US012400616B2

(12) United States Patent
Kimura et al.

(10) Patent No.: US 12,400,616 B2
(45) Date of Patent: Aug. 26, 2025

(54) SEMICONDUCTOR DEVICE

(71) Applicant: SEMICONDUCTOR ENERGY LABORATORY CO., LTD., Atsugi (JP)

(72) Inventors: Hajime Kimura, Kanagawa (JP); Atsushi Umezaki, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 18/892,704

(22) Filed: Sep. 23, 2024

(65) Prior Publication Data

US 2025/0014531 A1 Jan. 9, 2025

Related U.S. Application Data

(63) Continuation of application No. 18/212,752, filed on Jun. 22, 2023, now Pat. No. 12,100,366, which is a (Continued)

(30) Foreign Application Priority Data

Sep. 9, 2010 (JP) ................................ 2010-201621

(51) Int. Cl.
*G09G 3/36* (2006.01)
*G09G 3/20* (2006.01)

(52) U.S. Cl.
CPC ......... *G09G 3/3648* (2013.01); *G09G 3/2096* (2013.01); *G09G 3/3677* (2013.01); (Continued)

(58) Field of Classification Search
CPC ............... G09G 3/3677; G09G 3/2096; G09G 2300/0426; G09G 2300/0814; (Continued)

(56) References Cited

U.S. PATENT DOCUMENTS 5,986,630 A 11/1999 Hirakata et al.
6,876,353 B2 4/2005 Morosawa et al.
(Continued)

FOREIGN PATENT DOCUMENTS

CN 101303896 A 11/2008
CN 101483068 A 7/2009
(Continued)

OTHER PUBLICATIONS

Chinese Office Action (Application No. 201110278110.0) Dated Mar. 23, 2015.

(Continued)

*Primary Examiner* — Christopher E Leiby
(74) *Attorney, Agent, or Firm* — Fish & Richardson P.C.

(57) ABSTRACT

A semiconductor device where delay or distortion of a signal output to a gate signal line in a selection period is reduced is provided. The semiconductor device includes a gate signal line, a first and second gate driver circuits which output a selection signal and a non-selection signal to the gate signal line, and pixels electrically connected to the gate signal line and supplied with the two signals. In a period during which the gate signal line is selected, both the first and second gate driver circuits output the selection signal to the gate signal line. In a period during which the gate signal line is not selected, one of the first and second gate driver circuits outputs the non-selection signal to the gate signal line, and the other gate driver circuit outputs neither the selection signal nor the non-selection signal to the gate signal line.

10 Claims, 61 Drawing Sheets

Related U.S. Application Data continuation of application No. 17/979,836, filed on Nov. 3, 2022, now Pat. No. 11,688,358, which is a continuation of application No. 17/206,746, filed on Mar. 19, 2021, now Pat. No. 11,501,728, which is a continuation of application No. 16/711,621, filed on Dec. 12, 2019, now Pat. No. 10,957,267, which is a continuation of application No. 16/421,661, filed on May 24, 2019, now Pat. No. 10,510,310, which is a continuation of application No. 16/199,567, filed on Nov. 26, 2018, now Pat. No. 10,304,402, which is a continuation of application No. 15/995,210, filed on Jun. 1, 2018, now Pat. No. 10,140,942, which is a continuation of application No. 15/396,862, filed on Jan. 3, 2017, now Pat. No. 9,990,894, which is a continuation of application No. 14/714,395, filed on May 18, 2015, now Pat. No. 9,552,761, which is a continuation of application No. 13/225,856, filed on Sep. 6, 2011, now Pat. No. 9,035,923.

(52) U.S. Cl.
CPC ... *G09G 3/3688* (2013.01); *G09G 2300/0426* (2013.01); *G09G 2300/0814* (2013.01); *G09G 2300/0819* (2013.01); *G09G 2320/0209* (2013.01); *G09G 2320/0223* (2013.01); *G09G 2320/043* (2013.01)

(58) Field of Classification Search
CPC ... G09G 2300/0819; G09G 2320/0209; G09G 2320/0223
See application file for complete search history.

(56) References Cited

U.S. PATENT DOCUMENTS 7,023,410 B2 4/2006 Lee et al.
7,023,419 B2 4/2006 Park
7,038,653 B2 5/2006 Moon
7,119,767 B1 * 10/2006 Komiya ............... G09G 3/3266 345/100
7,190,338 B2 3/2007 Kubota et al.
7,277,070 B2 10/2007 Koyama
7,283,111 B2 10/2007 Kimura
7,317,432 B2 1/2008 Koyama
7,332,742 B2 2/2008 Miyake et al.
7,333,586 B2 2/2008 Jang
7,339,570 B2 3/2008 Kubota et al.
7,369,111 B2 5/2008 Jeon et al.
7,405,716 B2 7/2008 Lee et al.
7,486,268 B2 2/2009 Jang et al.
7,522,145 B2 4/2009 Lee et al.
7,529,334 B2 5/2009 Jang
7,573,445 B2 8/2009 Machida
7,687,808 B2 3/2010 Umezaki
7,705,819 B2 4/2010 Choi
7,814,345 B2 10/2010 Shaver et al.
7,843,421 B2 11/2010 Chang et al.
7,859,507 B2 12/2010 Jang et al.
7,859,510 B2 12/2010 Umezaki
7,889,832 B2 2/2011 Otose et al.
7,898,558 B2 3/2011 Chien et al.
7,956,855 B2 6/2011 Park
7,978,274 B2 7/2011 Umezaki et al.
8,054,279 B2 11/2011 Umezaki et al.
8,085,235 B2 12/2011 Jeon et al.
8,089,446 B2 1/2012 Pak et al.
8,102,340 B2 1/2012 Lee et al.
8,188,477 B2 5/2012 Miyairi et al.
8,212,802 B2 7/2012 Jeon
8,248,352 B2 8/2012 Kim et al.
8,279,210 B2 10/2012 Im et al.
8,330,492 B2 12/2012 Umezaki
8,405,596 B2 * 3/2013 Kumada ............. G09G 3/3677 345/98
8,520,159 B2 8/2013 Umezaki et al.
8,547,368 B2 10/2013 Yokoyama et al.
8,564,523 B2 10/2013 Moon
8,587,508 B2 11/2013 Iwase et al.
8,624,819 B2 1/2014 Kim et al.
8,654,056 B2 2/2014 Otose et al.
8,718,223 B2 5/2014 Murakami et al.
8,743,044 B2 6/2014 Umezaki et al.
8,902,145 B2 12/2014 Umezaki et al.
8,907,348 B2 12/2014 Miyairi et al.
8,908,115 B2 12/2014 Umezaki et al.
8,937,614 B2 1/2015 Otose et al.
9,070,593 B2 6/2015 Umezaki
9,153,341 B2 10/2015 Umezaki
9,214,473 B2 12/2015 Umezaki
9,263,468 B2 2/2016 Umezaki et al.
9,269,317 B2 2/2016 Jeon et al.
9,461,071 B2 10/2016 Umezaki
9,536,903 B2 1/2017 Umezaki et al.
9,570,619 B2 2/2017 Miyairi et al.
9,606,408 B2 3/2017 Umezaki et al.
9,646,714 B2 5/2017 Umezaki
9,842,861 B2 12/2017 Umezaki et al.
9,893,089 B2 2/2018 Miyairi et al.
10,048,558 B2 8/2018 Umezaki et al.
10,243,006 B2 3/2019 Miyairi et al.
10,297,618 B2 5/2019 Umezaki et al.
10,311,960 B2 6/2019 Umezaki
10,527,902 B2 1/2020 Umezaki et al.
10,622,381 B2 4/2020 Miyairi et al.
10,930,683 B2 2/2021 Umezaki et al.
11,237,445 B2 2/2022 Umezaki et al.
11,967,598 B2 4/2024 Umezaki et al.
12,107,092 B2 10/2024 Umezaki et al.
2001/0022565 A1 * 9/2001 Kimura ................ G09G 3/3266 345/82
2001/0052898 A1 * 12/2001 Osame ................. G09G 3/3688 345/211
2005/0088386 A1 * 4/2005 Kao ..................... G09G 3/3648 345/87
2006/0139293 A1 6/2006 Cho
2006/0279513 A1 12/2006 Chung
2007/0132700 A1 * 6/2007 Cho ....................... G11C 19/28 345/100
2007/0146354 A1 6/2007 Kubota. et al.
2007/0159438 A1 7/2007 Cho
2007/0236427 A1 10/2007 Koyama
2007/0290982 A1 12/2007 Kim et al.
2008/0007296 A1 1/2008 Umezaki
2008/0030434 A1 * 2/2008 Yamazaki ............ G09G 3/3258 345/76
2008/0036717 A1 * 2/2008 Moon .................. G09G 3/3677 345/87
2008/0055200 A1 3/2008 Lee et al.
2008/0062112 A1 3/2008 Umezaki
2008/0170064 A1 * 7/2008 Lee ...................... G09G 3/3677 345/87
2008/0211760 A1 9/2008 Baek et al.
2008/0219401 A1 9/2008 Tobita
2008/0266477 A1 * 10/2008 Lee ...................... G09G 3/3677 345/94
2008/0278467 A1 * 11/2008 Hwang ................ G09G 3/3648 345/87
2009/0021466 A1 1/2009 Otose et al.
2009/0146920 A1 * 6/2009 Miyake ................ G09G 3/3677 345/55
2009/0153532 A1 6/2009 Chen et al.
2009/0261339 A1 10/2009 Tsai et al.
2009/0267883 A1 * 10/2009 Kim ..................... G09G 3/3677 345/94
2009/0278782 A1 11/2009 Chen
2010/0002021 A1 * 1/2010 Hashimoto .......... G09G 3/2003 345/88
2010/0026619 A1 * 2/2010 Umezaki .............. G09G 3/3648 345/100

(56) References Cited

U.S. PATENT DOCUMENTS

| | | | | |
|---|---|---|---|---|
| 2010/0053138 | A1* | 3/2010 | Im | G09G 3/3677 345/212 |
| 2010/0123654 | A1* | 5/2010 | Kimura | G09G 3/3233 349/48 |
| 2010/0201668 | A1 | 8/2010 | Ko et al. | |
| 2010/0259512 | A1* | 10/2010 | Lin | G09G 3/3688 345/55 |
| 2010/0289832 | A1 | 11/2010 | Yamamoto et al. | |
| 2010/0327955 | A1 | 12/2010 | Umezaki | |
| 2010/0328594 | A1* | 12/2010 | Ishii | G09G 3/3688 349/139 |
| 2011/0115782 | A1* | 5/2011 | Song | G02F 1/133345 345/99 |
| 2011/0157263 | A1* | 6/2011 | Kim | G09G 3/3677 345/698 |
| 2011/0187694 | A1 | 8/2011 | Umezaki | |
| 2012/0162183 | A1 | 6/2012 | Kwon et al. | |
| 2015/0060682 | A1* | 3/2015 | Weisfield | H10F 39/813 250/208.1 |
| 2016/0125829 | A1 | 5/2016 | Jeon et al. | |
| 2016/0189129 | A1 | 6/2016 | Yang et al. | |
| 2017/0018576 | A1 | 1/2017 | Umezaki | |
| 2019/0295673 | A1 | 9/2019 | Umezaki | |
| 2020/0203386 | A1 | 6/2020 | Miyairi et al. | |
| 2021/0320128 | A1 | 10/2021 | Umezaki et al. | |
| 2022/0146872 | A1 | 5/2022 | Umezaki et al. | |

FOREIGN PATENT DOCUMENTS

| | | | |
|---|---|---|---|
| CN | 101567172 | A | 10/2009 |
| CN | 101568954 | A | 10/2009 |
| CN | 101609718 | A | 12/2009 |
| CN | 101620841 | A | 1/2010 |
| EP | 1895545 | A | 3/2008 |
| EP | 1906414 | A | 4/2008 |
| EP | 1959420 | A | 8/2008 |
| EP | 2226788 | A | 9/2010 |
| EP | 2226938 | A | 9/2010 |
| EP | 2357642 | A | 8/2011 |
| EP | 3223283 | A | 9/2017 |
| JP | 02-214817 | A | 8/1990 |
| JP | 02-253232 | A | 10/1990 |
| JP | 07-318902 | A | 12/1995 |
| JP | 2000-347628 | A | 12/2000 |
| JP | 2002-032048 | A | 1/2002 |
| JP | 2002-055660 | A | 2/2002 |
| JP | 2003-016794 | A | 1/2003 |
| JP | 2003-076346 | A | 3/2003 |
| JP | 2005-522734 | | 7/2005 |
| JP | 2006-190437 | A | 7/2006 |
| JP | 2007-011336 | A | 1/2007 |
| JP | 2007-034321 | A | 2/2007 |
| JP | 2007-151092 | A | 6/2007 |
| JP | 2007-226233 | A | 9/2007 |
| JP | 2007-241028 | A | 9/2007 |
| JP | 2008-009393 | A | 1/2008 |
| JP | 2008-058939 | A | 3/2008 |
| JP | 2008-089915 | A | 4/2008 |
| JP | 2008-107807 | A | 5/2008 |
| JP | 2008-129289 | A | 6/2008 |
| JP | 2008-140490 | A | 6/2008 |
| JP | 2008-146079 | A | 6/2008 |
| JP | 2008-197643 | A | 8/2008 |
| JP | 2008-251094 | A | 10/2008 |
| JP | 4163416 | | 10/2008 |
| JP | 2008-276849 | A | 11/2008 |
| JP | 2009-027265 | A | 2/2009 |
| JP | 2009-134845 | A | 6/2009 |
| JP | 2009-205706 | A | 9/2009 |
| JP | 2010-009738 | A | 1/2010 |
| JP | 2010-040074 | A | 2/2010 |
| JP | 2010-086640 | A | 4/2010 |
| JP | 2010-153828 | A | 7/2010 |
| KR | 2004-0022358 | A | 3/2004 |
| KR | 2006-0129881 | A | 12/2006 |
| KR | 2006-0134758 | A | 12/2006 |
| KR | 2009-0113080 | A | 10/2009 |
| KR | 2010-0027878 | A | 3/2010 |
| KR | 2010-0070627 | A | 6/2010 |
| KR | 2016-0083498 | A | 7/2016 |
| TW | 548465 | | 8/2003 |
| TW | 200502912 | | 1/2005 |
| TW | 200521913 | | 7/2005 |
| TW | 200703182 | | 1/2007 |
| TW | 200709150 | | 3/2007 |
| TW | 200818089 | | 4/2008 |
| TW | 200822038 | | 5/2008 |
| TW | 200826051 | | 6/2008 |
| TW | 200841144 | | 10/2008 |
| TW | 200905436 | | 2/2009 |
| TW | 200914964 | | 4/2009 |
| TW | 200926125 | | 6/2009 |
| TW | 201025236 | | 7/2010 |
| WO | WO-2003/087921 | | 10/2003 |
| WO | WO-2004/057561 | | 7/2004 |
| WO | WO-2005/114630 | | 12/2005 |
| WO | WO-2008/106049 | | 9/2008 |
| WO | WO-2009/084272 | | 7/2009 |
| WO | WO-2009/084280 | | 7/2009 |
| WO | WO-2010/058746 | | 5/2010 |
| WO | WO-2010/067641 | | 6/2010 |
| WO | WO-2010/150607 | | 12/2010 |

OTHER PUBLICATIONS

Taiwanese Office Action (Application No. 105142501) Dated Jul. 5, 2017.

Chinese Office Action (Application No. 201610335245.9) Dated Nov. 24, 2017.

Taiwanese Office Action (Application No. 109145808) Dated Mar. 30, 2021.

* cited by examiner

Operation 1
10A
11
10B

Operation 2
10A
11
10B

Operation 3
10A
11
10B

Operation 4
10A
11
10B

Operation 5
10A
11
10B

Operation 6
10A
11
10B

Operation 7
10A
11
10B

Operation 8
10A
11
10B

Operation 9
10A
11
10B

T2
T1
T2
T1
T2
T1
T2
T1
d
a
b
c
d
OUTA
OUTB d1
d2
OUTA
OUTB

FIG. 10A
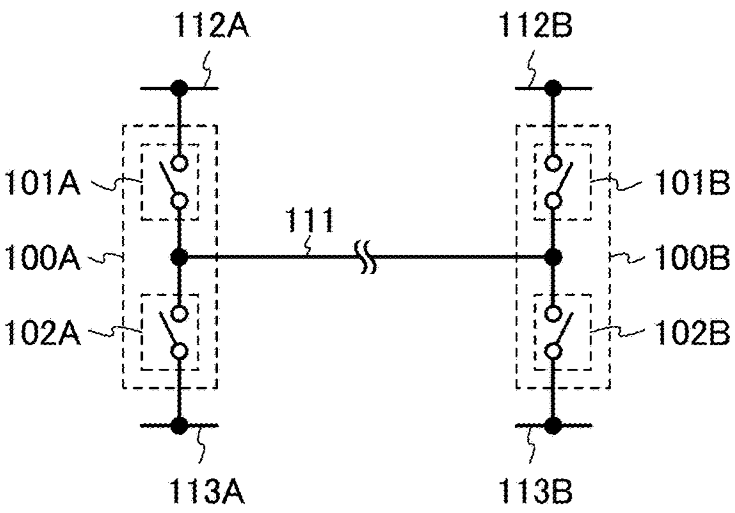
FIG. 10B
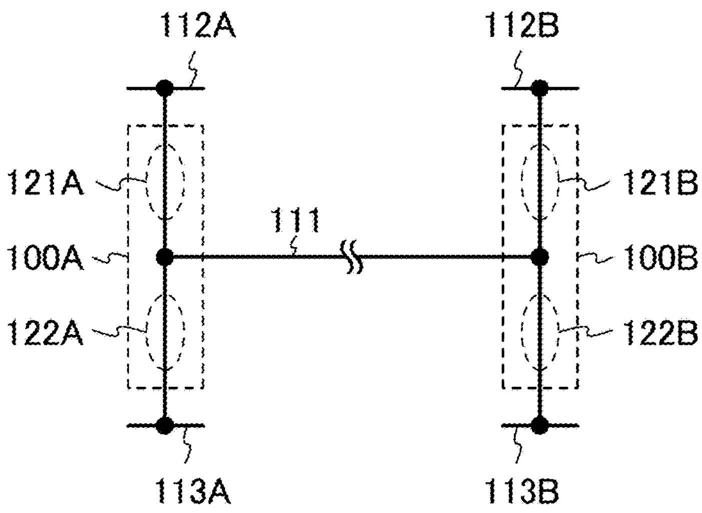
FIG. 10C
| | Operation 1a | Operation 1b | Operation 1c | Operation 2a | Operation 2b | Operation 2c | Operation 3a | Operation 3b | Operation 3c | Operation 4a | Operation 5a | Operation 6a | Operation 7a |
|---|---|---|---|---|---|---|---|---|---|---|---|---|---|
| 101A | ON | OFF | ON | ON | ON | OFF | OFF | OFF | OFF | OFF | ON | ON | OFF |
| 102A | ON | ON | OFF | ON | OFF | ON | OFF | OFF | OFF | OFF | OFF | OFF | OFF |
| 101B | ON | OFF | ON | OFF | OFF | OFF | ON | ON | OFF | OFF | ON | OFF | ON |
| 102B | ON | ON | OFF | OFF | OFF | OFF | ON | OFF | ON | OFF | OFF | OFF | OFF |

Operation 1a

Operation 1b

Operation 1c

Operation 2a

Operation 2b

Operation 2c

Operation 3a

Operation 3b

Operation 3c

Operation 4a

Operation 5a

Operation 6a

Operation 7a

FIG. 14A

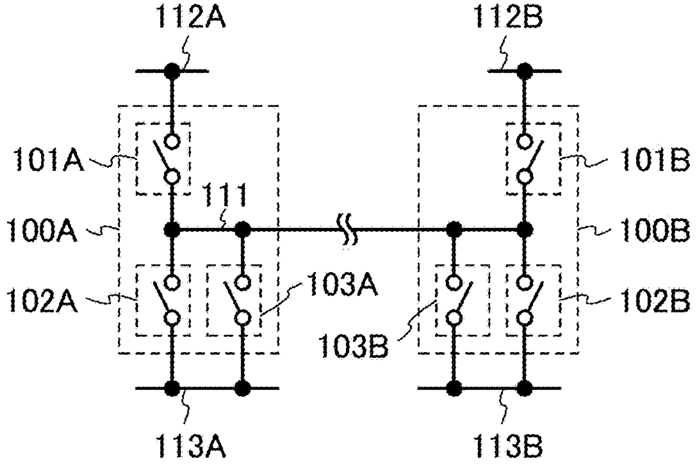

FIG. 14B

| | Operation 1d | Operation 1e | Operation 1f | Operation 2d | Operation 2e | Operation 2f | Operation 3d | Operation 3e | Operation 3f | Operation 4b | Operation 5b | Operation 6b | Operation 7b |
|---|---|---|---|---|---|---|---|---|---|---|---|---|---|
| 101A | OFF | OFF | OFF | OFF | OFF | OFF | OFF | OFF | OFF | OFF | ON | ON | OFF |
| 102A | ON | ON | OFF | ON | ON | OFF | OFF | OFF | OFF | OFF | OFF | OFF | OFF |
| 103A | ON | OFF | ON | ON | OFF | ON | OFF | OFF | OFF | OFF | OFF | OFF | OFF |
| 101B | OFF | OFF | OFF | OFF | OFF | OFF | OFF | OFF | OFF | OFF | ON | OFF | ON |
| 102B | ON | ON | OFF | OFF | OFF | OFF | ON | ON | OFF | OFF | OFF | OFF | OFF |
| 103B | ON | OFF | ON | OFF | OFF | OFF | ON | OFF | ON | OFF | OFF | OFF | OFF |

Operation 2e

Operation 2f

Operation 3e

Operation 3f

Operation 5b

Period a1

Period b1

Period c1

Period d1

Period a2

Period b2

Period c2

Period d2

Period c1

Period d1

Period a2

Period b2

Period c2

Period d2

Period a1

Period b1

Period c2

Period d2

SEMICONDUCTOR DEVICE

CROSS-REFERENCE TO RELATED APPLICATIONS

This application is a continuation of U.S. application Ser. No. 18/212,752, filed Jun. 22, 2023, now allowed, which is a continuation of U.S. application Ser. No. 17/979,836, filed Nov. 3, 2022, now U.S. Pat. No. 11,688,358, which is a continuation of U.S. application Ser. No. 17/206,746, filed Mar. 19, 2021, now U.S. Pat. No. 11,501,728, which is a continuation of U.S. application Ser. No. 16/711,621, filed Dec. 12, 2019, now U.S. Pat. No. 10,957,267, which is a continuation of U.S. application Ser. No. 16/421,661, filed May 24, 2019, now U.S. Pat. No. 10,510,310, which is a continuation of U.S. application Ser. No. 16/199,567, filed Nov. 26, 2018, now U.S. Pat. No. 10,304,402, which is a continuation of U.S. application Ser. No. 15/995,210, filed Jun. 1, 2018, now U.S. Pat. No. 10,140,942, which is a continuation of U.S. application Ser. No. 15/396,862, filed Jan. 3, 2017, now U.S. Pat. No. 9,990,894, which is a continuation of U.S. application Ser. No. 14/714,395, filed May 18, 2015, now U.S. Pat. No. 9,552,761, which is a continuation of U.S. application Ser. No. 13/225,856, filed Sep. 6, 2011, now U.S. Pat. No. 9,035,923, which claims the benefit of a foreign priority application filed in Japan as Serial No. 2010-201621 on Sep. 9, 2010, all of which are incorporated by reference.

BACKGROUND OF THE INVENTION

1. Field of the Invention

The technical field of the present invention relates to semiconductor devices including gate driver circuits.

2. Description of the Related Art

An active-matrix display device includes a pixel portion which includes a plurality of pixels provided with elements functioning as switches (e.g., transistors) and a driver circuit which includes a source driver circuit and a gate driver circuit. The source driver circuit outputs a video signal to a pixel provided with an element functioning as a switch when the element is on. The gate driver circuit controls switching of the element functioning as a switch.

The gate driver circuit is provided close to the pixel portion. In the case where the gate driver circuit is provided close to one side of the pixel portion, the region of the pixel portion might lean to one side of the display device. Thus, a display device which has a structure in which a gate driver circuit is separated into right and left in the pixel portion has been proposed.

FIG. 58 illustrates the structure of a display device disclosed in Reference 1. In the display device illustrated in FIG. 58, a first gate driver circuit 5108 and a second gate driver circuit 5110 are symmetrically provided in right and left peripheral regions of a display region.

The first gate driver circuit 5108 is provided in the left peripheral region of the display region. The first gate driver circuit 5108 includes a plurality of shift registers ($SRC_1$ and $SRC_3$ to $SRC_{n+1}$) whose output terminals are connected to odd-numbered gate lines ($GL_1$ and $GL_3$ to $GL_{n+1}$). The second gate driver circuit 5110 is provided in the right peripheral region of the display region. The second gate driver circuit 5110 includes a plurality of shift registers ($SRC_2$, $SRC_4$, . . . and $SRC_n$) whose output terminals are connected to even-numbered gate lines ($GL_2$, $GL_4$, . . . and $GL_n$).

The first gate driver circuit 5108 controls an electrical connection between a source driver circuit 5112 and a pixel which is provided in an odd-numbered row in the pixel portion 5102. The second gate driver circuit 5110 controls an electrical connection between the source driver circuit 5112 and a pixel which is provided in an even-numbered row in the pixel portion 5102.

REFERENCE

Reference 1: Japanese Published Patent Application No. 2003-076346

SUMMARY OF THE INVENTION

As in the display device described with reference to FIG. 58, in a display device which has a structure in which a gate driver circuit is separated into right and left in a pixel portion, a signal is output from one of a first gate driver circuit and a second gate driver circuit to a gate line (also referred to as a gate signal line) in a period during which a gate line is selected (such a period is also referred to as a selection period). In addition, in a period during which a gate line is not selected (such a period is also referred to as a non-selection period), no signal is output from the first gate driver circuit and the second gate driver circuit to a gate line.

It is an object of one embodiment of the present invention to provide a semiconductor device where delay or distortion of a signal output to a gate signal line in a selection period is reduced.

It is an object of one embodiment of the present invention to provide a semiconductor device where deterioration of transistors included in a first gate driver circuit and a second gate driver circuit is suppressed.

It is an object of one embodiment of the present invention to provide a semiconductor device where the rise time or fall time of the potential of a gate signal line is short.

One embodiment of the present invention is a semiconductor device which includes a gate signal line, a first gate driver circuit and a second gate driver circuit which output a selection signal and a non-selection signal to the gate signal line, and a plurality of pixels which are electrically connected to the gate signal line and supplied with the selection signal and the non-selection signal. In a period during which the gate signal line is selected, both the first gate driver circuit and the second gate driver circuit output the selection signal to the gate signal line. In a period during which the gate signal line is not selected, one of the first gate driver circuit and the second gate driver circuit outputs the non-selection signal to the gate signal line, and the other of the first gate driver circuit and the second gate driver circuit outputs neither the selection signal nor the non-selection signal to the gate signal line.

The first gate driver circuit and the second gate driver circuit may be provided with a pixel portion including the plurality of pixels provided therebetween.

The semiconductor device may include a source driver circuit for writing a video signal to a pixel corresponding to the gate signal line to which the selection signal is output.

In one embodiment of the present invention, it is possible to provide a semiconductor device where delay or distortion of a signal output to a gate signal line in a selection period is reduced.

In one embodiment of the present invention, it is possible to provide a semiconductor device where deterioration of transistors included in a first gate driver circuit and a second gate driver circuit is suppressed.

In one embodiment of the present invention, it is possible to provide a semiconductor device where the rise time or fall time of the potential of a gate signal line is short.

BRIEF DESCRIPTION OF THE DRAWINGS

In the accompanying drawings:

FIGS. 10A and 10B each illustrate a structure example of a gate driver circuit, and FIG. 10C illustrates an operation example of a gate driver circuit;

FIG. 14A illustrates a structure example of a gate driver circuit, and FIG. 14B illustrates an operation example of a gate driver circuit;

DETAILED DESCRIPTION OF THE INVENTION

Figure 1A:
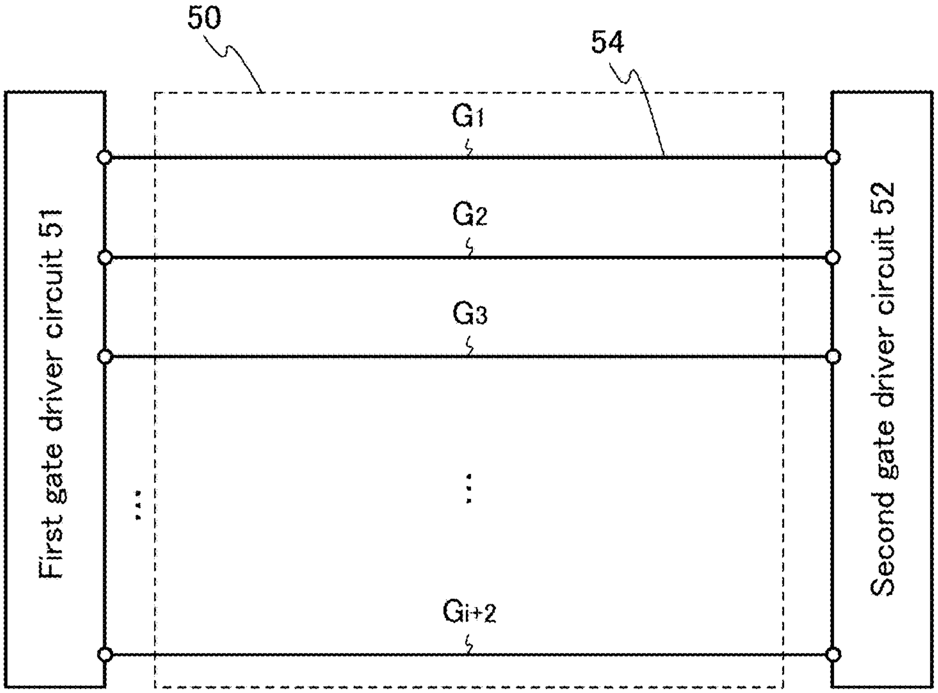
FIG. 1A illustrates a structure example of a semiconductor device.

Examples of embodiments of the present invention will be described below with reference to the drawings. Note that the present invention is not limited to the following description. It will be readily appreciated by those skilled in the art that modes and details of the present invention can be modified in various ways without departing from the spirit and scope of the present invention. The present invention therefore should not be construed as being limited to the following description of the embodiments. Note that in description with reference to the drawings, reference numerals denoting the same portions are used in common in different drawings in some cases. Further, in some cases, the same hatching patterns are applied to similar portions, and the similar portions are not necessarily denoted by reference numerals in different drawings.

Note that the contents of the embodiments can be combined with each other as appropriate. In addition, the contents of the embodiments can be replaced with each other as appropriate.

Further, in this specification, the term "k-th" (k is a natural number) is used in order to avoid confusion among components and do not limit the number of components.

The term "voltage" generally means a difference between potentials at two points (also referred to as a potential difference). However, in an electronic circuit, in a circuit diagram or the like, a difference between a potential at one point and a potential serving as a reference (also referred to as a reference potential) is used in some cases. Further, in some cases, volt (V) is used as the units of voltage and a potential. Thus, in this specification, a difference between a potential at one point and a reference potential is used as the voltage of the point in some cases unless otherwise specified.

Note that in this specification, a transistor has at least three terminals (a source, a drain, and a gate) and has a structure in which the potential of one terminal controls conduction between the other two terminals. Further, the source and the drain of the transistor might be interchanged with each other depending on the structure, operating condition, or the like of the transistor.

A source is part of or the whole of a source electrode, or part of or the whole of a source wiring. A conductive layer functioning as both a source electrode and a source wiring is referred to as a source in some cases without distinction between a source electrode and a source wiring. A drain is part of or the whole of a drain electrode, or part of or the whole of a drain wiring. A conductive layer functioning as both a drain electrode and a drain wiring is referred to as a drain in some cases without distinction between a drain electrode and a drain wiring. A gate is part or the whole of a gate electrode, or part or the whole of a gate wiring. A conductive layer functioning as both a gate electrode and a gate wiring is referred to as a gate in some cases without distinction between a gate electrode and a gate wiring.

Note that in this specification, description that "A and B are connected" indicates the case where A and B are electrically connected in addition to the case where A and B are directly connected. Specifically, the description that "A and B are connected" indicates the case where it is acceptable that A and B have the same nodes considering circuit operation, e.g., the case where A and B are connected through an element functioning as a switch, such as a transistor, and A and B have substantially the same potentials when the element is on, the case where A and B are connected through a resistor and a potential difference generated at opposite ends of the resistor does not affect the operation of a circuit including A and B, or the like.

Note that in this specification, the term "substantially" is used in consideration of various kinds of errors such as an error due to noise, an error due to process variation, an error due to variation in steps of manufacturing an element, or a measurement error.

Note that in this specification, the potential of an L-level signal (also referred to as an L signal) is denoted by V1, and the potential of an H-level signal (also referred to as an H signal) is denoted by V2 (V2>V1). In addition, in the case where the description "the potential of an L-level signal", "an L-level potential", or "voltage V1" is used, the potential is substantially V1. In the case where the description "the potential of an H-level signal", "an H-level potential", or "voltage V2" is used, the potential is substantially V2.

Embodiment 1

In this embodiment, semiconductor devices including gate driver circuits (also referred to as gate drivers) are described with reference to FIGS. 1A and 1B, FIGS. 2A to 2C, and FIGS. 3A to 3C.

Figure 1B:
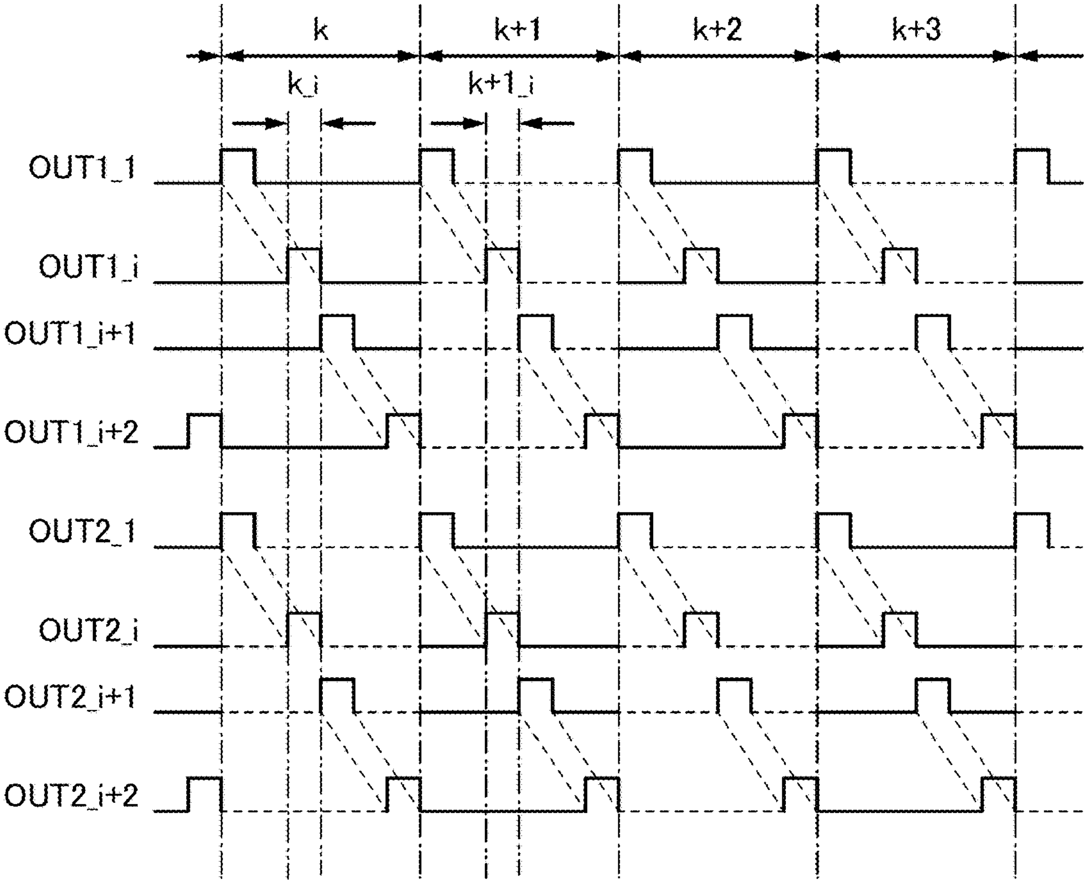
FIG. 1B is a timing chart illustrating an operation example of a semiconductor device.

FIG. 1A illustrates a structure example of a semiconductor device including a gate driver circuit. FIG. 1B is a timing chart illustrating an operation example of the semiconductor device. Note that the semiconductor device may include a source driver circuit (also referred to as a source driver), a control circuit, or the like in addition to the gate driver circuit.

In FIG. 1A, the semiconductor device includes a pixel portion 50, a first gate driver circuit 51, a second gate driver circuit 52, and a gate line 54 (also referred to as a gate signal line) connected to the first gate driver circuit 51 and the second gate driver circuit 52. In FIG. 1A, gate lines $G_i$ to $G_{i+2}$ (i is any one of 1 to (m−2)) are illustrated among a plurality of gate lines $G_1$ to $G_m$ (m is a natural number) included in the semiconductor device.

In the case where the gate line 54 is selected, H signals are input to the gate line 54 from the gate driver circuit 51 and the gate driver circuit 52. When H signals are input from both the gate driver circuit 51 and the gate driver circuit 52 in this manner, the rise time or fall time of the potential of the gate line 54 can be shortened and delay or distortion of signals output to the gate line 54 can be reduced.

In contrast, in the case where the gate line 54 is not selected, an L signal is output to the gate line 54 from one of the gate driver circuit 51 and the gate driver circuit 52 and no signal is output to the gate line 54 from the other of the gate driver circuit 51 and the gate driver circuit 52. Thus, some of or all of the transistors included in the other gate driver circuit can be turned off.

Figure 2A:
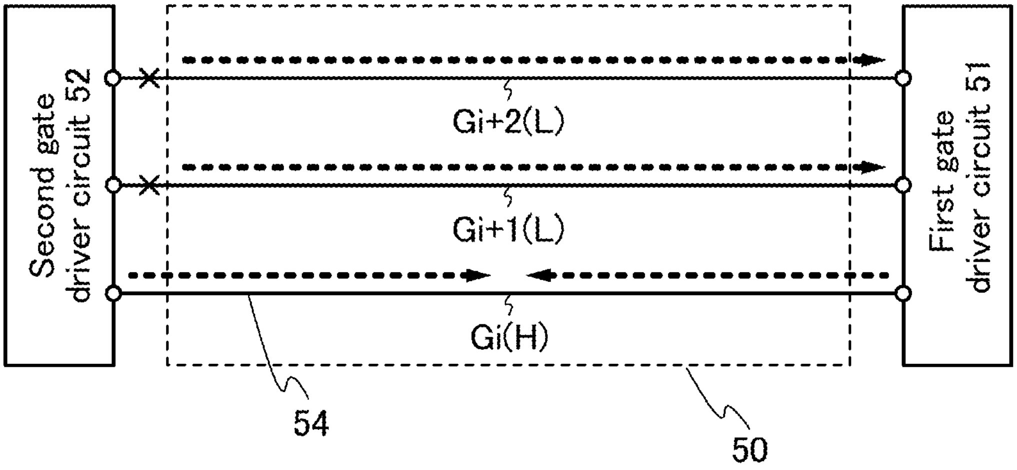
FIGS. 2A to 2C each illustrate an operation example of a semiconductor device.
Figure 2B:
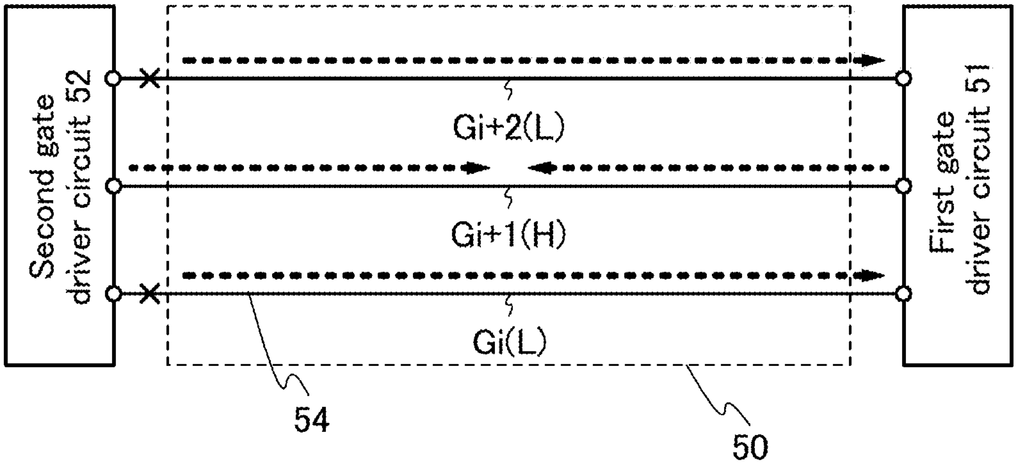
Figure 2C:
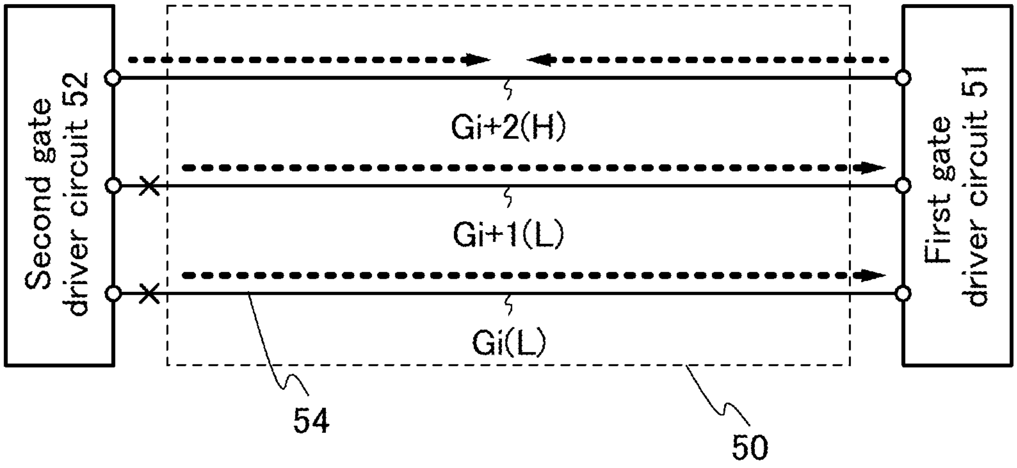
Figure 3A:
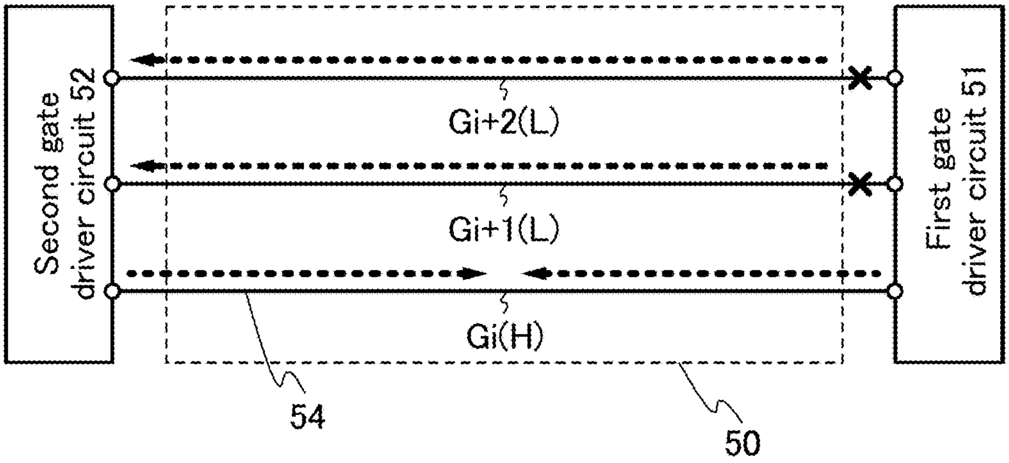
FIGS. 3A to 3C each illustrate an operation example of a semiconductor device.
Figure 3B:
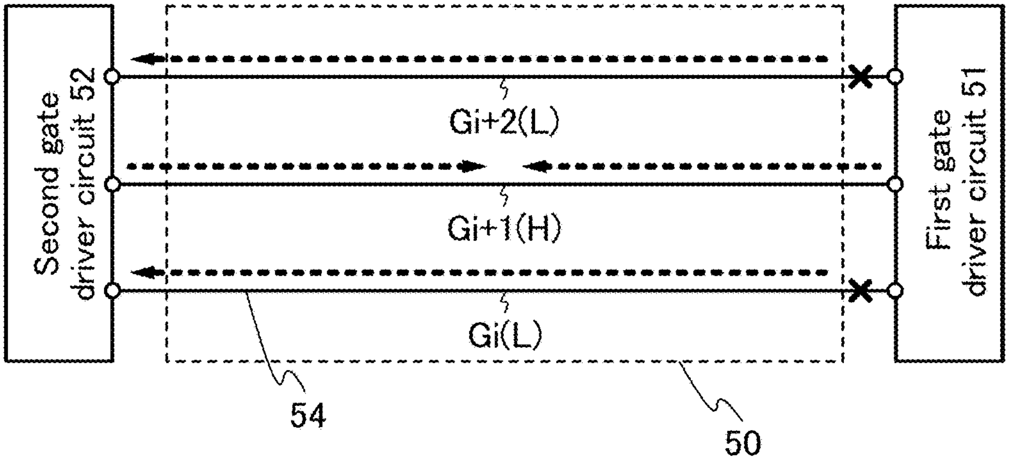
Figure 3C:
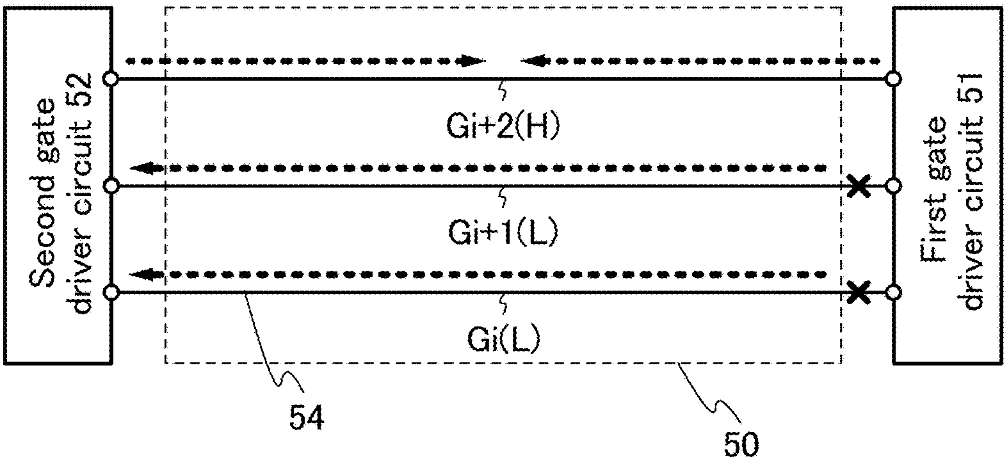

Next, an operation example of the semiconductor device illustrated in FIG. 1A is described below. FIGS. 2A to 2C illustrate an operation example of the semiconductor device in a k-th frame. FIGS. 3A to 3C illustrate an operation example of the semiconductor device in a (k+1)th frame.

Note that in FIGS. 2A to 2C and FIGS. 3A to 3C, each arrow indicates that the gate driver circuit (the first gate driver circuit 51 or the second gate driver circuit 52) outputs a signal to the gate line 54, and each cross indicates that the gate driver circuit outputs no signal to the gate line 54.

Here, the direction of each arrow is used properly depending on the kind of a signal output to the gate line 54 from the gate driver circuit. In the case where the gate driver circuit outputs a signal (e.g., a non-selection signal) to the gate line 54, the direction of each arrow is a direction from the gate line 54 to the gate driver circuit. In the case where the gate driver circuit outputs a signal (e.g., a selection signal) which is different from the above signal (e.g., a non-selection signal) to the gate line 54, the direction of each arrow is a direction from the gate driver circuit to the gate line 54.

In the case where the gate line $G_i$ is selected and the gate lines $G_{i+1}$ and $G_{i+2}$ are not selected in the k-th frame as illustrated in FIG. 2A (corresponding a period $k_{i}$ in FIG. 1B), H signals are output to the gate line $G_i$ from the gate driver circuit 51 and the gate driver circuit 52. In addition, L signals are output to the gate lines $G_{i+1}$ and $G_{i+2}$ from the gate driver circuit 51, and no signal is output to the gate lines $G_{i+1}$ and $G_{i+2}$ from the gate driver circuit 52. Thus, some of or all of the transistors included in the gate driver circuit 52 can be turned off.

Then, in the case where the gate line $G_i$ is selected and the gate lines $G_{i+1}$ and $G_{i+2}$ are not selected in the (k+1)th frame as illustrated in FIG. 3A (corresponding a period $k+1_{i}$ in FIG. 1B), H signals are output to the gate line $G_i$ from the gate driver circuit 51 and the gate driver circuit 52. In addition, no signal is output to the gate lines $G_{i+1}$ and $G_{i+2}$ from the gate driver circuit 51, and L signals are output to the gate lines $G_{i+1}$ and $G_{i+2}$ from the gate driver circuit 52. Thus, some of or all of the transistors included in the gate driver circuit 51 can be turned off.

Similarly, in the case where the gate line $G_{i+1}$ is selected and the gate lines $G_i$ and $G_{i+2}$ are not selected in the k-th frame as illustrated in FIG. 2B, H signals are output to the gate line $G_{i+1}$ from the gate driver circuit 51 and the gate driver circuit 52. In addition, L signals are output to the gate lines $G_i$ and $G_{i+2}$ from the gate driver circuit 51, and no signal is output to the gate lines $G_i$ and $G_{i+2}$ from the gate driver circuit 52. Thus, some of or all of the transistors included in the gate driver circuit 52 can be turned off.

Then, in the case where the gate line $G_{i+1}$ is selected and the gate lines $G_i$ and $G_{i+2}$ are not selected in the (k+1)th frame as illustrated in FIG. 3B, H signals are output to the gate line $G_{i+1}$ from the gate driver circuit 51 and the gate driver circuit 52. In addition, no signal is output to the gate lines $G_i$ and $G_{i+2}$ from the gate driver circuit 51, and L signals are output to the gate lines $G_i$ and $G_{i+2}$ from the gate driver circuit 52. Thus, some of or all of the transistors included in the gate driver circuit 51 can be turned off.

Similarly, in the case where the gate line $G_{i+2}$ is selected and the gate lines $G_i$ and $G_{i+1}$ are not selected in the k-th frame as illustrated in FIG. 2C, H signals are output to the gate line $G_{i+2}$ from the gate driver circuit 51 and the gate driver circuit 52. In addition, L signals are output to the gate lines $G_i$ and $G_{i+1}$ from the gate driver circuit 51, and no signal is output to the gate lines $G_i$ and $G_{i+1}$ from the gate driver circuit 52. Thus, some of or all of the transistors included in the gate driver circuit 52 can be turned off.

Then, in the case where the gate line $G_{i+2}$ is selected and the gate lines $G_i$ and $G_{i+1}$ are not selected in the (k+1)th frame as illustrated in FIG. 3C, H signals are output to the gate line $G_{i+2}$ from the gate driver circuit 51 and the gate driver circuit 52. In addition, no signal is output to the gate lines $G_i$ and $G_{i+1}$ from the gate driver circuit 51, and L signals are output to the gate lines G and $G_{i+1}$ from the gate driver circuit 52. Thus, some of or all of the transistors included in the gate driver circuit 51 can be turned off.

Since no signal is output to the gate line 54 which is not selected from one of the gate driver circuit 51 and the gate driver circuit 52 in this manner, some of or all of the transistors included in the one of the gate driver circuits can be turned off. Accordingly, deterioration of the transistors can be suppressed.

Embodiment 2

In this embodiment, the structure and operation of a gate driver circuit are described.

<Structure of Gate Driver Circuit>

The structure of a gate driver circuit is described with reference to FIG. 4A.

Figure 4A:
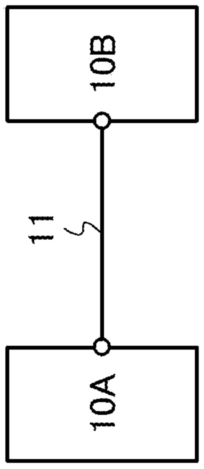
FIG. 4A illustrates a structure example of a gate driver circuit.

FIG. 4A illustrates a structure example of a gate driver circuit. The gate driver circuit includes a circuit 10A and a circuit 10B. Note that although FIG. 4A illustrates the case where the gate driver circuit includes the two circuits 10A and 10B, the gate driver circuit may include three or more circuits including the circuits 10A and 10B.

The circuit 10A and the circuit 10B are connected to a wiring 11.

A signal is input to the wiring 11 from the circuit 10A or the circuit 10B, and the wiring 11 functions as a signal line. Note that a signal may be input to the wiring 11 from a circuit which is different from the circuit 10A and the circuit 10B.

Note that in the case where the gate driver circuit in FIG. 4A is used for a display device including a pixel portion, the wiring 11 extends to the pixel portion and is connected to a gate of a transistor in a pixel included in the pixel portion (e.g., a switching transistor or a selection transistor). In that case, the wiring 11 functions as a gate line (also referred to as a gate signal line), a scan line, or a power supply line.

Alternatively, fixed voltage is applied to the wiring 11 from the circuit 10A or the circuit 10B, and the wiring 11 functions as a power supply line. Note that voltage may be applied to the wiring 11 from a circuit which is different from the circuit 10A and the circuit 10B.

Next, the functions of the circuit 10A and the circuit 10B are described.

The circuit 10A has a function of controlling the timing of outputting a signal (e.g., a selection signal or a non-selection signal) to the wiring 11. Alternatively, the circuit 10A has a function of controlling the timing of outputting no signal to the wiring 11. Alternatively, the circuit 10A has a function of outputting a signal (e.g., a non-selection signal) to the wiring 11 in a certain period and outputting a different signal (e.g., a selection signal) to the wiring 11 in a different period. Alternatively, the circuit 10A has a function of outputting a signal (e.g., a selection signal or a non-selection signal) to the wiring 11 in a certain period and outputting no signal to the wiring 11 in a different period.

As described above, the circuit 10A functions as a driver circuit or a control circuit. Note that the circuit 10A may output a different signal to the wiring 11. In that case, the circuit 10A can output three or more kinds of signals to the wiring 11.

The circuit 10B has a function of controlling the timing of outputting a signal (e.g., a selection signal or a non-selection signal) to the wiring 11. Alternatively, the circuit 10B has a function of controlling the timing of outputting no signal to the wiring 11. Alternatively, the circuit 10B has a function of outputting a signal (e.g., a non-selection signal) to the wiring 11 in a certain period and outputting a different signal (e.g., a selection signal) to the wiring 11 in a different period. Alternatively, the circuit 10B has a function of outputting a signal (e.g., a selection signal or a non-selection signal) to the wiring 11 in a certain period and outputting no signal to the wiring 11 in a different period.

As described above, the circuit 10B functions as a driver circuit or a control circuit. Note that the circuit 10B may output a different signal to the wiring 11. In that case, the circuit 10B can output three or more kinds of signals to the wiring 11.

<Operation of Gate Driver Circuit>

The operation of the gate driver circuit in FIG. 4A is described with reference to FIG. 4B and FIGS. 5A to 5I.

Figure 4B:
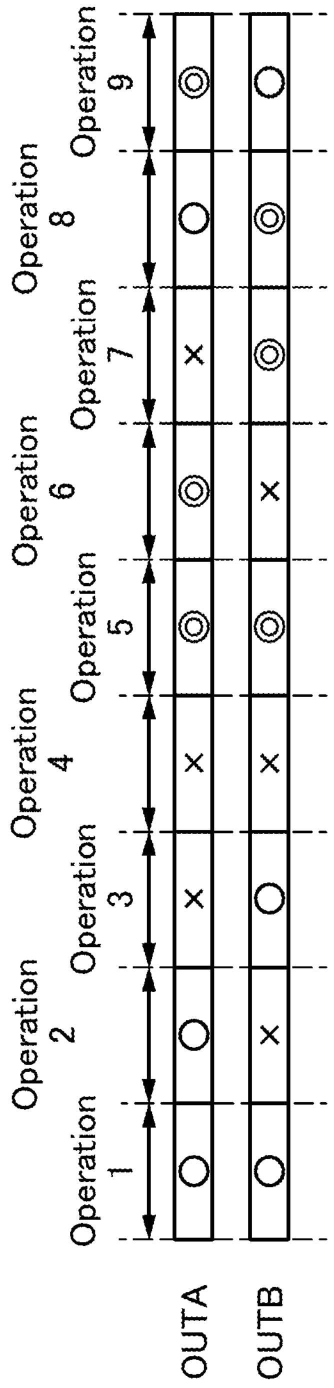
FIG. 4B illustrates an operation example of a gate driver circuit.

FIG. 4B illustrates an operation example of the gate driver circuit. FIG. 4B illustrates an output signal OUTA of the circuit 10A and an output signal OUTB of the circuit 10B in each operation of the gate driver circuit. FIGS. 5A to 5I are schematic views corresponding to operation examples of the gate driver circuit in FIG. 4A.

Note that the gate driver circuit in FIG. 4A can perform nine operations illustrated in FIG. 4B by an appropriate combination of the case where both the circuit 10A and the circuit 10B output signals (e.g., non-selection signals) to the wiring 11, the case where both the circuit 10A and the circuit 10B output signals which are different from the signals (e.g., selection signals) to the wiring 11, and the case where both the circuit 10A and the circuit 10B output no signal (e.g., neither a non-selection signal nor a selection signal) to the wiring 11.

In this embodiment, the nine operations are described. Note that the gate driver circuit in FIG. 4A does not necessarily perform all the nine operations, and can selectively perform some of the nine operations. In addition, the driver circuit in FIG. 4A may perform an operation which is different from the nine operations.

Note that in FIG. 4B, a circle indicates that the circuit (the circuit 10A or the circuit 10B) outputs a signal (e.g., a non-selection signal) to the wiring 11. A double circle indicates that the circuit outputs a signal which is different from the signal (e.g., a selection signal) to the wiring 11. A cross indicates that the circuit outputs no signal (e.g., neither a non-selection signal nor a selection signal) to the wiring 11.

Note that in the schematic views in FIGS. 5A to 5I, each arrow indicates that the circuit (the circuit 10A or the circuit 10B) outputs a signal to the wiring 11, and each cross indicates that the circuit outputs no signal to the wiring 11. Here, the direction of each arrow is used properly depending on the kind of a signal output to the wiring 11 from the circuit. In the case where the circuit outputs a signal (e.g., a non-selection signal) to the wiring 11, the direction of each arrow is a direction from the wiring 11 to the circuit. In the case where the circuit outputs a signal (e.g., a selection signal) which is different from the above signal (e.g., a non-selection signal) to the wiring 11, the direction of each arrow is a direction from the circuit to the wiring 11.

Note that in the schematic views in FIGS. 5A to 5I, the direction of each arrow does not indicate the direction of current and generation of current but indicates that the circuit (the circuit 10A or the circuit 10B) outputs a signal to the wiring 11. The direction of current is determined by the potential of the wiring 11. When the potential of a signal output from the circuit is substantially equal to the potential of the wiring 11, current is not generated or the amount of current is extremely small in some cases.

An operation example of the gate driver circuit in FIG. 4A is described below.

Figures 5A, 5B, 5C, 5D, 5E, 5F, 5G, 5H, 5I:
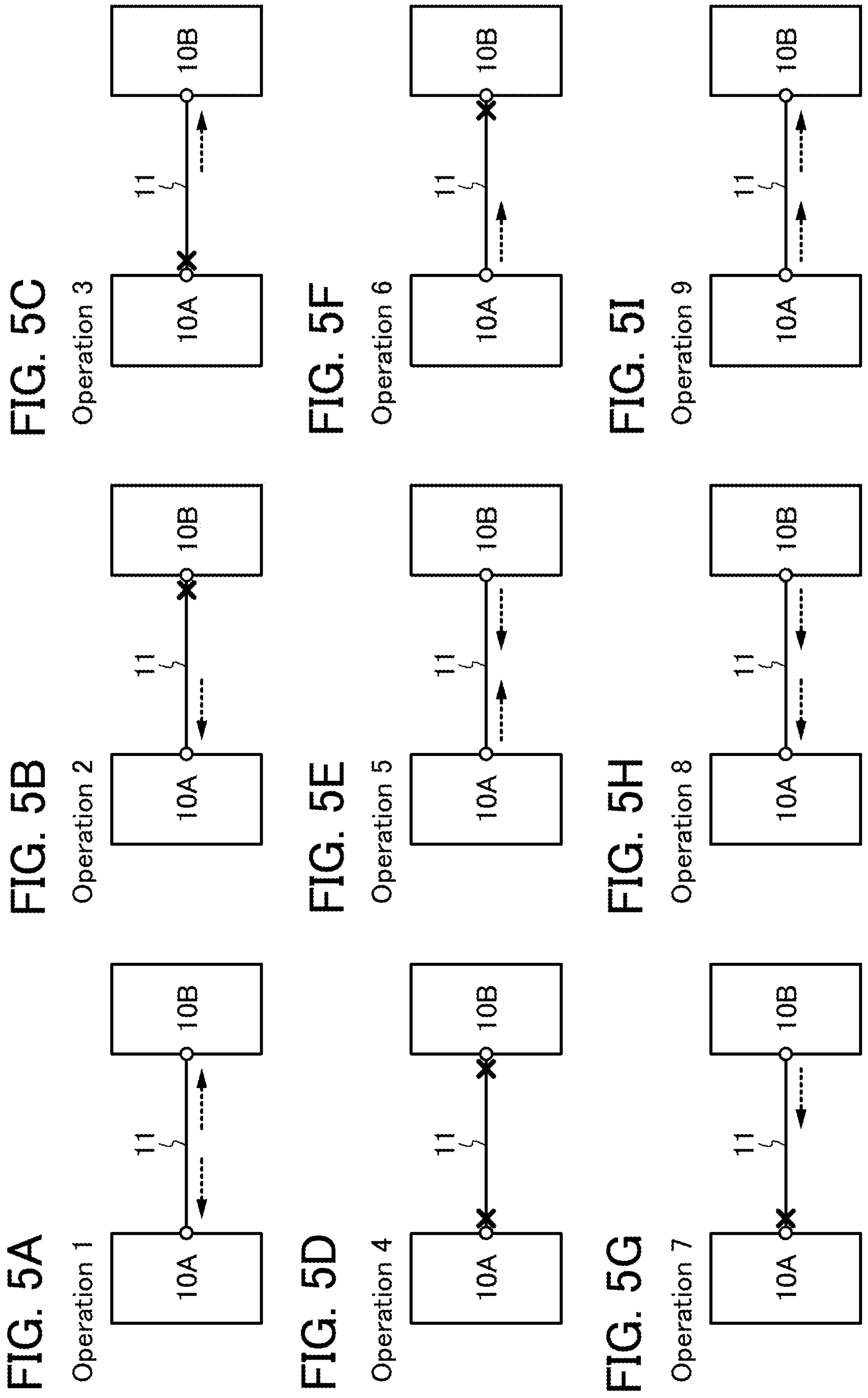
FIGS. 5A to 5I are schematic views corresponding to operation examples of a gate driver circuit.

In an operation 1 in FIG. 5A, the circuit 10A outputs a signal (e.g., a non-selection signal) to the wiring 11, and the circuit 10B outputs a signal (e.g., a non-selection signal) to the wiring 11. In an operation 2 in FIG. 5B, the circuit 10A outputs a signal (e.g., a non-selection signal) to the wiring 11, and the circuit 10B outputs no signal to the wiring 11. In an operation 3 in FIG. 5C, the circuit 10A outputs no signal to the wiring 11, and the circuit 10B outputs a signal (e.g., a non-selection signal) to the wiring 11. In an operation 4 in FIG. 5D, the circuit 10A outputs no signal to the wiring 11, and the circuit 10B outputs no signal to the wiring 11.

In an operation 5 in FIG. 5E, the circuit 10A outputs a different signal (e.g., a selection signal) to the wiring 11, and the circuit 10B outputs a different signal (e.g., a selection signal) to the wiring 11. In an operation 6 in FIG. 5F, the circuit 10A outputs a different signal (e.g., a selection signal) to the wiring 11, and the circuit 10B outputs no signal to the wiring 11. In an operation 7 in FIG. 5G, the circuit 10A outputs no signal to the wiring 11, and the circuit 10B outputs a different signal (e.g., a selection signal) to the wiring 11. In an operation 8 in FIG. 5H, the circuit 10A outputs a signal (e.g., a non-selection signal) to the wiring 11, and the circuit 10B outputs a different signal (e.g., a selection signal) to the wiring 11. In an operation 9 in FIG. 5I, the circuit 10A outputs a different signal (e.g., a non-selection signal) to the wiring 11, and the circuit 10B outputs a signal (e.g., a non-selection signal) to the wiring 11.

As described above, the gate driver circuit in FIG. 4A can perform a variety of operations. Then, the advantage of each operation is described.

In the operation 1 and the operation 5, when the circuit 10A and the circuit 10B output the same signal to the wiring 11, noise is not easily generated in the potential of the wiring 11, so that the potential of the wiring 11 can be stabilized. For example, a signal that should not be originally written (e.g., a video signal input to a pixel in a different row) can be prevented from being written to a pixel connected to the wiring 11. Alternatively, the potential of a video signal held in the pixel connected to the wiring 11 can be prevented from being changed. Accordingly, the display quality of a display device can be improved.

In the operation 1 and the operation 5, when the circuit 10A and the circuit 10B output the same signal to the wiring 11, a change in potential of the wiring 11 can be made steep (e.g., the rise time or fall time of the potential of the wiring 11 can be shortened). Thus, distortion in the potential of the wiring 11 can be reduced. For example, a signal that should not be originally written (e.g., a video signal input to a pixel in the preceding row) can be prevented from being written to the pixel connected to the wiring 11. Accordingly, cross-talk can be reduced. Thus, the display quality of the display device can be improved.

In the operation 8 and the operation 9, when the circuit 10A and the circuit 10B output different signals (e.g., a selection signal and a non-selection signal) to the wiring 11, the potential of the wiring 11 can be a potential which is between the potential of the signal output from the circuit 10A and the potential of the signal output from the circuit 10B. Thus, the potential of the wiring 11 can be controlled with high accuracy.

In the operations 2, 3, 6 and 7, when one of the circuit 10A and the circuit 10B outputs a signal to the wiring 11, the other of the circuit 10A and the circuit 10B outputs no signal. Thus, transistors included in the circuit which outputs no signal can be turned off. Accordingly, deterioration of the transistors can be suppressed.

In the operation 4, the circuit 10A and the circuit 10B output no signal to the wiring 11; thus, transistors included in the circuit 10A and the circuit 10B can be turned off. Accordingly, deterioration of the transistors can be suppressed.

Since deterioration of the transistors can be suppressed in the operations 2, 3, 4, 6, and 7 as described above, a material which easily deteriorates, such as a non-single-crystal semiconductor (e.g., an amorphous semiconductor or a microcrystalline semiconductor), an organic semiconductor, or an oxide semiconductor, can be used as a semiconductor layer of the transistor. Thus, when a semiconductor device is manufactured, the number of steps can be reduced, yield can be increased, or cost can be reduced. In addition, since a method for manufacturing a semiconductor device is facilitated, the size of the display device can be increased.

Since deterioration of the transistors can be suppressed in the operations 2, 3, 4, 6, and 7, it is not necessary to increase the channel width of the transistor in consideration of deterioration of the transistor. Thus, the channel width of the transistor can be decreased, so that the layout area can be decreased. In particular, in the case where the gate driver circuit in this embodiment is used for the display device, the layout area of the gate driver circuit can be decreased; thus, the resolution of the pixel can be increased.

In addition, since the channel width of the transistor can be decreased in the operations 2, 3, 4, 6, and 7 as described above, the load of the gate driver circuit can be decreased. Thus, the current supply capability of a circuit (e.g., an external circuit) for supplying a signal or the like to the gate driver circuit in this embodiment can be decreased. Consequently, the size of the circuit for supplying the signal or the like can be decreased or the number of IC chips used for the circuit for supplying the signal or the like can be reduced. Further, since the load of the gate driver circuit can be decreased, the power consumption of the gate driver circuit can be reduced.

Next, timing charts at the time when the operation of the gate driver circuit in FIG. 4A is a combination of some of the operations 1 to 9 illustrated in FIGS. 5A to 5I are described below.

Here, a timing chart illustrating the operation of the gate driver circuit in FIG. 4A includes a plurality of periods. In each period or a transition period from a certain period to a different period, the gate driver circuit in FIG. 4A can perform any of the operations 1 to 9 illustrated in FIGS. 5A to 5I. The gate driver circuit in FIG. 4A may perform operation which is different from the operations 1 to 9 illustrated in FIGS. 5A to 5I.

FIGS. 6A to 6L are timing charts each illustrating an operation example of the gate driver circuit. In the timing charts in FIGS. 6A to 6L, a period a, a period b, and a period c are sequentially provided and a period d is provided. Note that although the periods a to d are sequentially provided in FIGS. 6A to 6L, the order of the periods a to d is not limited to this. In addition, the timing charts may include a period which is different from the periods a to d.

In the timing charts in FIGS. 6A to 6L, each solid line indicates that the circuit (the circuit 10A or the circuit 10B) outputs a signal to the wiring 11, and a dotted line indicates that the circuit outputs no signal to the wiring 11.

The operation of the gate driver circuit in FIG. 4A in the period a, a transition period from the period a to the period b, the period b, a transition period from the period b to the period c, the period c, and the period d is described with reference to the timing chart illustrated in FIG. 6A.

In the period a, the transition period from the period b to the period c, the period c, and the period d, the gate driver circuit in FIG. 4A performs the operation 2 in FIG. 5B. In other words, in the period a, the transition period from the period b to the period c, the period c, and the period d, the circuit 10A outputs a signal (e.g., a non-selection signal) to the wiring 11 and the circuit 10B outputs no signal to the wiring 11.

In the transition period from the period a to the period b and the period b, the gate driver circuit in FIG. 4A performs the operation 6 in FIG. 5F. In other words, in the transition period from the period a to the period b and the period b, the circuit 10A outputs a different signal (e.g., a selection signal) to the wiring 11 and the circuit 10B outputs no signal to the wiring 11.

In this manner, in the period a, the transition period from the period a to the period b, the period b, the transition period from the period b to the period c, the period c, and the period d, the circuit 10B outputs no signal to the wiring 11. Thus, deterioration of the transistors included in the circuit 10B can be suppressed. Further, by simple circuit design such as provision of a switch for outputting no signal or turning off a transistor in the circuit 10B, the power consumption of the circuit 10B can be reduced.

Figure 6A:
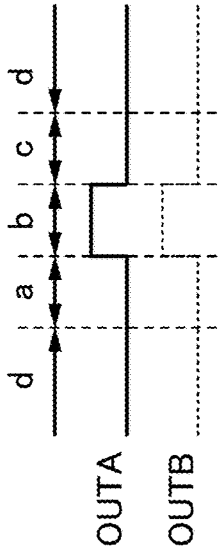
FIGS. 6A to 6L are timing charts each illustrating an operation example of a gate driver circuit.

Note that in the timing chart illustrated in FIG. 6A, the circuit 10A does not need to output a signal to the wiring 11 at least one of the periods in the period a, the transition period from the period a to the period b, the period b, the transition period from the period b to the period c, the period c, and the period d.

Figure 6B:
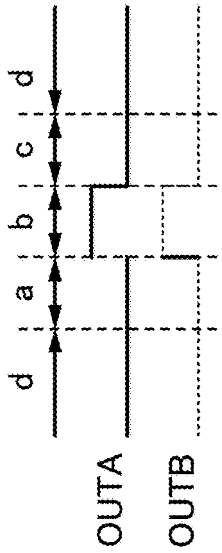

As illustrated in FIG. 6B, the circuit 10B may output a different signal (e.g., a selection signal) to the wiring 11 in the transition period from the period a to the period b. Thus, the change in potential of the wiring 11 can be made steep.

Figure 6C:
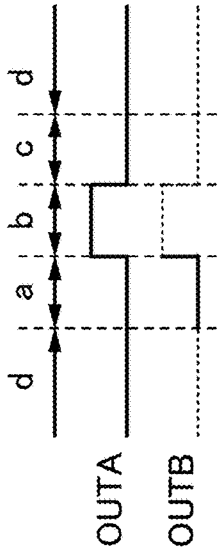

As illustrated in FIG. 6C, the circuit 10B may output a signal (e.g., a non-selection signal) to the wiring 11 in the period a and may output a different signal (e.g., a selection signal) to the wiring 11 in the transition period from the period a to the period b. Thus, the change in potential of the wiring 11 can be made steep.

Figure 6D:
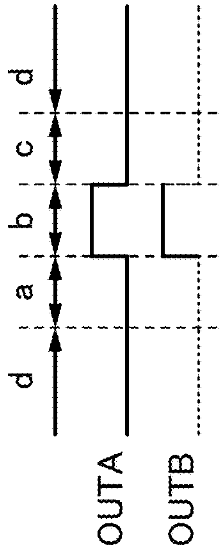

As illustrated in FIG. 6D, the circuit 10B may output a different signal (e.g., a selection signal) to the wiring 11 in the transition period from the period a to the period b and the period b. Thus, the change in potential of the wiring 11 can be made steep.

Figure 6E:
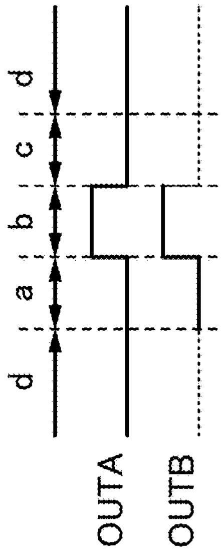

As illustrated in FIG. 6E, the circuit 10B may output a signal (e.g., a non-selection signal) to the wiring 11 in the period a and may output a different signal (e.g., a selection signal) to the wiring 11 in the transition period from the period a to the period b and the period b. Thus, the change in potential of the wiring 11 can be made steep.

Figure 6F:
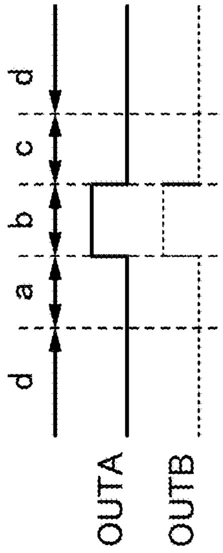

As illustrated in FIG. 6F, the circuit 10B may output a signal (e.g., a non-selection signal) to the wiring 11 in the transition period from the period b to the period c. Thus, the change in potential of the wiring 11 can be made steep.

Figure 6G:
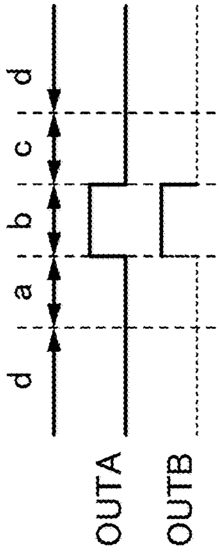

As illustrated in FIG. 6G, the circuit 10B may output a signal (e.g., a non-selection signal) to the wiring 11 in the transition period from the period b to the period c and may output a different signal (e.g., a selection signal) to the wiring 11 in the period b. Thus, the change in potential of the wiring 11 can be made steep.

Figure 6H:
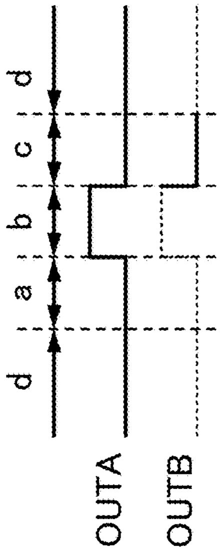

As illustrated in FIG. 6H, the circuit 10B may output a signal (e.g., a non-selection signal) to the wiring 11 in the transition period from the period b to the period c and the period c. Thus, the change in potential of the wiring 11 can be made steep.

Figure 6I:
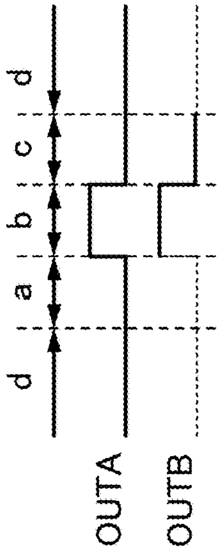

As illustrated in FIG. 6I, the circuit 10B may output a signal (e.g., a non-selection signal) to the wiring 11 in the transition period from the period b to the period c and the period c and may output a different signal (e.g., a selection signal) to the wiring 11 in the period b. Thus, the change in potential of the wiring 11 can be made steep.

Figure 6J:
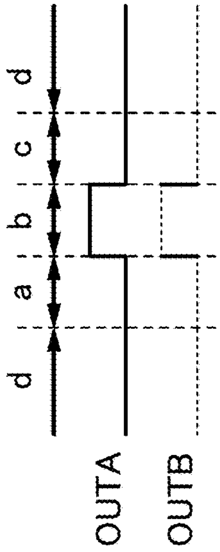

As illustrated in FIG. 6J, the circuit 10B may output a different signal (e.g., a selection signal) to the wiring 11 in the transition period from the period a to the period b and may output a signal (e.g., a non-selection signal) to the wiring 11 in the transition period from the period b to the period c. Thus, the change in potential of the wiring 11 can be made steep.

Figure 6K:
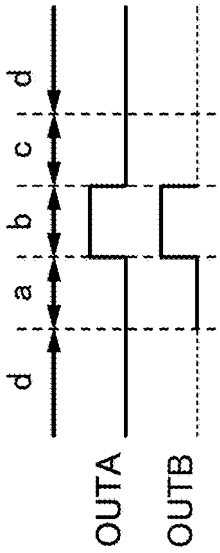

As illustrated in FIG. 6K, the circuit 10B may output a signal (e.g., a non-selection signal) to the wiring 11 in the period a and the transition period from the period b to the period c and may output a different signal (e.g., a selection signal) to the wiring 11 in the transition period from the period a to the period b and the period b. Thus, the change in potential of the wiring 11 can be made steep.

Figure 6L:
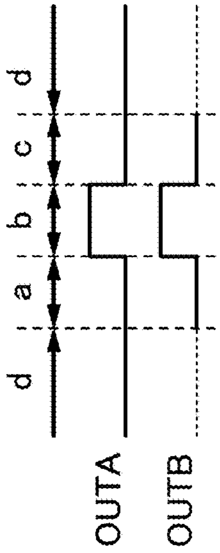

As illustrated in FIG. 6L, the circuit 10B may output a signal (e.g., a non-selection signal) to the wiring 11 in the period a, the transition period from the period b to the period c, and the period c and may output a different signal (e.g., a selection signal) to the wiring 11 in the transition period from the period a to the period b and the period b. Thus, the change in potential of the wiring 11 can be made steep.

Note that in the above description, the selection signal and the non-selection signal are examples of signals output from the circuit 10A and the circuit 10B and may be any signals as long as they are different from each other.

Next, timing charts at the time when the operation of the gate driver circuit in FIG. 4A is a combination of some of the operations 1 to 9 illustrated in FIGS. 5A to 5I that are different from the timing charts in FIGS. 6A to 6L are described below.

FIGS. 7A to 7L are timing charts each illustrating an operation example of the gate driver circuit.

The operation of the gate driver circuit in FIG. 4A in the period a, a transition period from the period a to the period b, the period b, a transition period from the period b to the period c, the period c, and the period d is described with reference to the timing chart illustrated in FIG. 7A.

In the period a, the transition period from the period b to the period c, the period c, and the period d, the gate driver circuit in FIG. 4A performs the operation 3 in FIG. 5C. In other words, in the period a, the transition period from the period b to the period c, the period c, and the period d, the circuit 10A outputs no signal to the wiring 11 and the circuit 10B outputs a signal (e.g., a non-selection signal) to the wiring 11.

In the transition period from the period a to the period b and the period b, the gate driver circuit in FIG. 4A performs the operation 7 in FIG. 5G. In other words, in the transition period from the period a to the period b and the period b, the circuit 10A outputs no signal to the wiring 11 and the circuit 10B outputs a different signal (e.g., a selection signal) to the wiring 11.

In this manner, in the period a, the transition period from the period a to the period b, the period b, the transition period from the period b to the period c, the period c, and the period d, the circuit 10A outputs no signal to the wiring 11. Thus, deterioration of the transistors included in the circuit 10A can be suppressed. Further, by simple circuit design such as provision of a switch for outputting no signal or turning off a transistor in the circuit 10A, the power consumption of the circuit 10A can be reduced.

Figure 7A:
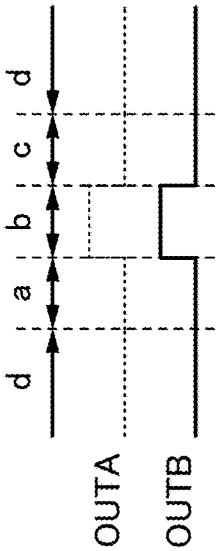
FIGS. 7A to 7L are timing charts each illustrating an operation example of a gate driver circuit.

Note that in the timing chart illustrated in FIG. 7A, the circuit 10B does not need to output a signal to the wiring 11 at least one of the periods in the period a, the transition period from the period a to the period b, the period b, the transition period from the period b to the period c, the period c, and the period d.

Figure 7B:
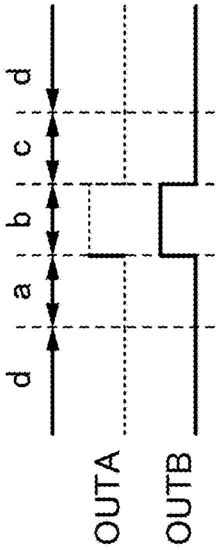

As illustrated in FIG. 7B, the circuit 10A may output a different signal (e.g., a selection signal) to the wiring 11 in the transition period from the period a to the period b. Thus, the change in potential of the wiring 11 can be made steep.

Figure 7C:
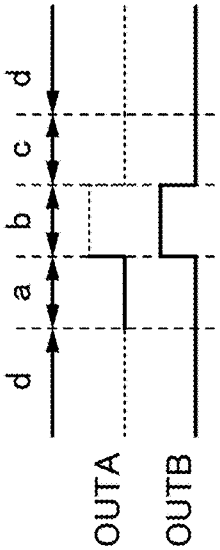

As illustrated in FIG. 7C, the circuit 10A may output a signal (e.g., a non-selection signal) to the wiring 11 in the period a and may output a different signal (e.g., a selection signal) to the wiring 11 in the transition period from the period a to the period b. Thus, the change in potential of the wiring 11 can be made steep.

Figure 7D:
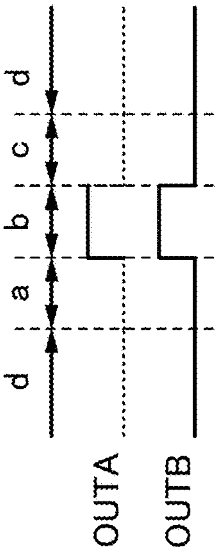

As illustrated in FIG. 7D, the circuit 10A may output a different signal (e.g., a selection signal) to the wiring 11 in the transition period from the period a to the period b and the period b. Thus, the change in potential of the wiring 11 can be made steep.

Figure 7E:
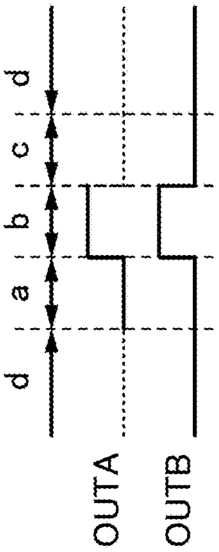

As illustrated in FIG. 7E, the circuit 10A may output a signal (e.g., a non-selection signal) to the wiring 11 in the period a and may output a different signal (e.g., a selection signal) to the wiring 11 in the transition period from the period a to the period b and the period b. Thus, the change in potential of the wiring 11 can be made steep.

Figure 7F:
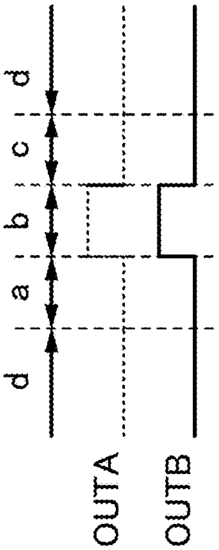

As illustrated in FIG. 7F, the circuit 10A may output a signal (e.g., a non-selection signal) to the wiring 11 in the transition period from the period b to the period c. Thus, the change in potential of the wiring 11 can be made steep.

Figure 7G:
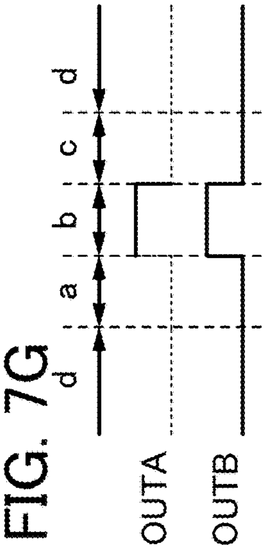

As illustrated in FIG. 7G, the circuit 10A may output a signal (e.g., a non-selection signal) to the wiring 11 in the transition period from the period b to the period c and may output a different signal (e.g., a selection signal) to the wiring 11 in the period b. Thus, the change in potential of the wiring 11 can be made steep.

Figure 7H:
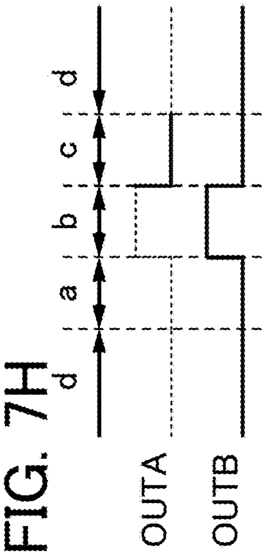

As illustrated in FIG. 7H, the circuit 10A may output a signal (e.g., a non-selection signal) to the wiring 11 in the transition period from the period b to the period c and the period c. Thus, the change in potential of the wiring 11 can be made steep.

Figure 7I:
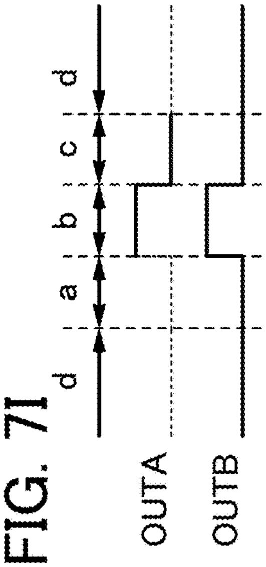

As illustrated in FIG. 7I, the circuit 10A may output a signal (e.g., a non-selection signal) to the wiring 11 in the transition period from the period b to the period c and the period c and may output a different signal (e.g., a selection signal) to the wiring 11 in the period b. Thus, the change in potential of the wiring 11 can be made steep.

Figure 7J:
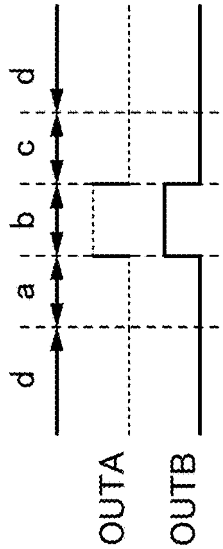

As illustrated in FIG. 7J, the circuit 10A may output a different signal (e.g., a selection signal) to the wiring 11 in the transition period from the period a to the period b and may output a signal (e.g., a non-selection signal) to the wiring 11 in the transition period from the period b to the period c. Thus, the change in potential of the wiring 11 can be made steep.

Figure 7K:
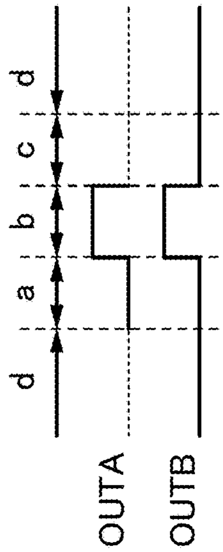

As illustrated in FIG. 7K, the circuit 10A may output a signal (e.g., a non-selection signal) to the wiring 11 in the period a and the transition period from the period b to the period c and may output a different signal (e.g., a selection signal) to the wiring 11 in the transition period from the period a to the period b and the period b. Thus, the change in potential of the wiring 11 can be made steep.

Figure 7L:
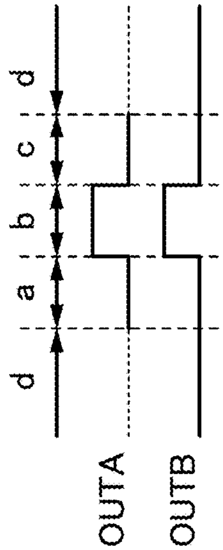

As illustrated in FIG. 7L, the circuit 10A may output a signal (e.g., a non-selection signal) to the wiring 11 in the period a, the transition period from the period b to the period c, and the period c and may output a different signal (e.g., a selection signal) to the wiring 11 in the transition period from the period a to the period b and the period b. Thus, the change in potential of the wiring 11 can be made steep.

Note that in the above description, the selection signal and the non-selection signal are examples of signals output from the circuit 10A and the circuit 10B and may be any signals as long as they are different from each other.

Next, timing charts at the time when the operation of the gate driver circuit in FIG. 4A is a combination of some of the operations 1 to 9 illustrated in FIGS. 5A to 5I that are different from the timing charts in FIGS. 6A to 6L and FIGS. 7A to 7L are described below.

FIGS. 8A to 8E are timing charts each illustrating an operation example of the gate driver circuit.

Figures 8A, 8B, 8C, 8D, 8E, 8F:
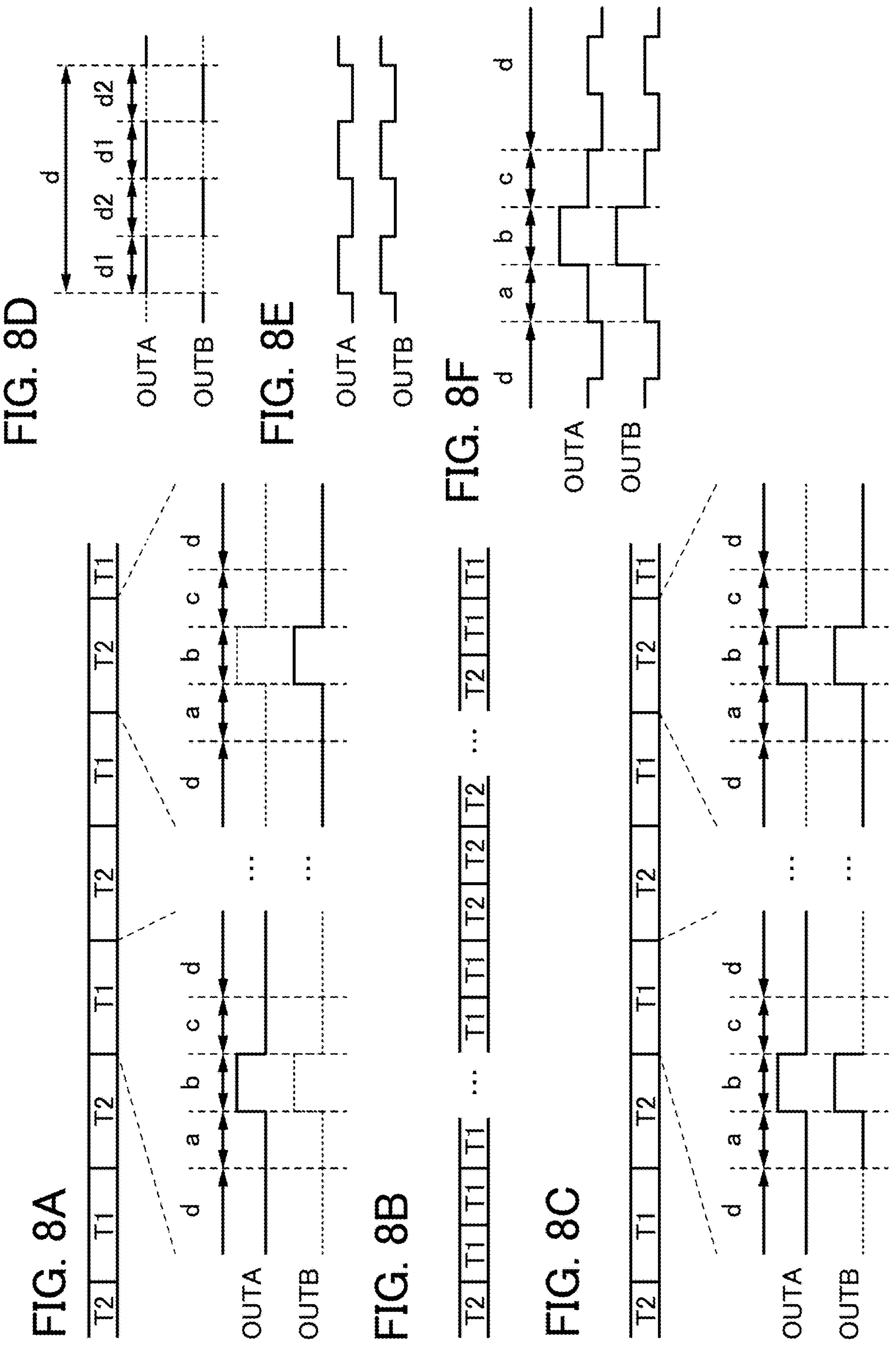
FIGS. 8A to 8F are timing charts each illustrating an operation example of a gate driver circuit.

The timing charts in FIGS. 8A to 8C include a period T1 and a period T2. In addition, in FIGS. 8A and 8C, the period T1 and the period T2 are alternated; however, as illustrated in FIG. 8B, the plurality of periods T1 and the plurality of periods T2 may be alternated. Further, a period which is different from the period T1 and the period T2 may be provided.

The operation of the gate driver circuit in FIG. 4A in the period T1 and the period T2 is described with reference to the timing chart in FIG. 8A.

In the period T1, the timing chart illustrated in FIG. 6A is used. Thus, in the period T1, deterioration of the transistors included in the circuit 10B can be suppressed. Further, in the period T2, the timing chart illustrated in FIG. 7A is used. Thus, in the period T2, deterioration of the transistors included in the circuit 10A can be suppressed.

In this manner, in FIG. 8A, the period T1 in which deterioration of the transistors included in the circuit 10B can be suppressed and the period T2 in which deterioration of the transistors included in the circuit 10A can be suppressed are alternated.

Here, in the case where the circuit 10A and the circuit 10B have similar structures, the degree of deterioration of the transistors included in the circuit 10A and the degree of deterioration of the transistors included in the circuit 10B can be substantially equal when the length of the period T1 and the length of the period T2 are made substantially equal. Thus, even when the operation of the circuit 10A and the operation of the circuit 10B are switched by alternate provision of the period T1 and the period T2, the change in potential of the wiring 11 can be made substantially equal.

Consequently, in the case where the gate driver circuit in FIG. 4A is used for a display device including a pixel for holding a video signal and the video signal is changed by the potential of the wiring 11 (e.g., feedthrough or capacitive coupling), even when the operation of the circuit 10A and the operation of the circuit 10B are switched, a change in video signal held in the a pixel connected to the wiring 11 can be made substantially equal. Thus, the luminance, transmittance, or the like of the pixel can be made substantially equal between the circuit 10A and the circuit 10B. Accordingly, display quality can be improved.

In the period T1, any of the timing charts illustrated in FIGS. 6A to 6L may be used, and in the period T2, any of the timing charts illustrated in FIGS. 7A to 7L may be used. For example, as illustrated in FIG. 8C, in the period T1, the timing chart in FIG. 6K may be used, and in the period T2, the timing chart in FIG. 7K may be used.

Next, a timing chart illustrating an operation example of the gate driver circuit in FIG. 4A in the period d illustrated in FIGS. 6A to 6L, FIGS. 7A to 7L, and FIGS. 8A and 8C is described with reference to FIG. 8D.

FIG. 8D is a timing chart illustrating an operation example of the gate driver circuit in the period d.

In the timing charts illustrated in FIGS. 6A to 6L, FIGS. 7A to 7L, and FIGS. 8A and 8C, the period d is divided into a plurality of periods. For example, as illustrated in FIG. 8D, the period d is divided into two periods d1 and d2. Note that the number of division of the period d is not limited to this, and the period d may be divided into three or more periods. In addition, in FIG. 8D, the period d1 and the period d2 are alternated; however, the plurality of periods d1 and the plurality of periods d2 may be alternated.

The operation of the gate driver circuit in FIG. 4A in the period d1 and the period d2 is described with reference to the timing chart in FIG. 8D.

In the period d1, the gate driver circuit performs the operation 2 in FIG. 5B. In other words, in the period d1, the circuit 10A outputs a signal to the wiring 11 and the circuit 10B outputs no signal to the wiring 11. In the period d2, the gate driver circuit performs the operation 3 in FIG. 5C. In other words, in the period d2, the circuit 10A outputs no signal to the wiring 11 and the circuit 10B outputs a signal to the wiring 11.

Since signals can be input to gates of the transistors included in the circuit 10A and the circuit 10B in this manner, deterioration of the transistors can be suppressed. Thus, even when the operation of the circuit 10A and the operation of the circuit 10B are switched, the change in potential of the wiring 11 can be made substantially equal.

Consequently, in the case where the gate driver circuit in FIG. 4A is used for a display device including a pixel for holding a video signal and the video signal is changed by the potential of the wiring 11 (e.g., feedthrough or capacitive coupling), even when the operation of the circuit 10A and the operation of the circuit 10B are switched, a change in video signal held in the a pixel connected to the wiring 11 can be made substantially equal. Thus, the luminance, transmittance, or the like of the pixel can be made substantially equal between the circuit 10A and the circuit 10B. Accordingly, display quality can be improved.

Next, a timing chart illustrating a different operation example of the gate driver circuit in FIG. 4A is described.

In FIGS. 6A to 6L, FIGS. 7A to 7L, and FIGS. 8A, 8C, and 8D, the potential of the output signal OUTA in the circuit 10A and the potential of the output signal OUTB in the circuit 10B are fixed in each period. Alternatively, in a certain period, the potential of the output signal may have a plurality of values. For example, as illustrated in FIG. 8E, in the period d, the potential of the output signal OUTA in the circuit 10A and the potential of the output signal OUTB in the circuit 10B may each have two values which are alternated.

The potential of the output signal OUTA and the potential of the output signal OUTB in the period d may be changed in an analog fashion.

As described above, the gate driver circuit in FIG. 4A can perform a variety of operations.

<Different Structure of Gate Driver Circuit>

Next, the structure of a gate driver circuit that is different from the structure in FIG. 4A is described with reference to FIG. 9A.

Figure 9A:
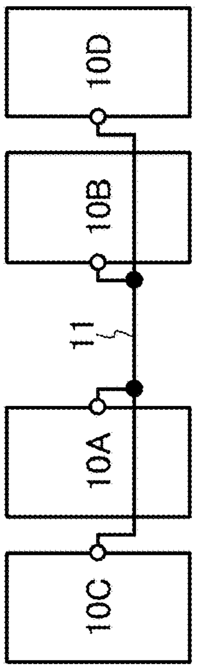
FIG. 9A illustrates a structure example of a gate driver circuit.

FIG. 9A illustrates a structure example of a gate driver circuit. The gate driver circuit includes the circuit 10A, the circuit 10B, a circuit 10C, and a circuit 10D. The circuit 10C and the circuit 10D may have a function that is similar to the function of the circuit 10A or the circuit 10B.

Note that the gate driver circuit in FIG. 9A can perform a variety of operations by an appropriate combination of the case where the circuits 10A to 10D output signals (e.g., non-selection signals) to the wiring 11, the case where the circuits 10A to 10D output signals which are different from the signals (e.g., selection signals) to the wiring 11, and the case where the circuits 10A to 10D output no signal (e.g., neither a non-selection signal nor a selection signal) to the wiring 11.

Although FIG. 9A illustrates the case where the gate driver circuit includes the four circuits connected to the wiring 11 (the circuits 10A to 10D), the structure of the gate driver circuit in this embodiment is not limited to this structure. The gate driver circuit in this embodiment may include N (N is a natural number) circuits. Note that the N circuits may have a function that is similar to the function of the circuit 10A or the circuit 10B.

<Operation of Gate Driver Circuit>

Figure 9B:
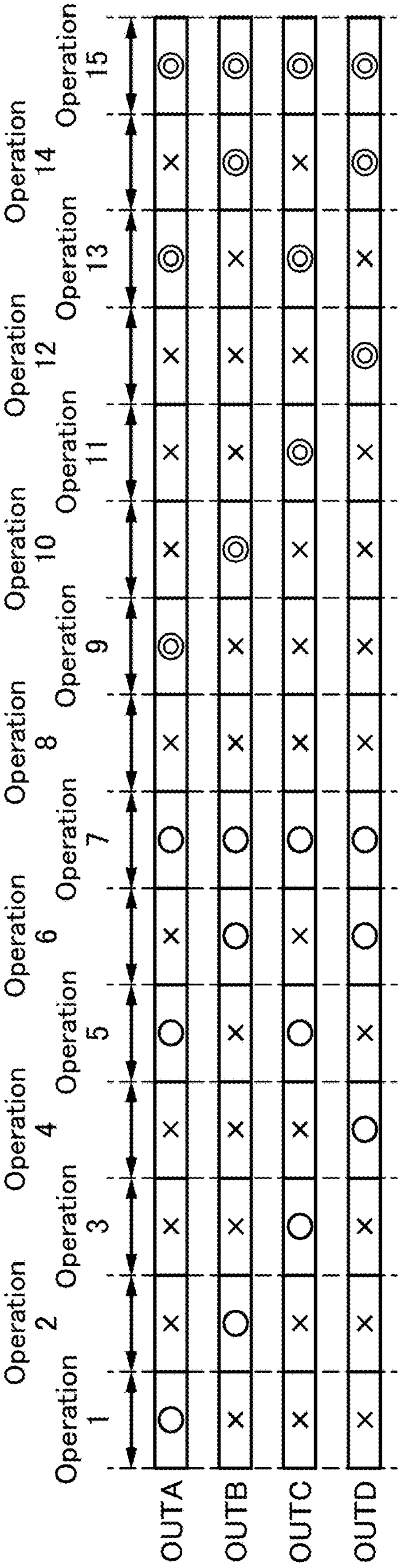
FIG. 9B illustrates an operation example of a gate driver circuit.

The operation of the gate driver circuit in FIG. 9A is described with reference to FIG. 9B. FIG. 9B illustrates an operation example of the gate driver circuit.

In the operation 1, the circuit 10A outputs a signal (e.g., a non-selection signal) to the wiring 11, and the circuits 10B to 10D output no signal to the wiring 11. In the operation 2, the circuit 10B outputs a signal (e.g., a non-selection signal) to the wiring 11, and the circuits 10A, 10C, and 10D output no signal to the wiring 11. In the operation 3, the circuit 10C outputs a signal (e.g., a non-selection signal) to the wiring 11, and the circuits 10A, 10B, and 10D output no signal to the wiring 11. In the operation 4, the circuit 10D outputs a signal (e.g., a non-selection signal) to the wiring 11, and the circuits 10A to 10C output no signal to the wiring 11.

In the operation 5, the circuits 10A and 10C output signals (e.g., non-selection signals) to the wiring 11, and the circuits 10B and 10D output no signal to the wiring 11. In the operation 6, the circuits 10B and 10D output signals (e.g., non-selection signals) to the wiring 11, and the circuits 10A and 10C output no signal to the wiring 11. In the operation 7, the circuits 10A to 10D output signals (e.g., non-selection signals) to the wiring 11. In the operation 8, the circuits 10A to 10D output no signal to the wiring 11.

In the operation 9, the circuit 10A outputs a different signal (e.g., a selection signal) to the wiring 11, and the circuits 10B to 10D output no signal to the wiring 11. In an operation 10, the circuit 10B outputs a different signal (e.g., a selection signal) to the wiring 11, and the circuits 10A, 10C, and 10D output no signal to the wiring 11. In an operation 11, the circuit 10C outputs a different signal (e.g., a selection signal) to the wiring 11, and the circuits 10A, 10B, and 10D output no signal to the wiring 11. In an operation 12, the circuit 10D outputs a different signal (e.g., a selection signal) to the wiring 11, and the circuits 10A to 10C output no signal to the wiring 11.

In an operation 13, the circuits 10A and 10C output different signals (e.g., selection signals) to the wiring 11, and the circuits 10B and 10D output no signal to the wiring 11. In an operation 14, the circuits 10B and 10D output different signals (e.g., selection signals) to the wiring 11, and the circuits 10A and 10C output no signal to the wiring 11. In an operation 15, the circuits 10A to 10D output different signals (e.g., selection signals) to the wiring 11.

As described above, the gate driver circuit in FIG. 9A can perform a variety of operations.

As the number of circuits (e.g., the circuits 10A and 10B) included in the gate driver circuit in this embodiment becomes larger, that is, N that indicates the number of circuits becomes larger, the frequency of output of signals from the circuits can be reduced. Thus, deterioration of transistors included in the circuits can be suppressed. Note that the size of the circuit increases when N becomes too large; thus, N is smaller than 6, preferably smaller than 4, more preferably 2.

In the case where the gate driver circuit in this embodiment is used for a display device, N is preferably an even number in order that the frame of the display device on a left side and the frame of the display device on a right side be substantially equal. In addition, N is preferably an even number in order that the number of circuits on one side and the number of circuits on the other side with a pixel portion provided between the sides be equal.

Embodiment 3

In this embodiment, the structure and operation of a gate driver circuit are described.

<Structure of Gate Driver Circuit>

The structure of a gate driver circuit is described below. FIGS. 10A and 10B and FIGS. 11A and 11B each illustrate a structure example of a gate driver circuit. The gate driver circuit includes a circuit 100A and a circuit 100B.

The circuit 100A includes a switch 101A and a switch 102A. The switch 101A is connected between a wiring 112A and a wiring 111. The switch 102A is connected between a wiring 113A and the wiring 111.

The circuit 100B includes a switch 101B and a switch 102B. The switch 101B is connected between a wiring 112B and the wiring 111. The switch 102B is connected between a wiring 113B and the wiring 111.

Figure 11A:
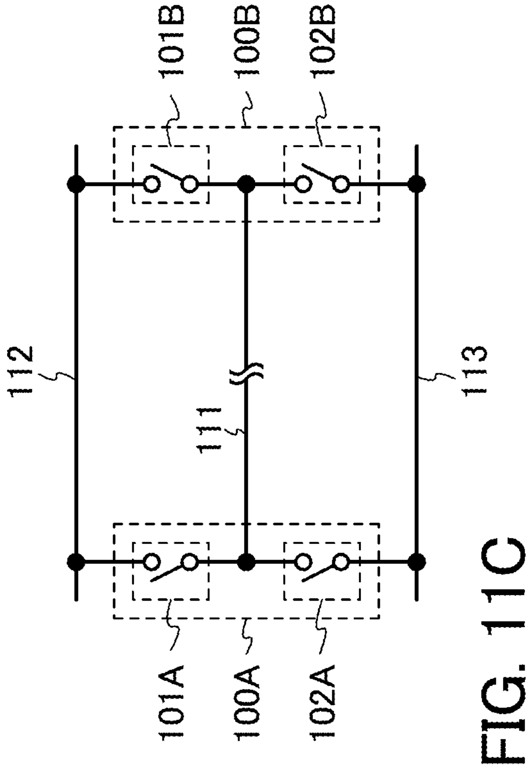
FIGS. 11A to 11C each illustrate a structure example of a gate driver circuit.
Figure 11B:
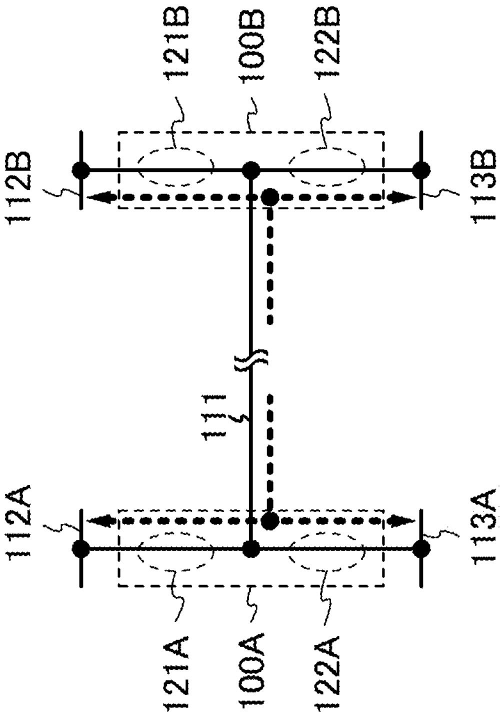

Here, as illustrated in FIG. 10B and FIG. 11B, a path between the wiring 112A and the wiring 111 is referred to as a path 121A; a path between the wiring 113A and the wiring 111 is referred to as a path 122A; a path between the wiring 112B and the wiring 111 is referred to as a path 121B; a path between the wiring 113B and the wiring 111 is referred to as a path 122B.

Note that the term "a path between A and B" may include the case where a switch is connected between A and B. An element (e.g., a transistor, a diode, a resistor, or a capacitor) or a circuit (e.g., a buffer circuit, an inverter circuit, or a shift register circuit) other than a switch may be connected between A and B. Alternatively, an element (e.g., a resistor or a transistor) may be connected in series or in parallel with the switch between A and B.

Note that the circuit 100A, the circuit 100B, and the wiring 111 correspond to the circuit 10A, the circuit 10B, and the wiring 11 in Embodiment 2, respectively, and have functions that are similar to the functions of the circuit 10A, the circuit 10B, and the wiring 11, respectively.

Next, the wiring 112A, the wiring 113A, the wiring 112B, and the wiring 113B are described.

In the case where a clock signal CK1 is input to the wiring 112A and the wiring 112B, the wiring 112A and the wiring 112B function as signal lines or clock signal lines (also referred to as clock lines or clock supply lines). In the case where fixed voltage is applied to the wiring 112A and the wiring 112B, the wiring 112A and the wiring 112B function as power supply lines.

Note that in the case where the same signal or the same voltage is input to the wiring 112A and the wiring 112B, the wiring 112A and the wiring 112B may be connected to each other. In that case, as illustrated in FIG. 11A, one wiring 112 may be used as the wiring 112A and the wiring 112B. Alternatively, different signals or different voltages may be input to the wiring 112A and the wiring 112B.

In the case where voltage V1 (e.g., power supply voltage, reference voltage, ground voltage, or a negative power supply potential) is applied to the wiring 113A and the wiring 113B, the wiring 113A and the wiring 113B function as power supply lines or grounds. Alternatively, in the case where signals are input to the wiring 113A and the wiring 113B, the wiring 113A and the wiring 113B function as signal lines.

Note that in the case where the same signal or the same voltage is input to the wiring 113A and the wiring 113B, the wiring 113A and the wiring 113B may be connected to each other. In that case, as illustrated in FIG. 11A, one wiring 113 may be used as the wiring 113A and the wiring 113B. Alternatively, different signals or different voltages may be input to the wiring 113A and the wiring 113B.

Next, the switch 101A, the switch 102A, the switch 101B, and the switch 102B are described.

The switch 101A has a function of controlling the timing of bringing the wiring 112A and the wiring 111 into conduction. Alternatively, the switch 101A has a function of controlling the timing of supplying the potential of the wiring 112A to the wiring 111. Alternatively, the switch 101A has a function of controlling the timing of supplying a signal, voltage, or the like (e.g., the clock signal CK1, a clock signal CK2, or voltage V2) which is to be input to the wiring 112A to the wiring 111. Alternatively, the switch 101A has a function of controlling the timing of not supplying a signal, voltage, or the like to the wiring 111. Alternatively, the switch 101A has a function of controlling the timing of supplying an H signal (e.g., the clock signal CK1) to the wiring 111. Alternatively, the switch 101A has a function of controlling the timing of supplying an L signal (e.g., the clock signal CK1) to the wiring 111. Alternatively, the switch 101A has a function of controlling the timing of raising the potential of the wiring 111. Alternatively, the switch 101A has a function of controlling the timing of lowering the potential of the wiring 111. Alternatively, the switch 101A has a function of controlling the timing of keeping the potential of the wiring 111.

Note that in the case where the clock signal CK2 corresponds to an inversion signal of the clock signal CK1, the clock signal CK1 and the clock signal CK2 are preferably signals obtained by inversion of the signals or signals which are substantially 180° out of phase.

The clock signal CK1 or the clock signal CK2 may be either a balanced signal or an unbalanced signal. A balanced signal is a signal whose period during which the signal is at an H level and whose period during which the signal is at an L level in one cycle have substantially the same length. An unbalanced signal is a signal whose period during which the signal is at an H level and whose period during which the signal is at an L level in one cycle have different lengths.

Note that in the case where the clock signal CK1 and the clock signal CK2 are unbalanced signals and the clock signal CK2 is not an inversion signal of the clock signal CK1, a period during which the clock signal CK1 is at an H level and a period during which the clock signal CK2 is at an H level may have substantially the same length.

The switch 102A has a function of controlling the timing of bringing the wiring 113A and the wiring 111 into conduction. Alternatively, the switch 102A has a function of controlling the timing of supplying the potential of the wiring 113A to the wiring 111. Alternatively, the switch 102A has a function of controlling the timing of supplying a signal, voltage, or the like (e.g., the clock signal CK2 or the voltage V1) which is to be input to the wiring 113A to the wiring 111. Alternatively, the switch 102A has a function of controlling the timing of not supplying a signal, voltage, or the like to the wiring 111. Alternatively, the switch 102A has a function of controlling the timing of supplying the voltage V1 to the wiring 111. Alternatively, the switch 102A has a function of controlling the timing of lowering the potential of the wiring 111. Alternatively, the switch 102A has a function of controlling the timing of keeping the potential of the wiring 111.

The switch 101B has a function of controlling the timing of bringing the wiring 112B and the wiring 111 into conduction. Alternatively, the switch 101B has a function of controlling the timing of supplying the potential of the wiring 112B to the wiring 111. Alternatively, the switch 101B has a function of controlling the timing of supplying a signal, voltage, or the like (e.g., the clock signal CK1, the clock signal CK2, or the voltage V2) which is to be input to the wiring 112B to the wiring 111. Alternatively, the switch 101B has a function of controlling the timing of not supplying a signal, voltage, or the like to the wiring 111. Alternatively, the switch 101B has a function of controlling the timing of supplying an H signal (e.g., the clock signal CK1) to the wiring 111. Alternatively, the switch 101B has a function of controlling the timing of supplying an L signal (e.g., the clock signal CK1) to the wiring 111. Alternatively, the switch 101B has a function of controlling the timing of raising the potential of the wiring 111. Alternatively, the switch 101B has a function of controlling the timing of lowering the potential of the wiring 111. Alternatively, the switch 101B has a function of controlling the timing of keeping the potential of the wiring 111.

The switch 102B has a function of controlling the timing of bringing the wiring 113B and the wiring 111 into conduction. Alternatively, the switch 102B has a function of controlling the timing of supplying the potential of the wiring 113B to the wiring 111. Alternatively, the switch 102B has a function of controlling the timing of supplying a signal, voltage, or the like (e.g., the clock signal CK2 or the voltage I'1) which is to be input to the wiring 113B to the wiring 111. Alternatively, the switch 102B has a function of controlling the timing of not supplying a signal, voltage, or the like to the wiring 111. Alternatively, the switch 102B has a function of controlling the timing of supplying the voltage V1 to the wiring 111. Alternatively, the switch 102B has a function of controlling the timing of lowering the potential of the wiring 111. Alternatively, the switch 102B has a function of controlling the timing of keeping the potential of the wiring 111.

<Operation of Gate Driver Circuit>

Next, an operation example of the gate driver circuit in FIG. 10A is described below.

FIG. 10C illustrates an operation example of the gate driver circuit in FIG. 10A. FIG. 10C illustrates the states (on and off) of the switch 101A, the switch 102A, the switch 101B, and the switch 102B in each operation of the gate driver circuit. By a combination of on and off of these switches, the gate driver circuit in FIG. 10A can perform a variety of operations.

Each operation of the gate driver circuit in FIG. 10A is described with reference to FIG. 10C, FIGS. 12A to 12H, and FIGS. 13A to 13E. Here, the operation of the gate driver circuit in FIG. 10A for performing the operations 1 to 7 illustrated in FIGS. 5A to 5G in Embodiment 2 is described.

First, the operation of the gate driver circuit in FIG. 10A for performing the operation 1 in FIG. 5A is described.

Figure 12A:
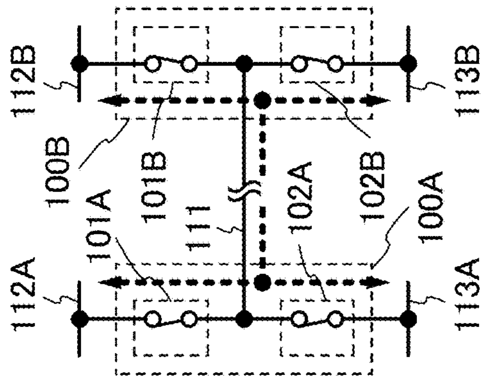
FIGS. 12A to 12H each illustrate an operation example of a gate driver circuit.

As illustrated in an operation 1*a* in FIG. 12A, the switch 101A is turned on, so that the wiring 112A and the wiring 111 are brought into conduction. Thus, the potential of the wiring 112A (e.g., the clock signal CK1) is supplied to the wiring 111. The switch 102A is turned on, so that the wiring 113A and the wiring 111 are brought into conduction. Thus, the potential of the wiring 113A (e.g., the voltage V1) is supplied to the wiring 111. The switch 101B is turned on, so that the wiring 112B and the wiring 111 are brought into conduction. Thus, the potential of the wiring 112B (e.g., the clock signal CK1) is supplied to the wiring 111. The switch 102B is turned on, so that the wiring 113B and the wiring 111 are brought into conduction. Thus, the potential of the wiring 113B (e.g., the voltage V1) is supplied to the wiring 111.

Thus, potentials are supplied from the circuit 100A and the circuit 100B to the wiring 111, so that the operation 1 in FIG. 5A can be performed.

Figure 12B:
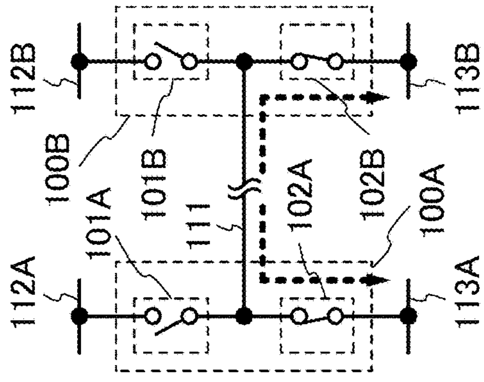

In the operation 1*a* in FIG. 12A, the switch 101A and the switch 101B may be turned off, as in an operation 1*b* in FIG. 12B. Alternatively, in the operation 1*a* in FIG. 12A, the switch 102A and the switch 102B may be turned off, as in an operation 1*c* in FIG. 12C. Alternatively, in the operation 1*a* in FIG. 12A, any one of the switch 101A, the switch 102A, the switch 101B, and the switch 102B may be turned off. Alternatively, in the operation 1*a* in FIG. 12A, the switch 101A and the switch 102B may be turned off. Alternatively, in the operation 1*a* in FIG. 12A, the switch 101B and the switch 102A may be turned off.

Next, the operation of the gate driver circuit in FIG. 10A for performing the operation 2 in FIG. 5B is described.

Figure 12C:
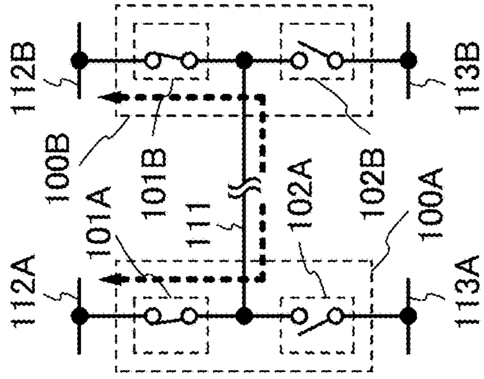
Figure 12D:
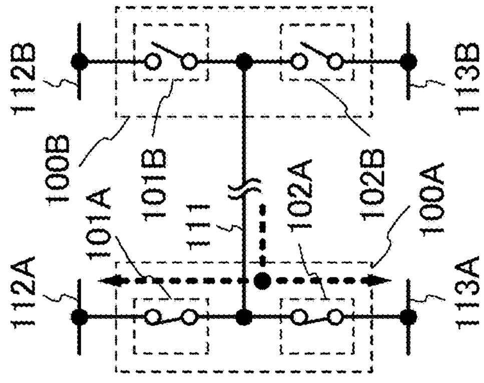

As illustrated in an operation 2*a* in FIG. 12D, the switch 101A is turned on, so that the wiring 112A and the wiring 111 are brought into conduction. Thus, the potential of the wiring 112A (e.g., the clock signal CK1) is supplied to the wiring 111. The switch 102A is turned on, so that the wiring 113A and the wiring 111 are brought into conduction. Thus, the potential of the wiring 113A (e.g., the voltage V1) is supplied to the wiring 111. The switch 101B is turned off, so that the wiring 112B and the wiring 111 are brought out of conduction. The switch 102B is turned off, so that the wiring 113B and the wiring 111 are brought out of conduction.

Thus, a potential is supplied from the circuit 100A to the wiring 111 and no potential is supplied from the circuit 100B to the wiring 111, so that the operation 2 in FIG. 5B can be performed.

Figure 12E:
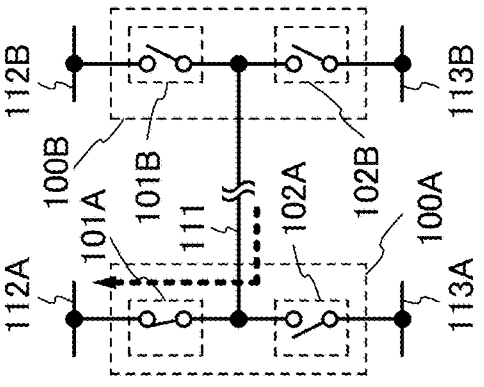
Figure 12F:
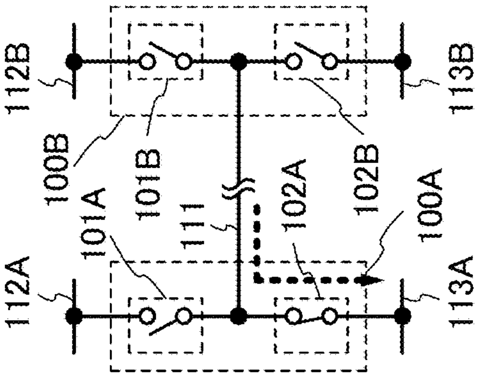

Note that in the operation 2*a* in FIG. 12D, the switch 102A may be turned off, as in an operation 2*b* in FIG. 12E. Alternatively, in the operation 2*a* in FIG. 12D, the switch 101A may be turned off, as in an operation 2*c* in FIG. 12F.

Next, the operation of the gate driver circuit in FIG. 10A for performing the operation 3 in FIG. 5C is described.

Figure 12G:
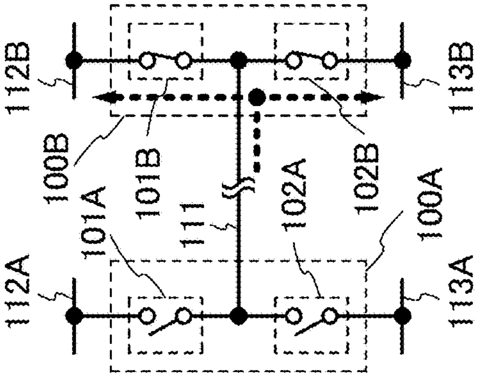

As illustrated in an operation 3*a* in FIG. 12G, the switch 101A is turned off, so that the wiring 112A and the wiring 111 are brought out of conduction. The switch 102A is turned off, so that the wiring 113A and the wiring 111 are brought out of conduction. The switch 101B is turned on, so that the wiring 112B and the wiring 111 are brought into conduction. Thus, the potential of the wiring 112B (e.g., the clock signal CK1) is supplied to the wiring 111. The switch 102B is turned on, so that the wiring 113B and the wiring 111 are brought into conduction. Thus, the potential of the wiring 113B (e.g., the voltage V1) is supplied to the wiring 111.

Thus, no potential is supplied from the circuit 100A to the wiring 111 and a potential is supplied from the circuit 100B to the wiring 111, so that the operation 3 in FIG. 5C can be performed.

Figure 12H:
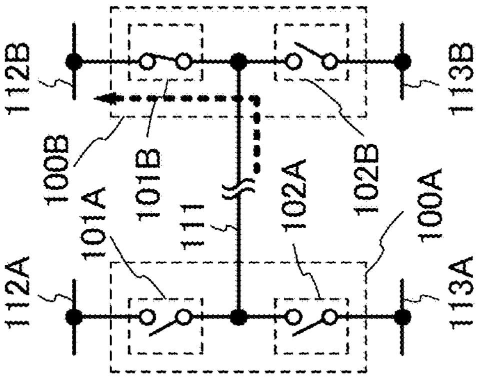

Note that in the operation 3*a* in FIG. 12G, the switch 102B may be turned off, as in an operation 3*b* in FIG. 12H. Alternatively, in the operation 3*a* in FIG. 12G, the switch 101B may be turned off, as in an operation 3*c* in FIG. 13A.

Next, the operation of the gate driver circuit in FIG. 10A for performing the operation 4 in FIG. 5D is described.

Figure 13A:
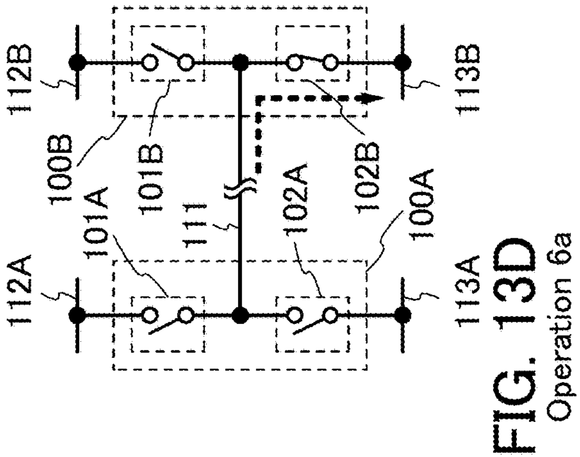
FIGS. 13A to 13E each illustrate an operation example of a gate driver circuit.
Figure 13B:
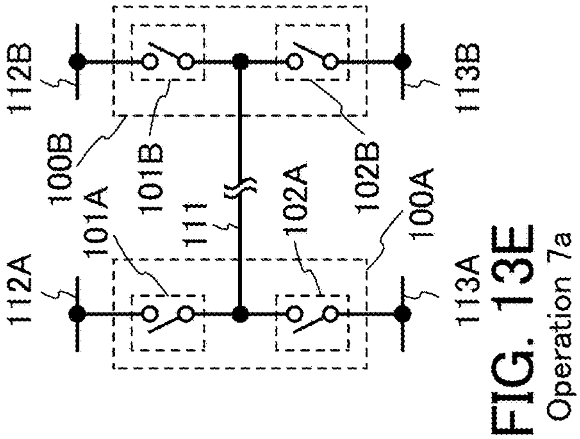

As illustrated in an operation 4*a* in FIG. 13B, the switch 101A is turned off, so that the wiring 112A and the wiring 111 are brought out of conduction. The switch 102A is turned off, so that the wiring 113A and the wiring 111 are brought out of conduction. The switch 101B is turned off, so that the wiring 112B and the wiring 111 are brought out of conduction. The switch 102B is turned off, so that the wiring 113B and the wiring 111 are brought out of conduction.

Thus, no potential is supplied from the circuit 100A and the circuit 100B to the wiring 111, so that the operation 4 in FIG. 5D can be performed.

Next, the operation of the gate driver circuit in FIG. 10A for performing the operation 5 in FIG. 5E is described.

Figure 13C:
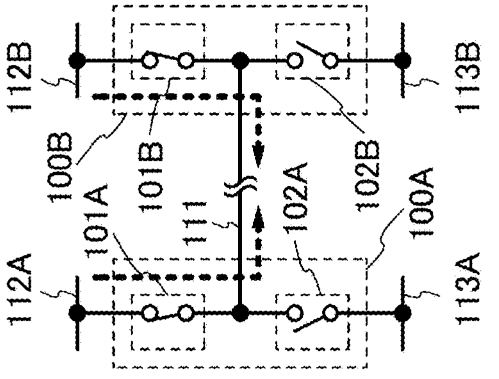

As illustrated in an operation Sa in FIG. 13C, the switch 101A is turned on, so that the wiring 112A and the wiring 111 are brought into conduction. Thus, a different potential of the wiring 112A (e.g., the clock signal CK2) is supplied to the wiring 111. The switch 102A is turned off, so that the wiring 113A and the wiring 111 are brought out of conduction. The switch 101B is turned on, so that the wiring 112B and the wiring 111 are brought into conduction. Thus, a different potential of the wiring 112B (e.g., the clock signal CK2) is supplied to the wiring 111. The switch 102B is turned off, so that the wiring 113B and the wiring 111 are brought out of conduction.

Thus, different potentials are supplied from the circuit 100A and the circuit 100B to the wiring 111, so that the operation 5 in FIG. 5E can be performed.

Next, the operation of the gate driver circuit in FIG. 10A for performing the operation 6 in FIG. 5F is described.

Figure 13D:
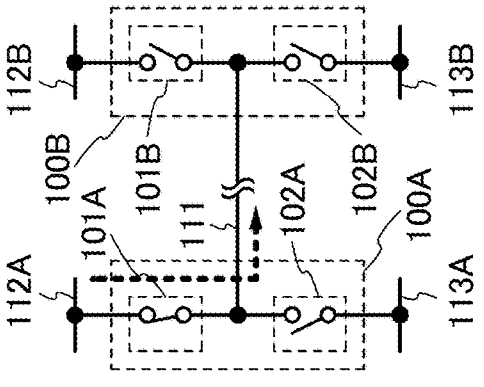

As illustrated in an operation 6*a* in FIG. 13D, the switch 101A is turned on, so that the wiring 112A and the wiring 111 are brought into conduction. Thus, a different potential of the wiring 112A (e.g., the clock signal CK2) is supplied to the wiring 111. The switch 102A is turned off, so that the wiring 113A and the wiring 111 are brought out of conduction. The switch 101B is turned off, so that the wiring 112B and the wiring 111 are brought out of conduction. The switch 102B is turned off, so that the wiring 113B and the wiring 111 are brought out of conduction.

Thus, a different potential is supplied from the circuit 100A to the wiring 111 and no potential is supplied from the circuit 100B to the wiring 111, so that the operation 6 in FIG. 5F can be performed.

Next, the operation of the gate driver circuit in FIG. 10A for performing the operation 7 in FIG. 5G is described.

Figure 13E:
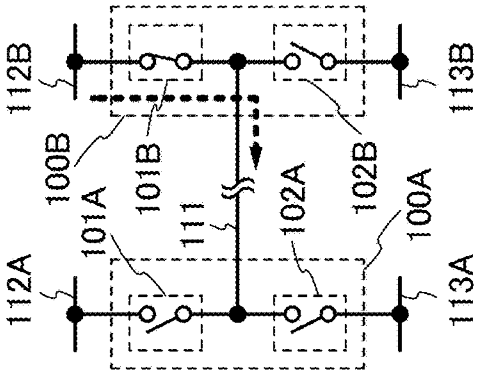

As illustrated in an operation 7*a* in FIG. 13E, the switch 101A is turned off, so that the wiring 112A and the wiring 111 are brought out of conduction. The switch 102A is turned off, so that the wiring 113A and the wiring 111 are brought out of conduction. The switch 101B is turned on, so that the wiring 112B and the wiring 111 are brought into conduction. Thus, a different potential of the wiring 112B (e.g., the clock signal CK2) is supplied to the wiring 111. The switch 102B is turned off, so that the wiring 113B and the wiring 111 are brought out of conduction.

Thus, no potential is supplied from the circuit 100A to the wiring 111 and a different potential is supplied from the circuit 100B to the wiring 111, so that the operation 7 in FIG. 5G can be performed.

By control of on and off of the switch 101A, the switch 102A, the switch 101B, and the switch 102B as described above, the operation of the gate driver circuit described with reference to FIGS. 5A to 5G in Embodiment 2 can be performed.

Note that in the operation 1*a* in FIG. 12A, the operation 2*a* in FIG. 12D, and the operation 3*a* in FIG. 12G, it is preferable that the potential of the wiring 112A and the potential of the wiring 112B be substantially equal. In addition, it is preferable that the potential of the wiring 113A and the potential of the wiring 113B be substantially equal. For example, in the case where the voltage V1 is applied to the wiring 113A and the wiring 113B, the clock signal CK1 is preferably at an L level.

In the operation 5*a* in FIG. 13C, the operation 6*a* in FIG. 13D, and the operation 7*a* in FIG. 13E, in the case where each of the potentials of the wiring 113A and the wiring 113B is V1, it is preferable that each of the potential of the wiring 112A and the wiring 112B be substantially V2. For example, the clock signal CK2 input to the wiring 112A and the wiring 112B is preferably at an H level.

The operation of the gate driver circuit in FIG. 10A for obtaining the timing charts illustrated in FIGS. 6A to 6L and FIGS. 7A to 7L in Embodiment 2 is described.

Note that the operation of the gate driver circuit in FIG. 4A in a given period is described with reference to FIGS. 5A to 5I in Embodiment 2; however, in order to perform the operation, the gate driver circuit in FIG. 10A can perform any of the operations illustrated in FIG. 10C in the given period. For example, in order to perform the operation 1 illustrated in FIG. 5A, the gate driver circuit in FIG. 10A can perform any of the operations 1*a*, 1*b*, and 1*c* illustrated in FIG. 10C (corresponding to FIGS. 12A to 12C).

First, the operation of the gate driver circuit in FIG. 10A for obtaining the timing chart illustrated in FIG. 6A is described.

As described in Embodiment 2, in the period a, the transition period from the period b to the period c, the period c, and the period d, the gate driver circuit in FIG. 10A performs the operation 2 in FIG. 5B. Thus, in order to perform the operation 2, in the period a, the transition period from the period b to the period c, the period c, and the period d, the gate driver circuit in FIG. 10A can perform any of the operations 2*a*, 2*b*, and 2*c* illustrated in FIG. 10C (corresponding to FIGS. 12D to 12F).

In the transition period from the period a to the period b and the period b, the gate driver circuit in FIG. 10A performs the operation 6 in FIG. 5F. Thus, in order to perform the operation 6, in the transition period from the period a to the period b and the period b, the gate driver circuit in FIG. 10A can perform the operation 6*a* illustrated in FIG. 10C (corresponding to FIG. 13D).

In this manner, the gate driver circuit in FIG. 10A can perform operation corresponding to the timing chart illustrated in FIG. 6A.

Note that in the timing chart illustrated in FIG. 6A, in the case where the circuit 100B outputs a signal (e.g., a non-selection signal) to the wiring 111 in the period a and the transition period from the period b to the period c, the gate driver circuit in FIG. 10A can perform, for example, any of the operations 1*a*, 1*b*, and 1*c* illustrated in FIG. 10C (corresponding to FIGS. 12A to 12C).

Note that in the timing chart illustrated in FIG. 6A, in the case where the circuit 100B outputs a different signal (e.g., a selection signal) to the wiring 111 in the transition period from the period a to the period b and the period b, the gate driver circuit in FIG. 10A can perform, for example, the operation 5*a* illustrated in FIG. 10C (corresponding to FIG. 13C).

In this manner, the gate driver circuit in FIG. 10A can perform operation corresponding to the timing chart illustrated in FIG. 6K.

Similarly, when the gate driver circuit in FIG. 10A performs any of the operations illustrated in FIG. 10C, the timing charts illustrated in FIGS. 6B to 6J and FIG. 6L can be obtained.

Next, the operation of the gate driver circuit in FIG. 10A for obtaining the timing chart illustrated in FIG. 7A is described.

As described in Embodiment 2, in the period a, the transition period from the period b to the period c, the period c, and the period d, the gate driver circuit in FIG. 10A performs the operation 3 in FIG. 5C. Thus, in order to perform the operation 3, in the period a, the period from the period b to the period c, the period c, and the period d, the gate driver circuit in FIG. 10A can perform any of the operations 3*a*, 3*b*, and 3*c* illustrated in FIG. 10C (corresponding to FIGS. 12G and 12H and FIG. 13A).

In the transition period from the period a to the period b and the period b, the gate driver circuit in FIG. 10A performs the operation 7 in FIG. 5G. Thus, in order to perform the operation 7, in the transition period from the period a to the period b and the period b, the gate driver circuit in FIG. 10A can perform the operation 7*a* illustrated in FIG. 10C (corresponding to FIG. 13E).

In this manner, the gate driver circuit in FIG. 10A can perform operation corresponding to the timing chart illustrated in FIG. 7A.

Note that in the timing chart illustrated in FIG. 7A, in the case where the circuit 100A outputs a signal (e.g., a non-selection signal) to the wiring 111 in the period a and the transition period from the period b to the period c, the gate driver circuit in FIG. 10A can perform, for example, any of the operations 1*a*, 1*b*, and 1*c* illustrated in FIG. 10C (corresponding to FIGS. 12A to 12C).

Note that in the timing chart illustrated in FIG. 7A, in the case where the circuit 100A outputs a different signal (e.g., a selection signal) to the wiring 111 in the transition period from the period a to the period b and the period b, the gate driver circuit in FIG. 10A can perform, for example, the operation 5*a* illustrated in FIG. 10C (corresponding to FIG. 13C).

In this manner, the gate driver circuit in FIG. 10A can perform operation corresponding to the timing chart illustrated in FIG. 7K.

Similarly, when the gate driver circuit in FIG. 10A performs any of the operations illustrated in FIG. 10C, the timing charts illustrated in FIGS. 7B to 7J and FIG. 7L can be obtained.

When the gate driver circuit in FIG. 10A performs a combination of the operations illustrated in FIG. 10C as described above, the timing charts illustrated in FIGS. 6A to 6L and FIGS. 7A to 7L can be obtained.

<Structure of Gate Driver Circuit>

Next, the structure of a gate driver circuit that is different from the structure in FIG. 10A is described below. Here, the case where the gate driver circuit includes N (N is a natural number) circuits having a function that is similar to the function of the circuit 100A or the circuit 100B is described.

Figure 11C:
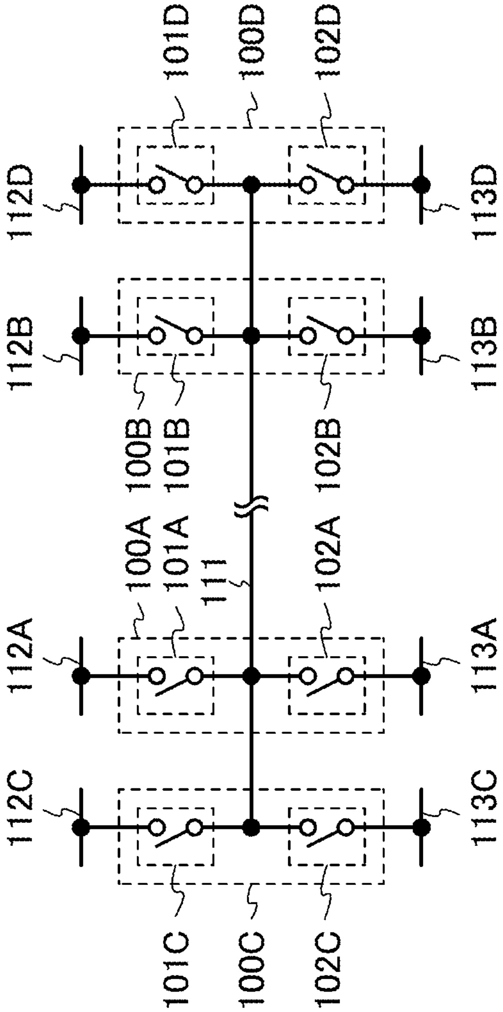

FIG. 11C illustrates a structure example of a gate driver circuit. The gate driver circuit includes the circuit 100A, the circuit 100B, a circuit 100C, and a circuit 100D. The circuit 100C and the circuit 100D have a function that is similar to the function of the circuit 100A or the circuit 100B.

The circuit 100C includes a switch 101C and a switch 102C. The switch 101C is connected between a wiring 112C and the wiring 111. The switch 102C is connected between a wiring 113C and the wiring 111. The switch 101C has a function that is similar to the function of the switch 101A or the switch 101B. The switch 102C has a function that is similar to the function of the switch 102A or the switch 102B. The wiring 112C has a function that is similar to the function of the wiring 112A or the wiring 112B and is supplied with a signal or voltage that is similar to the signal or voltage supplied to the wiring 112A or the wiring 112B. The wiring 113C has a function that is similar to the function of the wiring 113A or the wiring 113B and is supplied with a signal or voltage that is similar to the signal or voltage supplied to the wiring 113A or the wiring 113B.

The circuit 100D includes a switch 101D and a switch 102D. The switch 101D is connected between a wiring 112D and the wiring 111. The switch 102D is connected between a wiring 113D and the wiring 111. The switch 101D has a function that is similar to the function of the switch 101A or the switch 101B. The switch 102D has a function that is similar to the function of the switch 102A or the switch 102B. The wiring 112D has a function that is similar to the function of the wiring 112A or the wiring 112B and is supplied with a signal or voltage that is similar to the signal or voltage supplied to the wiring 112A or the wiring 112B. The wiring 113D has a function that is similar to the function of the wiring 113A or the wiring 113B and is supplied with a signal or voltage that is similar to the signal or voltage supplied to the wiring 113A or the wiring 113B.

FIG. 14A illustrates a different structure example of the gate driver circuit. The gate driver circuit includes the circuit 100A and the circuit 100B.

The circuit 100A includes a switch 103A in addition to the switch 101A and the switch 102A. The switch 103A is connected between the wiring 113A and the wiring 111. The switch 103A can perform operation that is similar to the operation of the switch 102A.

The circuit 100B includes a switch 103B in addition to the switch 101B and the switch 102B. The switch 103B is connected between the wiring 113B and the wiring 111. The switch 103B can perform operation that is similar to the operation of the switch 102B.

<Operation of Gate Driver Circuit>

The operation of the gate driver circuit in FIG. 14A is described with reference to FIG. 14B and FIGS. 15A to 15E. Here, the operation of the gate driver circuit in FIG. 14A for performing the operations 1 to 7 illustrated in FIGS. 5A to 5G in Embodiment 2 is described.

First, the operation of the gate driver circuit in FIG. 14A for performing the operation 1 in FIG. 5A is described.

As illustrated in an operation **1*d* in FIG. 14B, the switch 101A is turned off, so that the wiring 112A and the wiring 111 are brought out of conduction. The switch 102A and the switch 103A are turned on, so that the wiring 113A and the wiring 111 are brought into conduction. Thus, the potential of the wiring 113A (e.g., the voltage V1) is supplied to the wiring 111. The switch 101B is turned off, so that the wiring 112B and the wiring 111 are brought out of conduction. The switch 102B and the switch 103B are turned on, so that the wiring 113B and the wiring 111 are brought into conduction. Thus, the potential of the wiring 113B (e.g., the voltage V1) is supplied to the wiring 111**.

Note that in the operation **1*d* in FIG. 14B, the switch 103A and the switch 103B may be turned off, as in an operation 1*e* in FIG. 14B. Alternatively, in the operation 1*d* in FIG. 14B, the switch 102A and the switch 102B may be turned off, as in an operation 1*f* in FIG. 14B. Alternatively, in the operations 1*d*, 1*e*, and 1*f* in FIG. 14B, the switch 101A or the switch 101**B may be turned off.

Next, the operation of the gate driver circuit in FIG. 14A for performing the operation 2 in FIG. 5B is described.

As illustrated in an operation **2*d* in FIG. 14B, the switch 101A is turned off, so that the wiring 112A and the wiring 111 are brought out of conduction. The switch 102A and the switch 103A are turned on, so that the wiring 113A and the wiring 111 are brought into conduction. Thus, the potential of the wiring 113A (e.g., the voltage V1) is supplied to the wiring 111. The switch 101B is turned off, so that the wiring 112B and the wiring 111 are brought out of conduction. The switch 102B and the switch 103B are turned off, so that the wiring 113B and the wiring 111** are brought out of conduction.

Figure 15A:
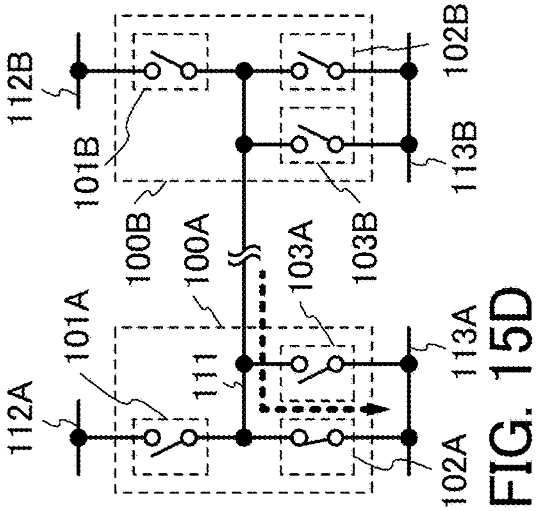
FIGS. 15A to 15E each illustrate an operation example of a gate driver circuit.
Figure 15B:
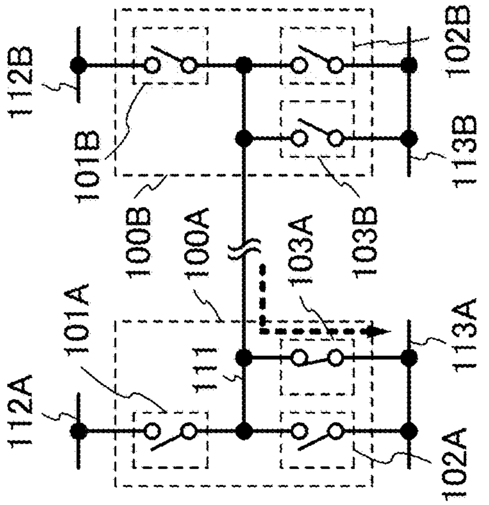

Note that in the operation **2*d* in FIG. 14B, the switch 103A may be turned off, as in an operation 2*e* in FIG. 14B (corresponding to FIG. 15A). Alternatively, in the operation 2*d* in FIG. 14B, the switch 102A may be turned off, as in an operation 2*f* in FIG. 14B (corresponding to FIG. 15B). Alternatively, in the operations 2*d*, 2*e*, and 2*f* in FIG. 14B, the switch 101**A may be turned off.

Next, the operation of the gate driver circuit in FIG. 14A for performing the operation 3 in FIG. 5C is described.

As illustrated in an operation **3*d* in FIG. 14B, the switch 101A is turned off, so that the wiring 112A and the wiring 111 are brought out of conduction. The switch 102A and the switch 103A are turned off, so that the wiring 113A and the wiring 111 are brought out of conduction. The switch 101B is turned off, so that the wiring 112B and the wiring 111 are brought out of conduction. The switch 102B and the switch 103B are turned on, so that the wiring 113B and the wiring 111 are brought into conduction. Thus, the potential of the wiring 113B (e.g., the voltage V1) is supplied to the wiring 111**.

Figure 15C:
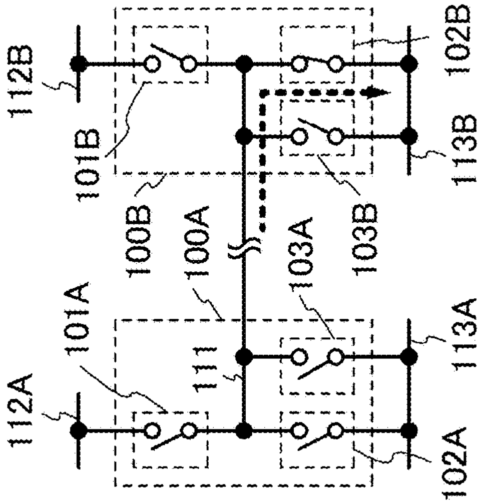
Figure 15D:
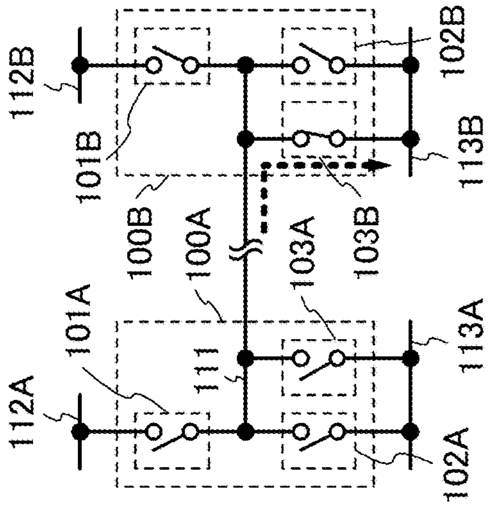
Figure 15E:
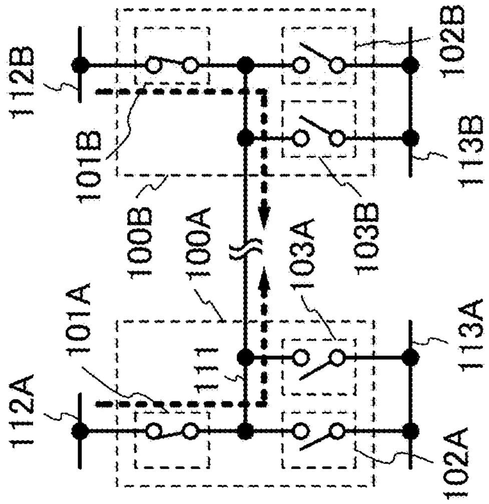

Note that in the operation **3*d* in FIG. 14B, the switch 103B may be turned off, as in an operation 3*e* in FIG. 14B (corresponding to FIG. 15C). Alternatively, in the operation 3*d* in FIG. 14B, the switch 102B may be turned off, as in an operation 3*f* in FIG. 14B (corresponding to FIG. 15D). Alternatively, in the operations 3*d*, 3*e*, and 3*f* in FIG. 14B, the switch 101**B may be turned off.

Next, the operation of the gate driver circuit in FIG. 14A for performing the operation 4 in FIG. 5D is described.

As illustrated in an operation **4*d* in FIG. 14B, the switch 101A is turned off, so that the wiring 112A and the wiring 111 are brought out of conduction. The switch 102A and the switch 103A are turned off, so that the wiring 113A and the wiring 111 are brought out of conduction. The switch 101B is turned off, so that the wiring 112B and the wiring 111 are brought out of conduction. The switch 102B and the switch 103B are turned off, so that the wiring 113B and the wiring 111** are brought out of conduction.

Next, the operation of the gate driver circuit in FIG. 14A for performing the operation 5 in FIG. 5E is described.

As illustrated in an operation **5*b* in FIG. 14B (corresponding to FIG. 15E), the switch 101A is turned on, so that the wiring 112A and the wiring 111 are brought into conduction. Thus, the potential of the wiring 112A (e.g., the clock signal CK1) is supplied to the wiring 111. The switch 102A and the switch 103A are turned off, so that the wiring 113A and the wiring 111 are brought out of conduction. The switch 101B is turned on, so that the wiring 112B and the wiring 111 are brought into conduction. Thus, the potential of the wiring 112B (e.g., the clock signal CK1**) is supplied to the wiring 111. The switch 102B and the switch 103B are turned off, so that the wiring 113B and the wiring 111 are brought out of conduction.

Next, the operation of the gate driver circuit in FIG. 14A for performing the operation 6 in FIG. 5F is described.

As illustrated in an operation 6b in FIG. 14B, the switch 101A is turned on, so that the wiring 112A and the wiring 111 are brought into conduction. Thus, the potential of the wiring 112A (e.g., the clock signal CK1) is supplied to the wiring 111. The switch 102A and the switch 103A are turned off, so that the wiring 113A and the wiring 111 are brought out of conduction. The switch 101B is turned off, so that the wiring 112B and the wiring 111 are brought out of conduction. The switch 102B and the switch 103B are turned off, so that the wiring 113B and the wiring 111 are brought out of conduction.

Next, the operation of the gate driver circuit in FIG. 14A for performing the operation 7 in FIG. 5B is described.

As illustrated in an operation 7b in FIG. 14B, the switch 101A is turned off, so that the wiring 112A and the wiring 111 are brought out of conduction. The switch 102A and the switch 103A are turned off, so that the wiring 113A and the wiring 111 are brought out of conduction. The switch 101B is turned on, so that the wiring 112B and the wiring 111 are brought into conduction. Thus, the potential of the wiring 112B (e.g., the clock signal CK1) is supplied to the wiring 111. The switch 102B and the switch 103B are turned off, so that the wiring 113B and the wiring 111 are brought out of conduction.

By control of on and off of the switch 101A, the switch 102A, the switch 103A, the switch 101B, the switch 102B, and the switch 103B as described above, the operation of the gate driver circuit described with reference to FIGS. 5A to 5G in Embodiment 2 can be performed.

Embodiment 4

In this embodiment, a semiconductor device including the gate driver circuit described in any of the above embodiments is described.

<Structure of Semiconductor Device>

Figure 16A:
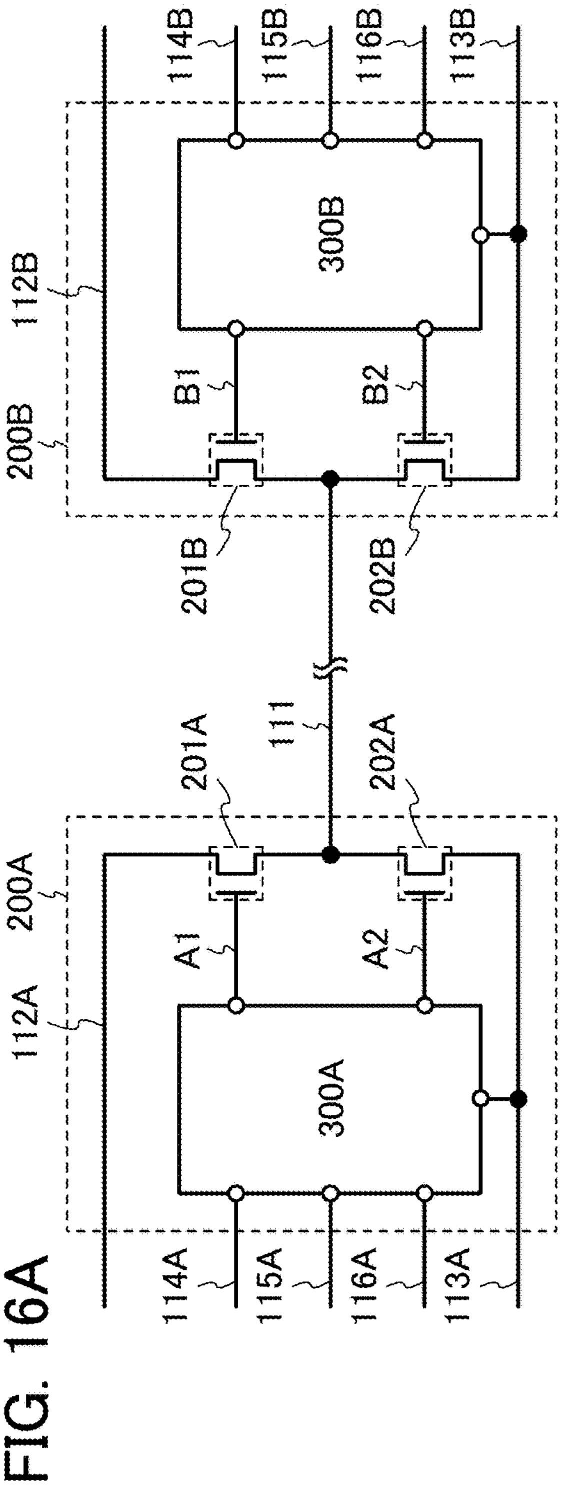
FIGS. 16A and 16B each illustrate an example of a circuit diagram of a semiconductor device.

A structure example of a semiconductor device in this embodiment is described with reference to FIG. 16A. FIG. 16A illustrates an example of a circuit diagram of the semiconductor device. The semiconductor device illustrated in FIG. 16A includes a circuit 200A and a circuit 200B included in a gate driver circuit.

The circuit 200A includes a transistor 201A, a transistor 202A, and a circuit 300A. The circuit 200B includes a transistor 201B, a transistor 202B, and a circuit 300B.

Note that in FIG. 16A, the transistor 201A, the transistor 202A, the transistor 201B, and the transistor 202B are described as n-channel transistors. The n-channel transistor is turned on when a potential difference Vgs between a gate and a source exceeds the threshold voltage Vth.

These transistors may be p-channel transistors. The p-channel transistor is turned on when a potential difference Vgs between a gate and a source is lower than the threshold voltage Vth.

A first terminal of the transistor 201A is connected to the wiring 112A. A second terminal of the transistor 201A is connected to the wiring 111. A first terminal of the transistor 202A is connected to the wiring 113A. A second terminal of the transistor 202A is connected to the wiring 111. The circuit 300A is connected to the wiring 113A, a wiring 114A, a wiring 115A, a wiring 116A, a gate of the transistor 201A, and a gate of the transistor 202A. Note that the circuit 300A is not necessarily connected to all of the wiring 113A, the wiring 114A, the wiring 115A, and the wiring 116A, and the circuit 300A is not connected to any of the wiring 113A, the wiring 114A, the wiring 115A, and the wiring 116A in some cases.

Note that a portion where the gate of the transistor 201A and the circuit 300A are connected to each other is referred to as a node A1, and a portion where the gate of the transistor 202A and the circuit 300A are connected to each other is referred to as a node A2. In addition, the potential of the node A1 is also referred to as a potential Va1, and the potential of the node A2 is also referred to as a potential Va2.

A first terminal of the transistor 201B is connected to the wiring 112B. A second terminal of the transistor 201B is connected to the wiring 111. A first terminal of the transistor 202B is connected to the wiring 113B. A second terminal of the transistor 202B is connected to the wiring 111. The circuit 300B is connected to the wiring 113B, a wiring 114B, a wiring 115B, a wiring 116B, a gate of the transistor 201B, and a gate of the transistor 202B. Note that the circuit 300B is not necessarily connected to all of the wiring 113B, the wiring 114B, the wiring 115B, and the wiring 116B, and the circuit 300B is not connected to any of the wiring 113B, the wiring 114B, the wiring 115B, and the wiring 116B in some cases.

Note that a portion where the gate of the transistor 201B and the circuit 300B are connected to each other is referred to as a node B1, and a portion where the gate of the transistor 202B and the circuit 300B are connected to each other is referred to as a node B2. In addition, the potential of the node B1 is also referred to as a potential Vb1, and the potential of the node B2 is also referred to as a potential Vb2.

Next, the wiring 111, the wiring 114A, the wiring 115A, the wiring 116A, the wiring 114B, the wiring 115B, and the wiring 116B are described.

The signal OUTA is output from the circuit 200A to the wiring 111, and the signal OUTB is output from the circuit 200B to the wiring 111.

The wiring 111 extends to a pixel portion and functions as a gate signal line (also referred to as a gate line), a scan line, or a signal line. Thus, the signal OUTA and the signal OUTB each correspond to a gate signal, a scan signal, or a selection signal.

In the case where the semiconductor device includes the plurality of circuits 200A, the wiring 111 may be connected to the wiring 114A in the circuit 200A in a different stage (e.g., the next stage). In that case, the signal OUTA corresponds to a transfer signal or a start signal. In addition, in the case where the semiconductor device includes the plurality of circuits 200A, the wiring 111 may be connected to the wiring 116A in the circuit 200A in a different stage (e.g., the preceding stage). In that case, the signal OUTA corresponds to a reset signal.

In the case where the semiconductor device includes the plurality of circuits 200B, the wiring 111 may be connected to the wiring 114B in the circuit 200B in a different stage (e.g., the next stage). In that case, the signal OUTB corresponds to a transfer signal or a start signal. In addition, in the case where the semiconductor device includes the plurality of circuits 200B, the wiring 111 may be connected to the wiring 116B in the circuit 200B in a different stage (e.g., the preceding stage). In that case, the signal OUTB corresponds to a reset signal.

Start signals SP are input to the wiring 114A and the wiring 114B. Thus, the wiring 114A and the wiring 114B function as signal lines.

Further, in the case where the semiconductor device includes the plurality of circuits 200A, the wiring 114A may be connected to the wiring 111 in the circuit 200A in a different stage (e.g., the preceding stage). In that case, the wiring 114A functions as a gate signal line (also referred to as a gate line), a scan line, or a signal line. Thus, the start signal SP corresponds to a gate signal, a scan signal, or a selection signal.

Further, in the case where the semiconductor device includes the plurality of circuits 200B, the wiring 114B may be connected to the wiring 111 in the circuit 200B in a different stage (e.g., the preceding stage). In that case, the wiring 114B functions as a gate signal line (also referred to as a gate line), a signal line, or a scan line. Thus, the start signal SP corresponds to a gate signal, a selection signal, or a scan signal.

Note that in the case where the same signal is input to the wiring 114A and the wiring 114B, the wiring 114A and the wiring 114B may be connected to each other. In that case, one wiring may be used as the wiring 114A and the wiring 114B. Alternatively, different signals may be input to the wiring 114A and the wiring 114B.

A signal SELA is input to the wiring 115A, and a signal SELB is input to the wiring 115B.

The signal SELA and the signal SELB are preferably signals obtained by inversion of the signals or signals which are substantially 180° out of phase. In the case where each of the signal SELA and the signal SELB is a signal which repeatedly shifts between an H level and an L level every given period (e.g., every frame period), each of the signal SELA and the signal SELB corresponds to a control signal, a clock signal, or a clock control signal. Thus, the wiring 115A and the wiring 115B function as signal lines, control lines, or clock signal lines (also referred to as clock lines or clock supply lines). Each of the signal SELA and the signal SELB may be a signal which repeatedly shifts between an H level and an L level every several periods, every time power supply voltage is input, or in a random manner. In the same period, both the signal SELA and the signal SELB may be at an H level or an L level.

Reset signals RE are input to the wiring 116A and the wiring 116B. Thus, the wiring 116A and the wiring 116B function as signal lines.

Further, in the case where the semiconductor device includes the plurality of circuits 200A, the wiring 116A may be connected to the wiring 111 in the circuit 200B in a different stage (e.g., the next stage). In that case, the wiring 116A functions as a gate signal line (also referred to as a gate line), a signal line, or a scan line. Thus, the reset signal RE corresponds to a gate signal, a selection signal, or a scan signal.

Further, in the case where the semiconductor device includes the plurality of circuits 200B, the wiring 116B may be connected to the wiring 111 in the circuit 200B in a different stage (e.g., the next stage). In that case, the wiring 116B functions as a gate signal line (also referred to as a gate line), a signal line, or a scan line. Thus, the reset signal RE corresponds to a gate signal, a selection signal, or a scan signal.

Note that in the case where the same signal is input to the wiring 116A and the wiring 116B, the wiring 116A and the wiring 116B may be connected to each other. In that case, one wiring may be used as the wiring 116A and the wiring 116B. Alternatively, different signals may be input to the wiring 116A and the wiring 116B.

Next, the transistor 201A, the transistor 202A, the circuit 300A, the transistor 201B, the transistor 202B, and the circuit 300B are described.

The transistor 201A has a function that is similar to the function of the switch 101A described in Embodiment 3. Alternatively, the transistor 201A may have a function of performing bootstrap operation. Alternatively, the transistor 201A may have a function of raising the potential of the node A1 by bootstrap operation.

In this manner, the transistor 201A functions as a switch, a buffer, or the like. Note that the transistor 201A may be controlled in accordance with the potential of the node A1.

The transistor 202A has a function that is similar to the function of the switch 102A described in Embodiment 3. Note that the transistor 202A may be controlled in accordance with the potential of the node A2.

The circuit 300A has a function of controlling the potential of the node A1 or the potential of the node A2. Alternatively, the circuit 300A has a function of controlling the timing of supplying a signal, voltage, or the like to the node A1 or the node A2. Alternatively, the circuit 300A has a function of controlling the timing of not supplying a signal, voltage, or the like to the node A1 or the node A2. Alternatively, the circuit 300A has a function of controlling the timing of supplying an H signal or the voltage 12 to the node A1 or the node A2. Alternatively, the circuit 300A has a function of controlling the timing of supplying an L signal or the voltage V1 to the node A1 or the node A2. Alternatively, the circuit 300A has a function of controlling the timing of raising the potential of the node A1 or the potential of the node A2. Alternatively, the circuit 300A has a function of controlling the timing of lowering the potential of the node A1 or the potential of the node A2. Alternatively, the circuit 300A has a function of controlling the timing of keeping the potential of the node A1 or the potential of the node A2. Alternatively, the circuit 300A has a function of controlling the timing of setting the node A1 or the node A2 to be in a floating state.

Note that the circuit 300A may be controlled in accordance with the start signal SP, the signal SELA, or the reset signal RE. Alternatively, the circuit 300A may be controlled in accordance with a signal which is different from the above signal (the start signal SP, the signal SELA, or the reset signal RE) (e.g., the signal OUTA, the clock signal CK1, or the clock signal CK2).

The transistor 201B has a function that is similar to the function of the switch 101B described in Embodiment 3. Alternatively, the transistor 201B may have a function of performing bootstrap operation. Alternatively, the transistor 201B may have a function of raising the potential of the node B1 by bootstrap operation.

In this manner, the transistor 201B functions as a switch, a buffer, or the like. Note that the transistor 201B may be controlled in accordance with the potential of the node B1.

The transistor 202B has a function that is similar to the function of the switch 102B described in Embodiment 3. Note that the transistor 202B may be controlled in accordance with the potential of the node B2.

The circuit 300B has a function of controlling the potential of the node B1 or the potential of the node B2. Alternatively, the circuit 300B has a function of controlling the timing of supplying a signal, voltage, or the like to the node B1 or the node B2. Alternatively, the circuit 300B has a function of controlling the timing of not supplying a signal, voltage, or the like to the node B1 or the node B2. Alternatively, the circuit 300B has a function of controlling the timing of supplying an H signal or the voltage 12 to the node B1 or the node B2. Alternatively, the circuit 300B has a function of controlling the timing of supplying an L signal or the voltage V1 to the node B1 or the node B2. Alternatively, the circuit 300B has a function of controlling the timing of raising the potential of the node B1 or the potential of the node B2. Alternatively, the circuit 300B has a function of controlling the timing of lowering the potential of the node B1 or the potential of the node B2. Alternatively, the circuit 300B has a function of controlling the timing of keeping the potential of the node B1 or the potential of the node B2. Alternatively, the circuit 300B has a function of controlling the timing of setting the node B1 or the node B2 to be in a floating state.

Note that the circuit 300B may be controlled in accordance with the start signal SP, the signal SELB, or the reset signal RE. Alternatively, the circuit 300B may be controlled in accordance with a signal which is different from the above signal (the start signal SP, the signal SELB, or the reset signal RE) (e.g., the signal OUTB, the clock signal CK1, or the clock signal CK2).

<Operation of Semiconductor Device>

Figure 17:
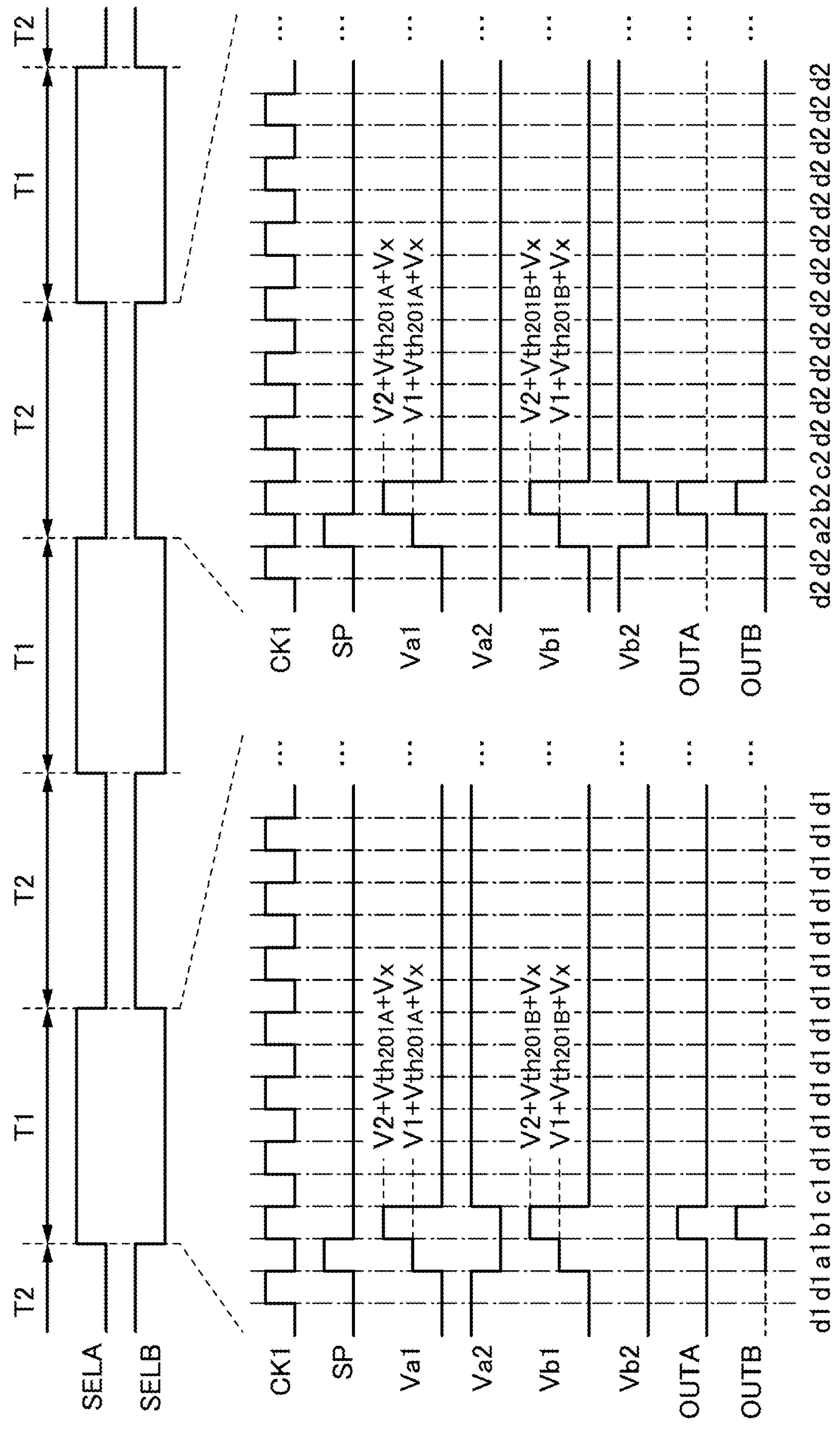
FIG. 17 is a timing chart illustrating an operation example of a semiconductor device.
Figure 21A:
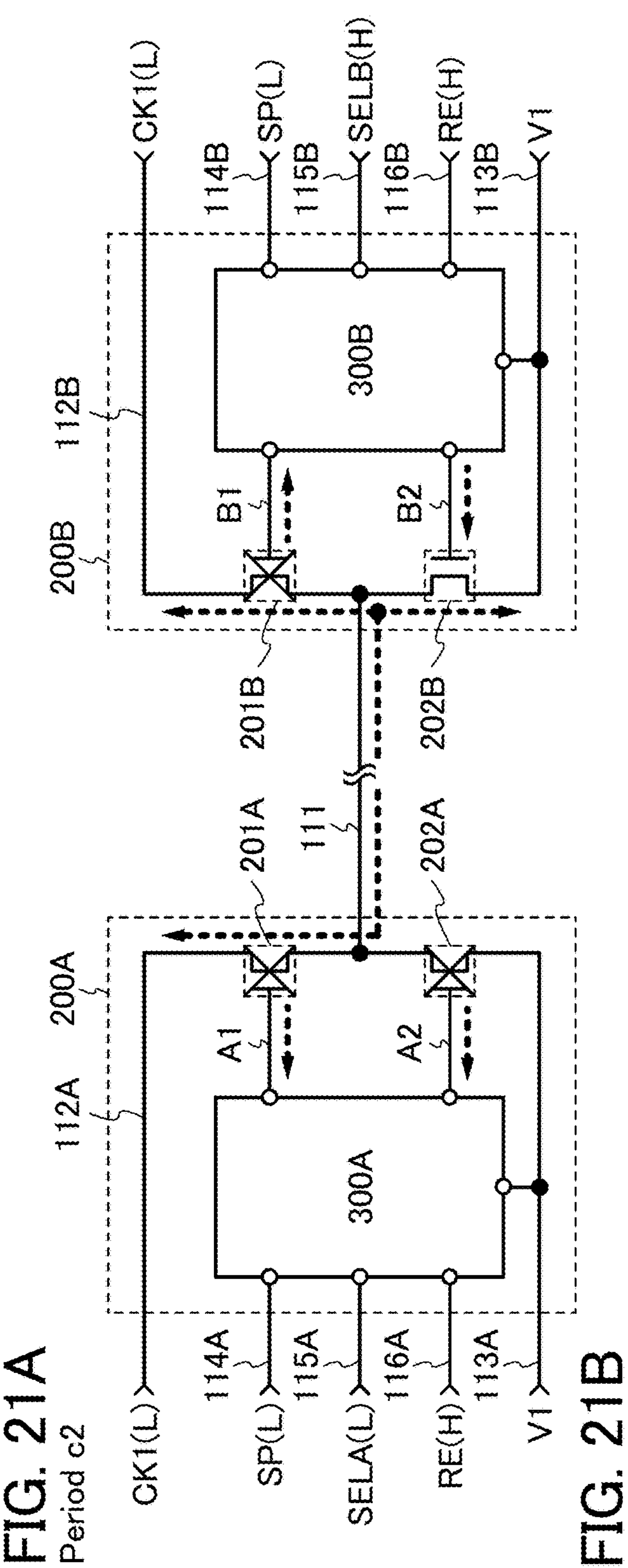
FIGS. 21A and 21B each illustrate an operation example of a semiconductor device.
Figure 21B:
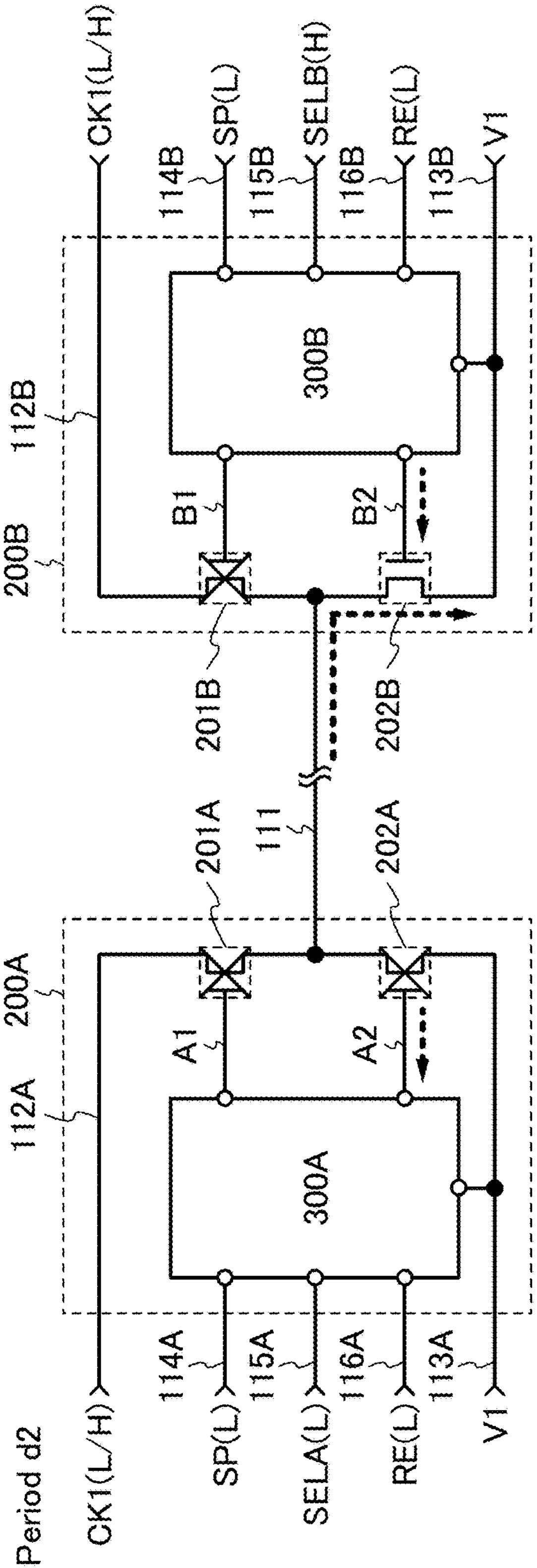
Figure 22:
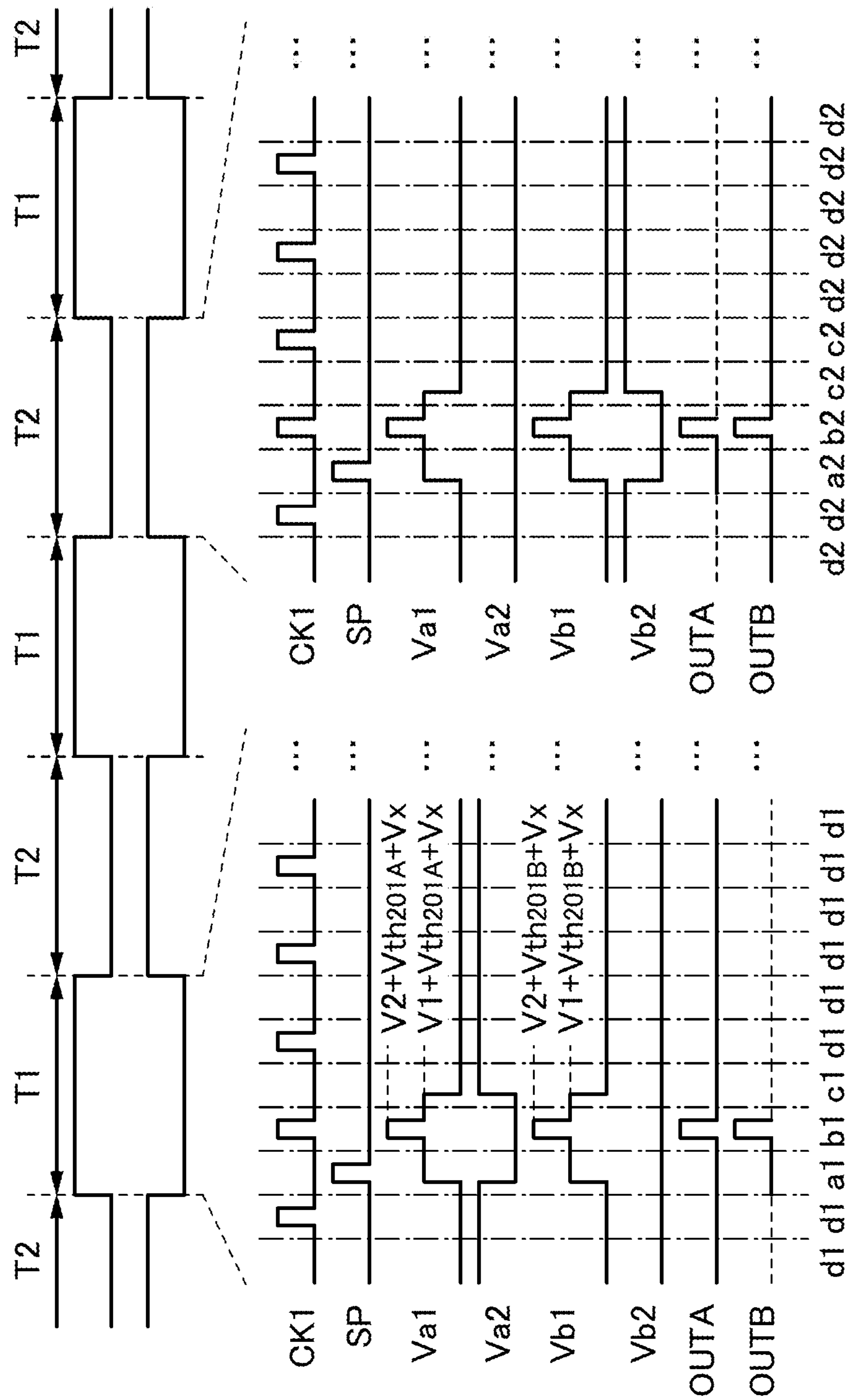
FIG. 22 is a timing chart illustrating an operation example of a semiconductor device.
Figure 23:
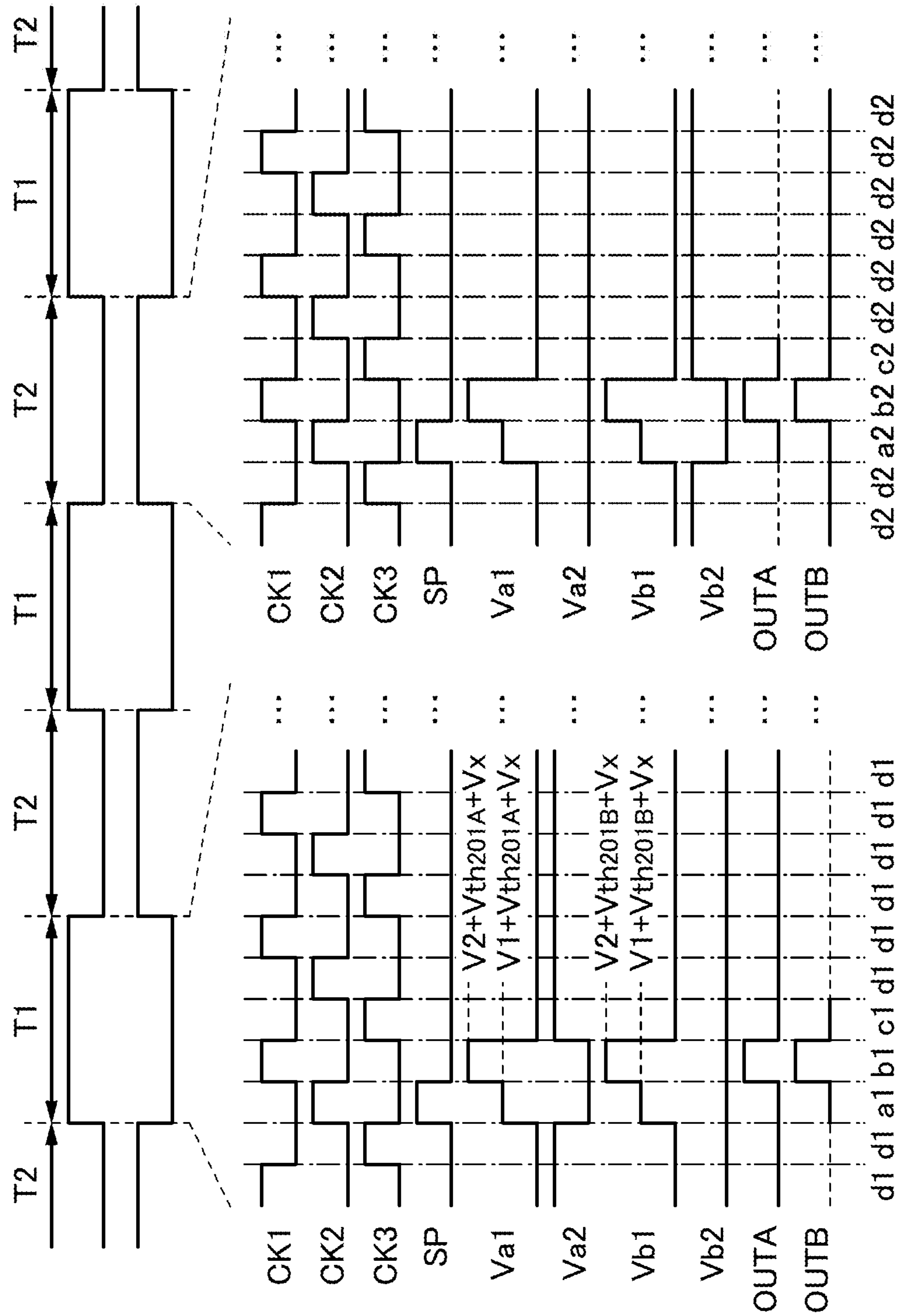
FIG. 23 is a timing chart illustrating an operation example of a semiconductor device.

An operation example of the semiconductor device in FIG. 16A is described with reference to a timing chart illustrated in FIG. 17. FIGS. 18A and 18B, FIGS. 19A and 19B, FIGS. 20A and 20B, and FIGS. 21A and 21B each illustrate an operation example of the semiconductor device in FIG. 16A, and FIG. 22 and FIG. 23 are timing charts each illustrating an operation example of the semiconductor device in FIG. 16A. Note that description of portions which are common with the portions described in the above embodiments is omitted.

Figure 18A:
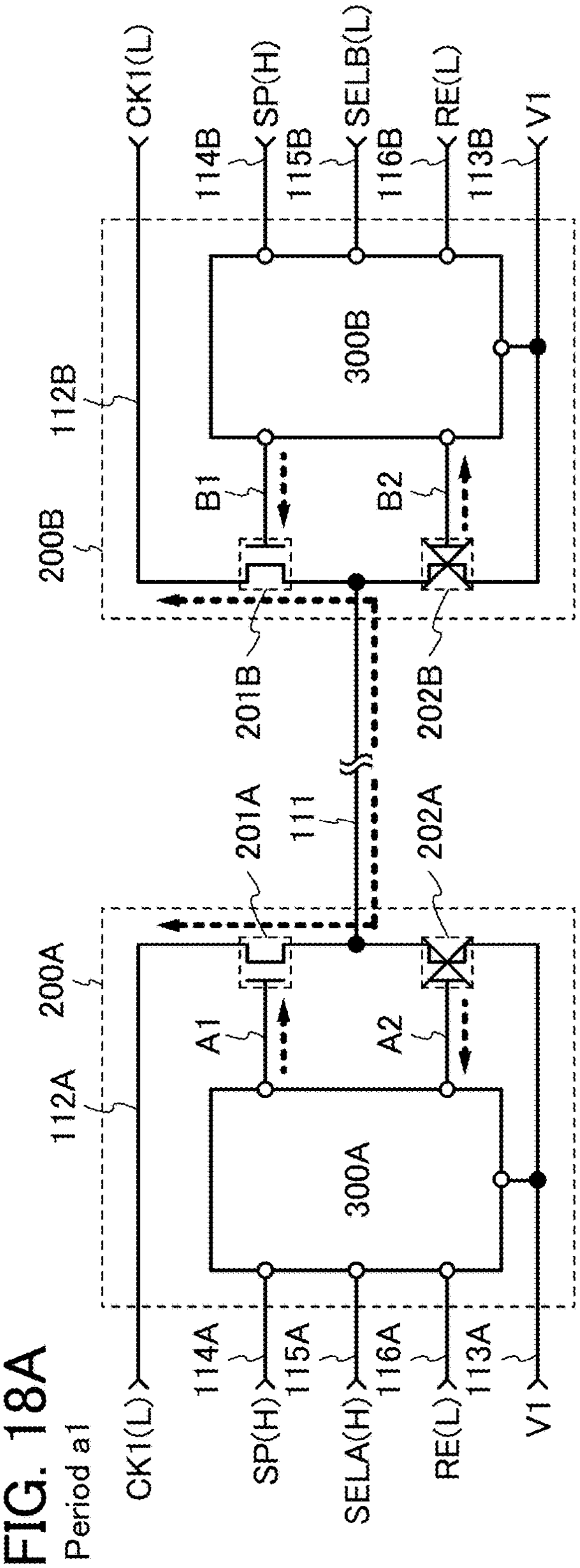
FIGS. 18A and 18B each illustrate an operation example of a semiconductor device.

First, as illustrated in FIG. 18A, in a period a1, the start signal SP is set at an H level. At the timing of when the start signal SP is set at an H level, the circuit 300A starts to supply an H signal or the voltage V2 to the node A1. Thus, the potential of the node A1 rises. At this time, since the potential of the node A1 rises, the circuit 300A supplies an L signal or the voltage V1 to the node A2. Thus, the potential of the node A2 decreases and is set at an L level. Then, the transistor 202A is turned off, so that the wiring 113A and the wiring 111 are brought out of conduction.

Then, the potential of the node A1 continuously rises. After the potential of the node A1 rises to V1+$Vth_{201A}$ ($Vth_{201A}$ is the threshold voltage of the transistor 201A), the transistor 201A is turned on, so that the wiring 112A and the wiring 111 are brought into conduction. Then, the clock signal CK1 which is at an L level is supplied to the wiring 111 through the transistor 201A. Accordingly, the signal OUTA is set at an L level.

After that, the potential of the node A1 further rises. Then, the circuit 300A stops supplying a signal or voltage to the node A1, so that the circuit 300A and the node A1 are brought out of conduction. Consequently, the node A1 is set to be in a floating state, so that the potential of the node A1 is kept at V1+$Vth_{201A}$+Vx (Vx is a positive number).

Note that in the period a1, instead of stopping the supply of a signal or voltage to the node A1, the circuit 300A may continuously supply the voltage V1+$Vth_{201A}$+Vx to the node A1.

In contrast, in the period a1, at the timing of when the start signal SP is set at an H level, the circuit 300B starts to supply an H signal or the voltage 12 to the node B1. Thus, the potential of the node B1 rises. At this time, since the signal SELB is at an L level or the potential of the node B1 rises, the circuit 300B supplies an L signal or the voltage V1 to the node B2. Thus, the potential of the node B2 decreases and is set at an L level. Then, the transistor 202B is turned off, so that the wiring 113B and the wiring 111 are brought out of conduction.

Then, the potential of the node B1 continuously rises. After the potential of the node B1 rises to V1+$Vth_{201B}$ ($Vth_{201B}$ is the threshold voltage of the transistor 201B), the transistor 201B is turned on, so that the wiring 112B and the wiring 111 are brought into conduction. Then, the clock signal CK1 which is at an L level is supplied to the wiring 111 through the transistor 201B. Accordingly, the signal OUTB is set at an L level.

After that, the potential of the node B1 further rises. Then, the circuit 300B stops supplying a signal or voltage to the node B1, so that the circuit 300B and the node B1 are brought out of conduction. Consequently, the node B1 is set to be in a floating state, so that the potential of the node B1 is kept at V1+$Vth_{201B}$+Vx.

Note that in the period a1, instead of stopping the supply of a signal or voltage to the node B1, the circuit 300B may continuously supply the voltage V1+$Vth_{201B}$+Vx to the node B1.

Figure 18B:
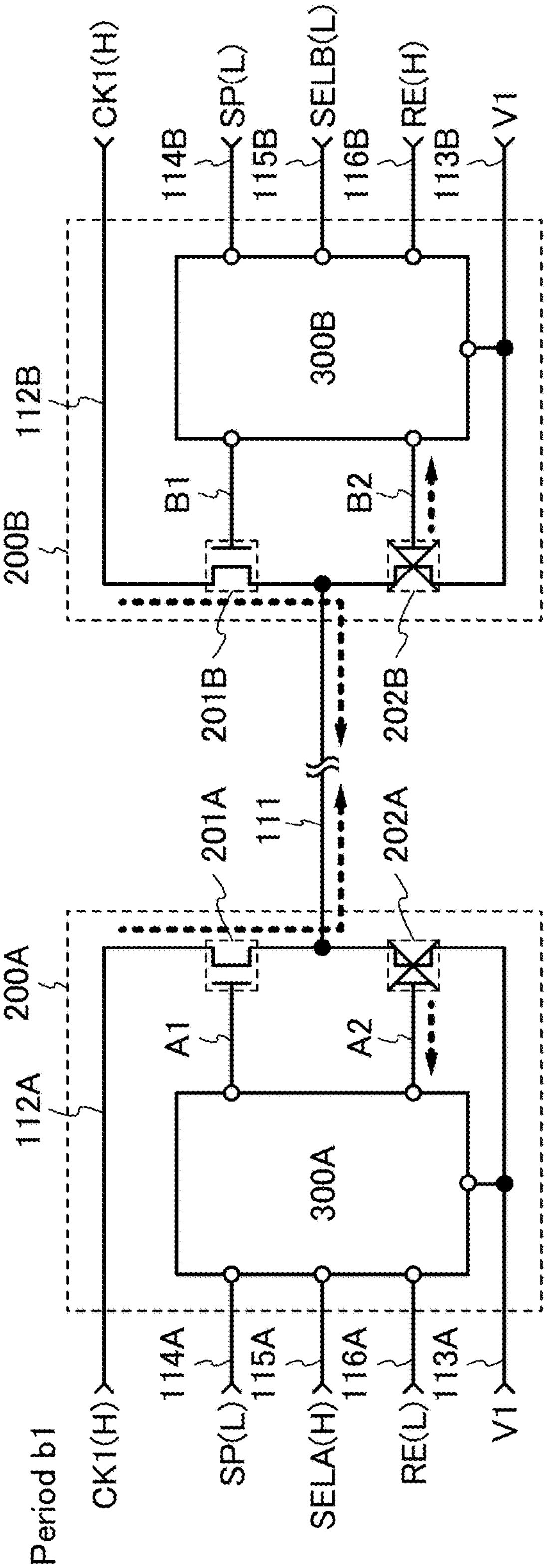

Next, as illustrated in FIG. 18B, in a period b1, the start signal SP is set at an L level. Thus, a state is kept in which the circuit 300A does not supply a signal or voltage to the node A1. Consequently, the node A1 is kept in a floating state, so that the potential of the node A1 is kept at V1+$Vth_{201A}$+Vx. That is, since the transistor 201A is kept on, the wiring 112A and the wiring 111 are kept in a conduction state.

Since the potential of the node A1 is kept at the level that is raised in the period a1, a state is kept in which the circuit 300A supplies an L signal or the voltage V1 to the node A2. Thus, the transistor 202A is kept off, so that the wiring 113A and the wiring 111 are kept in a non-conduction state.

At this time, the level of the clock signal CK1 rises from an L level to an H level. Then, the clock signal CK1 which is at an H level is supplied to the wiring 111 through the transistor 201A, so that the potential of the wiring 111 rises. Then, the potential of the node A1 is raised to V2+$Vth_{202A}$+Vx ($Vth_{202A}$ is the threshold voltage of the transistor 202A) by parasitic capacitance between the gate of the transistor 201A and the second terminal of the transistor 201A because the node A1 is kept in a floating state. This is so-called bootstrap operation. Thus, the potential of the wiring 111 rises to V2, so that the signal OUTA is set at an H level.

In contrast, in the period b1, the start signal SP is set at an L level, so that a state is kept in which the circuit 300B does not supply a signal or voltage to the node B1. Thus, the node B1 is kept in a floating state, so that the potential of the node B1 is kept at V1+$Vth_{201B}$+Vx. That is, since the transistor 201B is kept on, the wiring 112B and the wiring 111 are kept in a conduction state.

Since the signal SELB is at an L level or the potential of the node B1 is kept at the level that is raised in the period a1, a state is kept in which the circuit 300B supplies an L signal or the voltage V1 to the node B2. Thus, the transistor 202B is kept off, so that the wiring 113B and the wiring 111 are kept in a non-conduction state.

At this time, the level of the clock signal CK1 rises from an L level to an H level. Then, the clock signal CK1 which is at an H level is supplied to the wiring 111 through the transistor 201B, so that the potential of the wiring 111 rises. Then, the potential of the node B1 is raised to V2+$Vth_{202B}$+Vx ($Vth_{202B}$ is the threshold voltage of the transistor 202B) by parasitic capacitance between the gate of the transistor 201B and the second terminal of the transistor 201B because the node B1 is kept in a floating state. This is so-called bootstrap operation. Thus, the potential of the wiring 111 rises to V2, so that the signal OUTB is set at an H level.

Figure 19A:
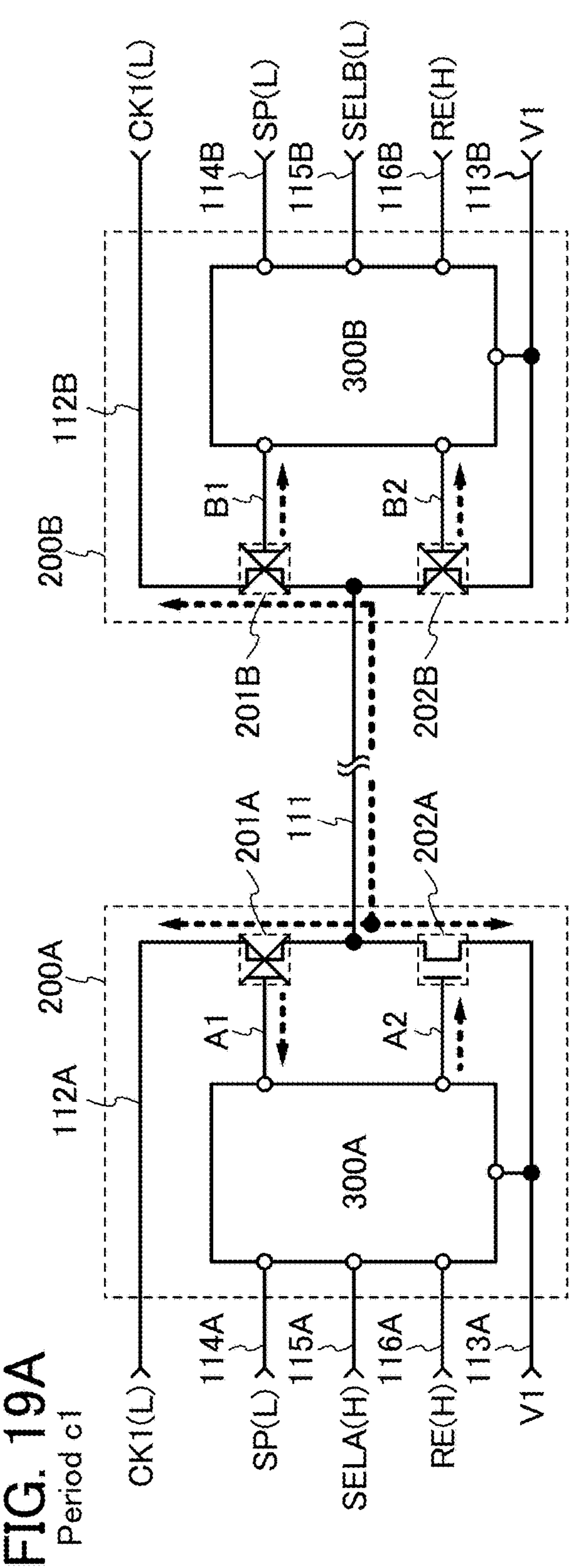
FIGS. 19A and 19B each illustrate an operation example of a semiconductor device.

Next, as illustrated in FIG. 19A, in a period c1, the reset signal RE is set at an H level. At the timing of when the reset signal RE is set at an H level, the circuit 300A supplies an L signal or the voltage V1 to the node A1. Thus, the potential of the node A1 decreases so as to be the voltage V1. Then, the transistor 201A is turned off, so that the wiring 112A and the wiring 111 are brought out of conduction. Since the potential of the node A1 decreases, the circuit 300A supplies an H signal or the voltage 12 to the node A2. Thus, the potential of the node A2 rises. Then, the transistor 202A is turned on, so that the wiring 113A and the wiring 111 are brought into conduction. Consequently, the voltage V1 is supplied to the wiring 111 through the transistor 202A. Thus, the potential of the wiring 111 decreases, so that the signal OUTA is set at an L level.

Note that in the period c1, the timing of when the clock signal CK1 is set at an L level might be earlier than the timing of when the transistor 201A is turned off. Thus, until the transistor 201A is turned off, it is preferable that the clock signal CK1 which is at an L level be supplied to the wiring 111 through the transistor 201A. When the channel width of the transistor 201A is increased, the fall time of the signal OUTA can be shortened.

In the period c1, as for the wiring 111, there are the following three cases: the case where the voltage V1 is supplied to the wiring 111 through the transistor 202A; the case where the clock signal CK1 which is at an L level is supplied to the wiring 111 through the transistor 201A; and the case where the voltage V1 is supplied to the wiring 111 through the transistor 202A and the clock signal CK1 which is at an L level is supplied to the wiring 111 through the transistor 201A.

In contrast, in the period c1, at the timing of when the reset signal RE is set at an H level, the circuit 300B supplies an L signal or the voltage V1 to the node B1. Thus, the potential of the node B1 decreases so as to be the voltage V1. Then, the transistor 201B is turned off, so that the wiring 112B and the wiring 111 are brought out of conduction. Since the signal SELB is kept at an L level, a state is kept in which the circuit 300B supplies an L signal or the voltage V1 to the node B2. Thus, the potential of the node B2 is kept at an L level. Then, the transistor 202B is kept off, so that the wiring 113B and the wiring 111 are kept in a non-conduction state.

Note that in the period c1, the timing of when the clock signal CK1 is set at an L level might be earlier than the timing of when the transistor 201B is turned off. Thus, until the transistor 201B is turned off, it is preferable that the clock signal CK1 which is at an L level be supplied to the wiring 111 through the transistor 201B. When the channel width of the transistor 201B is increased, the fall time of the signal OUTB can be shortened.

Figure 19B:
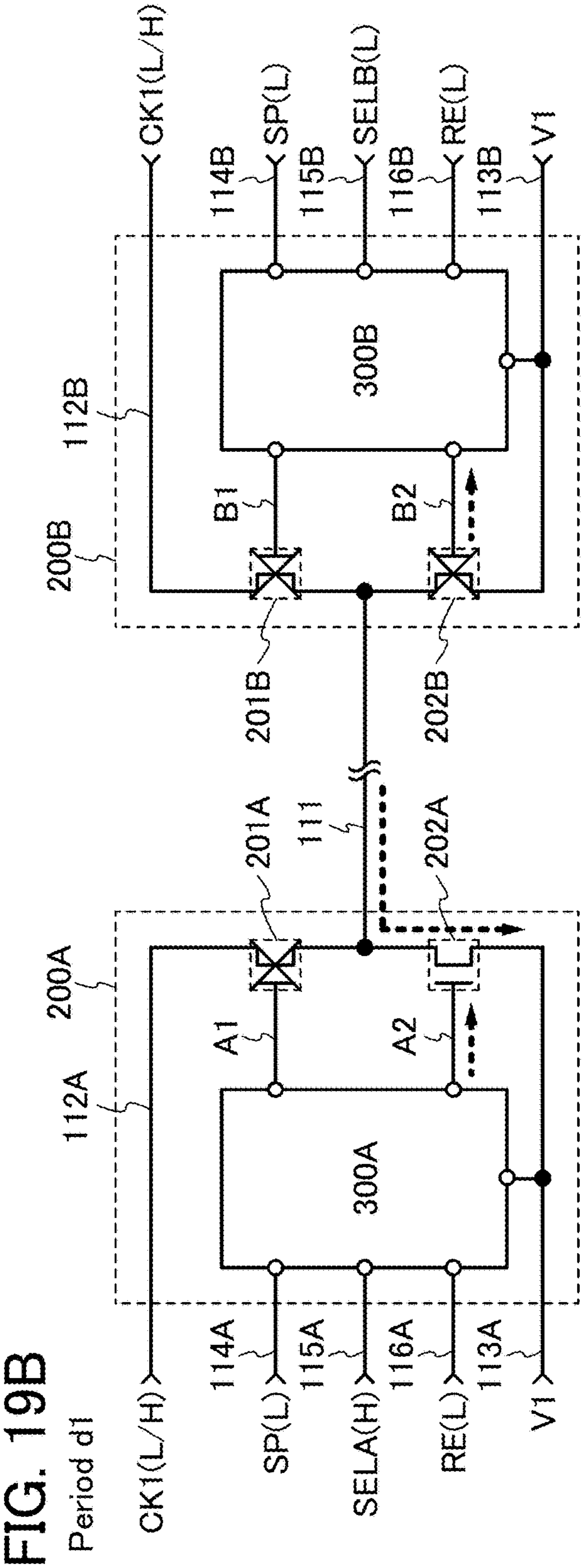

Next, as illustrated in FIG. 19B, in the period d1, a state is kept in which the circuit 300A supplies an L signal or the voltage V1 to the node A1. Thus, the potential of the node A1 is kept at an L level. Then, the transistor 201A is kept off, so that the wiring 112A and the wiring 111 are kept in a non-conduction state.

In addition, a state is kept in which the circuit 300A supplies an H signal or the voltage V2 to the node A2. Thus, the potential of the node A2 is kept at an H level. Then, the transistor 202A is kept on, so that the wiring 113A and the wiring 111 are kept in a conduction state. Consequently, a state is kept in which the voltage V1 is supplied to the wiring 111 through the transistor 202A.

In contrast, in the period d1, a state is kept in which the circuit 300B supplies an L signal or the voltage V1 to the node B1. Thus, the potential of the node B1 is kept at an L level. Then, the transistor 201B is kept off, so that the wiring 112B and the wiring 111 are kept in a non-conduction state.

In addition, a state is kept in which the circuit 300B supplies an L signal or the voltage V1 to the node B2. Thus, the potential of the node B2 is kept at an L level. Then, the transistor 202B is kept off, so that the wiring 113B and the wiring 111 are kept in a non-conduction state.

Figure 20A:
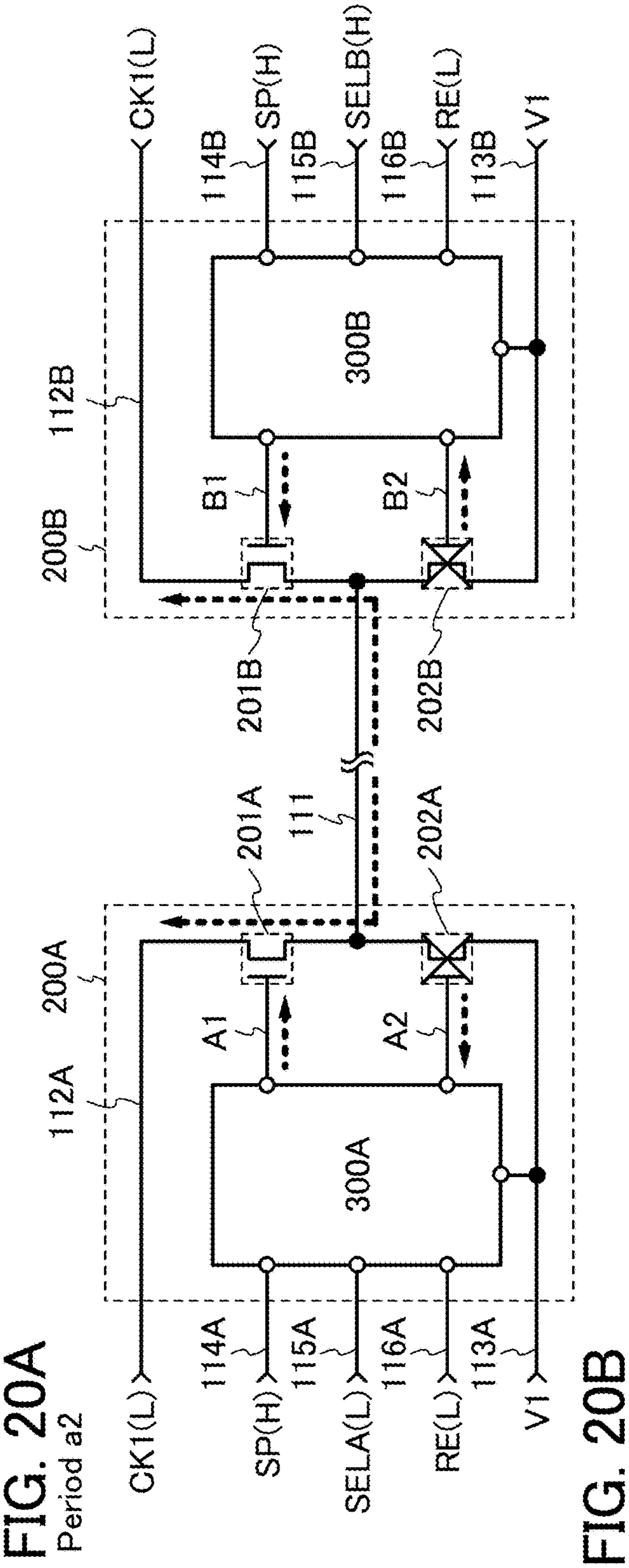
FIGS. 20A and 20B each illustrate an operation example of a semiconductor device.

Next, the operation of the semiconductor device in a period a2 is similar to the operation of the semiconductor device in the period a1, as illustrated in FIG. 20A. Note that the operation of the semiconductor device in the period a2 differs from the operation of the semiconductor device in the period a1 in that the signal SELA is set at an L level and that the signal SELB is set at an H level.

Figure 20B:
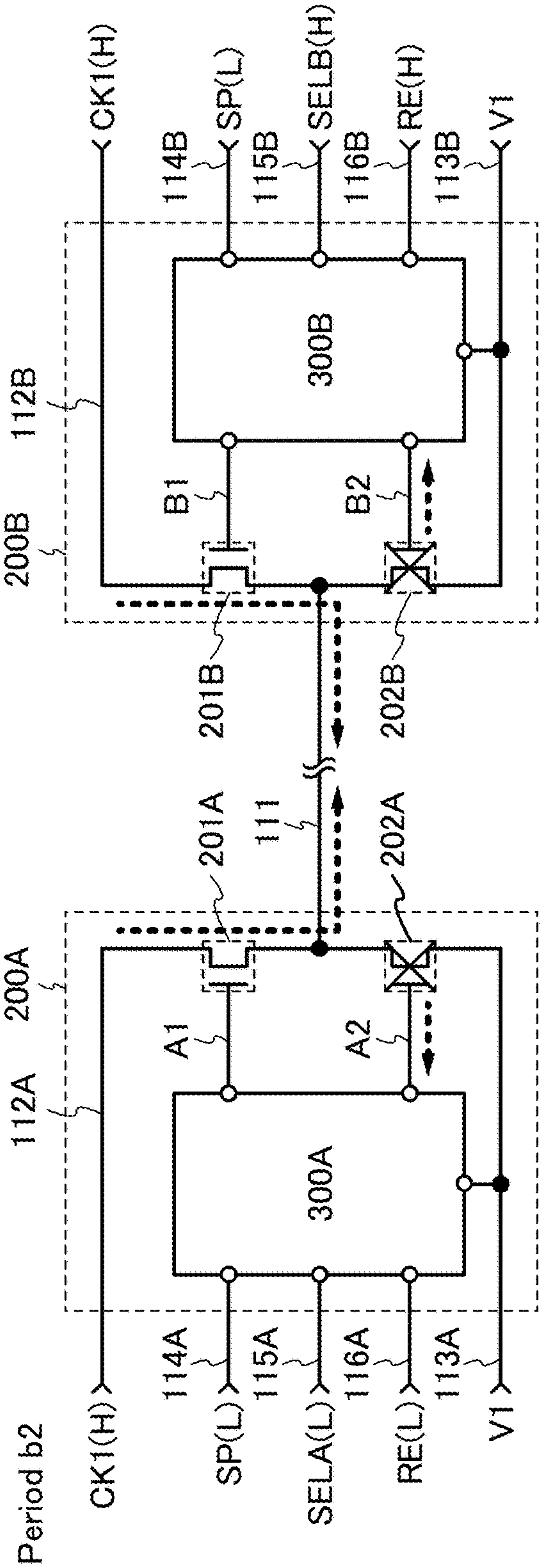

Next, the operation of the semiconductor device in a period b2 is similar to the operation of the semiconductor device in the period b1, as illustrated in FIG. 20B. Note that the operation of the semiconductor device in the period b2 differs from the operation of the semiconductor device in the period b1 in that the signal SELA is set at an L level and that the signal SELB is set at an H level.

Next, the operation of the semiconductor device in a period c2 is described with reference to FIG. 21A. The operation of the semiconductor device in the period c2 differs from the operation of the semiconductor device in the period c1 in that the signal SELA is set at an L level and that the signal SELB is set at an H level.

Since the signal SELA is set at an L level, the circuit 300A supplies an L signal or the voltage V1 to the node A2. Thus, the transistor 202A is turned off, so that the wiring 113A and the wiring 111 are brought out of conduction.

In contrast, since the signal SELB is set at an H level, the circuit 300B supplies an H signal or the voltage V2 to the node B2. Thus, the transistor 202B is turned on, so that the wiring 113B and the wiring 111 are brought into conduction. Then, the voltage V1 is supplied to the wiring 111 through the transistor 202B.

Note that in the period c2, the timing of when the clock signal CK1 is set at an L level might be earlier than the timing of when the transistor 201A is turned off. Thus, until the transistor 201A is turned off, it is preferable that the clock signal CK1 which is at an L level be supplied to the wiring 111 through the transistor 201A. When the channel width of the transistor 201A is increased, the fall time of the signal OUTA can be shortened.

Note that in the period c2, the timing of when the clock signal CK1 is set at an L level might be earlier than the timing of when the transistor 201B is turned off. Thus, until the transistor 201B is turned off, it is preferable that the clock signal CK1 which is at an L level be supplied to the wiring 111 through the transistor 201B. When the channel width of the transistor 201B is increased, the fall time of the signal OUTB can be shortened.

In the period c2, as for the wiring 111, there are the following three cases: the case where the voltage V1 is supplied to the wiring 111 through the transistor 202B; the case where the clock signal CK1 which is at an L level is supplied to the wiring 111 through the transistor 201B; and the case where the voltage V1 is supplied to the wiring 111 through the transistor 202B and the clock signal CK1 which is at an L level is supplied to the wiring 111 through the transistor 201B.

Next, the operation of the semiconductor device in the period d2 is described with reference to FIG. 21B. The operation of the semiconductor device in the period d2 differs from the operation of the semiconductor device in the period d1 in that the signal SELA is set at an L level and that the signal SELB is set at an H level.

Since the signal SELA is set at an L level, the circuit 300A supplies an L signal or the voltage V1 to the node A2. Thus, the transistor 202A is turned off, so that the wiring 113A and the wiring 111 are brought out of conduction.

In contrast, since the signal SELB is set at an H level, the circuit 300B supplies an H signal or the voltage V2 to the node B2. Thus, the transistor 202B is turned on, so that the wiring 113B and the wiring 111 are brought into conduction. Then, the voltage V1 is supplied to the wiring 111 through the transistor 202B.

The transistor 202A and the transistor 202B are alternately turned on as described above, so that deterioration in characteristics of the transistors can be suppressed. Thus, a material which easily deteriorates, such as a non-single-crystal semiconductor (e.g., an amorphous semiconductor or a microcrystalline semiconductor), an organic semiconductor, or an oxide semiconductor, can be used as a semiconductor layer of the transistor. Accordingly, when a semiconductor device is manufactured, the number of steps can be reduced, yield can be increased, or cost can be reduced. In addition, in the case where the semiconductor device in this embodiment is used for a display device, a method for manufacturing a semiconductor device is facilitated, so that the size of the display device can be increased.

Since deterioration of the transistors can be suppressed, it is not necessary to increase the channel width of the transistor in consideration of deterioration of the transistor. Thus, the channel width of the transistor can be decreased, so that the layout area can be decreased. In particular, in the case where the semiconductor device in this embodiment is used for a display device, the layout area of the gate driver circuit can be decreased; thus, the resolution of a pixel can be increased. Further, since the channel width of the transistor can be decreased, the load of the gate driver circuit can be decreased. Thus, the power consumption of a driver circuit including the gate driver circuit can be reduced.

In the period b1 and the period b2, the clock signal CK1 which is at an H level is supplied to the wiring 111 through the transistor 201A and the transistor 201B; thus, the rise time or fall time of the signal supplied to the wiring 111 can be shortened. Thus, a video signal for a pixel in a different row can be prevented from being written to a pixel in a selected row. Accordingly, crosstalk can be reduced. Thus, the display quality of the display device can be improved.

Since the rise time or fall time of the signal supplied to the wiring 111 can be shortened, in the case where a scan signal corresponds to a start signal or the like, the drive frequency of the gate driver circuit can be increased. Thus, in the case where the semiconductor device in this embodiment is used for the display device, the size of the display device can be increased or the resolution of the pixel can be increased.

Note that the waveforms of the signal OUTA and the signal OUTB in the period T1 correspond to the timing chart in FIG. 6K. As the waveforms of the signal OUTA and the signal OUTB in the period T1, the waveforms in FIGS. 6A to 6L can be used.

Note that the waveforms of the signal OUTA and the signal OUTB in the period T2 correspond to the timing chart in FIG. 7K. As the waveforms of the signal OUTA and the signal OUTB in the period T2, the waveforms in FIGS. 7A to 7L can be used.

Note that the clock signal CK1 can be an unbalanced signal. FIG. 22 is a timing chart illustrating an operation example of the semiconductor device at the time when the length of a period during which the clock signal CK1 is at an H level is shorter than the length of a period during which the clock signal CK1 is at an L level in one cycle. In the timing chart in FIG. 22, the fall time of the signal OUTA and the fall time of the signal OUTB can be shortened because the clock signal CK1 which is at an L level can be supplied to the wiring 111 in the period c1 or the period c2. In particular, in the case where the wiring 111 is formed so as to extend to the pixel portion, a video signal that should not be originally written can be prevented from being written to a pixel. Alternatively, the length of the period during which the clock signal CK1 is at an H level may be longer than the length of the period during which the clock signal CK1 is at an L level in one cycle.

Note that in the semiconductor device, a multi-phase clock signal can be used. For example, an n-phase (n is a natural number) clock signal can be used in the semiconductor device. The n-phase clock signal is n clock signals whose cycles are shifted by 1/n cycle. FIG. 23 is a timing chart illustrating an operation example of the semiconductor device at the time when a three-phase clock signal is used in the semiconductor device.

Note that the larger n becomes, the lower clock frequency becomes. Thus, power consumption can be reduced. However, when n is too large, the number of signals is increased; thus, the layout area is increased or the size of an external circuit is increased. Accordingly, n is smaller than 8, preferably smaller than 6, more preferably 4 or 3.

Note that in the period c1, the period d1, the period c2, or the period d2, the transistor 202A and the transistor 202B can be turned on at the same time. Thus, when the voltage V1 is supplied to the wiring 111 through the transistor 202A and the transistor 202B, noise in the wiring 111 can be reduced. Accordingly, a semiconductor device which is hardly affected by noise can be obtained.

Note that in the period a1, the period b1, the period a2, or the period b2, one of the transistor 201A and the transistor 201B can be turned on. For example, in the period a1 and the period b1, the transistor 201A can be turned on and the transistor 201B can be turned off. Alternatively, in the period a2 and the period b2, the transistor 201A can be turned off and the transistor 201B can be turned on. Thus, the frequency of turning on the transistor 201A and the frequency of turning on the transistor 2011B are decreased. Accordingly, deterioration of the transistors can be suppressed.

In order to perform such a driving method, for example, it is preferable that a signal input to the wiring 114B be kept at an L level in the period T1 and a signal input to the wiring 114A be kept at an L level in the period T2. As another example, it is preferable that a circuit that has a function of keeping the potential of the node A1 at an L level in accordance with the signal SELA in the period T1 be provided in the circuit 200A and a circuit that has a function of keeping the potential of the node B1 at an L level in accordance with the signal SELB in the period T2 be provided in the circuit 200B.

<Size of Transistor>

Next, the size of a transistor, such as the channel width of a transistor or the channel length of a transistor, is described. Note that the channel width of a transistor can also be referred to as the W/L (W is the channel width and L is the channel length) ratio of a transistor.

It is preferable that the channel width of the transistor 201A be substantially equal to the channel width of the transistor 201B. Alternatively, it is preferable that the channel width of the transistor 202A be substantially equal to the channel width of the transistor 202B.

By making the transistors have substantially the same channel width in this manner, the transistors can have substantially the same current supply capability or substantially the same degree of deterioration. Accordingly, even when transistors which are selected are switched, the waveforms of output signals OUT can be substantially the same.

From a similar reason, it is preferable that the channel length of the transistor 201A be substantially equal to the channel length of the transistor 201B. Alternatively, it is preferable that the channel length of the transistor 202A be substantially equal to the channel length of the transistor 202B.

Note that in the case where the load of a gate signal line connected to the transistor 201A or the transistor 201B is driven is heavy, it is preferable that the channel width of the transistor 201A be larger than those of the other transistors included in the circuit 200A in the circuit 200A or the channel width of the transistor 201B be larger than those of the other transistors included in the circuit 200B in the circuit 200B.

Note that in the case where the load of a gate signal line through which the transistor 201A or the transistor 201B is driven is heavy, it is preferable that the channel width of the transistor 201A or the transistor 201B be made large. Specifically, each of the channel width of the transistor 201A and the channel width of the transistor 201B is preferably 1000 to 30000 μm, more preferably 2000 to 20000 μm, still more preferably 3000 to 8000 μm or 10000 to 18000 μm.

<Structure of Semiconductor Device>

Next, examples of circuit diagrams of a semiconductor device in this embodiment that is different from the structure example of the semiconductor device in FIG. 16A are described with reference to FIG. 16B, FIGS. 24A and 24B, and FIGS. 25A and 25B.

FIG. 16B, FIGS. 24A and 24B, and FIGS. 25A and 25B each illustrate an example of a circuit diagram of the semiconductor device.

Figure 16B:
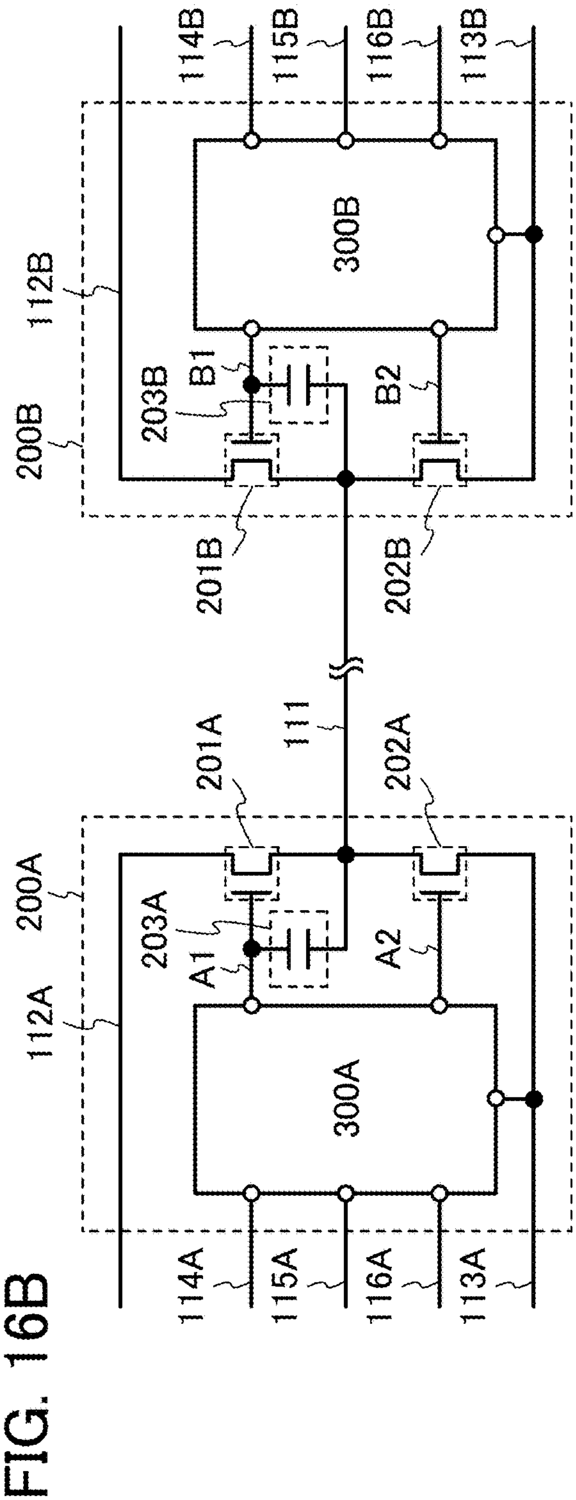

The semiconductor device illustrated in FIG. 16B has a structure where a capacitor 203A is connected between the gate of the transistor 201A and the second terminal of the transistor 201A included in the semiconductor device illustrated in FIG. 16A. Alternatively, the semiconductor device illustrated in FIG. 16B has a structure where a capacitor 203B is connected between the gate of the transistor 201B and the second terminal of the transistor 201B included in the semiconductor device illustrated in FIG. 16A.

With such a structure, the potential of the node A1 or the potential of the node B1 is likely to rise in bootstrap operation. Thus, a potential difference Vgs between the gate and the source of the transistor 201A can made larger than a potential difference Vgs between the gate and the source of the transistor 201B. Accordingly, the channel width of the transistor 201A or the transistor 201B can be made small. Alternatively, the fall time or rise time of the signal OUTA or the signal OUTB can be shortened.

A MOS capacitor can be used as each of the capacitor 203A and the capacitor 203B, for example. Note that the material of one electrode of each of the capacitor 203A and the capacitor 203B is preferably a material which is similar to the material of each of the gates of the transistor 201A and the transistor 201B. Alternatively, the material of the other electrode of each of the capacitor 203A and the capacitor 203B is preferably a material which is similar to the material of each of the sources or drains of the transistor 201A and the transistor 201B. With such a material, the layout area can be decreased or the capacitance value can be increased.

Note that it is preferable that the capacitance value of the capacitor 203A and the capacitance value of the capacitor 203B be substantially equal. Alternatively, it is preferable that an area where one electrode and the other electrode overlap with each other in the capacitor 203A and an area where one electrode and the other electrode overlap with each other in the capacitor 203B be substantially equal. With such a structure, between the case where a signal is input from the circuit 200A to the wiring 111 and the case where a signal is input from the circuit 200B to the wiring 111, the wavelengths of the signals input to the wiring 111 can be substantially equal.

Figure 24A:
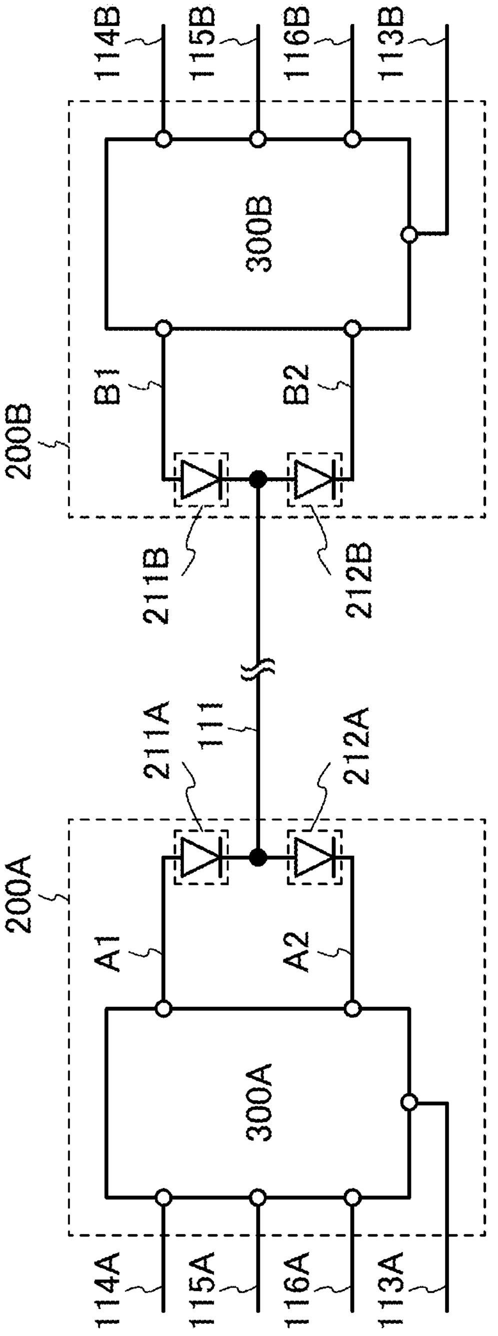
FIGS. 24A and 24B each illustrate an example of a circuit diagram of a semiconductor device.

In addition, in the semiconductor devices illustrated in FIGS. 16A and 16B, as illustrated in FIG. 24A, the transistor 201A may be replaced with a diode 211A. One electrode (e.g., a positive electrode) of the diode 211A is connected to the node A1, and the other electrode (e.g., a negative electrode) of the diode 211A is connected to the wiring 111. Alternatively, the transistor 202A may be replaced with a diode 212A. One electrode (e.g., a positive electrode) of the diode 212A is connected to the wiring 111, and the other electrode (e.g., a negative electrode) of the diode 212A is connected to the node A2.

Further, the transistor 201B may be replaced with a diode 211B. One electrode (e.g., a positive electrode) of the diode 211B is connected to the node B1, and the other electrode (e.g., a negative electrode) of the diode 211B is connected to the wiring 111. Alternatively, the transistor 202B may be replaced with a diode 212B. One electrode (e.g., a positive electrode) of the diode 212B is connected to the wiring 111, and the other electrode (e.g., a negative electrode) of the diode 212B is connected to the node B2.

Figure 24B:
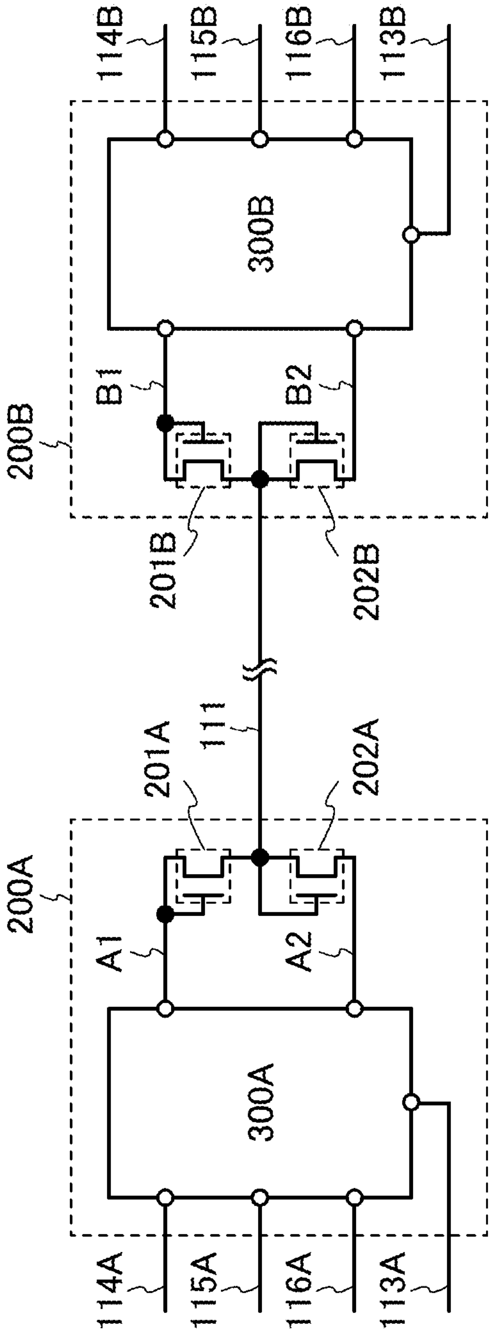

In the semiconductor devices illustrated in FIGS. 16A and 16B, as illustrated in FIG. 24B, the first terminal of the transistor 201A may be connected to the node A1. In addition, the first terminal of the transistor 202A may be connected to the node A2 and the gate of the transistor 202A may be connected to the wiring 111.

The first terminal of the transistor 201B may be connected to the node B1. In addition, the first terminal of the transistor 202B may be connected to the node B2 and the gate of the transistor 202B may be connected to the wiring 111.

Next, examples of a semiconductor device which generates a transfer signal in addition to the signal OUTA or generates a transfer signal in addition to the signal OUTB are described with reference to FIGS. 25A and 25B.

In the case where the semiconductor device includes a plurality of circuits (including the circuit 200A and the circuit 200B), when a transfer signal is not input to the wiring 111 but is input as a start signal to a circuit in the next stage, delay or distortion of the transfer signal can be further reduced as compared to the signal OUTA or the signal OUTB. Thus, the semiconductor device can be driven by a signal whose delay or distortion is reduced, so that delay of an output signal of the semiconductor device can be reduced. Alternatively, the timing of storing electricity in the node A1 or the node B1 can be made earlier, so that the operation range can be made wider. In addition, a transfer signal may be output to the wiring 111.

Figure 25A:
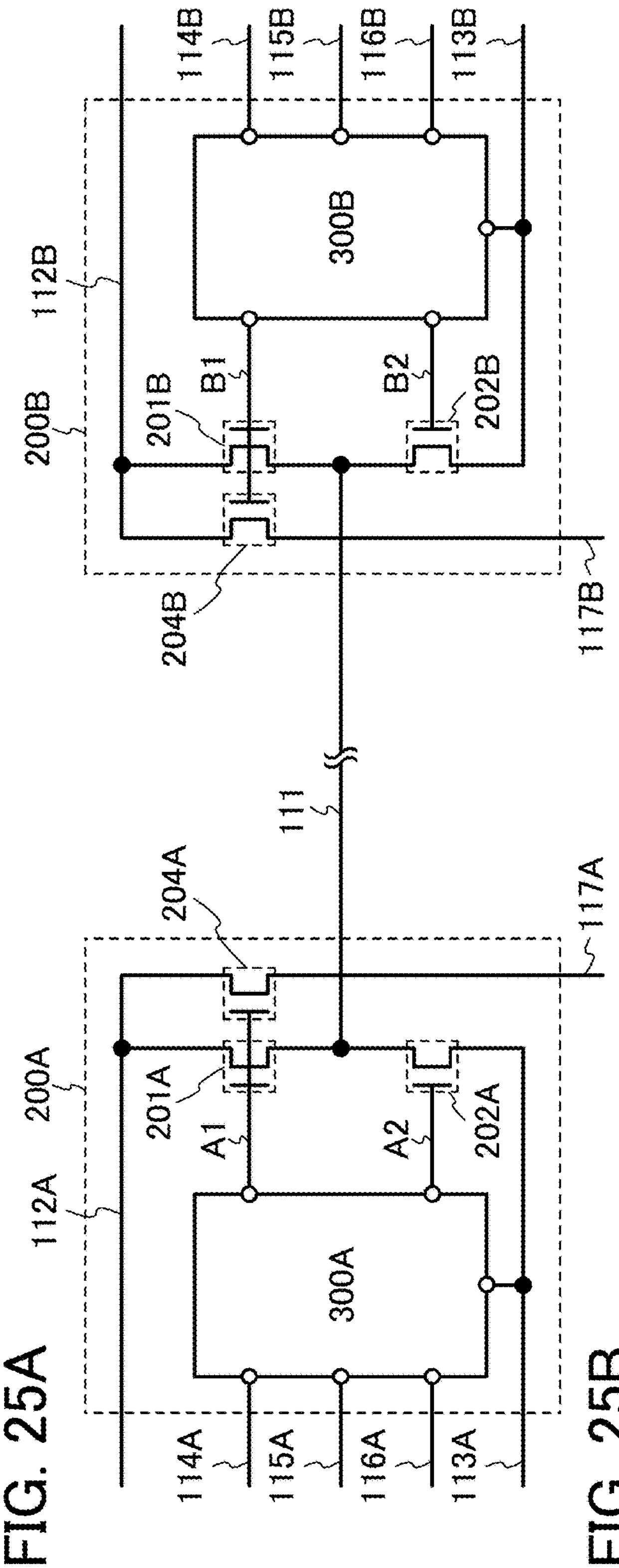
FIGS. 25A and 25B each illustrate an example of a circuit diagram of a semiconductor device.

Thus, in the semiconductor devices illustrated in FIGS. 16A and 16B and FIGS. 24A and 24B, as illustrated in FIG. 25A, the circuit 200A may include a transistor 204A. A first terminal of the transistor 204A is connected to the wiring 112A; a second terminal of the transistor 204A is connected to a wiring 117A; a gate of the transistor 204A is connected to the node A1. In addition, the circuit 200B may include a transistor 204B. A first terminal of the transistor 204B is connected to the wiring 112B; a second terminal of the transistor 204B is connected to a wiring 117B; a gate of the transistor 204B is connected to the node B1.

Figure 25B:
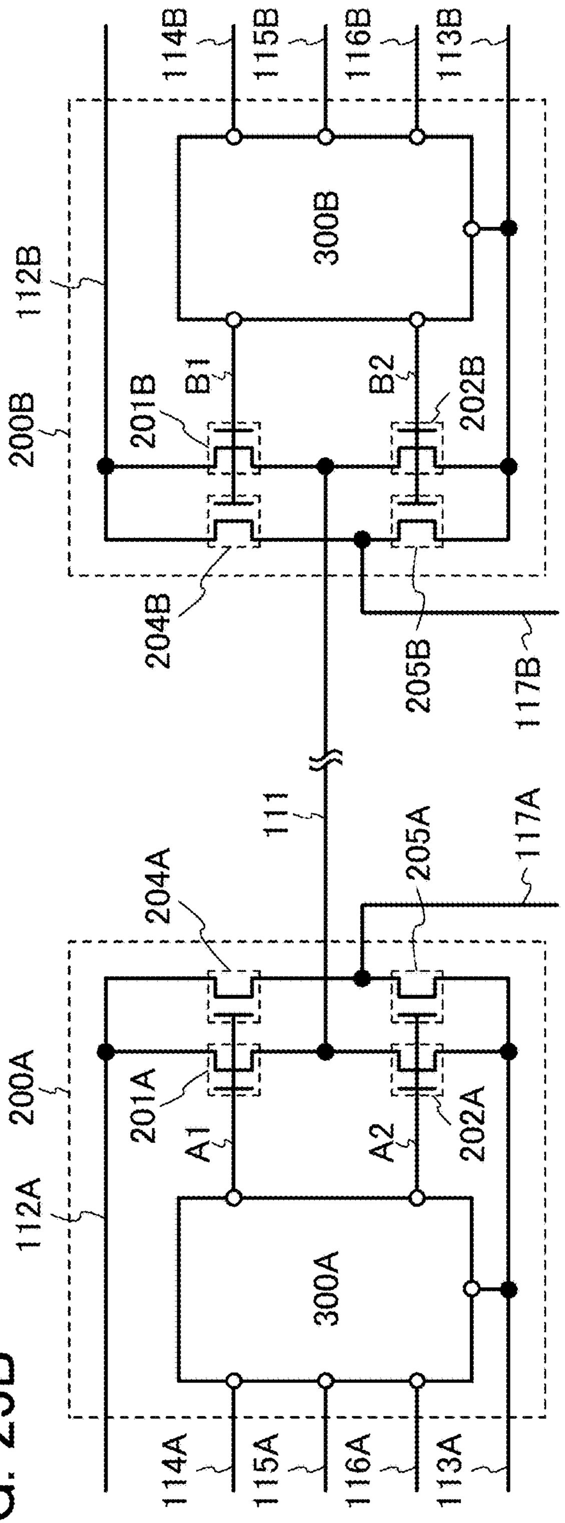

Alternatively, in the semiconductor devices illustrated in FIGS. 16A and 16B and FIGS. 24A and 24B, as illustrated in FIG. 25B, the circuit 200A may include a transistor 205A. A first terminal of the transistor 205A is connected to the wiring 113A; a second terminal of the transistor 205A is connected to the wiring 117A; a gate of the transistor 205A is connected to the node A2. In addition, the circuit 200B may include a transistor 205B. A first terminal of the transistor 205B is connected to the wiring 113B; a second terminal of the transistor 205B is connected to the wiring 117B; a gate of the transistor 205B is connected to the node B2.

Note that the transistor 204A preferably has a function that is similar to the function of the transistor 201A and the same polarity as the transistor 201A. The transistor 205A preferably has a function that is similar to the function of the transistor 202A and the same polarity as the transistor 202A. The transistor 204B preferably has a function that is similar to the function of the transistor 201B and the same polarity as the transistor 201B. The transistor 205B preferably has a function that is similar to the function of the transistor 202B and the same polarity as the transistor 202B. Note that the transistor 204A, the transistor 204B, the transistor 205A, and the transistor 205B may be either n-channel transistors or p-channel transistors.

Note that in the case where the plurality of circuits included in the semiconductor device are connected to each other, the wiring 117A may be connected to the wiring 114A in the semiconductor device in a different stage (e.g., the next stage). In addition, the wiring 117B may be connected to the wiring 114B in the semiconductor device in a different stage (e.g., the next stage). With such a structure, the wiring 117A and the wiring 117B function as signal lines.

Note that in the case where the plurality of circuits included in the semiconductor device are connected to each other, the wiring 117A may be connected to the wiring 116A in the semiconductor device in a different stage (e.g., the preceding stage). In addition, the wiring 117B may be connected to the wiring 116B in the semiconductor device in a different stage (e.g., the preceding stage). Further, the wiring 117A may extend to the pixel portion. Furthermore, the wiring 117B may extend to the pixel portion. With such a structure, the wiring 117A and the wiring 117B function as gate signal lines or scan lines.

<Structure of Semiconductor Device>

Next, an example of a circuit diagram of a semiconductor device in this embodiment that is different from the structure examples of the semiconductor device in FIGS. 16A and 16B, FIGS. 24A and 24B, and FIGS. 25A and 25B is described with reference to FIG. 26.

Figure 26:
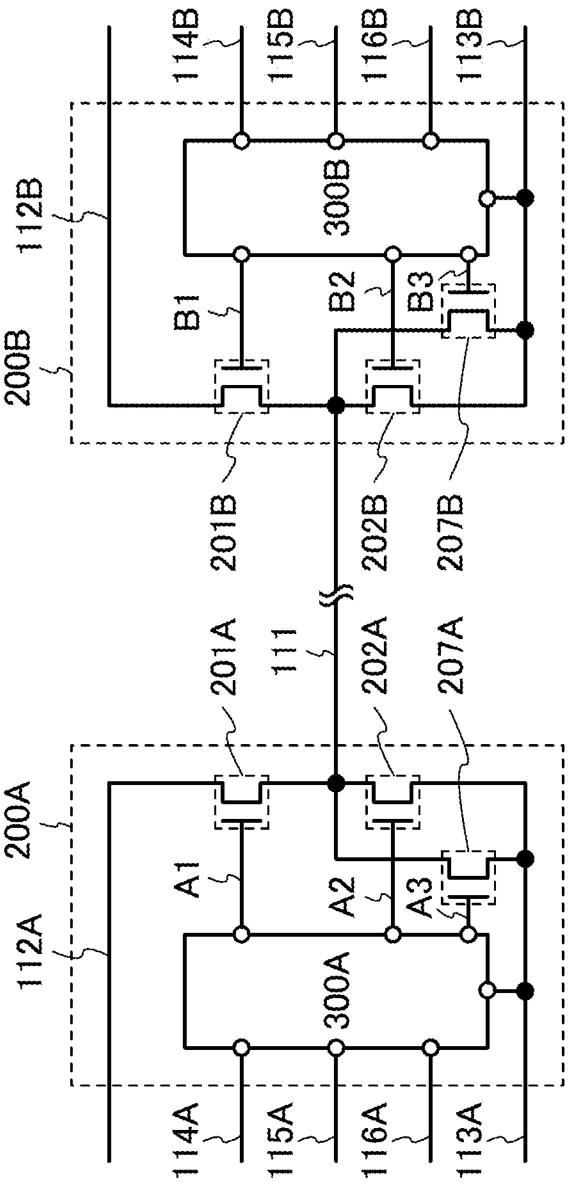
FIG. 26 illustrates an example of a circuit diagram of a semiconductor device.

The semiconductor device illustrated in FIG. 26 has a structure where a transistor 207A and a transistor 207B are provided in the semiconductor device illustrated in FIG. 16A.

A first terminal of the transistor 207A is connected to the wiring 113A. A second terminal of the transistor 207A is connected to the wiring 111. A gate of the transistor 207A is connected to the circuit 300A. A first terminal of the transistor 207B is connected to the wiring 113B. A second terminal of the transistor 207B is connected to the wiring 111. A gate of the transistor 207B is connected to the circuit 300B.

Note that a portion where the gate of the transistor 207A and the circuit 300A are connected to each other is referred to as a node A3, and a portion where the gate of the transistor 207B and the circuit 300B are connected to each other is referred to as a node B3.

Note that the transistor 207A preferably has a function that is similar to the function of the transistor 202A. The transistor 207B preferably has a function that is similar to the function of the transistor 202B.

<Operation of Semiconductor Device>

An operation example of the semiconductor device in FIG. 26 is described with reference to a timing chart illustrated in FIG. 27. FIGS. 28A and 28B and FIGS. 29A and 29B each illustrate an operation example of the semiconductor device in FIG. 26.

Figure 28A:
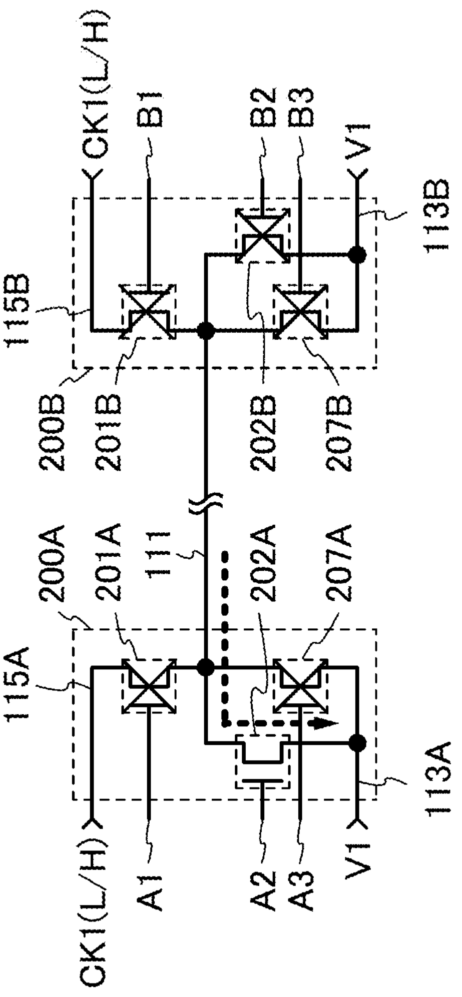
FIGS. 28A and 28B each illustrate an operation example of a semiconductor device.
Figure 28B:
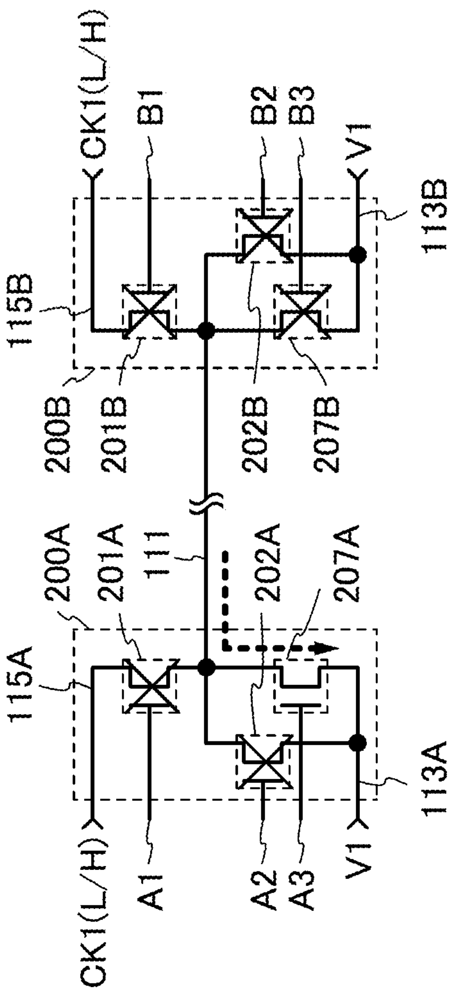

The transistor 202A and the transistor 207A are alternately turned on every other gate selection period or every other half cycle of the clock signal CK1 in the period T1. For example, in a period during which the clock signal CK1 is at an H level in the period d1, as illustrated in FIG. 28A, the transistor 202A is turned on and the transistor 207A is turned off. In contrast, in a period during which the clock signal CK1 is at an L level in the period d1, as illustrated in FIG. 28B, the transistor 202A is turned off and the transistor 207A is turned on.

Figure 29A:
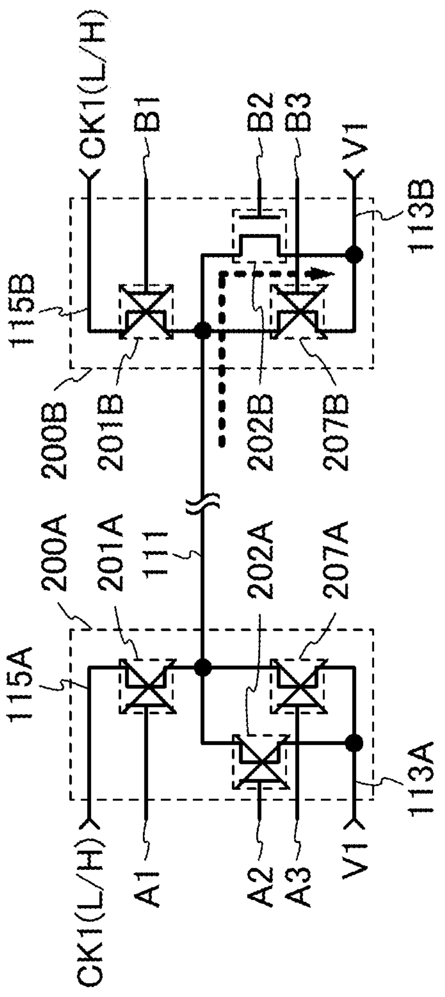
FIGS. 29A and 29B each illustrate an operation example of a semiconductor device.
Figure 29B:
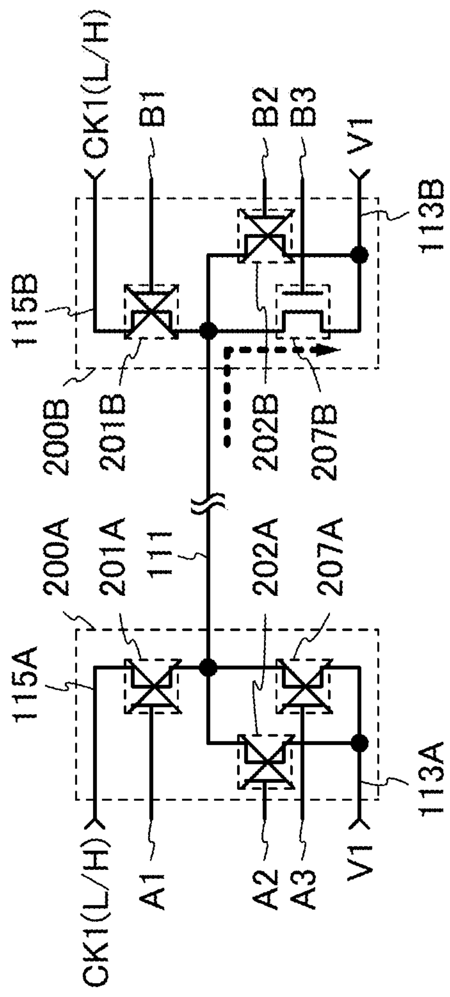

The transistor 202B and the transistor 207B are alternately turned on every other gate selection period or every other half cycle of the clock signal CK1 in the period T2. For example, in a period during which the clock signal CK1 is at an H level in the period d2, as illustrated in FIG. 29A, the transistor 202B is turned on and the transistor 207B is turned off. In contrast, in a period during which the clock signal CK1 is at an L level in the period d2, as illustrated in FIG. 29B, the transistor 202B is turned off and the transistor 207B is turned on.

In this manner, the transistor 202A and the transistor 207A are alternately turned on in the period T1 and the transistor 202B and the transistor 207B are alternately turned on in the period T2. Accordingly, periods during which the transistors are on can be shortened; thus, deterioration of the transistors can be suppressed.

A wiring to which the clock signal CK2 (e.g., an inversion signal of the clock signal CK1) is input may be connected to one of the node A2 and the node A3. In addition, a wiring to which the clock signal CK2 is input may be connected to one of the node B2 and the node B3.

Alternatively, the transistor 202A, the transistor 207A, the transistor 202B, and the transistor 207B may be turned on in the same period (e.g., the period b1 or the period b2). Alternatively, two or more of the transistor 202A, the transistor 207A, the transistor 202B, and the transistor 207B may be turned on in the same period (e.g., the period a1 or the period a2).

The order of turning on the transistor 202A and the transistor 207A may be set to a given order. In addition, the order of turning on the transistor 202B and the transistor 207B may be set to a given order.

Figure 27:
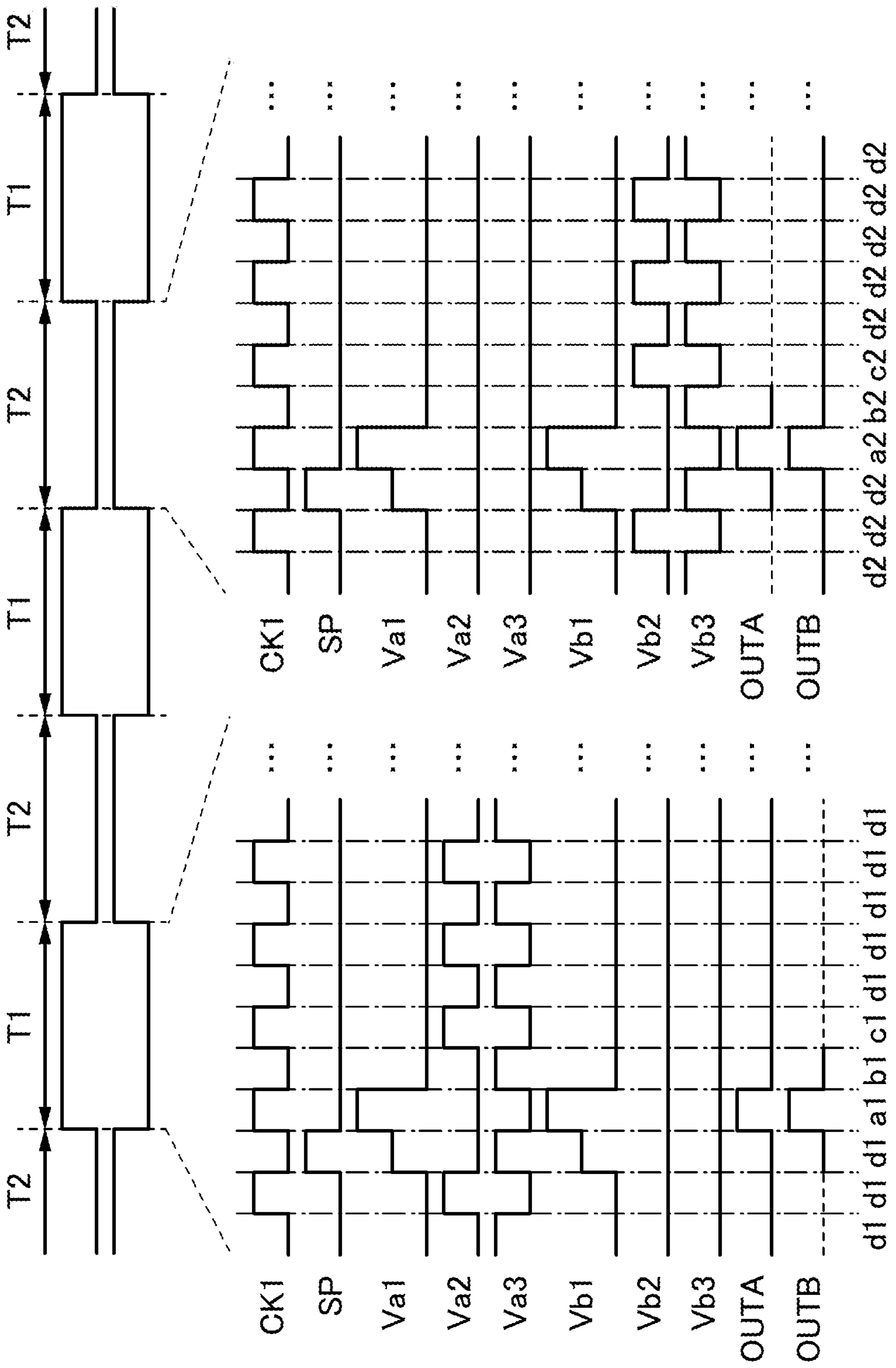
FIG. 27 is a timing chart illustrating an operation example of a semiconductor device.

Next, a timing chart illustrating an operation example of the semiconductor device in FIG. 26 that is different from the operation example in FIG. 27 is described with reference to FIG. 30.

The transistor 202A, the transistor 207A, the transistor 202B, and the transistor 207B may be sequentially turned on in frame periods. In FIG. 30, in the period T1, a period during which the transistor 202A is on is referred to as a period T1*a*, and a period during which the transistor 207A is on is referred to as a period T1*b*. In addition, in the period T2, a period during which the transistor 202B is on is referred to as a period T2*a*, and a period during which the transistor 207B is on is referred to as a period T2*b*.

Figure 30:
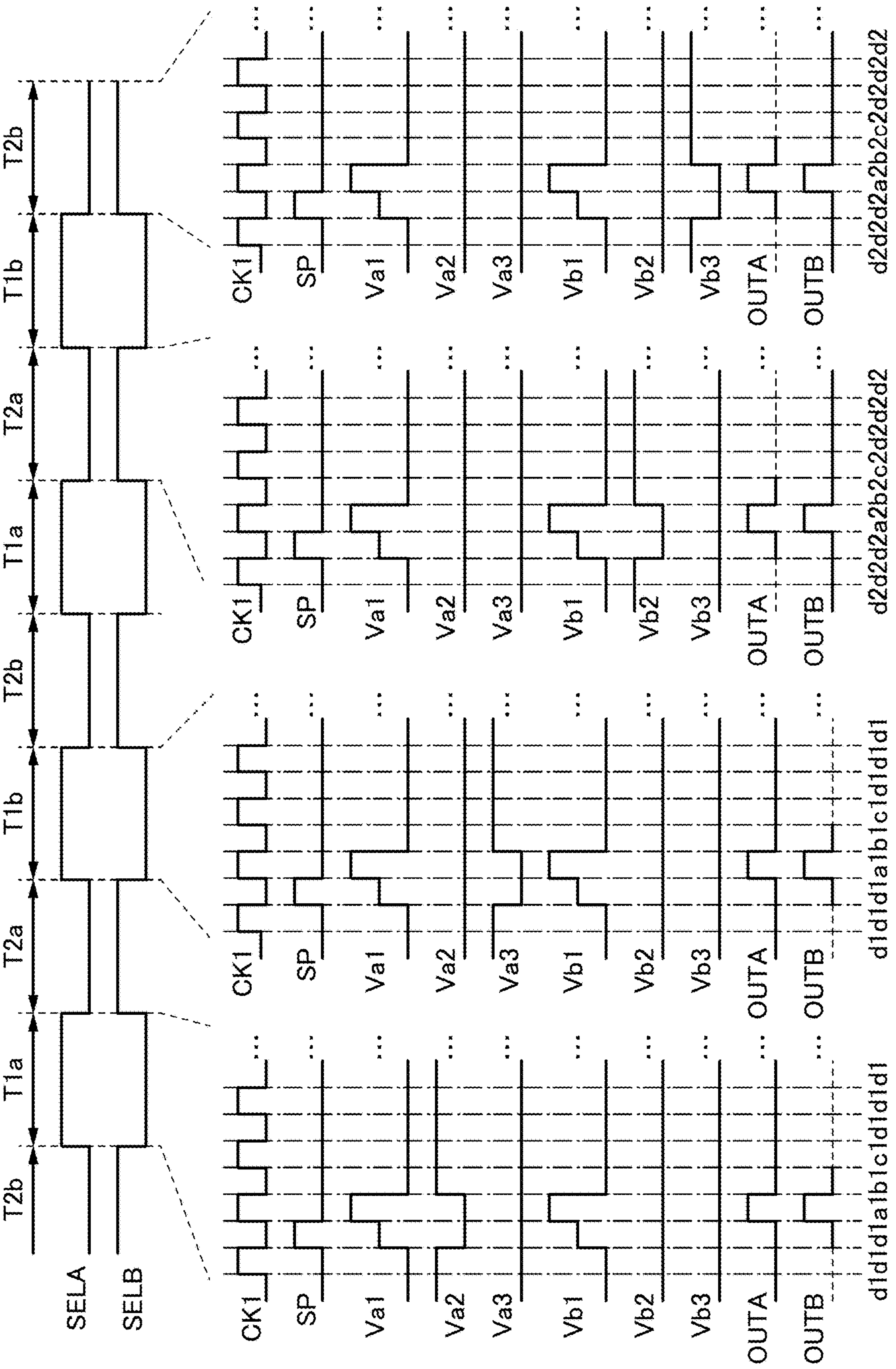
FIG. 30 is a timing chart illustrating an operation example of a semiconductor device.

Note that although the timing chart in FIG. 30 illustrate the case where the period T1*a*, the period T2*a*, the period T1*b*, and the period T2*b* are provided in that order, the order of these periods may be set to a given order. For example, the period T1*a*, the period T1*b*, the period T2*a*, and the period T2*b* may be provided in that order; a plurality of each of these periods may be provided; or these periods may be provided in a random manner.

In the period d1 in the period T1*a*, the potential of the node A2 is set at an H level, and the potential of the node A3 (the potential of the node A3 is also referred to as a potential Va3), the potential of the node B2, and the potential of the node B3 (the potential of the node B3 is also referred to as a potential Vb3) are set at an L level. Thus, as illustrated in FIG. 28A, the transistor 202A is turned on and the transistor 207A, the transistor 202B, and the transistor 207B are turned off.

In the period d1 in the period T1*b*, the potential of the node A3 is set at an H level, and the potential of the node A2, the potential of the node B2, and the potential of the node B3 are set at an L level. Thus, as illustrated in FIG. 28B, the transistor 207A is turned on and the transistor 202A, the transistor 202B, and the transistor 207B are turned off.

In the period d2 in the period T2*a*, the potential of the node B2 is set at an H level, and the potential of the node A2, the potential of the node A3, and the potential of the node B3 are set at an L level. Thus, as illustrated in FIG. 29A, the transistor 202B is turned on and the transistor 202A, the transistor 207A, and the transistor 207B are turned off.

In the period d2 in the period T2*b*, the potential of the node B3 is set at an H level, and the potential of the node A2, the potential of the node A3, and the potential of the node B2 are set at an L level. Thus, as illustrated in FIG. 29B, the transistor 207B is turned on and the transistor 202A, the transistor 207A, and the transistor 202B are turned off.

When the semiconductor device illustrated in FIG. 26 performs the above operation, a period during which the transistor is on can be shortened. Alternatively, the frequency of a signal for controlling on and off of the transistor can be lowered, so that power consumption can be reduced.

A plurality of transistors may be provided. A first terminal of each of the plurality of transistors is connected to the wiring 113A, and a second terminal of each of the plurality of transistors is connected to the wiring 111. The plurality of transistors have a function that is similar to the function of the transistor 202A or the transistor 207A. The plurality of transistors may be sequentially turned on in gate selection periods or in frame periods, for example.

In addition, a plurality of transistors may be provided. A first terminal of each of the plurality of transistors is connected to the wiring 113B, and a second terminal of each of the plurality of transistors is connected to the wiring 111. The plurality of transistors have a function that is similar to the function of the transistor 202B or the transistor 207B. The plurality of transistors may be sequentially turned on in gate selection periods or in frame periods, for example.

With provision of such a plurality of transistors, periods during which the transistors are on can be shortened; thus, deterioration of the transistors can be suppressed.

Embodiment 5

In this embodiment, a semiconductor device including the gate driver circuit described in any of the above embodiments is described.

<Structure of Semiconductor Device>

Figure 31A:
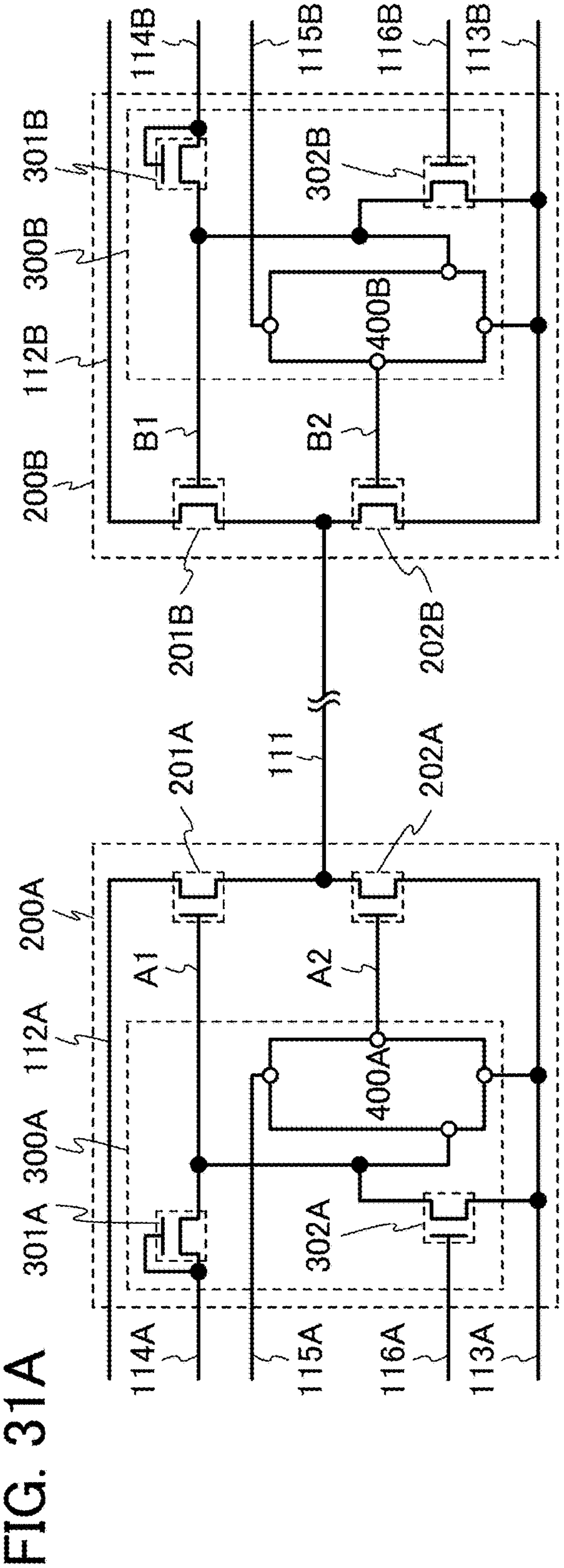
FIGS. 31A and 31B each illustrate an example of a circuit diagram of a semiconductor device.
Figure 31B:
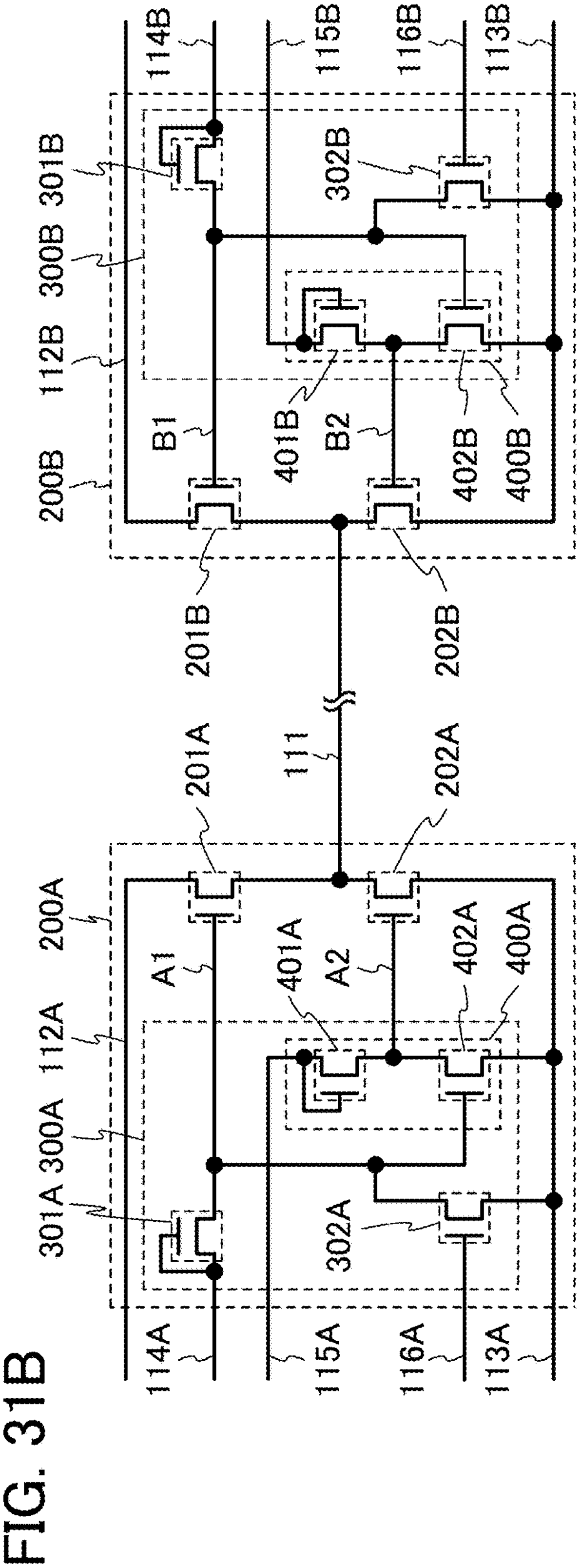

The structure of a semiconductor device in this embodiment is described with reference to FIGS. 31A and 31B. FIGS. 31A and 31B each illustrate an example of a circuit diagram of the semiconductor device.

In FIG. 31A, the circuit 300A includes a transistor 301A, a transistor 302A, and a circuit 400A. The circuit 300B includes a transistor 301B, a transistor 302B, and a circuit 400B.

Structure examples of the transistor 301A, the transistor 302A, the circuit 400A, the transistor 301B, the transistor 302B, and the circuit 400B are described with reference to FIG. 31A. Here, the transistor 301A, the transistor 302A, the transistor 301B, and the transistor 302B are described as n-channel transistors. Note that these transistors may be p-channel transistors.

A first terminal of the transistor 301A is connected to the wiring 114A. A second terminal of the transistor 301A is connected to the node A1. A gate of the transistor 301A is connected to the wiring 114A. A first terminal of the transistor 302A is connected to the wiring 113A. A second terminal of the transistor 302A is connected to the node A1. A gate of the transistor 302A is connected to the wiring 116A. The circuit 400A is connected to the wiring 115A, the node A1, the wiring 113A, and the node A2.

A first terminal of the transistor 301B is connected to the wiring 114B. A second terminal of the transistor 301B is connected to the node B1. A gate of the transistor 301B is connected to the wiring 114B. A first terminal of the transistor 302B is connected to the wiring 113B. A second terminal of the transistor 302B is connected to the node B1. A gate of the transistor 302B is connected to the wiring 116B. The circuit 400B is connected to the wiring 115B, the node B1, the wiring 113B, and the node B2.

Next, examples of the functions of the transistor 301A, the transistor 302A, the circuit 400A, the transistor 301B, the transistor 302B, and the circuit 400B are described.

The transistor 301A has a function of controlling the timing of bringing the wiring 114A and the node A1 into conduction. Alternatively, the transistor 301A has a function of controlling the timing of supplying the potential of the wiring 114A to the node A1. Alternatively, the transistor 301A has a function of controlling the timing of supplying a signal, voltage, or the like (e.g., the start signal SP, the clock signal CK1, the clock signal CK2, the signal SELA, the signal SELB, or the voltage V2) which is to be input to the wiring 114A to the node A1. Alternatively, the transistor 301A has a function of controlling the timing of not supplying a signal, voltage, or the like to the node A1. Alternatively, the transistor 301A has a function of controlling the timing of supplying an H signal or the voltage 12 to the node A1. Alternatively, the transistor 301A has a function of controlling the timing of raising the potential of the node A1. Alternatively, the transistor 301A has a function of controlling the timing of setting the node A1 to be in a floating state.

As described above, the transistor 301A functions as a switch, a rectifier element, a diode, a diode-connected transistor, or the like. Note that the transistor 301A may be controlled in accordance with the start signal SP.

The transistor 302A has a function of controlling the timing of bringing the wiring 113A and the node A1 into conduction. Alternatively, the transistor 302A has a function of controlling the timing of supplying the potential of the wiring 113A to the node A1. Alternatively, the transistor 302A has a function of controlling the timing of supplying a signal, voltage, or the like (e.g., the clock signal CK2 or the voltage V1) which is to be input to the wiring 113A to the node A1. Alternatively, the transistor 302A has a function of controlling the timing of supplying the voltage V1 to the node A1. Alternatively, the transistor 302A has a function of controlling the timing of lowering the potential of the node A1. Alternatively, the transistor 302A has a function of controlling the timing of keeping the potential of the node A1.

As described above, the transistor 302A functions as a switch. Note that the transistor 302A may be controlled in accordance with the reset signal RE.

The circuit 400A has a function of controlling the potential of the node A2. Alternatively, the circuit 400A has a function of controlling the timing of supplying a signal, voltage, or the like to the node A2. Alternatively, the circuit 400A has a function of controlling the timing of not supplying a signal, voltage, or the like to the node A2. Alternatively, the circuit 400A has a function of controlling the timing of supplying an H signal or the voltage V2 to the node A2. Alternatively, the circuit 400A has a function of controlling the timing of supplying an L signal or the voltage V1 to the node A2. Alternatively, the circuit 400A has a function of controlling the timing of raising the potential of the node A2. Alternatively, the circuit 400A has a function of controlling the timing of lowering the potential of the node A2. Alternatively, the circuit 400A has a function of controlling the timing of keeping the potential of the node A2.

As described above, the circuit 400A functions as a control circuit. Note that the circuit 400A may be controlled in accordance with the signal SELA or the potential of the node A1.

The transistor 301B has a function of controlling the timing of bringing the wiring 114B and the node B1 into conduction. Alternatively, the transistor 301B has a function of controlling the timing of supplying the potential of the wiring 114B to the node B1. Alternatively, the transistor 301B has a function of controlling the timing of supplying a signal, voltage, or the like (e.g., the start signal SP, the clock signal CK1, the clock signal CK2, the signal SELA, the signal SELB, or the voltage V2) which is to be input to the wiring 114B to the node B1. Alternatively, the transistor 301B has a function of controlling the timing of not supplying a signal, voltage, or the like to the node B1. Alternatively, the transistor 301B has a function of controlling the timing of supplying an H signal or the voltage 12 to the node B1. Alternatively, the transistor 301B has a function of controlling the timing of raising the potential of the node B1. Alternatively, the transistor 301B has a function of controlling the timing of setting the node B1 to be in a floating state.

As described above, the transistor 301B functions as a switch, a rectifier element, a diode, a diode-connected transistor, or the like. Note that the transistor 301B may be controlled in accordance with the start signal SP.

The transistor 302B has a function of controlling the timing of bringing the wiring 113B and the node B1 into conduction. Alternatively, the transistor 302B has a function of controlling the timing of supplying the potential of the wiring 113B to the node B1. Alternatively, the transistor 302B has a function of controlling the timing of supplying a signal, voltage, or the like (e.g., the clock signal CK2 or the voltage V1) which is to be input to the wiring 113B to the node B1. Alternatively, the transistor 302B has a function of controlling the timing of supplying the voltage V1 to the node B1. Alternatively, the transistor 302B has a function of controlling the timing of lowering the potential of the node B1. Alternatively, the transistor 302B has a function of controlling the timing of keeping the potential of the node B1.

As described above, the transistor 302B functions as a switch. Note that the transistor 302B may be controlled in accordance with the reset signal RE.

The circuit 400B has a function of controlling the potential of the node B2. Alternatively, the circuit 400B has a function of controlling the timing of supplying a signal, voltage, or the like to the node B2. Alternatively, the circuit 400B has a function of controlling the timing of not supplying a signal, voltage, or the like to the node B2. Alternatively, the circuit 400B has a function of controlling the timing of supplying an H signal or the voltage 12 to the node B2. Alternatively, the circuit 400B has a function of controlling the timing of supplying an L signal or the voltage V1 to the node B2. Alternatively, the circuit 400B has a function of controlling the timing of raising the potential of the node B2. Alternatively, the circuit 400B has a function of controlling the timing of lowering the potential of the node B2. Alternatively, the circuit 400B has a function of controlling the timing of keeping the potential of the node B2.

As described above, the circuit 400B functions as a control circuit. Note that the circuit 400B may be controlled in accordance with the signal SELB or the potential of the node B1.

Next, structure examples of the circuit 400A and the circuit 400B are described with reference to FIG. 31B.

The circuit 400A includes a transistor 401A and a transistor 402A. The circuit 400B includes a transistor 401B and a transistor 402B.

Structure examples of the transistor 401A, the transistor 402A, the transistor 401B, and the transistor 402B are described with reference to FIG. 31B. Here, the transistor 401A, the transistor 402A, the transistor 401B, and the transistor 402B are described as n-channel transistors. Note that these transistors may be p-channel transistors.

A first terminal of the transistor 401A is connected to the wiring 115A. A second terminal of the transistor 401A is connected to the node A2. A gate of the transistor 401A is connected to the wiring 115A. A first terminal of the transistor 402A is connected to the wiring 113A. A second terminal of the transistor 402A is connected to the node A2. A gate of the transistor 402A is connected to the node A1.

A first terminal of the transistor 401B is connected to the wiring 115B. A second terminal of the transistor 401B is connected to the node B2. A gate of the transistor 401B is connected to the wiring 115B. A first terminal of the transistor 402B is connected to the wiring 113B. A second terminal of the transistor 402B is connected to the node B2. A gate of the transistor 402B is connected to the node B1.

Next, examples of the functions of the transistor 401A, the transistor 402A, the transistor 401B, and the transistor 402B are described.

The transistor 401A has a function of controlling the timing of bringing the wiring 115A and the node A2 into conduction. Alternatively, the transistor 401A has a function of controlling the timing of supplying the potential of the wiring 115A to the node A2. Alternatively, the transistor 401A has a function of controlling the timing of supplying a signal, voltage, or the like (e.g., the signal SELA or the voltage V2) which is to be input to the wiring 115A to the node A2. Alternatively, the transistor 401A has a function of controlling the timing of not supplying a signal or voltage to the node A2. Alternatively, the transistor 401A has a function of controlling the timing of supplying an H signal, the voltage 12, or the like to the node A2. Alternatively, the transistor 401A has a function of controlling the timing of raising the potential of the node A2.

As described above, the transistor 401A functions as a switch, a rectifier element, a diode, a diode-connected transistor, or the like. Note that the transistor 401A may be controlled in accordance with the signal SELA.

The transistor 402A has a function of controlling the timing of bringing the wiring 113A and the node A2 into conduction. Alternatively, the transistor 402A has a function of controlling the timing of supplying the potential of the wiring 113A to the node A2. Alternatively, the transistor 402A has a function of controlling the timing of supplying a signal, voltage, or the like (e.g., the clock signal CK2 or the voltage V1) which is to be input to the wiring 113A to the node A2. Alternatively, the transistor 402A has a function of controlling the timing of supplying the voltage V1 to the node A2. Alternatively, the transistor 402A has a function of controlling the timing of lowering the potential of the node A2. Alternatively, the transistor 402A has a function of controlling the timing of keeping the potential of the node A2.

As described above, the transistor 402A functions as a switch. Note that the transistor 402A may be controlled in accordance with the potential of the node A1 or the potential of the wiring 111.

The transistor 401B has a function of controlling the timing of bringing the wiring 115B and the node B2 into conduction. Alternatively, the transistor 401B has a function of controlling the timing of supplying the potential of the wiring 115B to the node B2. Alternatively, the transistor 401B has a function of controlling the timing of supplying a signal, voltage, or the like (e.g., the signal SELB or the voltage V2) which is to be input to the wiring 115B to the node B2. Alternatively, the transistor 401B has a function of controlling the timing of not supplying a signal or voltage to the node B2. Alternatively, the transistor 401B has a function of controlling the timing of supplying an H signal, the voltage V2, or the like to the node B2. Alternatively, the transistor 401B has a function of controlling the timing of raising the potential of the node B2.

As described above, the transistor 401B functions as a switch, a rectifier element, a diode, a diode-connected transistor, or the like. Note that the transistor 401B may be controlled in accordance with the signal SELB.

The transistor 402B has a function of controlling the timing of bringing the wiring 113B and the node B2 into conduction. Alternatively, the transistor 402B has a function of controlling the timing of supplying the potential of the wiring 113B to the node B2. Alternatively, the transistor 402B has a function of controlling the timing of supplying a signal, voltage, or the like (e.g., the clock signal CK2 or the voltage V1) which is to be input to the wiring 113B to the node B2. Alternatively, the transistor 402B has a function of controlling the timing of supplying the voltage V1 to the node B2. Alternatively, the transistor 402B has a function of controlling the timing of lowering the potential of the node B2. Alternatively, the transistor 402B has a function of controlling the timing of keeping the potential of the node B2.

As described above, the transistor 402B functions as a switch. Note that the transistor 402B may be controlled in accordance with the potential of the node B1 or the potential of the wiring 111.

<Operation of Semiconductor Device>

Next, operation examples of the semiconductor device in FIG. 31B are described with reference to FIGS. 32A and 32B, FIGS. 33A and 33B, FIGS. 34A and 34B, and FIGS. 35A and 35B. FIG. 32A, FIG. 32B, FIG. 33A, FIG. 33B, FIG. 34A, FIG. 34B, FIG. 35A, and FIG. 35B correspond to the schematic views of the semiconductor device in the period a1, the period b1, the period c1, the period d1, the period a2, the period b2, the period c2, and the period d2 described in Embodiment 4, respectively.

Note that the operation of a portion of the semiconductor device in FIG. 31B that is common with a portion of the semiconductor device in FIG. 16A is described with reference to the timing chart in FIG. 17.

Figures 32A, 32B:
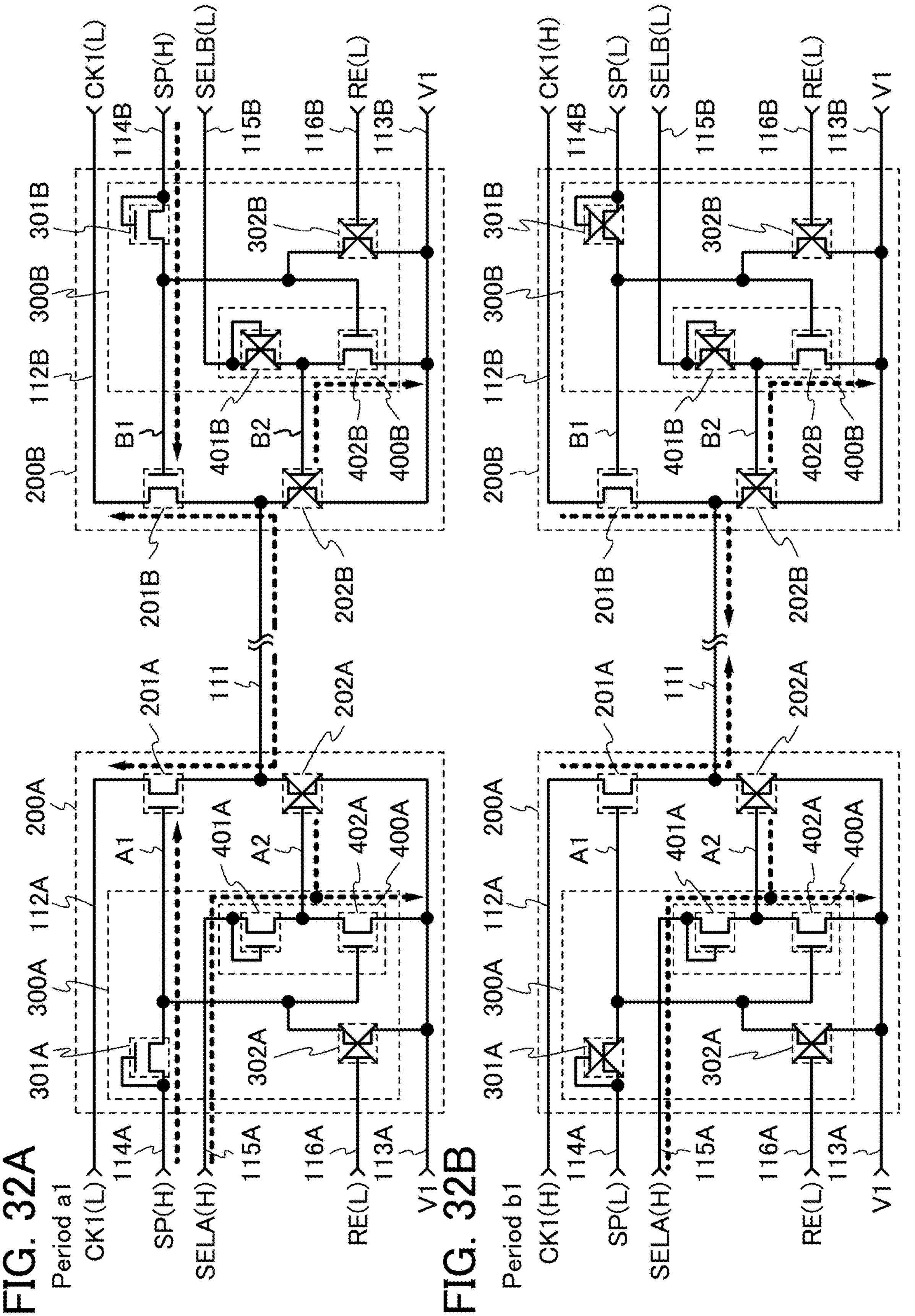
FIGS. 32A and 32B each illustrate an operation example of a semiconductor device.

First, as illustrated in FIG. 32A, in the period a1, the start signal SP is set at an H level. Thus, the transistor 301A is turned on, so that the wiring 114A and the node A1 are brought into conduction. Then, the start signal SP which is at an H level is supplied to the node A1 through the transistor 301A, so that the potential of the node A1 rises.

After the potential of the node A1 becomes $V2-Vth_{301A}$ (which is obtained by subtraction of the threshold voltage of the transistor 301A ($Vth_{301A}$) from the potential of the gate of the transistor 301A (e.g., the voltage V2), the transistor 301A is turned off. Thus, the wiring 114A and the node A1 are brought out of conduction, so that the potential of the node A1 rises. When the potential of the node A1 rises, the transistor 402A is turned on; thus, the wiring 113A and the node A2 are brought into conduction. Then, the voltage V1 is supplied to the node A2 through the transistor 402A.

In addition, in the period a1, the signal SELA is set at an H level. Thus, the transistor 401A is turned on, so that the wiring 115A and the node A2 are brought into conduction. Accordingly, the signal SELA which is at an H level is supplied to the node A2 through the transistor 401A. Here, when the current supply capability of the transistor 402A is made higher than the current supply capability of the transistor 401A (e.g., the channel width of the transistor 402A is made larger than the channel width of the transistor 401A), the potential of the node A2 is set at an L level.

Note that in the period a1, the reset signal RE is set at an L level. Thus, the transistor 302A is turned off, so that the wiring 113A and the node A1 are brought out of conduction.

In contrast, in the period a1, the start signal SP is set at an H level. Thus, the transistor 301B is turned on, so that the wiring 114B and the node B1 are brought into conduction. Then, the start signal SP which is at an H level is supplied to the node B1 through the transistor 301B, so that the potential of the node B1 rises.

After the potential of the node B1 becomes $V2-Vth_{301B}$ (which is obtained by subtraction of the threshold voltage of the transistor 301B ($Vth_{301B}$) from the potential of the gate of the transistor 301B (e.g., the voltage V2), the transistor 301B is turned off. Thus, the wiring 114B and the node B1 are brought out of conduction, so that the potential of the node B1 rises. When the potential of the node B1 rises, the transistor 402B is turned on; thus, the wiring 113B and the node B2 are brought into conduction. Then, the voltage V1 is supplied to the node B2 through the transistor 402B.

In addition, in the period a1, the signal SELB is set at an L level. Thus, the transistor 401B is turned off, so that the wiring 115B and the node B2 are brought out of conduction. Accordingly, the potential of the node B2 is set at an L level.

Note that in the period a1, the reset signal RE is set at an L level. Thus, the transistor 302B is turned off, so that the wiring 113B and the node B1 are brought out of conduction.

Next, as illustrated in FIG. 32B, in the period b1, the start signal SP is set at an L level. Thus, the transistor 301A is kept off, so that the wiring 114A and the node A1 are kept in a non-conduction state.

In addition, in the period b1, the reset signal RE is kept at an L level. Thus, the transistor 302A is kept off, so that the wiring 113A and the node A1 are kept in a non-conduction state. The potential of the node A1 is raised by bootstrap operation. Thus, the transistor 402A is kept on, so that the wiring 113A and the node A2 are kept in a conduction state.

In addition, in the period b1, the signal SELA is kept at an H level. Thus, the transistor 401A is kept on, so that the wiring 115A and the node A2 are kept in a conduction state. Accordingly, the potential of the node A2 is kept at an L level.

In contrast, in the period b1, when the start signal SP is set at an L level, the transistor 301B is kept off; thus, the wiring 114B and the node B1 are kept in a non-conduction state.

In addition, in the period b1, the reset signal RE is kept at an L level. Thus, the transistor 302B is kept off, so that the wiring 113B and the node B1 are kept in a non-conduction state. The potential of the node B1 is raised by bootstrap operation. Thus, the transistor 402B is kept on, so that the wiring 113B and the node B2 are kept in a conduction state.

Further, in the period b1, the signal SELB is set at an L level. Thus, the transistor 401B is kept off, so that the wiring 115B and the node B2 are kept in a non-conduction state. Accordingly, the potential of the node B2 is kept at an L level.

Figure 33A:
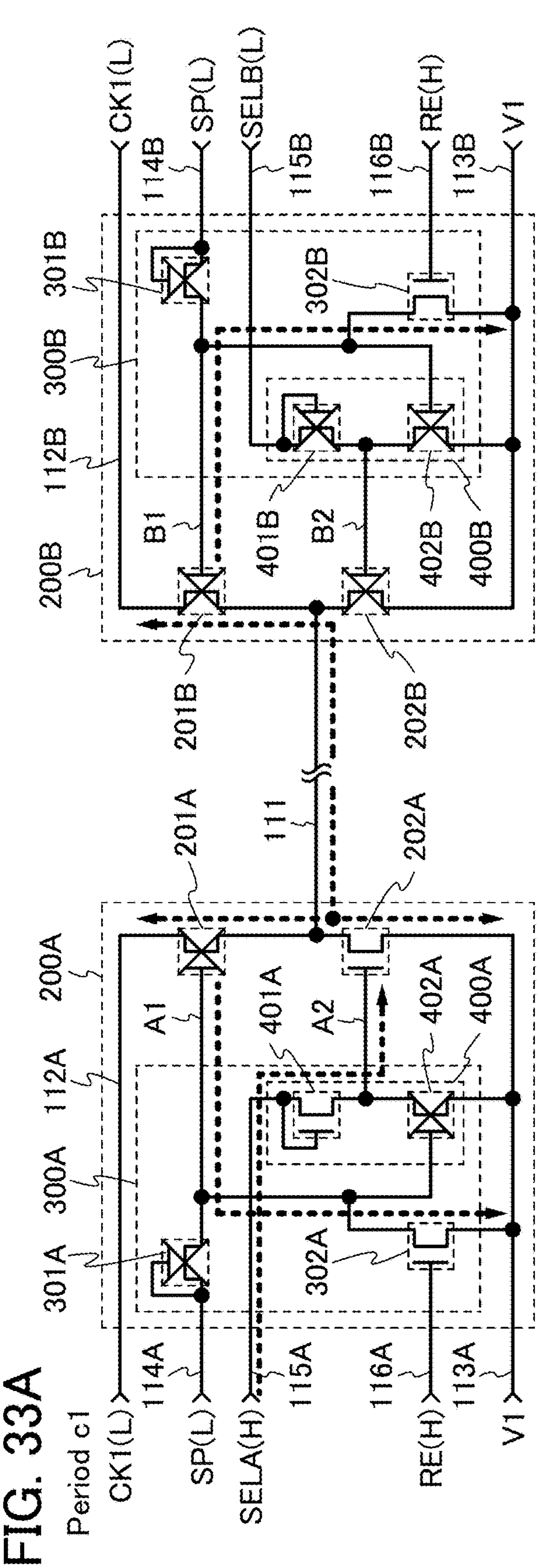
FIGS. 33A and 33B each illustrate an operation example of a semiconductor device.

Next, as illustrated in FIG. 33A, in the period c1, the start signal SP is kept at an L level. Thus, the transistor 301A is kept off, so that the wiring 114A and the node A1 are kept in a non-conduction state.

In addition, in the period c1, the reset signal RE is set at an H level. Thus, the transistor 302A is turned on, so that the wiring 113A and the node A1 are brought into conduction. Then, the voltage V1 is supplied to the node A1 through the transistor 302A, so that the potential of the node A1 is lowered and set at an L level. When the potential of the node A1 is set at an L level, the transistor 402A is turned off; thus, the wiring 113A and the node A2 are brought out of conduction.

Further, in the period c1, the signal SELA is kept at an H level. Thus, the transistor 401A is kept on, so that the wiring 115A and the node A2 are kept in a conduction state. Then, the signal SELA which is at an H level is supplied to the node A2 through the transistor 401A, so that the potential of the node A2 is raised and set at an H level.

In contrast, in the period c1, the start signal SP is kept at an L level. Thus, the transistor 301B is kept off, so that the wiring 114B and the node B1 are kept in a non-conduction state.

In addition, in the period c1, the reset signal RE is set at an H level. Thus, the transistor 302B is turned on, so that the wiring 113B and the node B1 are brought into conduction. Then, the voltage V1 is supplied to the node B1 through the transistor 302B, so that the potential of the node B1 is lowered and set at an L level. When the potential of the node B1 is set at an L level, the transistor 402B is turned off; thus, the wiring 113B and the node B2 are brought out of conduction.

Further, in the period c1, the signal SELB is kept at an L level. Thus, the transistor 401B is kept off, so that the wiring 115B and the node B2 are kept in a non-conduction state. Accordingly, the node B2 is set to be in a floating state, so that the potential of the node B2 is kept at an L level.

Figure 33B:
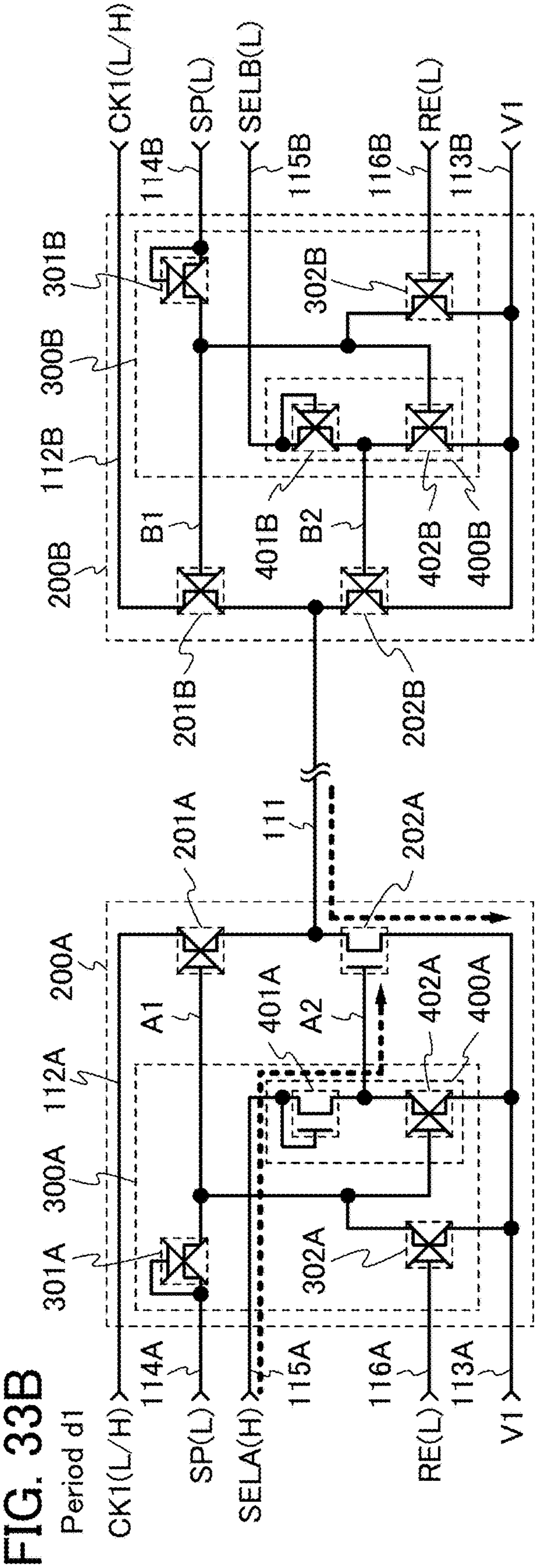

Next, as illustrated in FIG. 33B, in the period d1, the start signal SP is kept at an L level. Thus, the transistor 301A is kept off, so that the wiring 114A and the node A1 are kept in a non-conduction state.

In addition, in the period d1, the reset signal RE is set at an L level. Thus, the transistor 302A is turned off, so that the wiring 113A and the node A1 are kept in a non-conduction state. Then, the node A1 is set to be in a floating state, so that the potential of the node A1 is kept at an L level. Thus, the transistor 402A is kept off, so that the wiring 113A and the node A2 are kept in a non-conduction state.

Further, in the period d1, the signal SELA is kept at an H level. Thus, the transistor 401A is kept on, so that the wiring 115A and the node A2 are kept in a conduction state. Then, the signal SELA which is at an H level is supplied to the node A2 through the transistor 401A, so that the potential of the node A2 is raised and set at an H level.

In contrast, in the period d1, the start signal SP is kept at an L level. Thus, the transistor 301B is kept off, so that the wiring 114B and the node B1 are kept in a non-conduction state.

In addition, in the period d1, the reset signal RE is set at an L level. Thus, the transistor 302B is turned off, so that the wiring 113B and the node B1 are kept in a non-conduction state. Then, the node B1 is set to be in a floating state, so that the potential of the node B1 is kept at an L level. Thus, the transistor 402B is kept off, so that the wiring 113B and the node B2 are kept in a non-conduction state.

Further, in the period d1, the signal SELB is kept at an L level. Thus, the transistor 401B is kept off, so that the wiring 115B and the node B2 are kept in a non-conduction state. Accordingly, the node A2 is set to be in a floating state, so that the potential of the node B2 is kept at an L level.

Figure 34A:
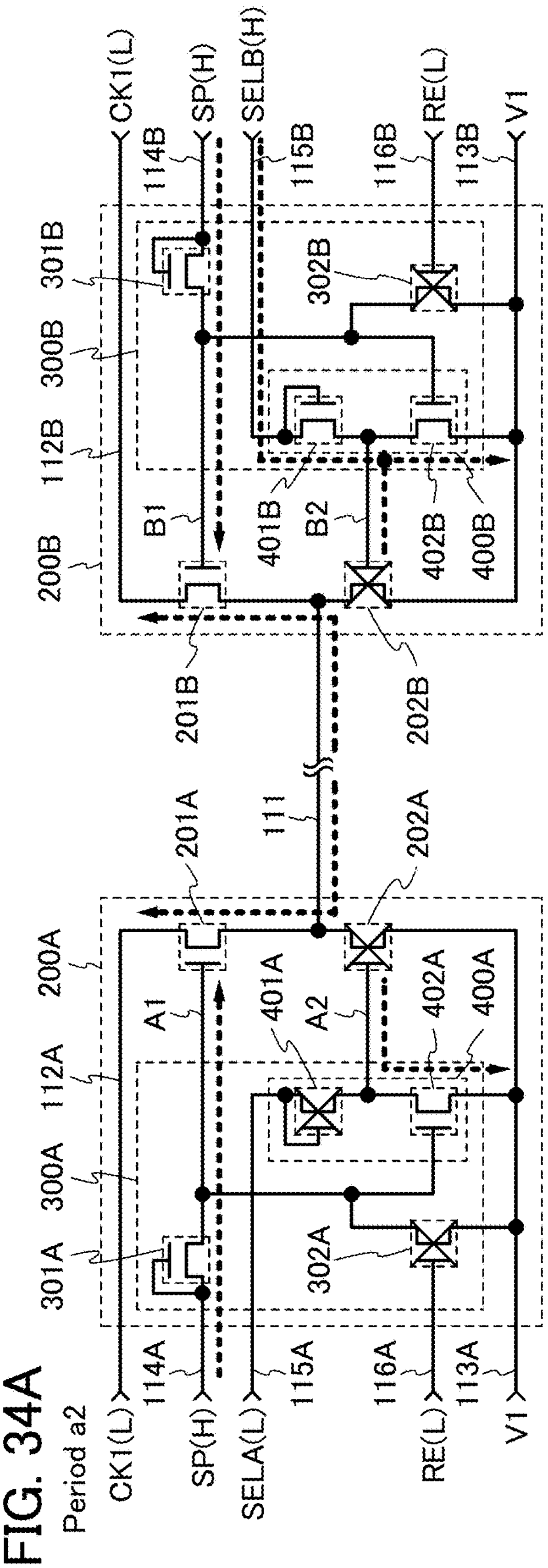
FIGS. 34A and 34B each illustrate an operation example of a semiconductor device.

Next, the operation of the semiconductor device in the period a2 is described with reference to FIG. 34A. The operation of the semiconductor device in the period a2 differs from the operation of the semiconductor device in the period a1 illustrated in FIG. 32A in that the signal SELA is set at an L level and that the signal SELB is set at an H level.

Thus, the transistor 401A is turned off; so that the wiring 115A and the node A2 are brought out of conduction.

In contrast, the transistor 401B is turned on, so that the wiring 115B and the node B2 are brought into conduction. Thus, the signal SELB which is at an H level is supplied to the node B2 through the transistor 401B. Here, when the current supply capability of the transistor 402B is made higher than the current supply capability of the transistor 401B (e.g., the channel width of the transistor 402B is made larger than the channel width of the transistor 401B), the potential of the node B2 is set at an L level.

Figure 34B:
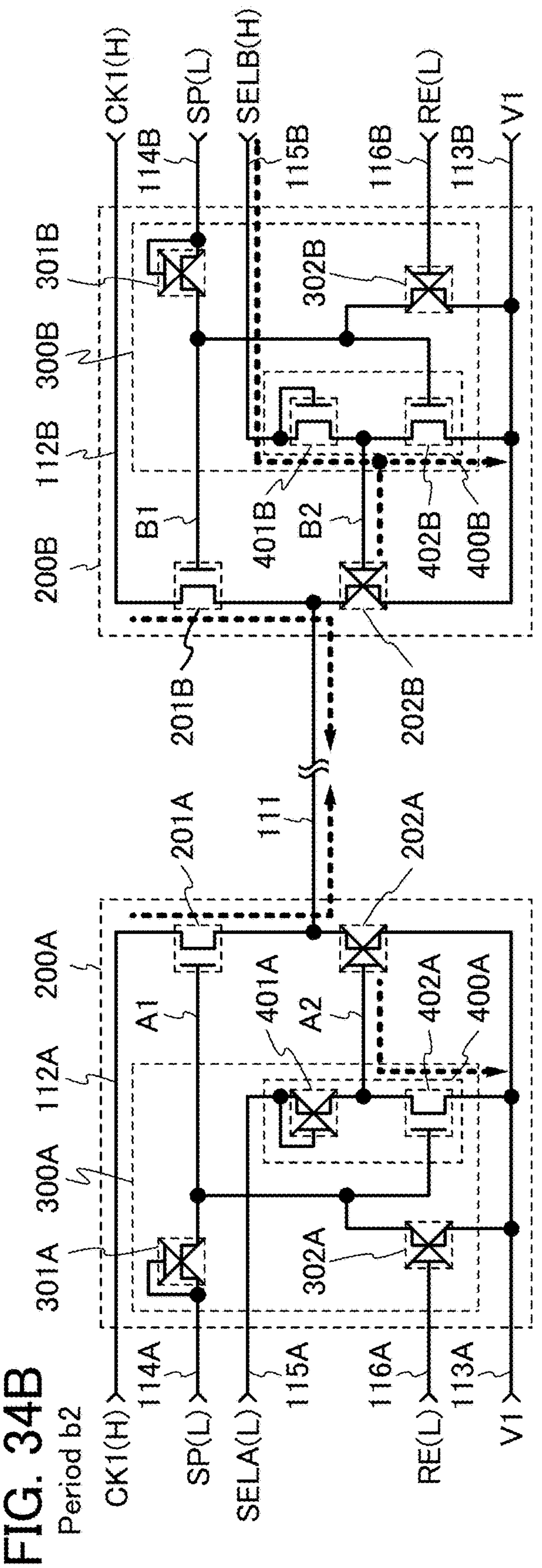

Next, the operation of the semiconductor device in the period b2 is described with reference to FIG. 34B. The operation of the semiconductor device in the period b2 differs from the operation of the semiconductor device in the period b1 illustrated in FIG. 32B in that the signal SELA is set at an L level and that the signal SELB is set at an H level.

Thus, the transistor 401A is kept off, so that the wiring 115A and the node A2 are kept in a non-conduction state.

In contrast, the transistor 401B is kept on, so that the wiring 115B and the node B2 are kept in a conduction state.

Figure 35A:
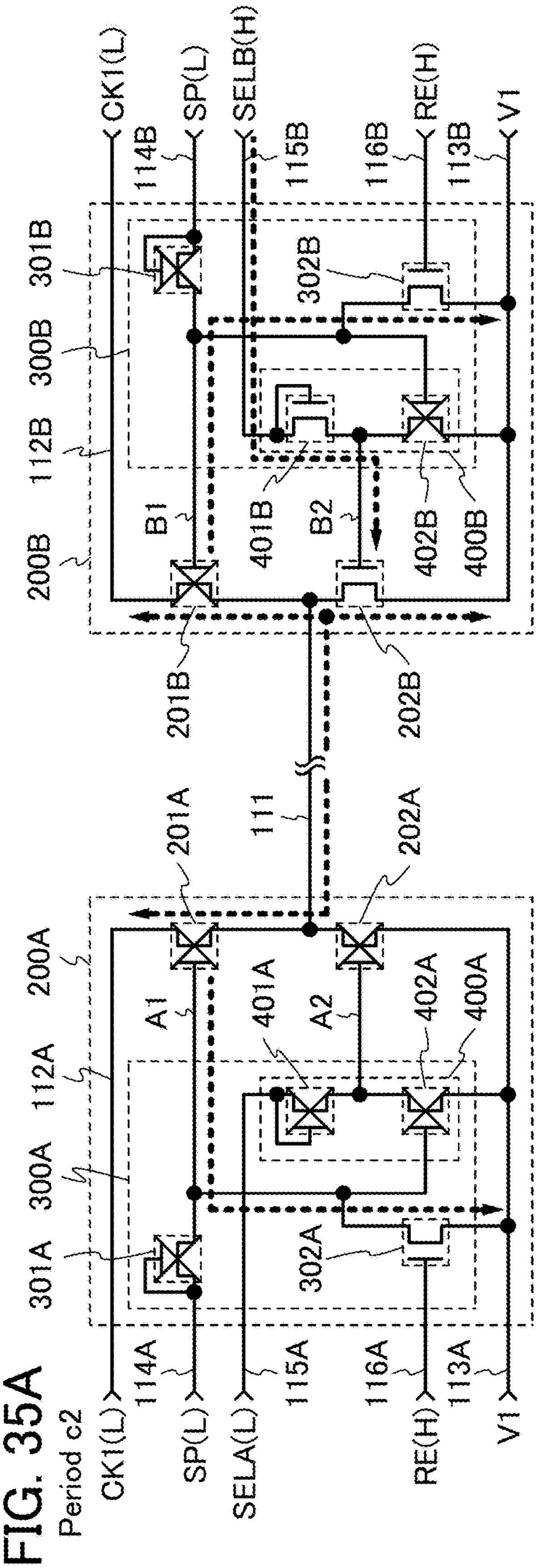
FIGS. 35A and 35B each illustrate an operation example of a semiconductor device.

Next, the operation of the semiconductor device in the period c2 is described with reference to FIG. 35A. The operation of the semiconductor device in the period c2 differs from the operation of the semiconductor device in the period c1 illustrated in FIG. 33A in that the signal SELA is set at an L level and that the signal SELB is set at an H level.

Thus, the transistor 401A is kept off, so that the wiring 115A and the node A2 are brought out of conduction. Then, the node A2 is set to be in a floating state, so that the potential of the node A2 is kept at an L level.

In contrast, the transistor 401B is kept on, so that the wiring 115B and the node B2 are kept in a conduction state. Thus, the signal SELB which is at an H level is supplied to the node B2 through the transistor 401B, so that the potential of the node B2 rises.

Figure 35B:
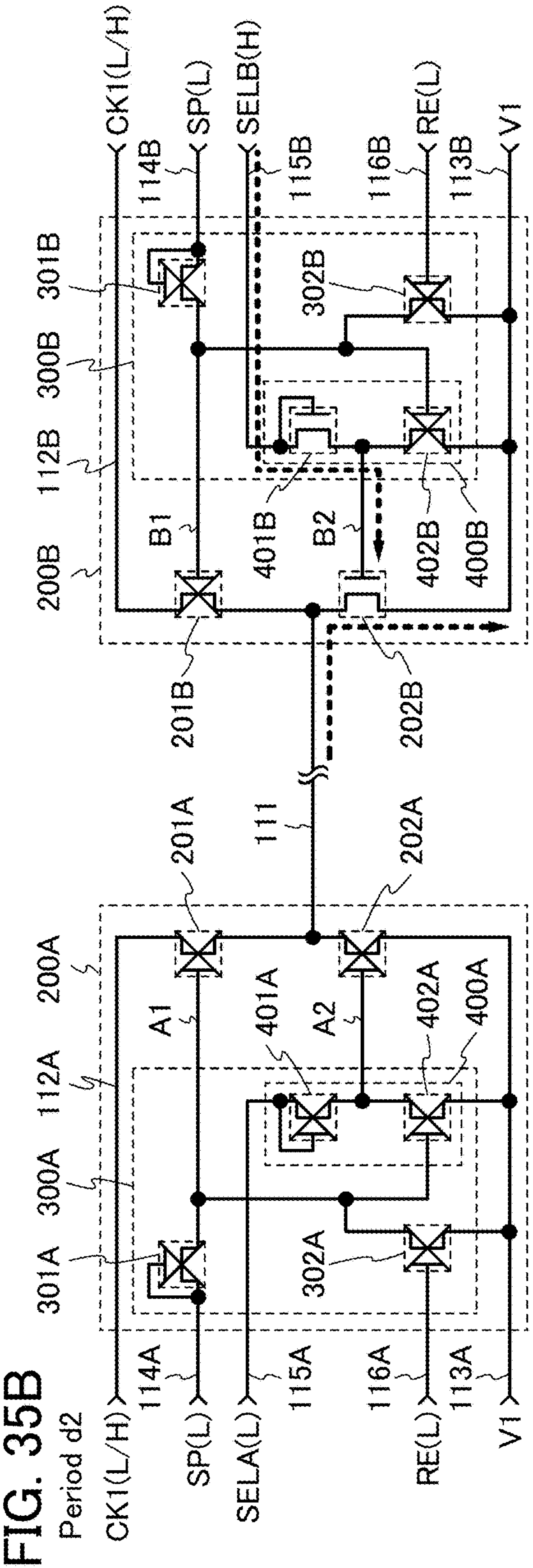

Next, the operation of the semiconductor device in the period d2 is described with reference to FIG. 35B. The operation of the semiconductor device in the period d2 differs from the operation of the semiconductor device in the period d1 illustrated in FIG. 33B in that the signal SELA is set at an L level and that the signal SELB is set at an H level.

Thus, the transistor 401A is kept off, so that the wiring 115A and the node A2 are brought out of conduction. Then, the node A2 is set to be in a floating state, so that the potential of the node A2 is kept at an L level.

In contrast, the transistor 401B is kept on, so that the wiring 115B and the node B2 are kept in a conduction state. Thus, the signal SELB which is at an H level is supplied to the node B2 through the transistor 401B, so that the potential of the node B2 is kept at an H level.

<Size of Transistor>

Next, the size of a transistor, such as the channel width of a transistor or the channel length of a transistor, is described.

It is preferable that the channel width of the transistor 301A be substantially equal to the channel width of the transistor 301B. Alternatively, it is preferable that the channel width of the transistor 302A be substantially equal to the channel width of the transistor 302B. Alternatively, it is preferable that the channel width of the transistor 401A be substantially equal to the channel width of the transistor 401B. Alternatively, it is preferable that the channel width of the transistor 402A be substantially equal to the channel width of the transistor 402B.

By making the transistors have substantially the same channel width in this manner, the transistors can have substantially the same current supply capability or substantially the same degree of deterioration. Accordingly, even when transistors which are selected are switched, the waveforms of output signals OUT can be substantially the same.

From a similar reason, it is preferable that the channel length of the transistor 301A be substantially equal to the channel length of the transistor 301B. Alternatively, it is preferable that the channel length of the transistor 302A be substantially equal to the channel length of the transistor 302B. Alternatively, it is preferable that the channel length of the transistor 401A be substantially equal to the channel length of the transistor 401B. Alternatively, it is preferable that the channel length of the transistor 402A be substantially equal to the channel length of the transistor 402B.

Specifically, each of the channel width of the transistor 301A and the channel width of the transistor 301B is preferably 500 to 3000 μm, more preferably 800 to 2500 μm, still more preferably 1000 to 2000 μm.

Each of the channel width of the transistor 302A and the channel width of the transistor 302B is preferably 100 to 3000 μm, more preferably 300 to 2000 μm, still more preferably 300 to 1000 μm.

Each of the channel width of the transistor 401A and the channel width of the transistor 401B is preferably 100 to 2000 μm, more preferably 200 to 1500 μm, still more preferably 300 to 700 μm.

Each of the channel width of the transistor 402A and the channel width of the transistor 402B is preferably 300 to 3000 μm, more preferably 500 to 2000 μm, still more preferably 700 to 1500 μm.

<Structure of Semiconductor Device>

Next, examples of circuit diagrams of a semiconductor device in this embodiment that is different from the structure example of the semiconductor device in FIG. 31B are described with reference to FIGS. 36A and 36B, FIGS. 37A and 37B, FIGS. 38A and 38B, FIGS. 39A to 39F, FIGS. 40A to 40D, and FIGS. 41A and 41B.

FIGS. 36A and 36B, FIGS. 37A and 37B, FIGS. 38A and 38B, FIGS. 39A to 39F, FIGS. 40A to 40D, and FIGS. 41A and 41B each illustrate an example of a circuit diagram of the semiconductor device.

Figure 36A:
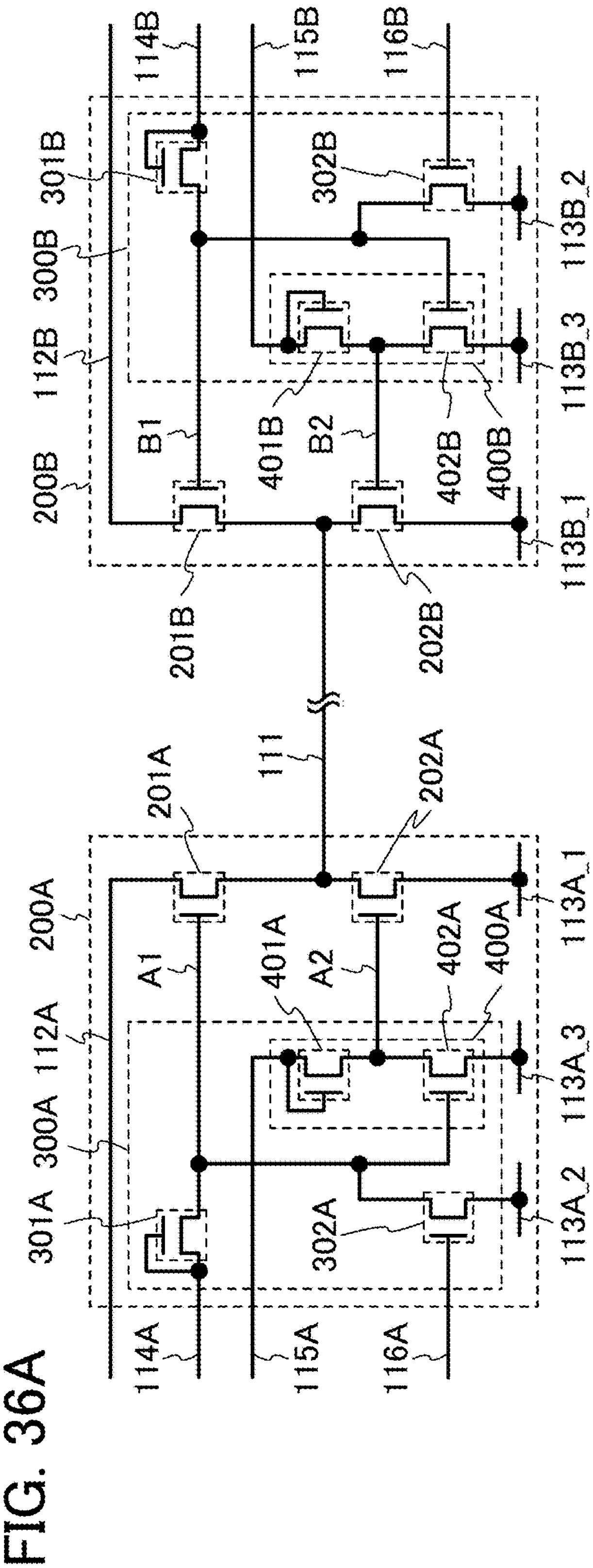
FIGS. 36A and 36B each illustrate an example of a circuit diagram of a semiconductor device.

The semiconductor device illustrated in FIG. 36A has a structure where the first terminal of the transistor 202A included in the semiconductor device illustrated in FIG. 31B, the first terminal of the transistor 302A included in the semiconductor device illustrated in FIG. 31B, and the first terminal of the transistor 402A included in the semiconductor device illustrated in FIG. 31B are connected to different wirings. Alternatively, the semiconductor device illustrated in FIG. 36A has a structure where the first terminal of the transistor 202B included in the semiconductor device illustrated in FIG. 31B, the first terminal of the transistor 302B included in the semiconductor device illustrated in FIG. 31B, and the first terminal of the transistor 402B included in the semiconductor device illustrated in FIG. 31B are connected to different wirings.

In FIG. 36A, the wiring 113A is divided into a plurality of wirings 113A_1 to 113A_3. The wiring 113B is divided into a plurality of wirings 113B_1 to 113B_3. The first terminal of the transistor 202A is connected to the wiring 113A_1. The first terminal of the transistor 302A is connected to the wiring 113A_2. The first terminal of the transistor 402A is connected to the wiring 113A_3. The first terminal of the transistor 202B is connected to the wiring 113B_1. The first terminal of the transistor 302B is connected to the wiring 113B_2. The first terminal of the transistor 402B is connected to the wiring 113B_3.

Note that the wirings 113A_1 to 113A_3 have a function that is similar to the function of the wiring 113A. The wirings 113B_1 to 113B_3 have a function that is similar to the function of the wiring 113B. For example, voltage such as the voltage V1 can be supplied to the wirings 113A_1 to 113A_3 and the wirings 113B_1 to 113B_3. Alternatively, different voltages or different signals may be supplied to the wirings 113A_1 to 113A_3. Alternatively, different voltages or different signals may be supplied to the wirings 113B_1 to 113B_3.

Figure 37A:
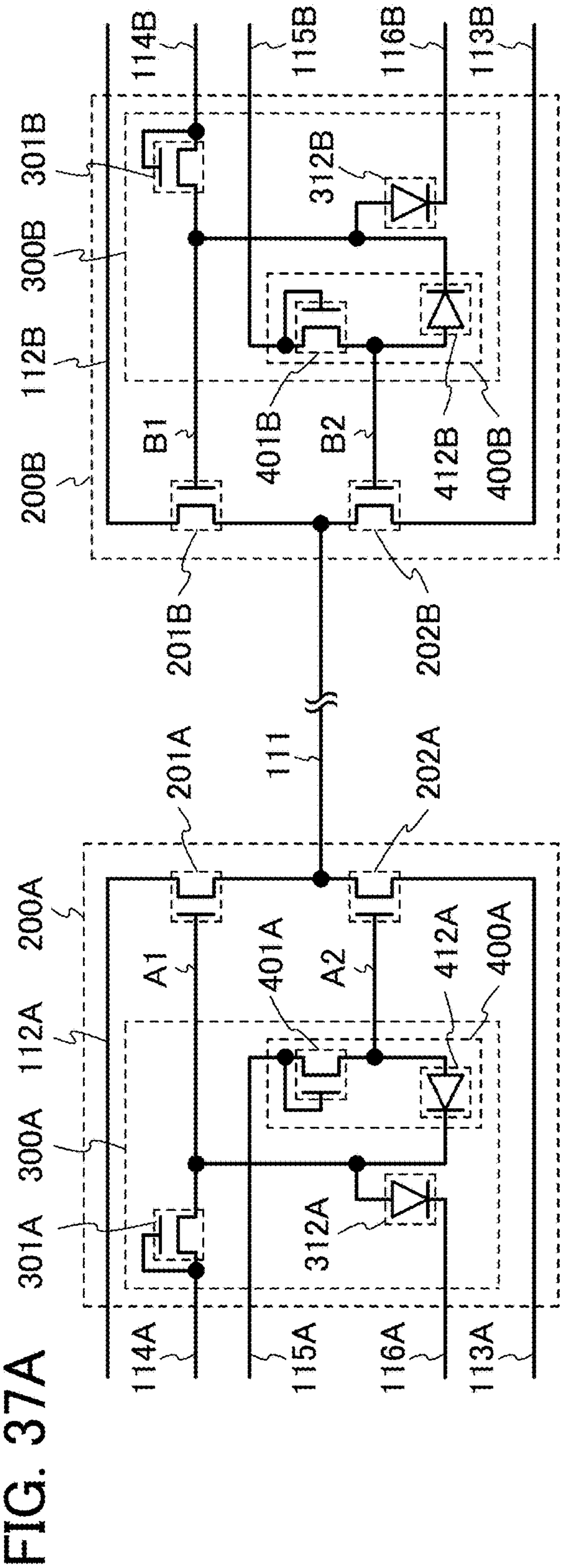
FIGS. 37A and 37B each illustrate an example of a circuit diagram of a semiconductor device.

In addition, in the structures illustrated in FIG. 31B and FIG. 36A, as illustrated in FIG. 37A, the transistor 302A may be replaced with a diode 312A. One electrode (e.g., a positive electrode) of the diode 312A is connected to the node A1, and the other electrode (e.g., a negative electrode) of the diode 312A is connected to the wiring 116A. Alternatively, the transistor 402A may be replaced with a diode 412A. One electrode (e.g., a positive electrode) of the diode 412A is connected to the node A2, and the other electrode (e.g., a negative electrode) of the diode 412A is connected to the node A1.

Further, the transistor 302B may be replaced with a diode 312B. One electrode (e.g., a positive electrode) of the diode 312B is connected to the node B1, and the other electrode (e.g., a negative electrode) of the diode 312B is connected to the wiring 116B. Alternatively, the transistor 402B may be replaced with a diode 412B. One electrode (e.g., a positive electrode) of the diode 412B is connected to the node B2, and the other electrode (e.g., a negative electrode) of the diode 412B is connected to the node B1.

Figure 37B:
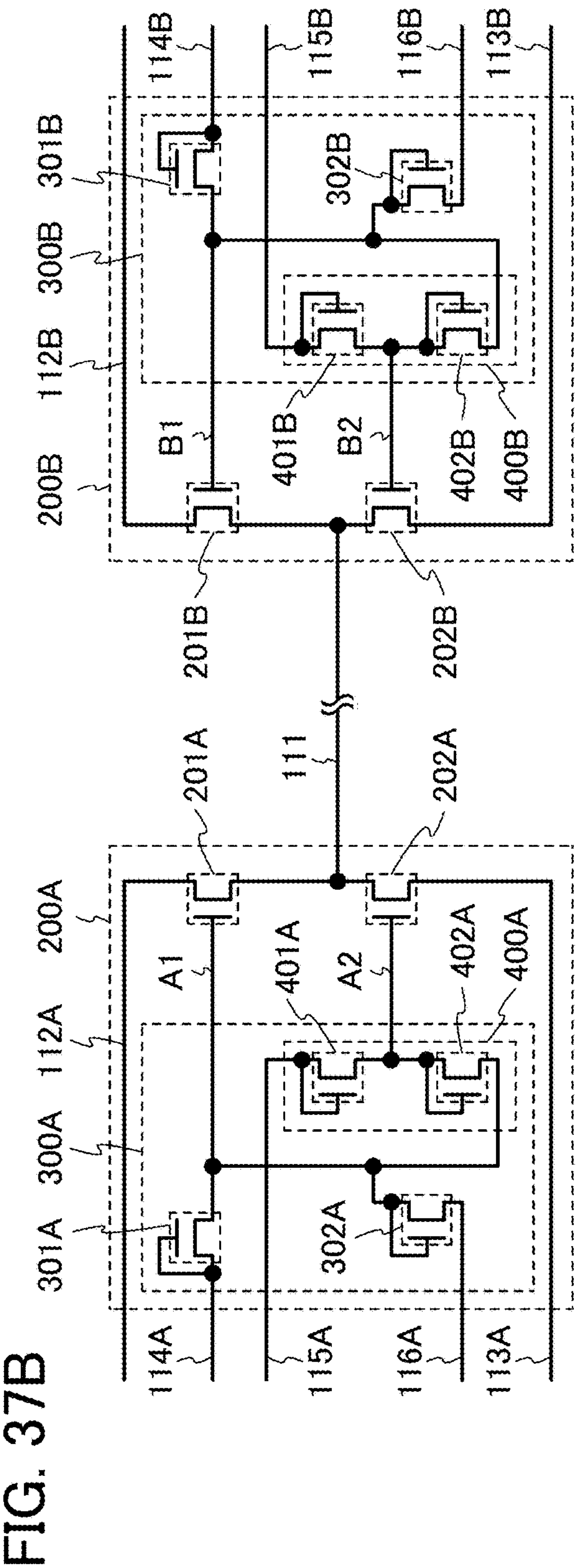

Further, in the structures illustrated in FIG. 31B and FIG. 36A, as illustrated in FIG. 37B, the first terminal of the transistor 302A may be connected to the wiring 116A, and the gate of the transistor 302A may be connected to the node A1. Alternatively, the first terminal of the transistor 402A may be connected to the node A1, and the gate of the transistor 402A may be connected to the node A2.

Furthermore, the first terminal of the transistor 302B may be connected to the wiring 116B, and the gate of the transistor 302B may be connected to the node B1. Alternatively, the first terminal of the transistor 402B may be connected to the node B1, and the gate of the transistor 402B may be connected to the node B2.

Figure 38A:
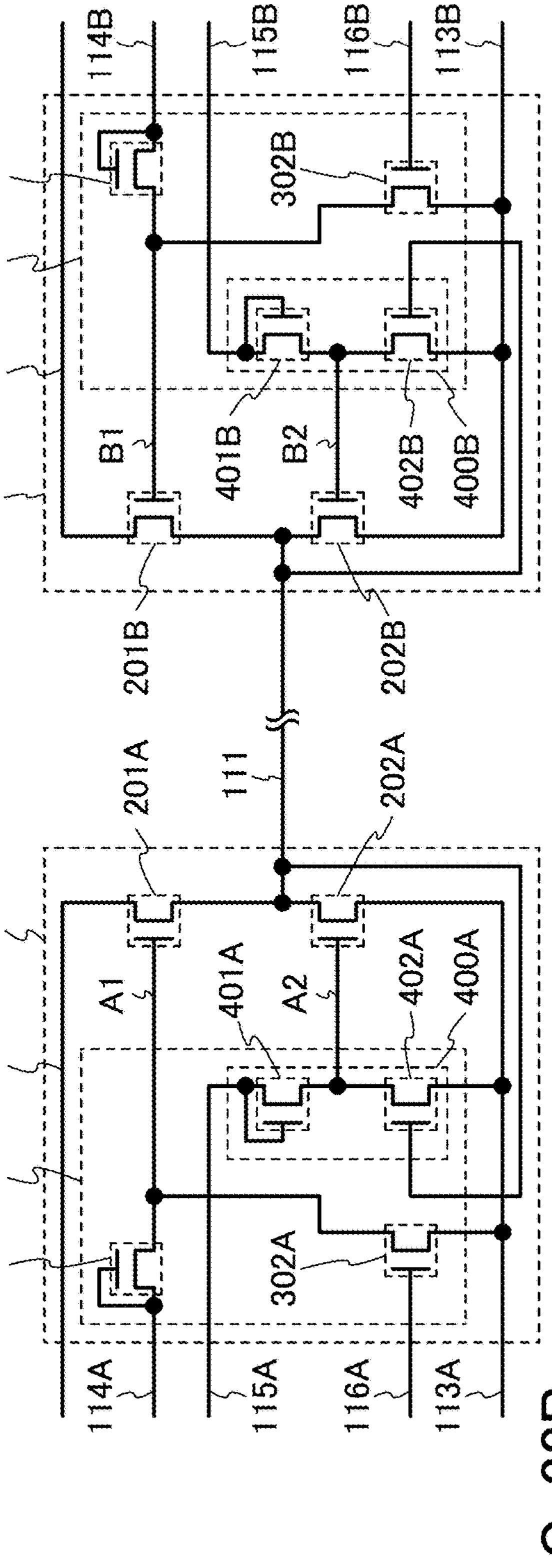
FIGS. 38A and 38B each illustrate an example of a circuit diagram of a semiconductor device.

In the structures illustrated in FIG. 31B, FIG. 36A, FIG. 37A, and FIG. 37B, as illustrated in FIG. 38A, the gate of the transistor 402A may be connected to the wiring 111. In addition, the gate of the transistor 402B may be connected to the wiring 111.

Figure 38B:
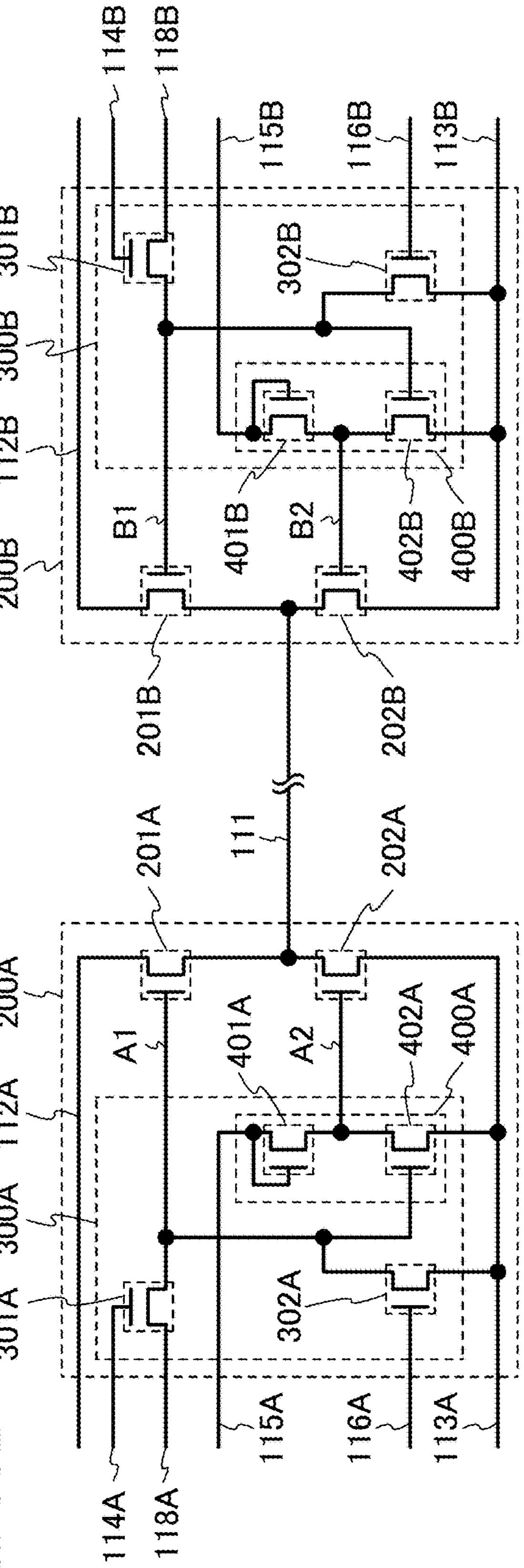

Further, in the structures illustrated in FIG. 31B, FIG. 36A, FIGS. 37A and 37B, and FIG. 38A, as illustrated in FIG. 38B, the first terminal of the transistor 301A may be connected to a wiring 118A, and the gate of the transistor 301A may be connected to the wiring 114A. Furthermore, the first terminal of the transistor 301B may be connected to a wiring 118B, and the gate of the transistor 301B may be connected to the wiring 114B.

Alternatively, the first terminal of the transistor 301A may be connected to the wiring 114A, and the gate of the transistor 301A may be connected to the wiring 118A. Further, the first terminal of the transistor 301B may be connected to the wiring 114B, and the gate of the transistor 301B may be connected to the wiring 118B.

Note that in the case where the voltage 12 is applied to the wiring 118A and the wiring 118B, the wiring 118A and the wiring 118B function as power supply lines. Alternatively, the clock signal CK2 may be input to the wiring 118A and the wiring 118B. Alternatively, different signals or different voltages may be input to the wiring 118A and the wiring 118B.

Note that in the case where the same voltage is input to the wiring 118A and the wiring 118B, the wiring 118A and the wiring 118B may be connected to each other. In that case, one wiring may be used as the wiring 118A and the wiring 118B.

Figure 39A:
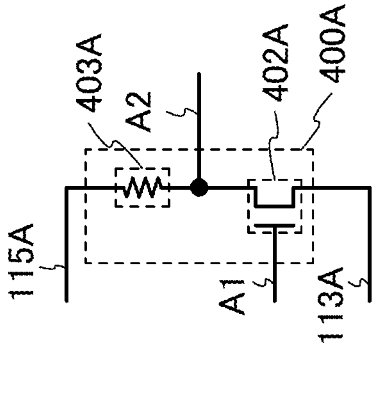
FIGS. 39A to 39F each illustrate an example of a circuit diagram of a semiconductor device.
Figure 39B:
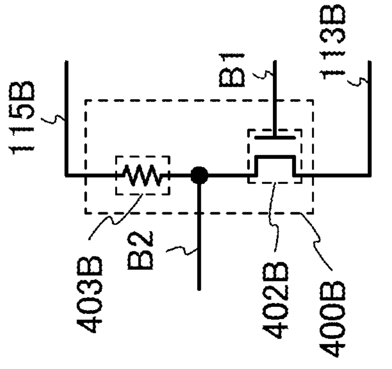

In the structures illustrated in FIG. 31B, FIG. 36A, FIGS. 37A and 37B, and FIGS. 38A and 38B, as illustrated in FIG. 39A, the transistor 401A may be replaced with a resistor 403A. The resistor 403A is connected between the wiring 115A and the node A2. In addition, as illustrated in FIG. 39B, the transistor 401B may be replaced with a resistor 403B. The resistor 403B is connected between the wiring 115B and the node B2.

With the structures illustrated in FIGS. 39A and 39B, in the period c1 and the period d1, the signal SELB which is at an L level can be supplied to the node B2. Alternatively, in the period c2 and the period d2, the signal SELA which is at an L level can be supplied to the node A2. Thus, the potential of the node A2 and the potential of the node B2 can be fixed, so that a semiconductor device which is hardly affected by noise can be obtained.

Figure 39C:
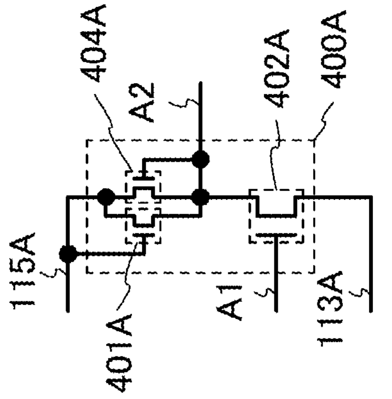
Figure 39D:
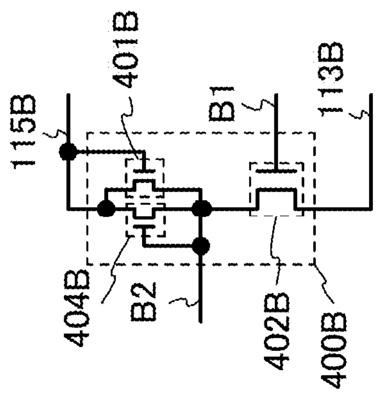

Further, in the structures illustrated in FIG. 31B, FIG. 36A, FIGS. 37A and 37B, and FIGS. 38A and 38B, as illustrated in FIG. 39C, a transistor 404A may be provided. A first terminal of the transistor 404A is connected to the wiring 115A; a second terminal of the transistor 404A is connected to the node A2; a gate of the transistor 404A is connected to the node A2. Furthermore, as illustrated in FIG. 39D, a transistor 404B may be provided. A first terminal of the transistor 404B is connected to the wiring 115B; a second terminal of the transistor 404B is connected to the node B2; a gate of the transistor 404B is connected to the node B2.

With the structures illustrated in FIGS. 39C and 39D, as in FIGS. 39A and 39B, the potential of the node A2 and the potential of the node B2 can be fixed, so that a semiconductor device which is hardly affected by noise can be obtained.

Figure 39E:
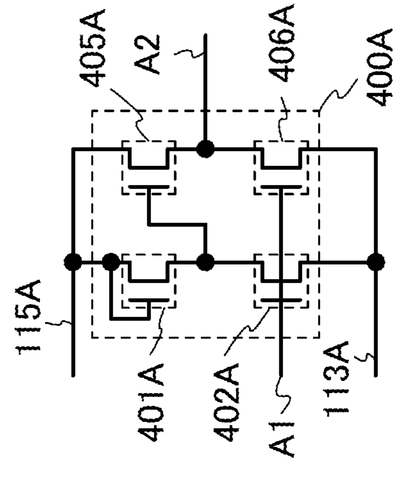

Further, in the structures illustrated in FIG. 31B, FIG. 36A, FIGS. 37A and 37B, FIGS. 38A and 38B, and FIGS. 39A to 39D, as illustrated in FIG. 39E, the circuit 400A may include a transistor 405A and a transistor 406A. A first terminal of the transistor 405A is connected to the wiring 115A; a second terminal of the transistor 405A is connected to the node A2; a gate of the transistor 405A is connected to a portion where the second terminal of the transistor 401A and the second terminal of the transistor 402A are connected to each other. A first terminal of the transistor 406A is connected to the wiring 113A; a second terminal of the transistor 406A is connected to the node A2; a gate of the transistor 406A is connected to the node A1.

Figure 39F:
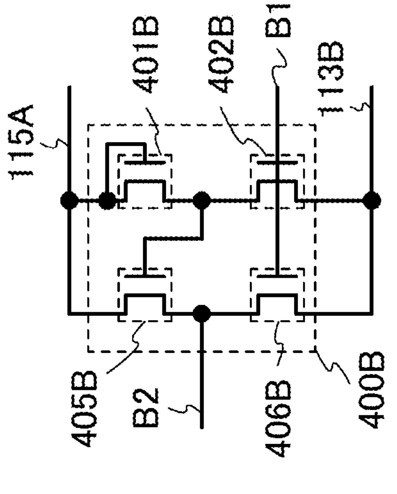

Further, as illustrated in FIG. 39F, the circuit 400B may include a transistor 405B and a transistor 406B. A first terminal of the transistor 405B is connected to the wiring 115B; a second terminal of the transistor 405B is connected to the node B2; a gate of the transistor 405B is connected to a portion where the second terminal of the transistor 401B and the second terminal of the transistor 402B are connected to each other. A first terminal of the transistor 406B is connected to the wiring 113B; a second terminal of the transistor 406B is connected to the node B2; a gate of the transistor 406B is connected to the node B1.

With the structures illustrated in FIGS. 39E and 39F, the potential of the node A2 or the potential of the node B2 can be set to V2, so that the amplitude of a signal can be increased.

Alternatively, the first terminal of the transistor 401A and the first terminal of the transistor 405A may be connected to different wirings. For example, in FIG. 40A, the wiring 115A is divided into a plurality of wirings 115A_1 and 115A_2; the first terminal of the transistor 401A is connected to the wiring 115A_1; the first terminal of the transistor 405A is connected to the wiring 115A_2. In that case, the signal SELA may be input to one of the wirings 115A_1 and 115A_2, and the voltage V2 may be supplied to the other of the wirings 115A_1 and 115A_2.

Alternatively, the first terminal of the transistor 401B and the first terminal of the transistor 405B may be connected to different wirings. For example, in FIG. 40B, the wiring 115B is divided into a plurality of wirings 115B_1 and 115B_2; the first terminal of the transistor 401B is connected to the wiring 115B_1; the first terminal of the transistor 405B is connected to the wiring 115B_2. In that case, the signal SELB may be input to one of the wirings 115B_1 and 115B_2, and the voltage 12 may be supplied to the other of the wirings 115B_1 and 115B_2.

Figure 40A:
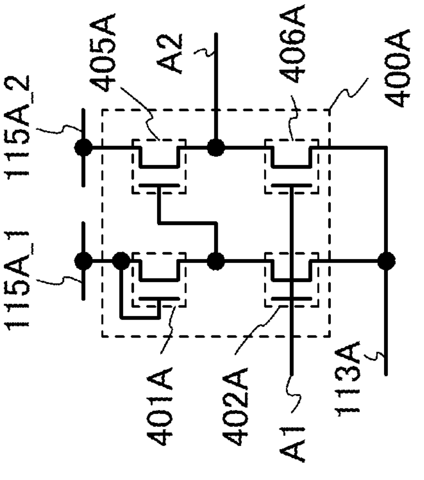
FIGS. 40A to 40D each illustrate an example of a circuit diagram of a semiconductor device.
Figure 40B:
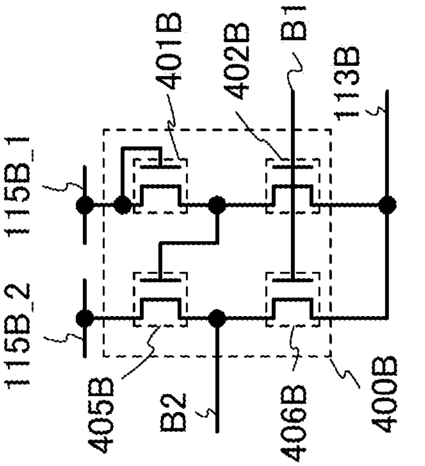

With the structures illustrated in FIGS. 40A and 40B, in the period c1 and the period d1, the signal SELB which is at an L level can be supplied to the node B2. Alternatively, in the period c2 and the period d2, the signal SELA which is at an L level can be supplied to the node A2. Thus, the potential of the node A2 and the potential of the node B2 can be fixed, so that a semiconductor device which is hardly affected by noise can be obtained.

Figure 40C:
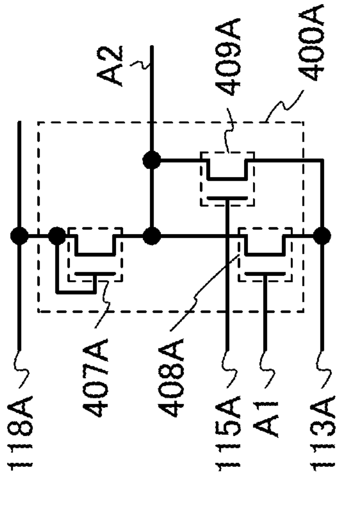

Further, in the structures illustrated in FIG. 31B, FIG. 36A, FIGS. 37A and 37B, FIGS. 38A and 38B, and FIGS. 39A to 39D, as illustrated in FIG. 40C, the circuit 400A may include a transistor 407A, a transistor 408A, and a transistor 409A. A first terminal of the transistor 407A is connected to the wiring 118A; a second terminal of the transistor 407A is connected to the node A2; a gate of the transistor 407A is connected to the wiring 118A. A first terminal of the transistor 408A is connected to the wiring 113A; a second terminal of the transistor 408A is connected to the node A2; a gate of the transistor 408A is connected to the node A1. A first terminal of the transistor 409A is connected to the wiring 113A; a second terminal of the transistor 409A is connected to the node A2; a gate of the transistor 409A is connected to the wiring 115A.

Figure 40D:
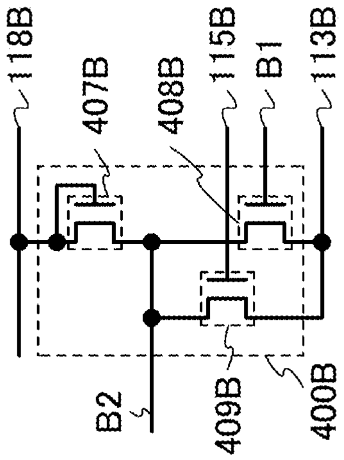

As illustrated in FIG. 40D, the circuit 400B may include a transistor 407B, a transistor 408B, and a transistor 409B. A first terminal of the transistor 407B is connected to the wiring 118B; a second terminal of the transistor 407B is connected to the node B2; a gate of the transistor 407B is connected to the wiring 118B. A first terminal of the transistor 408B is connected to the wiring 113B; a second terminal of the transistor 408B is connected to the node B2; a gate of the transistor 408B is connected to the node B1. A first terminal of the transistor 409B is connected to the wiring 113B; a second terminal of the transistor 409B is connected to the node B2; a gate of the transistor 409B is connected to the wiring 115B.

With the structures illustrated in FIGS. 40C and 40D, in the period c1 and the period d1, the signal SELB which is at an L level can be supplied to the node B2. Alternatively, in the period c2 and the period d2, the signal SELA which is at an L level can be supplied to the node A2. Thus, the potential of the node A2 and the potential of the node B2 can be fixed, so that a semiconductor device which is hardly affected by noise can be obtained.

Figure 41A:
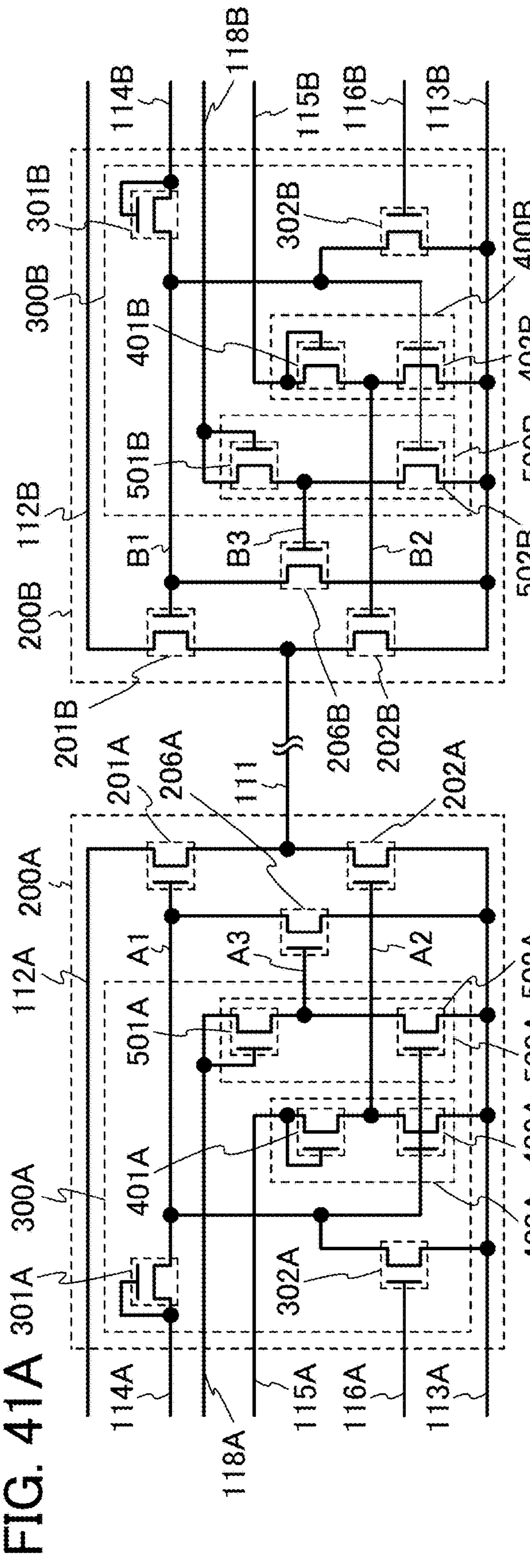
FIGS. 41A and 41B each illustrate an example of a circuit diagram of a semiconductor device.

Further, in the structures illustrated in FIG. 31B, FIG. 36A, FIGS. 37A and 37B, FIGS. 38A and 38B, FIGS. 39A to 39F, and FIGS. 40A to 40D, as illustrated in FIG. 41A, a transistor 206A and a circuit 500A may be provided. The circuit 500A includes a transistor 501A and a transistor 502A.

A first terminal of the transistor 206A is connected to the wiring 113A. A second terminal of the transistor 206A is connected to the node A1. A first terminal of the transistor 501A is connected to the wiring 118A. A second terminal of the transistor 501A is connected to a gate of the transistor 206A. A gate of the transistor 501A is connected to the wiring 118A. A first terminal of the transistor 502A is connected to the wiring 113A. A second terminal of the transistor 502A is connected to the gate of the transistor 206A. A gate of the transistor 502A is connected to the node A1.

As illustrated in FIG. 41A, a transistor 206B and a circuit 500B may be provided. The circuit 500B includes a transistor 501B and a transistor 502B.

A first terminal of the transistor 206B is connected to the wiring 113B. A second terminal of the transistor 206B is connected to the node B1. A first terminal of the transistor 501B is connected to the wiring 118B. A second terminal of the transistor 501B is connected to a gate of the transistor 206B. A gate of the transistor 501B is connected to the wiring 118B. A first terminal of the transistor 502B is connected to the wiring 113B. A second terminal of the transistor 502B is connected to the gate of the transistor 206B. A gate of the transistor 502B is connected to the node B1.

Note that in FIG. 41A, a portion where the gate of the transistor 206A, the second terminal of the transistor 501A, and the second terminal of the transistor 502A are connected to each other is referred to as a node A3. In addition, a portion where the gate of the transistor 206B, the second terminal of the transistor 501B, and the second terminal of the transistor 502B are connected to each other is referred to as a node B3.

In addition, the gate of the transistor 502A may be connected to the wiring 111. Further, the gate of the transistor 502B may be connected to the wiring 111.

Figure 41B:
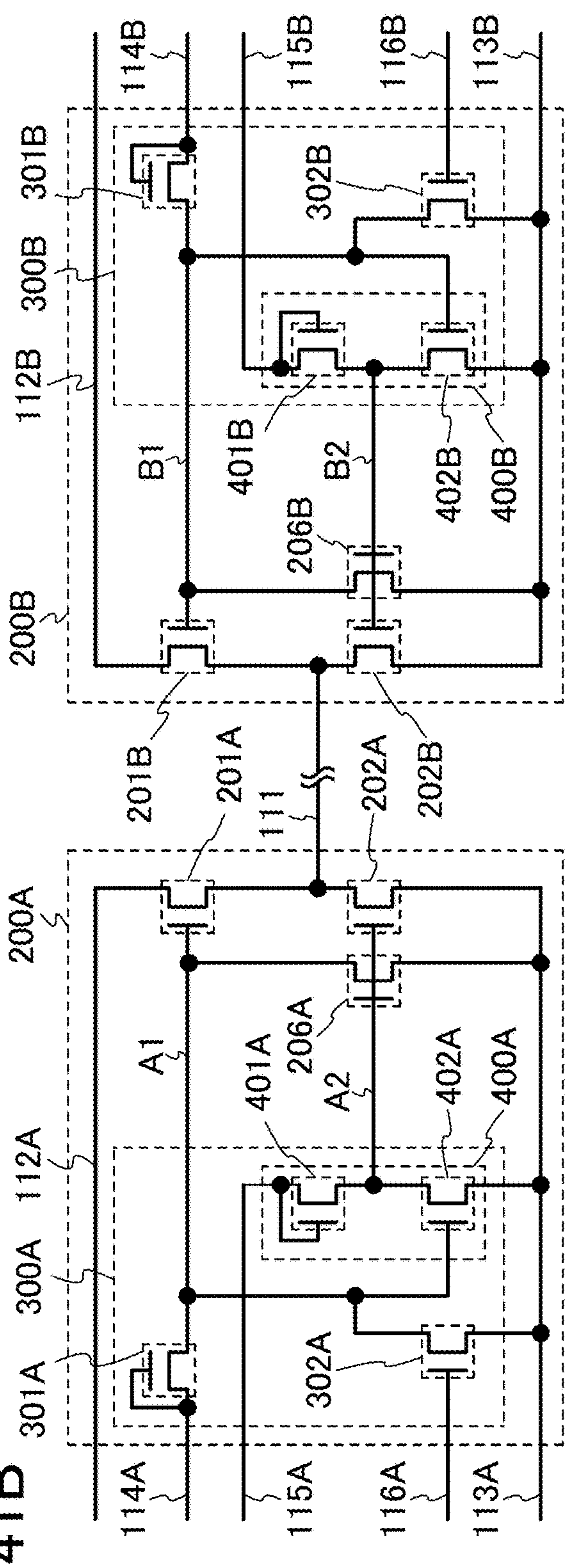
Figure 42A:
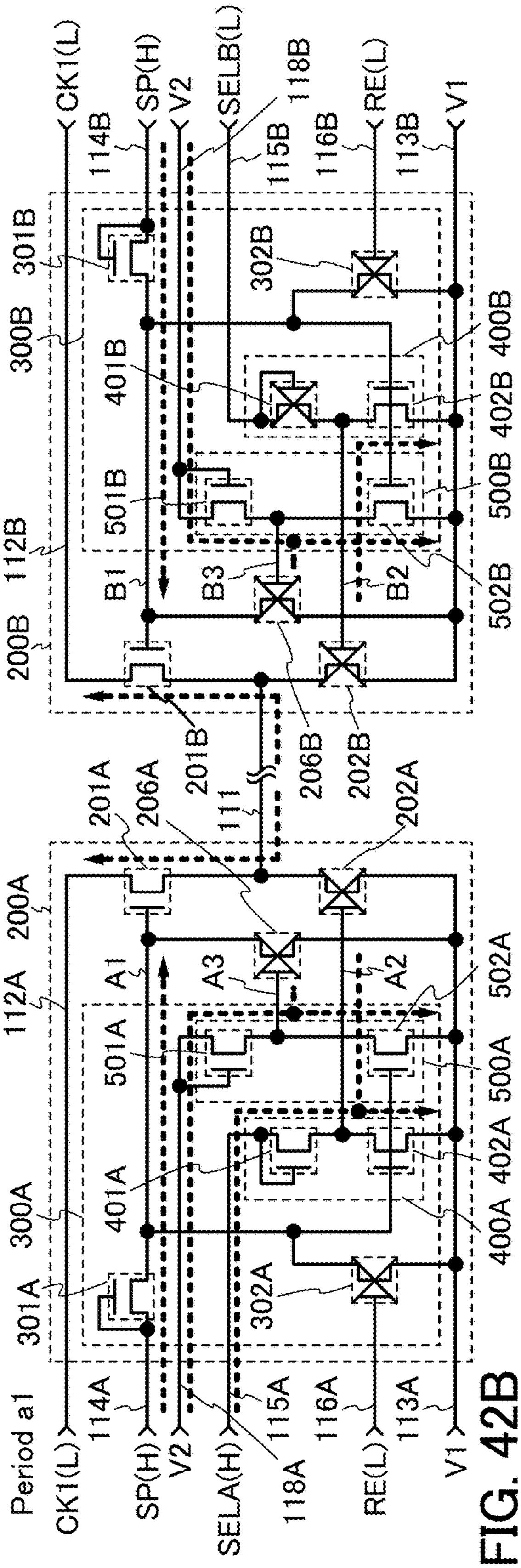
FIGS. 42A and 42B each illustrate an operation example of a semiconductor device.
Figure 42B:
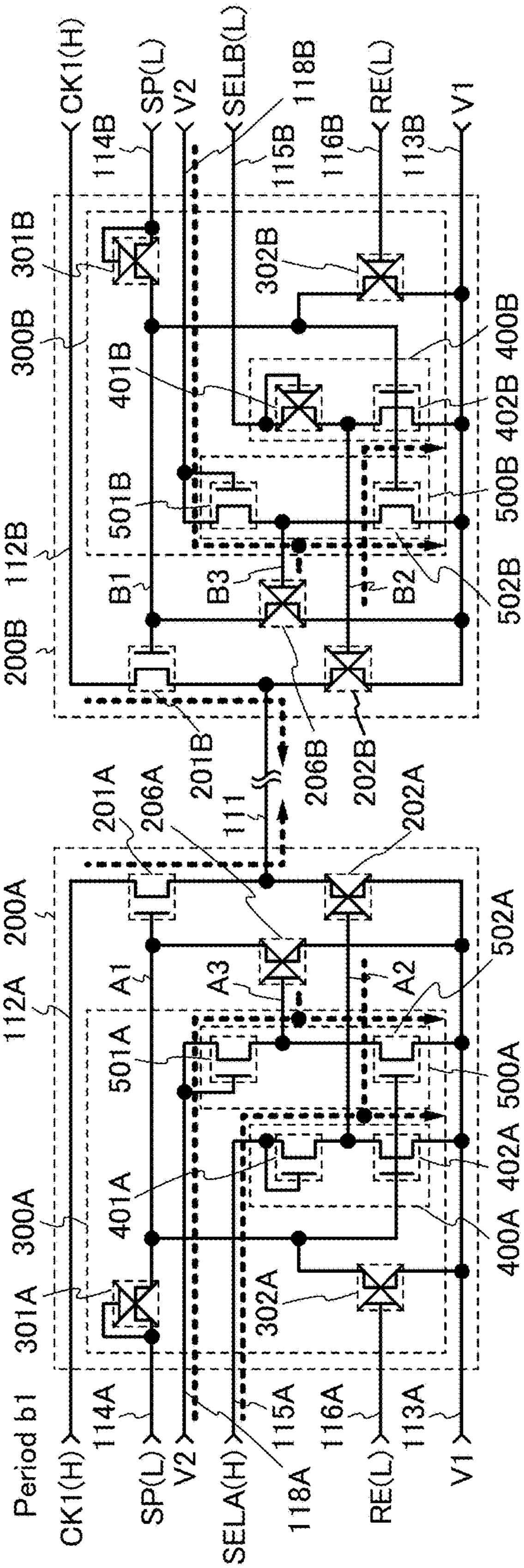
Figure 43A:
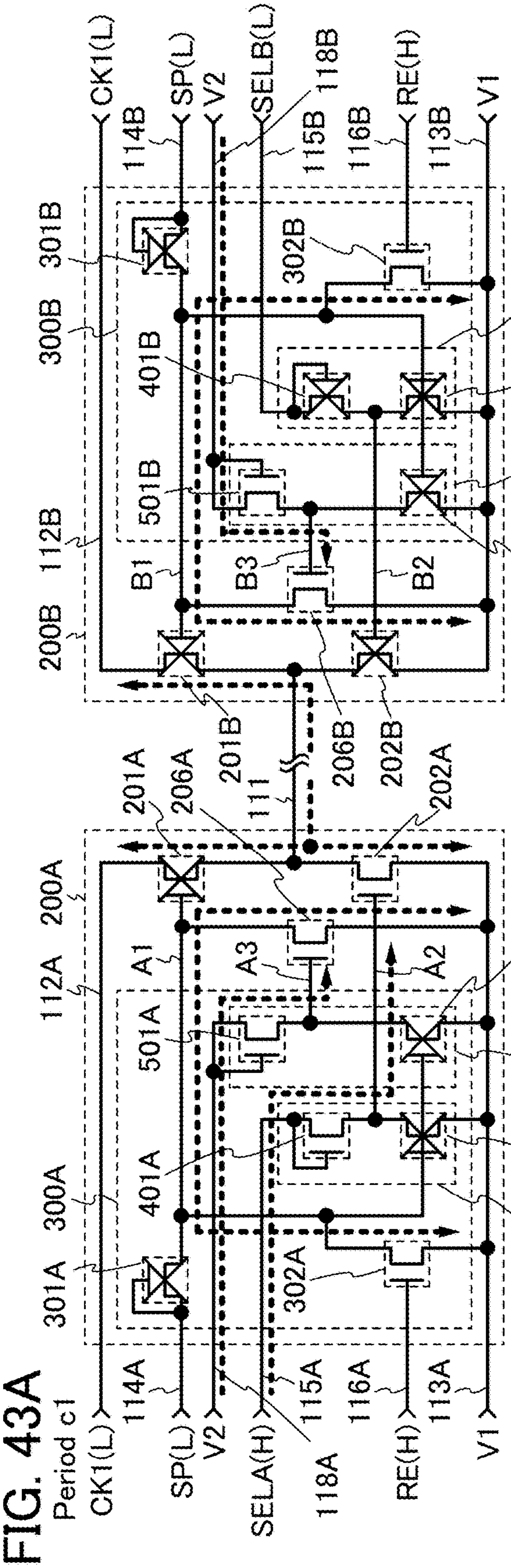
FIGS. 43A and 43B each illustrate an operation example of a semiconductor device.
Figure 43B:
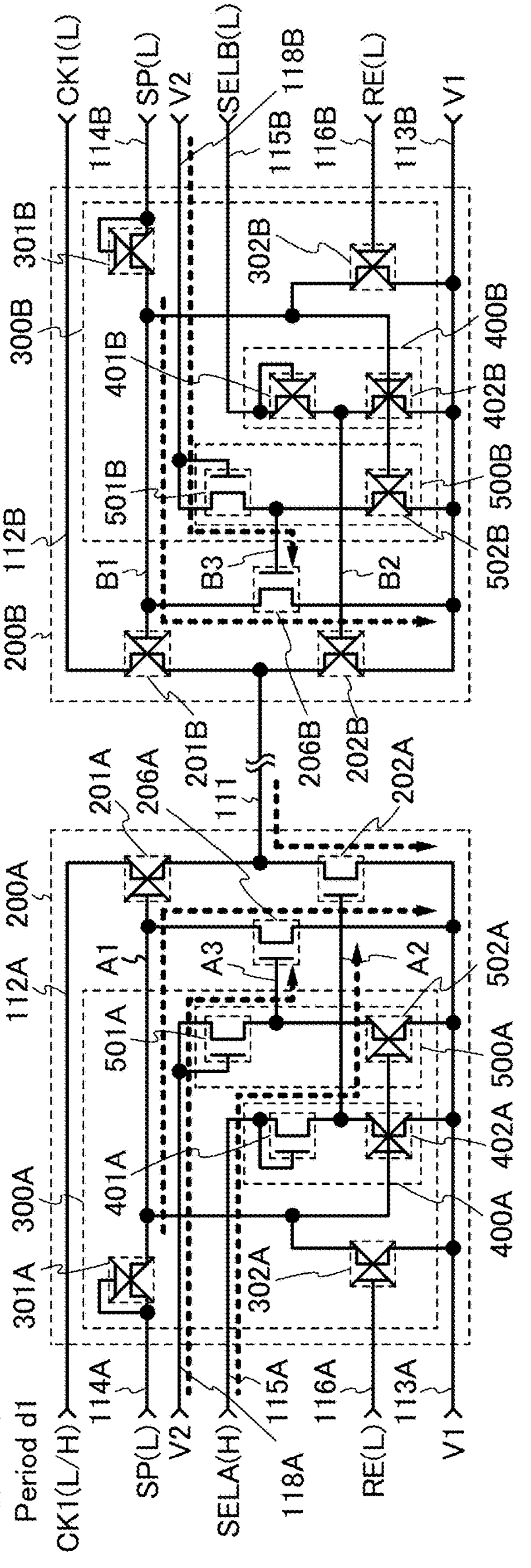
Figure 44A:
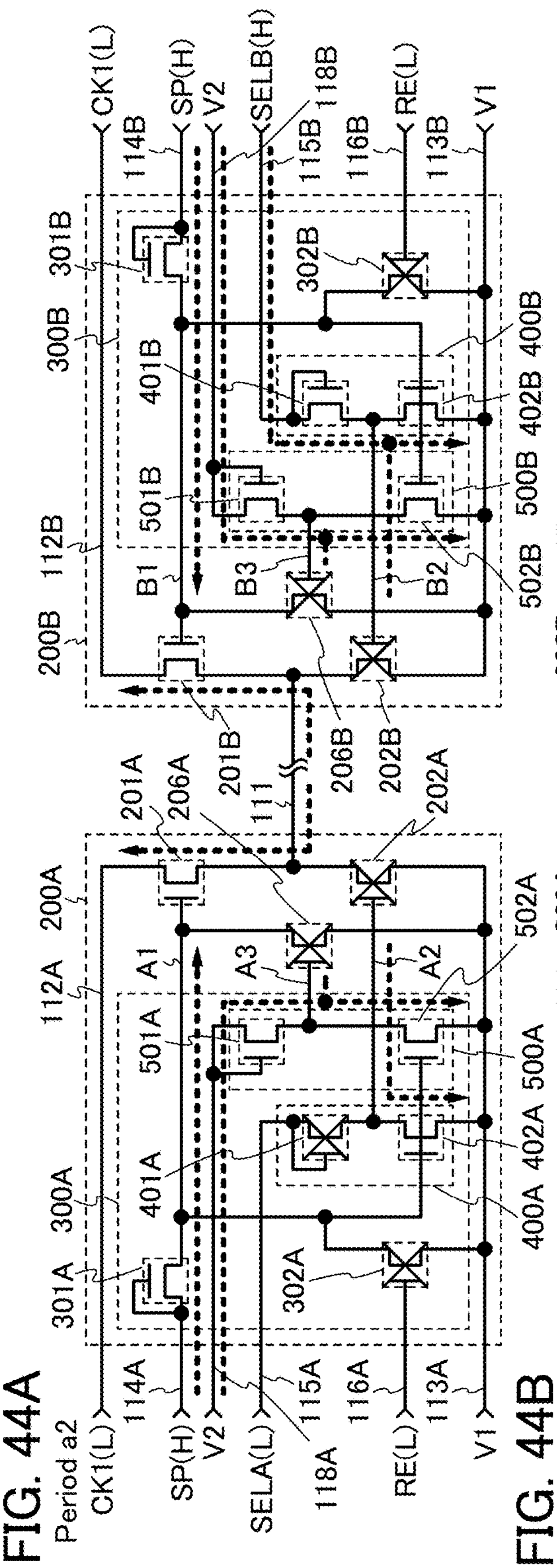
FIGS. 44A and 44B each illustrate an operation example of a semiconductor device.
Figure 44B:
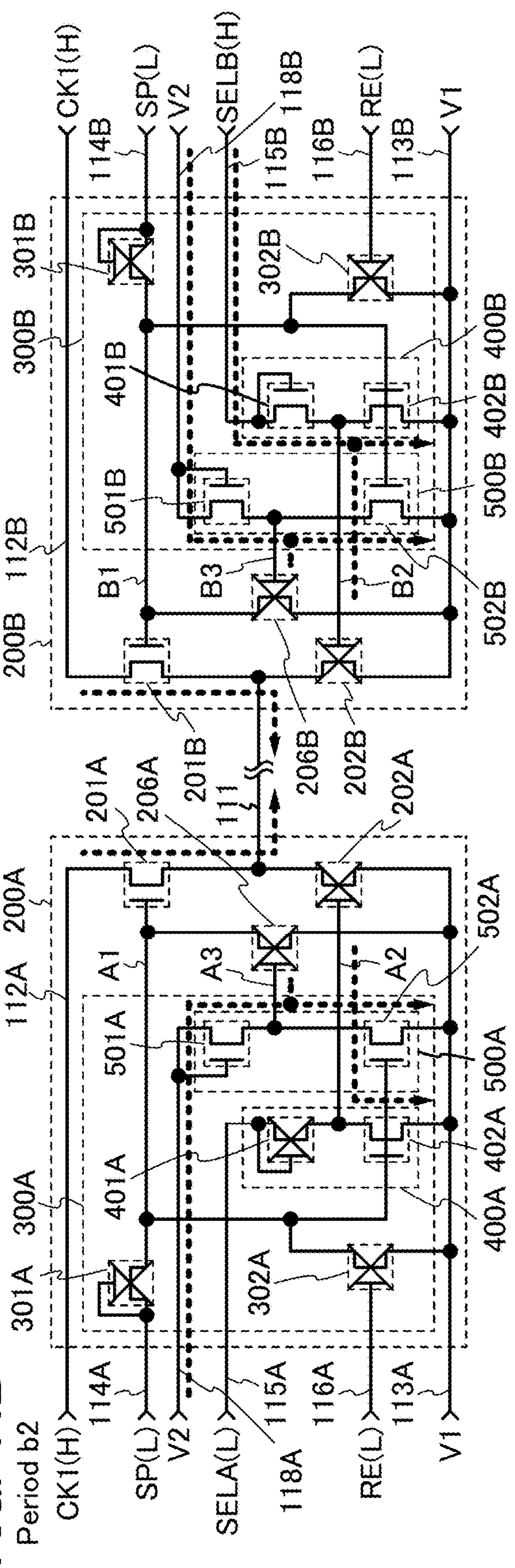
Figure 45A:
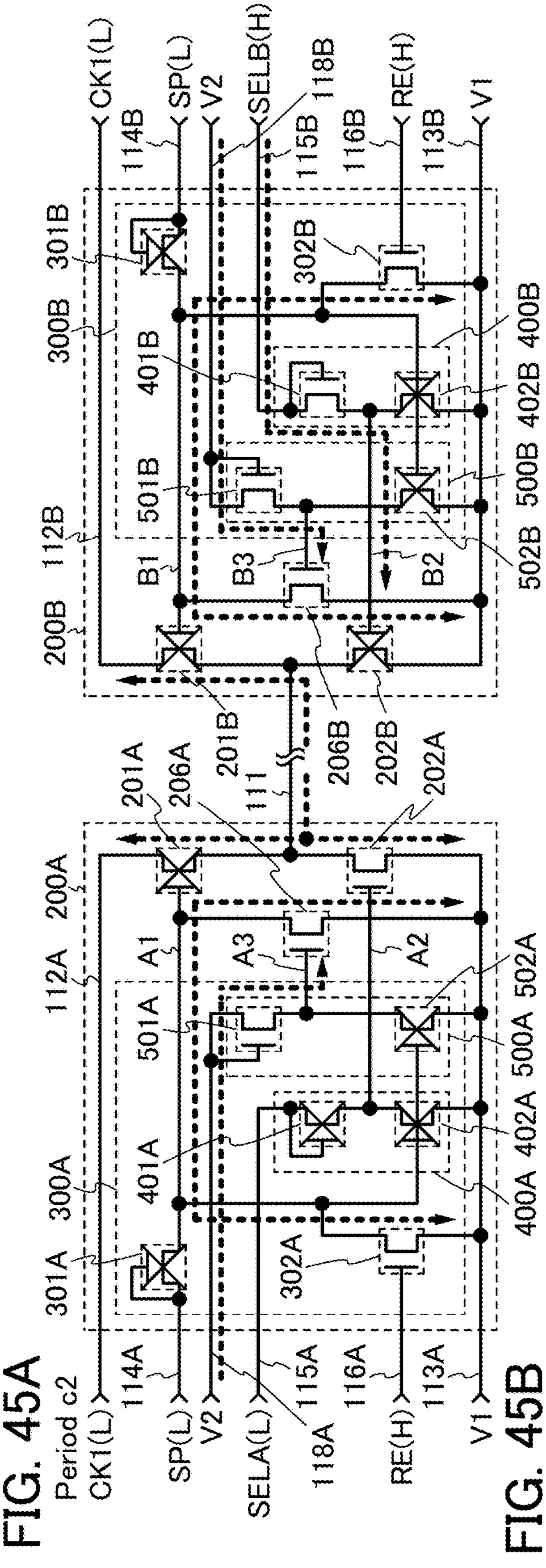
FIGS. 45A and 45B each illustrate an operation example of a semiconductor device.
Figure 45B:
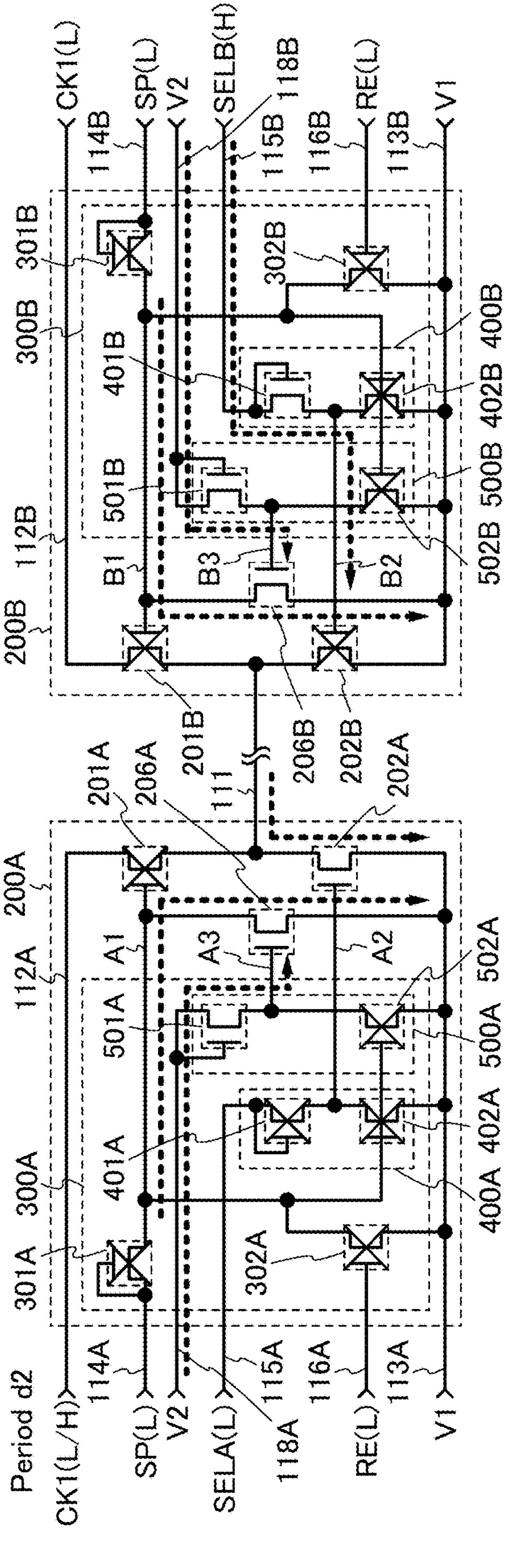

As another example, as illustrated in FIG. 41B, the circuit 500A may be eliminated and the gate of the transistor 206A may be connected to the node A2. In addition, the circuit 500B may be eliminated and the gate of the transistor 206B may be connected to the node B2. With the structure illustrated in FIG. 41B, the size of the circuit can be made smaller, so that the layout area can be decreased or power consumption can be reduced.

Next, examples of the functions of the transistor 206A, the circuit 500A, the transistor 501A, the transistor 502A, the transistor 206B, the circuit 500B, the transistor 501B, and the transistor 502B are described with reference to FIGS. 41A and 41B.

The transistor 206A has a function of controlling the timing of bringing the wiring 113A and the node A1 into conduction. Alternatively, the transistor 206A has a function of controlling the timing of supplying the potential of the wiring 113A to the node A1. Alternatively, the transistor 206A has a function of controlling the timing of supplying a signal, voltage, or the like (e.g., the clock signal CK2 or the voltage V1) which is to be input to the wiring 113A to the node A1. Alternatively, the transistor 206A has a function of controlling the timing of supplying the voltage V1 to the node A1. Alternatively, the transistor 206A has a function of controlling the timing of lowering the potential of the node A1. Alternatively, the transistor 206A has a function of controlling the timing of keeping the potential of the node A1.

In this manner, the transistor 206A functions as a switch. Note that the transistor 206A may be controlled in accordance with the potential of the node A3.

The circuit 500A has a function of controlling the potential of the node A3. Alternatively, the circuit 500A has a function of controlling the timing of supplying a signal, voltage, or the like to the node A3. Alternatively, the circuit 500A has a function of controlling the timing of not supplying a signal, voltage, or the like to the node A3. Alternatively, the circuit 500A has a function of controlling the timing of supplying an H signal or the voltage 12 to the node A3. Alternatively, the circuit 500A has a function of controlling the timing of supplying an L signal or the voltage V1 to the node A3. Alternatively, the circuit 500A has a function of controlling the timing of raising the potential of the node A3. Alternatively, the circuit 500A has a function of controlling the timing of lowering the potential of the node A3. Alternatively, the circuit 500A has a function of controlling the timing of keeping the potential of the node A3. Alternatively, the circuit 500A has a function of inverting the potential of the node A1 and controlling the timing of outputting the inverted potential to the node A3.

As described above, the circuit 500A functions as a control circuit or an inverter circuit. Note that the circuit 500A may be controlled in accordance with the potential of the node A1.

The transistor 501A has a function of controlling the timing of bringing the wiring 118A and the node A3 into conduction. Alternatively, the transistor 501A has a function of controlling the timing of supplying the potential of the wiring 118A to the node A3. Alternatively, the transistor 501A has a function of controlling the timing of supplying a signal, voltage, or the like (e.g., the voltage V2) which is to be input to the wiring 118A to the node A3. Alternatively, the transistor 501A has a function of controlling the timing of not supplying a signal, voltage, or the like to the node A3.

Alternatively, the transistor 501A has a function of controlling the timing of supplying an H signal or the voltage V2 to the node A3. Alternatively, the transistor 501A has a function of controlling the timing of raising the potential of the node A3.

As described above, the transistor 501A functions as a switch, a rectifier element, a diode, a diode-connected transistor, or the like.

The transistor 502A has a function of controlling the timing of bringing the wiring 113A and the node A3 into conduction. Alternatively, the transistor 502A has a function of controlling the timing of supplying the potential of the wiring 113A to the node A3. Alternatively, the transistor 502A has a function of controlling the timing of supplying a signal, voltage, or the like (e.g., the clock signal CK2 or the voltage V1) which is to be input to the wiring 113A to the node A3. Alternatively, the transistor 502A has a function of controlling the timing of supplying the voltage V1 to the node A3. Alternatively, the transistor 502A has a function of controlling the timing of lowering the potential of the node A3. Alternatively, the transistor 502A has a function of controlling the timing of keeping the potential of the node A3.

As described above, the transistor 502A functions as a switch.

The transistor 206B has a function of controlling the timing of bringing the wiring 113B and the node B1 into conduction. Alternatively, the transistor 206B has a function of controlling the timing of supplying the potential of the wiring 113B to the node B1. Alternatively, the transistor 206B has a function of controlling the timing of supplying a signal, voltage, or the like (e.g., the clock signal CK2 or the voltage V1) which is to be input to the wiring 113B to the node B1. Alternatively, the transistor 206B has a function of controlling the timing of supplying the voltage V1 to the node B1. Alternatively, the transistor 206B has a function of controlling the timing of lowering the potential of the node B1. Alternatively, the transistor 206B has a function of controlling the timing of keeping the potential of the node B1.

As described above, the transistor 206B functions as a switch. Note that the transistor 206B may be controlled in accordance with the potential of the node B3.

The circuit 500B has a function of controlling the potential of the node B3. Alternatively, the circuit 500B has a function of controlling the timing of supplying a signal, voltage, or the like to the node B3. Alternatively, the circuit 500B has a function of controlling the timing of not supplying a signal, voltage, or the like to the node B3. Alternatively, the circuit 500B has a function of controlling the timing of supplying an H signal or the voltage 12 to the node B3. Alternatively, the circuit 500B has a function of controlling the timing of supplying an L signal or the voltage V1 to the node B3. Alternatively, the circuit 500B has a function of controlling the timing of raising the potential of the node B3. Alternatively, the circuit 500B has a function of controlling the timing of lowering the potential of the node B3. Alternatively, the circuit 500B has a function of controlling the timing of keeping the potential of the node B3. Alternatively, the circuit 500B has a function of inverting the potential of the node B1 and controlling the timing of outputting the inverted potential to the node 3.

As described above, the circuit 500B functions as a control circuit or an inverter circuit. Note that the circuit 500B may be controlled in accordance with the potential of the node B1.

The transistor 501B has a function of controlling the timing of bringing the wiring 118B and the node B3 into conduction. Alternatively, the transistor 501B has a function of controlling the timing of supplying the potential of the wiring 118B to the node B3. Alternatively, the transistor 501B has a function of controlling the timing of supplying a signal, voltage, or the like (e.g., the voltage 12) which is to be input to the wiring 118B to the node B3. Alternatively, the transistor 501B has a function of controlling the timing of not supplying a signal, voltage, or the like to the node B3. Alternatively, the transistor 501B has a function of controlling the timing of supplying an H signal or the voltage 12 to the node B3. Alternatively, the transistor 501B has a function of controlling the timing of raising the potential of the node B3.

As described above, the transistor 501B functions as a switch, a rectifier element, a diode, a diode-connected transistor, or the like.

The transistor 502B has a function of controlling the timing of bringing the wiring 113B and the node B3 into conduction. Alternatively, the transistor 502B has a function of controlling the timing of supplying the potential of the wiring 113B to the node B3. Alternatively, the transistor 502B has a function of controlling the timing of supplying a signal, voltage, or the like (e.g., the clock signal CK2 or the voltage V1) which is to be input to the wiring 113B to the node B3. Alternatively, the transistor 502B has a function of controlling the timing of supplying the voltage V1 to the node B3. Alternatively, the transistor 502B has a function of controlling the timing of lowering the potential of the node B3. Alternatively, the transistor 502B has a function of controlling the timing of keeping the potential of the node B3.

As described above, the transistor 502B functions as a switch.

<Operation of Semiconductor Device>

Next, the operation of the semiconductor device in FIG. 41A is described with reference to FIGS. 42A and 42B, FIGS. 43A and 43B, FIGS. 44A and 44B, and FIGS. 45A and 45B. FIG. 42A, FIG. 42B, FIG. 43A, FIG. 43B, FIG. 44A, FIG. 44B, FIG. 45A, and FIG. 45B correspond to the schematic views of the semiconductor device in the period a1, the period b1, the period c1, the period d1, the period a2, the period b2, the period c2, and the period d2, respectively.

In the period a1, the period b1, the period a2, and the period b2, the node A1 has an H-level potential. Thus, like the circuit 400A, the circuit 500A outputs an L signal to the node A3. Then, the transistor 206A is turned off, so that the wiring 113A and the node A1 are brought out of conduction.

Specifically, in the period a1, the period b1, the period a2, and the period b2, the transistor 502A is turned on, so that the wiring 113A and the node A3 are brought into conduction. Thus, the voltage V1 is supplied to the node A3 through the transistor 502A. At this time, the transistor 501A is turned on, so that the wiring 118A and the node A3 are brought into conduction. Thus, the voltage V2 is supplied to the node A3 through the transistor 501A.

Here, when the current supply capability of the transistor 502A is made higher than the current supply capability of the transistor 501A (e.g., the channel width of the transistor 502A is made larger than the channel width of the transistor 501A), the potential of the node A3 is set at an L level.

In the period a1, the period b1, the period a2, and the period b2, the node B1 has an H-level potential. Thus, like the circuit 400B, the circuit 500B outputs an L signal to the node B3. Then, the transistor 206B is turned off, so that the wiring 113B and the node B1 are brought out of conduction.

Specifically, in the period a1, the period b1, the period a2, and the period b2, the transistor 502B is turned on, so that the wiring 113B and the node B3 are brought into conduction. Thus, the voltage V1 is supplied to the node B3 through the transistor 502B. At this time, the transistor 501B is turned on, so that the wiring 118B and the node B3 are brought into conduction. Thus, the voltage V2 is supplied to the node B3 through the transistor 501B.

Here, when the current supply capability of the transistor 502B is made higher than the current supply capability of the transistor 501B (e.g., the channel width of the transistor 502B is made larger than the channel width of the transistor 501B), the potential of the node B3 is set at an L level.

In the period c1, the period d1, the period c2, and the period d2, the node A1 has an L-level potential. Thus, like the circuit 400A, the circuit 500A outputs an H signal to the node A3. Then, the transistor 206A is turned on, so that the wiring 113A and the node A1 are brought into conduction. Then, the voltage V1 is supplied to the node A1 through the transistor 206A.

Specifically, in the period c1, the period d1, the period c2, and the period d2, the transistor 502A is turned off, so that the wiring 113A and the node A3 are brought out of conduction. At this time, the transistor 501A is turned on, so that the wiring 118A and the node A3 are brought into conduction. Thus, the voltage V2 is supplied to the node A3 through the transistor 501A.

In addition, in the period c1, the period d1, the period c2, and the period d2, the node B1 has an L-level potential. Thus, like the circuit 400B, the circuit 500B outputs an H signal to the node B3. Then, the transistor 206B is turned on, so that the wiring 113B and the node B1 are brought into conduction. Then, the voltage V1 is supplied to the node B1 through the transistor 206B.

Specifically, in the period c1, the period d1, the period c2, and the period d2, the transistor 502B is turned off, so that the wiring 113B and the node B3 are brought out of conduction. At this time, the transistor 501B is turned on, so that the wiring 118B and the node B3 are brought into conduction. Thus, the voltage V2 is supplied to the node B3 through the transistor 501B.

In this manner, in the period c1 and the period d1, the transistor 206A is turned on, so that the wiring 113A and the node A1 are brought into conduction. Then, the voltage V1 is supplied to the node A1 through the transistor 206A. Thus, the potential of the node A1 can be fixed, so that a semiconductor device which is hardly affected by noise can be obtained.

In addition, in the period c2 and the period d2, the transistor 206B is turned on, so that the wiring 113B and the node B1 are brought into conduction. Then, the voltage V1 is supplied to the node B1 through the transistor 206B. Thus, the potential of the node B1 can be fixed, so that a semiconductor device which is hardly affected by noise can be obtained.

<Size of Transistor>

Next, the size of a transistor, such as the channel width of a transistor or the channel length of a transistor, is described.

It is preferable that the channel width of the transistor 501A be substantially equal to the channel width of the transistor 501B. Alternatively, it is preferable that the channel width of the transistor 502A be substantially equal to the channel width of the transistor 502B.

By making the transistors have substantially the same channel width in this manner, the transistors can have substantially the same current supply capability or substantially the same degree of deterioration. Accordingly, even when transistors which are selected are switched, the waveforms of output signals OUT can be substantially the same.

From a similar reason, it is preferable that the channel length of the transistor 501A be substantially equal to the channel length of the transistor 501B. Alternatively, it is preferable that the channel length of the transistor 502A be substantially equal to the channel length of the transistor 502B.

Specifically, each of the channel width of the transistor 501A and the channel width of the transistor 501B is preferably 100 to 2000 μm, more preferably 200 to 1500 μm, still more preferably 300 to 700 μm.

Each of the channel width of the transistor 502A and the channel width of the transistor 502B is preferably 300 to 3000 μm, more preferably 500 to 2000 μm, still more preferably 700 to 1500 μm.

Note that in the structures illustrated in FIG. 31B, FIG. 36A, FIGS. 37A and 37B, FIGS. 38A and 38B, FIGS. 39A to 39F, FIGS. 40A to 40D, and FIGS. 41A and 41B, the second terminal of the transistor 302A may be connected to the wiring 111, and the second terminal of the transistor 302B may be connected to the wiring 111. Alternatively, a transistor for obtaining such a connection relationship may be provided. With such a structure, the fall time of the signal OUTA and the fall time of the signal OUTB can be shortened.

Alternatively, in the structures illustrated in FIG. 31B, FIG. 36A, FIGS. 37A and 37B, FIGS. 38A and 38B, FIGS. 39A to 39F, FIGS. 40A to 40D, and FIGS. 41A and 41B, the first terminal of the transistor 302A may be connected to the wiring 118A; the second terminal of the transistor 302A may be connected to the node A2; the gate of the transistor 302A may be connected to the wiring 116A. In addition, the first terminal of the transistor 302B may be connected to the wiring 118B; the second terminal of the transistor 302B may be connected to the node B2; the gate of the transistor 302B may be connected to the wiring 116B. Alternatively, a transistor for obtaining such a connection relationship may be provided. With such a structure, reverse bias can be applied to the transistor 302A and the transistor 302B, so that deterioration of each transistor can be suppressed.

Figure 36B:
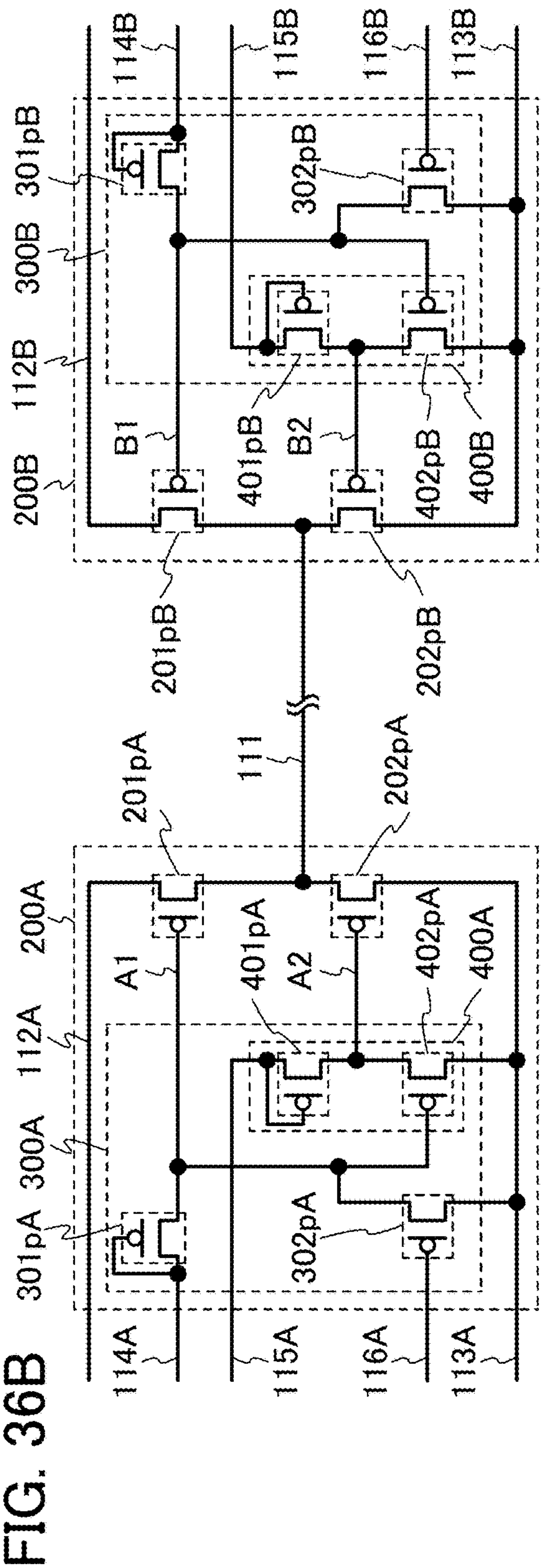

Note that in the structures illustrated in FIG. 31B, FIG. 36A, FIGS. 37A and 37B, FIGS. 38A and 38B, FIGS. 39A to 39F, FIGS. 40A to 40D, and FIGS. 41A and 41B, as illustrated in FIG. 36B, the transistors may be p-channel transistors.

In FIG. 36B, a transistor 201*p*A, a transistor 202*p*A, a transistor 301*p*A, a transistor 302*p*A, a transistor 401*p*A, and a transistor 402*p*A are p-channel transistors and have functions that are similar to the functions of the transistor 201A, the transistor 202A, the transistor 301A, the transistor 302A, the transistor 401A, and the transistor 402A in FIG. 36A, respectively.

Further, in FIG. 36B, a transistor 201*p*B, a transistor 202*p*B, a transistor 301*p*B, a transistor 302*p*B, a transistor 401*p*B, and a transistor 402*p*B are p-channel transistors and have functions that are similar to the functions of the transistor 201B, the transistor 202B, the transistor 301B, the transistor 302B, the transistor 401B, and the transistor 402B in FIG. 36A, respectively.

Note that in the case where the transistors are p-channel transistors, the voltage V1 is supplied to the wiring 113A and the wiring 113B. In that case, a timing chart illustrating the signal OUTA, the signal OUTB, the clock signal CK1, the start signal SP, the reset signal RE, the signal SELA, the signal SELB, the potential of the node A1, the potential of the node A2, the potential of the node B1, and the potential of the node B2 corresponds to inversion of the timing chart in FIG. 17.

Embodiment 6

In this embodiment, gate driver circuits (also referred to as gate drivers) and display devices including the gate driver circuits are described with reference to FIGS. 46A to 46E, FIG. 47, FIG. 48, and FIG. 49.

<Structure of Display Device>

Structure examples of display devices are described with reference to FIGS. 46A to 46D. The display devices in FIGS. 46A to 46D include a circuit 1001, a circuit 1002, a circuit 1003_1, a circuit 1003_2, a pixel portion 1004, and a terminal 1005.

A plurality of wirings which extend from the circuit 1003_1 and the circuit 1003_2 are arranged over the pixel portion 1004. The plurality of wirings function as gate lines (also referred to as gate signal lines), scan lines, or signal lines. In addition, a plurality of wirings which extend from the circuit 1002 are arranged over the pixel portion 1004. The plurality of wirings function as video signal lines, data lines, signal lines, or source lines (also referred to as source signal lines). Pixels are provided so as to correspond to the plurality of wirings extending from the circuit 1003_1 and the circuit 1003_2 and the plurality of wirings extending from the circuit 1002.

In addition to the above wirings, a wiring functioning as a power supply line, a capacitor line, or the like may be provided over the pixel portion 1004.

The circuit 1001 has a function of controlling the timing of supplying a signal, voltage, current, or the like to the circuit 1002, the circuit 1003_1, and the circuit 1003_2. Alternatively, the circuit 1001 has a function of controlling the circuit 1002, the circuit 1003_1, and the circuit 1003_2. As described above, the circuit 1001 functions as a controller, a control circuit, a timing generator, a power supply circuit, or a regulator.

The circuit 1002 has a function of controlling the timing of supplying a video signal to the pixel portion 1004. Alternatively, the circuit 1002 has a function of controlling the luminance, transmittance, or the like of a pixel included in the pixel portion 1004. As described above, the circuit 1002 functions as a source driver circuit or a signal line driver circuit.

The circuit 1003_1 has a function that is similar to the function of the circuit 10A, the circuit 100A, or the circuit 200A described in the above embodiments. In addition, the circuit 1003_2 has a function that is similar to the function of the circuit 10B, the circuit 100B, or the circuit 200B described in the above embodiments. As described above, the circuit 1003_1 and the circuit 1003_2 each function as a gate driver circuit.

Figure 46A:
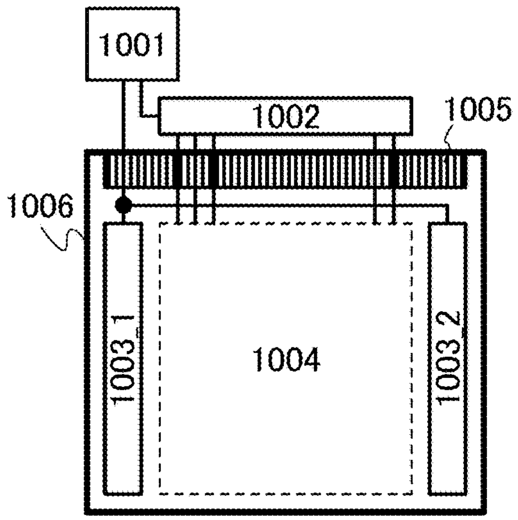
FIGS. 46A to 46D each illustrate a structure example of a display device.
Figure 46B:
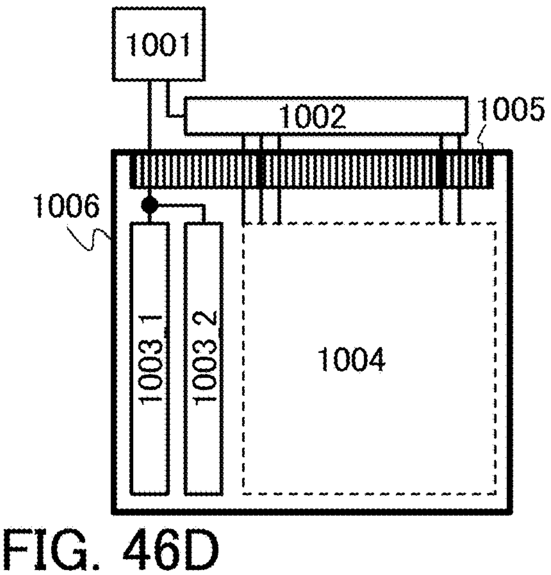

Note that as illustrated in FIGS. 46A and 46B, the circuit 1001 and the circuit 1002 may be formed using a substrate which is different from a substrate 1006 over which the pixel portion 1004 is formed (e.g., a semiconductor substrate or an SOI substrate). In addition, the circuit 1003_1 and the circuit 1003_2 may be formed using the same substrate as the pixel portion 1004.

In the case where the drive frequency of the circuit 1003_1 and the circuit 1003_2 is lower than the drive frequency of the circuit 1001 and the circuit 1002, transistors whose mobility is low may be used as transistors included in the circuit 1003_1 and the circuit 1003_2. Thus, a non-single-crystal semiconductor (e.g., an amorphous semiconductor or a microcrystalline semiconductor), an organic semiconductor, or an oxide semiconductor can be used for semiconductor layers of the transistors included in the circuit 1003_1 and the circuit 1003_2. Accordingly, when a semiconductor device is manufactured, the number of steps can be reduced, yield can be increased, or cost can be reduced. In addition, in the case where the semiconductor device in this embodiment is used for a display device, a method for manufacturing a semiconductor device is facilitated, so that the size of the display device can be increased.

Figure 46C:
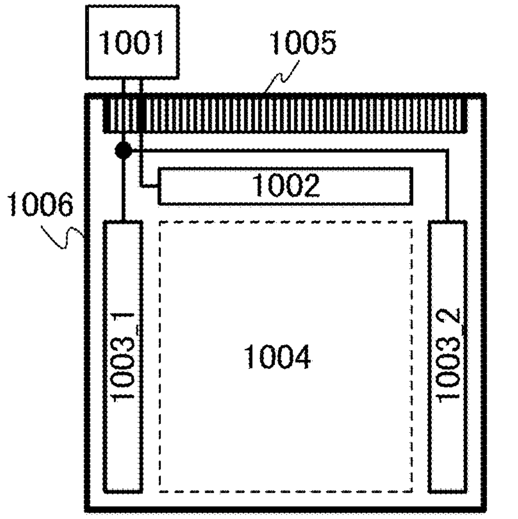
Figure 46D:
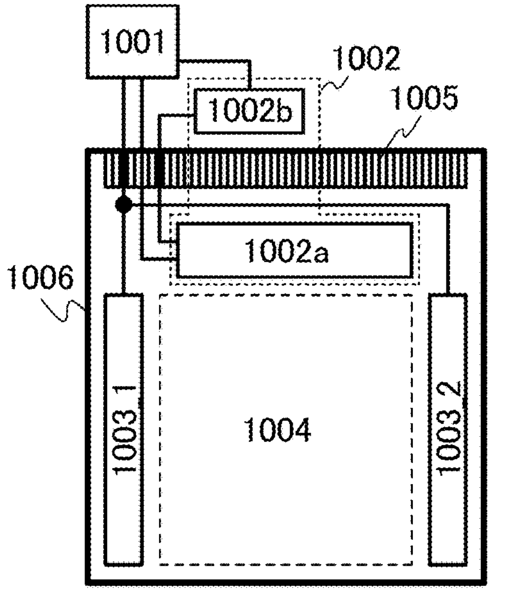

Note that as illustrated in FIGS. 46A, 46C, and 46D, the circuit 1003_1 and the circuit 1003_2 may face each other with the pixel portion 1004 provided therebetween. For example, as illustrated in FIG. 46A, the circuit 1003_1 is provided on the left side of the pixel portion 1004 and the circuit 1003_2 is provided on the right side of the pixel portion 1004. Alternatively, as illustrated in FIG. 46B, the circuit 1003_1 and the circuit 1003_2 may be provided on the same side (e.g., the left side or the right side) of the pixel portion 1004.

Note that in the structures illustrated in FIGS. 46A and 46B, as illustrated in FIG. 46C, the circuit 1002 may be provided over the same substrate 1006 as the pixel portion 1004.

Note that in the structures illustrated in FIGS. 46A to 46C, as illustrated in FIG. 46D, part of the circuit 1002 (e.g., a circuit 1002*a*) may be provided over the substrate 1006 over which the pixel portion 1004 is provided, and another part of the circuit 1002 (e.g., a circuit 1002*b*) may be provided over a substrate which is different from the substrate 1006. In that case, as the circuit 1002*a*, a circuit with comparatively low drive frequency, such as a switch, a shift register, or a selector, is preferably used.

Figure 46E:
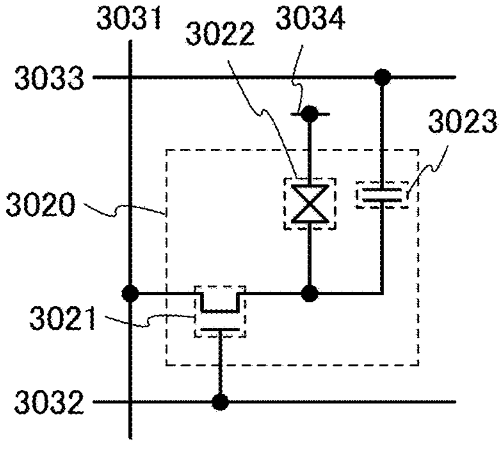
FIG. 46E illustrates a structure example of a pixel.

Next, a pixel included in the pixel portion of the display device is described with reference to FIG. 46E. FIG. 46E illustrates a structure example of a pixel.

A pixel 3020 includes a transistor 3021, a liquid crystal element 3022, and a capacitor 3023. A first terminal of the transistor 3021 is connected to a wiring 3031. A second terminal of the transistor 3021 is connected to one electrode of the liquid crystal element 3022 and one electrode of the capacitor 3023. A gate of the transistor 3021 is connected to a wiring 3032. The other electrode of the liquid crystal element 3022 is connected to an electrode 3034. The other electrode of the capacitor 3023 is connected to a wiring 3033.

A video signal is input from the circuit 1002 illustrated in FIGS. 46A to 46D to the wiring 3031. Thus, the wiring 3031 functions as a signal line, a video signal line, or a source line (also referred to as a source signal line).

A gate signal, a scan signal, or a selection signal is input from the circuit 1003_1 and the circuit 1003_2 illustrated in FIGS. 46A to 46D to the wiring 3032. Thus, the wiring 3032 functions as a gate line (also referred to as a gate signal line), a scan line, or a signal line.

Constant voltage is supplied from the circuit 1001 illustrated in FIGS. 46A to 46D to the wiring 3033 and the electrode 3034. Thus, the wiring 3033 functions as a power supply line or a capacitor line. Further, the electrode 3034 functions as a common electrode or a counter electrode.

Note that precharge voltage may be supplied to the wiring 3031. The level of the precharge voltage is preferably set substantially equal to the level of the voltage supplied to the electrode 3034. Alternatively, a signal may be input to the wiring 3033. In this manner, voltage applied to the liquid crystal element 3022 is controlled, so that the amplitude of a video signal can be decreased and inversion driving can be performed. Alternatively, a signal is input to the electrode 3034, so that frame inversion driving can be performed.

The transistor 3021 has a function of controlling the timing of bringing the wiring 3031 and the one electrode of the liquid crystal element 3022 into conduction. Alternatively, the transistor 3021 has a function of controlling the timing of writing a video signal to a pixel. In this manner, the transistor 3021 functions as a switch.

The capacitor 3023 has a function of holding a difference between the potential of the one electrode of the liquid crystal element 3022 and the potential of the wiring 3033. Alternatively, the capacitor 3023 has a function of holding voltage applied to the liquid crystal element 3022 so that the level of the voltage is constant. In this manner, the capacitor 3023 functions as a storage capacitor.

<Structure of Shift Register>

Figure 47:
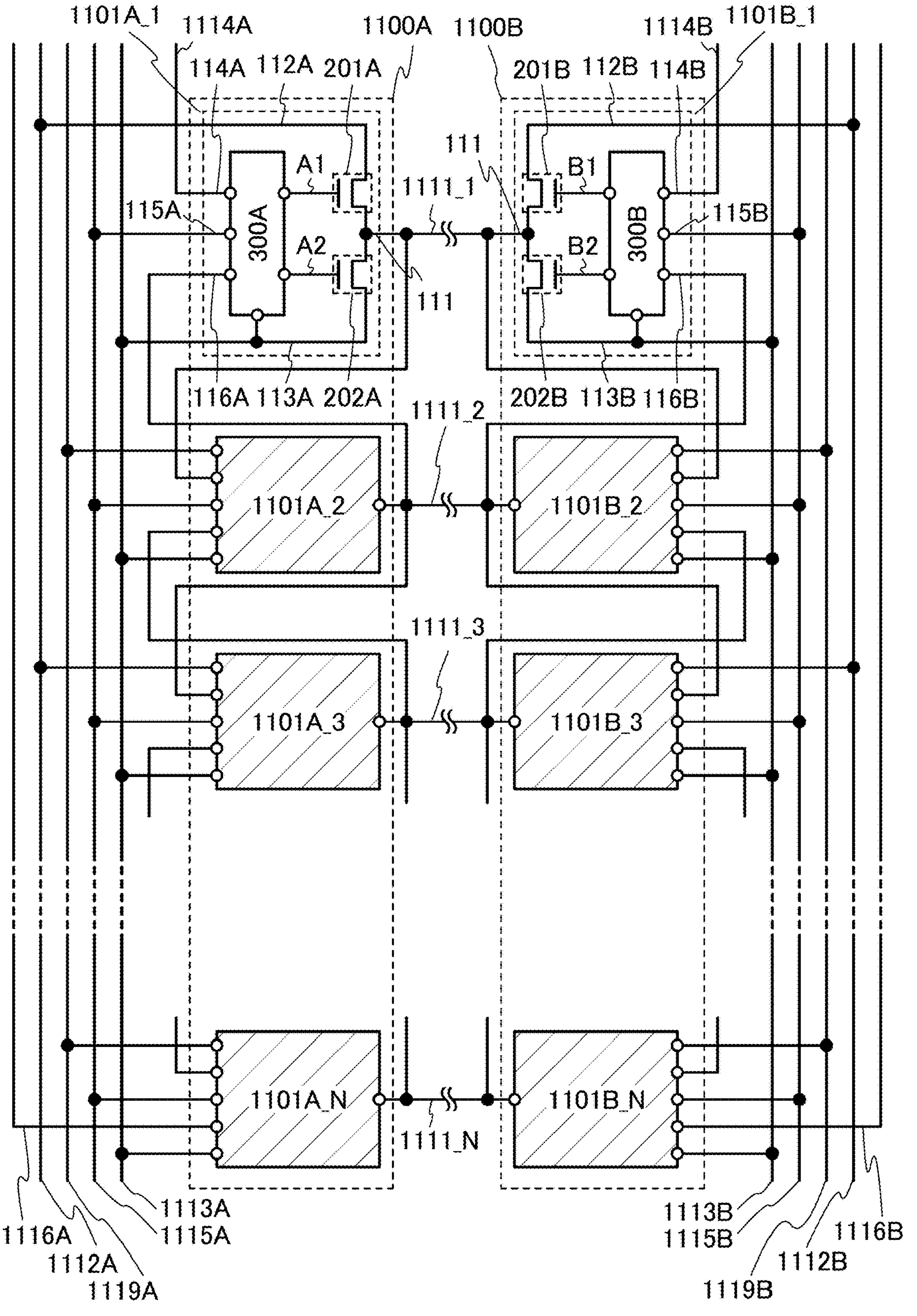
FIG. 47 illustrates an example of a circuit diagram of a shift register.
Figure 48:
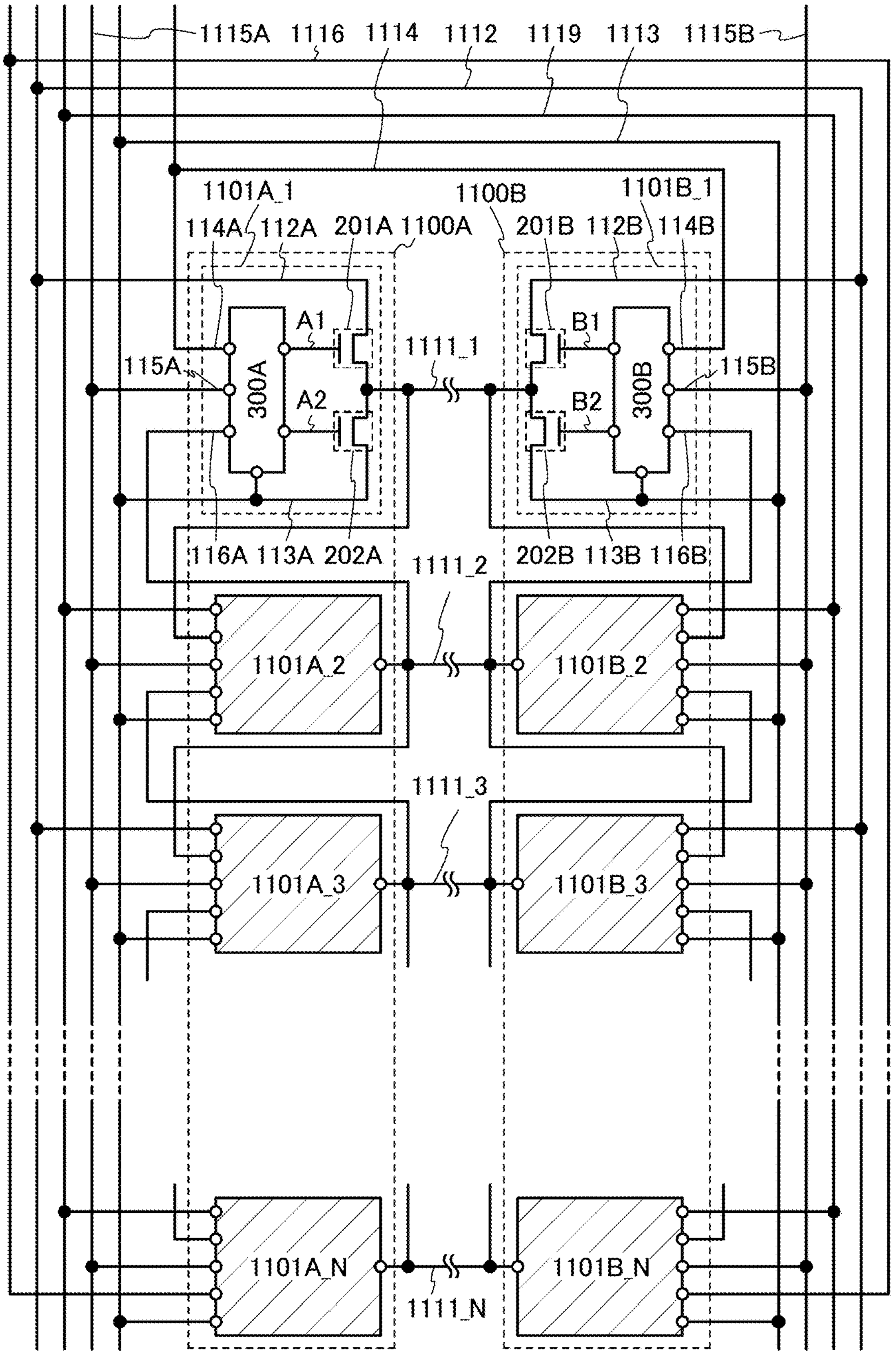
FIG. 48 illustrates an example of a circuit diagram of a shift register.

Next, the structure of the gate driver circuit included in the display device is described below. Specifically, the structure of a shift register included in the gate driver circuit is described with reference to FIG. 47 and FIG. 48. FIG. 47 and FIG. 48 are examples of a circuit diagram of the shift register.

In FIG. 47, a shift register 1100A includes a plurality of flip-flop circuits 1101A_1 to 1101A_N (Nis a natural number). Note that the circuit 200A included in the semiconductor device illustrated in FIG. 16A can be used for each of the flip-flop circuits 1101A_1 to 1101A_N illustrated in FIG. 47.

In addition, a shift register 1100B includes a plurality of flip-flop circuits 1101B_1 to 1101B_N (Nis a natural number). Note that the circuit 200B included in the semiconductor device illustrated in FIG. 16A can be used for each of the flip-flop circuits 1101B_1 to 1101B_N illustrated in FIG. 47.

The shift register 1100A is connected to wirings 1111_1 to 1111_N, a wiring 1112A, a wiring 1113A, a wiring 1114A, a wiring 1115A, a wiring 1116A, and a wiring 1119A. In a flip-flop 1101A_i (i is any one of 1 to N), the wiring 111, the wiring 112A, the wiring 113A, the wiring 114A, the wiring 115A, and the wiring 116A are connected to the wiring 1111_$i$, the wiring 1112A, the wiring 1113A, a wiring 1111_$i$−1, the wiring 1115A, and a wiring 1111_$i$+1, respectively.

Note that in the case where the wiring 112A is connected to one of the wiring 1112A and the wiring 1119A, a portion to which the wiring 112A is connected may be changed between a flip-flop circuit in an odd-numbered stage and a flip-flop circuit in an even-numbered stage.

In addition, the shift register 1100B is connected to the wirings 1111_1 to 1111_N, a wiring 1112B, a wiring 1113B, a wiring 1114B, a wiring 1115B, a wiring 1116B, and a wiring 1119B. In a flip-flop 1101B_i (i is any one of 1 to N), the wiring 111, the wiring 112B, the wiring 113B, the wiring 114B, the wiring 115B, and the wiring 116B are connected to the wiring 1111_$i$, the wiring 1112B, the wiring 1113B, the wiring 1111_$i$−1, the wiring 1115B, and the wiring 1111_$i$+1, respectively.

Note that in the case where the wiring 112B is connected to one of the wiring 1112B and the wiring 1119B, a portion to which the wiring 112B is connected may be changed between a flip-flop circuit in an odd-numbered stage and a flip-flop circuit in an even-numbered stage.

The shift register 1100A outputs signals GOUTA_1 to GOUTA_N to the wirings 1111_1 to 1111_N. The signals GOUTA_1 to GOUTA_N are signals output from the flip-flops 1101A_1 to 1101A_N, respectively, and correspond to the signal OUTA. The shift register 1100B outputs signals GOUTB_1 to GOUTB_N to the wirings 1111_1 to 1111_N. The signals GOUTB_1 to GOUTB_N are signals output from the flip-flops 1101B_1 to 1101B_N, respectively, and correspond to the signal OUTB. Thus, the wirings 1111_1 to 1111_N have a function that is similar to the function of the wiring 111.

The signal GCK1 is input to the wiring 1112A and the wiring 1112B, and the signal GCK2 is input to the wiring 1119A and the wiring 1119B. The signal GCK1 and the signal GCK2 correspond to the clock signal CK1 and the clock signal CK2, respectively. Thus, the wiring 1112A and wiring 1119A have a function that is similar to the function of the wiring 112A, and the wiring 1112B and wiring 1119B have a function that is similar to the function of the wiring 112B.

The voltage V1 is supplied to the wiring 1113A and the wiring 1113B. Thus, the wiring 1113A has a function that is similar to the function of the wiring 113A, and the wiring 1113B has a function that is similar to the function of the wiring 113B.

Signals GSP are input to the wiring 1114A and the wiring 1114B. The signal GSP corresponds to the start signal SP. Thus, the wiring 1114A has a function that is similar to the function of the wiring 114A, and the wiring 1114B has a function that is similar to the function of the wiring 114B.

The signal SELA is input to the wiring 1115A, and the signal SELB is input to the wiring 1115B. Thus, the wiring 1115A has a function that is similar to the function of the wiring 115A, and the wiring 1115B has a function that is similar to the function of the wiring 115B.

Signals GRE are input to the wiring 1116A and the wiring 1116B. The signal GRE corresponds to the reset signal RE. Thus, the wiring 1116A has a function that is similar to the function of the wiring 116A, and the wiring 1116B has a function that is similar to the function of the wiring 116B.

Note that in the case where the same signal or the same voltage is input to the wiring 1112A and the wiring 1112B, the wiring 1112A and the wiring 1112B may be connected to each other. In that case, as illustrated in FIG. 48, one wiring (one wiring 1112) may be used as the wiring 1112A and the wiring 1112B. Alternatively, different signals or different voltages may be input to the wiring 1112A and the wiring 1112B.

In the case where the same signal or the same voltage is input to the wiring 1113A and the wiring 1113B, the wiring 1113A and the wiring 1113B may be connected to each other. In that case, as illustrated in FIG. 48, one wiring (one wiring 1113) may be used as the wiring 1113A and the wiring 1113B. Alternatively, different signals or different voltages may be input to the wiring 1113A and the wiring 1113B.

In the case where the same signal or the same voltage is input to the wiring 1114A and the wiring 1114B, the wiring 1114A and the wiring 1114B may be connected to each other. In that case, as illustrated in FIG. 48, one wiring (one wiring 1114) may be used as the wiring 1114A and the wiring 1114B. Alternatively, different signals or different voltages may be input to the wiring 1114A and the wiring 1114B.

In the case where the same signal or the same voltage is input to the wiring 1116A and the wiring 1116B, the wiring 1116A and the wiring 1116B may be connected to each other. In that case, as illustrated in FIG. 48, one wiring (one wiring 1116) may be used as the wiring 1116A and the wiring 1116B. Alternatively, different signals or different voltages may be input to the wiring 1116A and the wiring 1116B.

In the case where the same signal or the same voltage is input to the wiring 1119A and the wiring 1119B, the wiring 1119A and the wiring 1119B may be connected to each other.

In that case, as illustrated in FIG. 48, one wiring (one wiring 1119) may be used as the wiring 1119A and the wiring 1119B. Alternatively, different signals or different voltages may be input to the wiring 1119A and the wiring 1119B.

<Operation of Shift Register>

Figure 49:
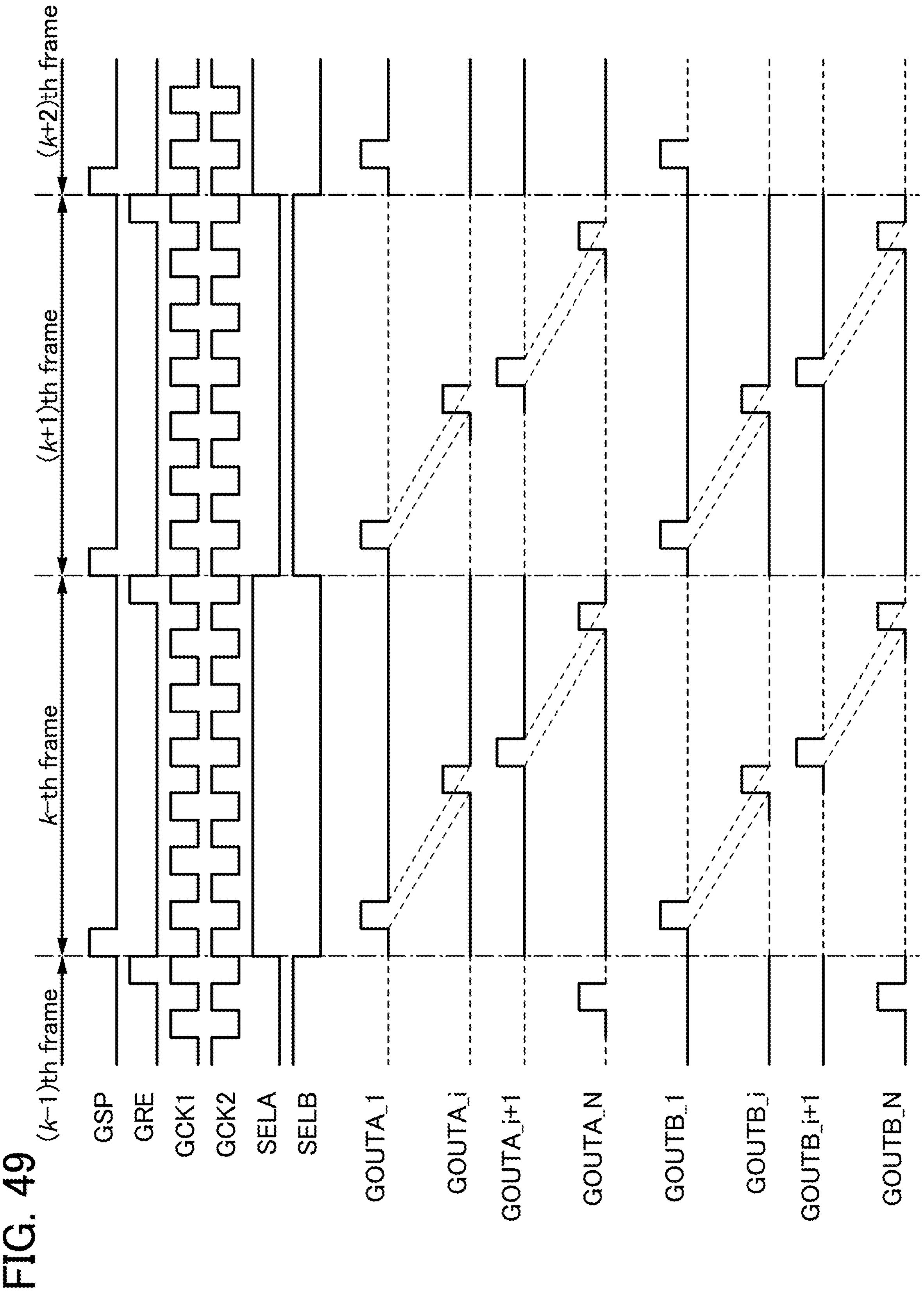
FIG. 49 is a timing chart illustrating an operation example of a shift register.

An operation example of the shift register is described with reference to FIG. 49. FIG. 49 is a timing chart illustrating the operation example of the shift register. FIG. 49 illustrates the signal GCK1, the signal GCK2, the signal GSP, the signal GRE, the signal SELA, the signal SELB, the signals GOUTA_1 to GOUTA_N, and the signals GOUTB_1 to GOUTB_N.

First, the operation of the flip-flop 1101A_i in a k-th (k is a natural number) frame and the operation of the flip-flop 1101B_i in a (k−1)th frame are described.

First, the signal GOUTA_i−1 and the signal GOUTB_i are set at an H level. Then, the flip-flop 1101A_i and the flip-flop 1101B_i start the operation in the period a1 described in Embodiment 4. Thus, the flip-flop 1101A_i outputs an L signal to the wiring 1111_*i*, and the flip-flop 1101B_i outputs an L signal to the wiring 1111_*i*.

Then, when the signal GCK1 and the signal GCK2 are inverted, the flip-flop 1101A_i and the flip-flop 1101B_i start the operation in the period b1 described in Embodiment 4. Thus, the flip-flop 1101A_i outputs an H signal to the wiring 1111_*i*, and the flip-flop 1101B_i outputs an H signal to the wiring 1111_*i*.

Then, when the signal GCK1 and the signal GCK2 are inverted again, the signal GOUTA_i+1 and the signal GOUTB_i+1 are set at an H level. After that, the flip-flop 1101A_i and the flip-flop 1101B_i start the operation in the period c1 described in Embodiment 4. Thus, the flip-flop 1101A_i outputs an L signal to the wiring 1111_*i*, and the flip-flop 1101B_i outputs no signal to the wiring 1111_*i*.

Then, until the signal GOUTA_i−1 and the signal GOUTB_i are set at an H level again, the flip-flop 1101A_i and the flip-flop 1101B_i perform the operation in the period d1 described in Embodiment 4. Thus, the flip-flop 1101A_i outputs an L signal to the wiring 1111_*i*, and the flip-flop 1101B_i outputs no signal to the wiring 1111_*i*.

First, the operation of the flip-flop 1101A_i in a (k+1)th frame and the operation of the flip-flop 1101B_i in the k-th frame are described.

First, the signal GOUTA_i−1 and the signal GOUTB_i are set at an H level. Then, the flip-flop 1101A_i and the flip-flop 1101B_i start the operation in the period a2 described in Embodiment 4. Thus, the flip-flop 1101A_i outputs an L signal to the wiring 1111_*i*, and the flip-flop 1101B_i outputs an L signal to the wiring 1111_*i*.

Then, when the signal GCK1 and the signal GCK2 are inverted, the flip-flop 1101A_i and the flip-flop 1101B_i start the operation in the period b2 described in Embodiment 4. Thus, the flip-flop 1101A_i outputs an H signal to the wiring 1111_*i*, and the flip-flop 1101B_i outputs an H signal to the wiring 1111_*i*.

Then, when the signal GCK1 and the signal GCK2 are inverted again, the signal GOUTA_i+1 and the signal GOUTB_i+1 are set at an H level. After that, the flip-flop 1101A_i and the flip-flop 1101B_i start the operation in the period c2 described in Embodiment 4. Thus, the flip-flop 1101A_i outputs no signal to the wiring 1111_*i*, and the flip-flop 1101B_i outputs an L signal to the wiring 1111_*i*.

Then, until the signal GOUTA_i−1 and the signal GOUTB_i are set at an H level again, the flip-flop 1101A_i and the flip-flop 1101B_i perform the operation in the period d2 described in Embodiment 4. Thus, the flip-flop 1101A_i outputs no signal to the wiring 1111_*i*, and the flip-flop 1101B_i outputs an L signal to the wiring 1111_*i*.

Embodiment 7

In this embodiment, a source driver circuit (also referred to as a source driver) is described with reference to FIGS. 50A to 50D.

Figure 50A:
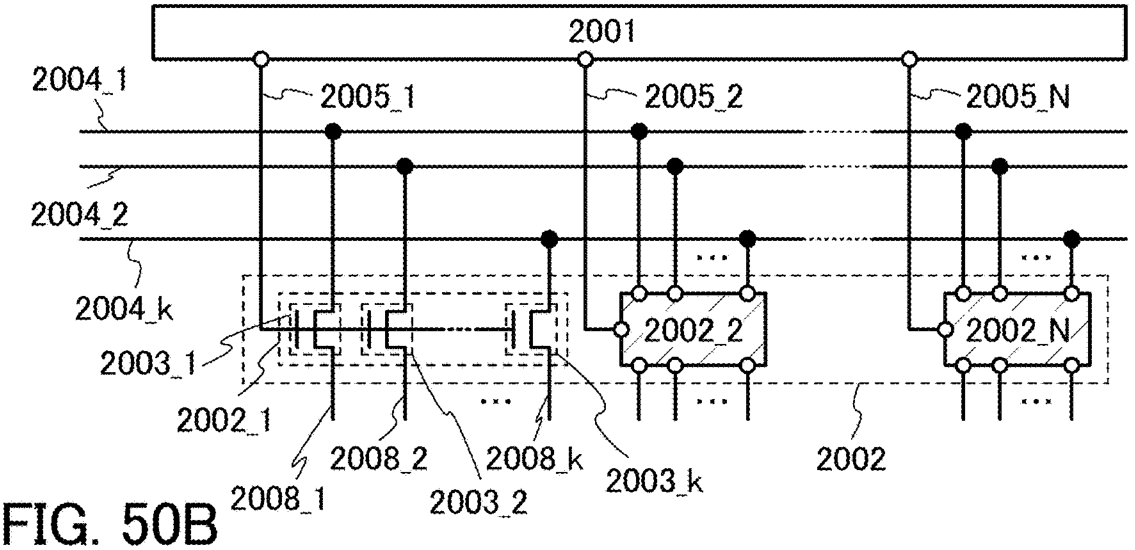
FIGS. 50A, 50C, and 50D each illustrate a structure example of a source driver circuit.

FIG. 50A illustrates a structure example of a source driver circuit. The source driver circuit includes a circuit 2001 and a circuit 2002. The circuit 2002 includes a plurality of circuits 2002_1 to 2002_N (N is a natural number). The circuits 2002_1 to 2002_N include a plurality of transistors 2003_1 to 2003_*k* (k is a natural number). The transistors 2003_1 to 2003_*k* can be n-channel transistors or p-channel transistors. Alternatively, the transistors 2003_1 to 2003_*k* can be used as CMOS switches.

The connection relationship of the circuits 2002_1 to 2002_N included in the source driver circuit is described taking the circuit 2002_1 as an example. First terminals of the transistors 2003_1 to 2003_*k* included in the circuit 2002_1 are connected to wirings 2004_1 to 2004_*k*, respectively. Second terminals of the transistors 2003_1 to 2003_*k* are connected to source lines 2008_1 to 2008_*k* (denoted by S1, S2, and Sk in FIG. 50B), respectively. Gates of the transistors 2003_1 to 2003_*k* are connected to a wiring 2005_1.

The circuit 2001 has a function of controlling the timing of sequentially outputting H signals to the wiring 2005_1 and wirings 2005_2 to 2005_N or a function of sequentially selecting the circuits 2002_1 to 2002_N. In this manner, the circuit 2001 functions as a shift register.

The circuit 2001 can output H signals to the wirings 2005_1 to 2005_N in different orders. Alternatively, the circuit 2001 can select the 2002_1 to 2002_N in different orders. In this manner, the circuit 2001 functions as a decoder.

The circuit 2002_1 has a function of controlling the timing of bringing the wirings 2004_1 to 2004_*k* and the source lines 2008_1 to 2008_*k* into conduction. Alternatively, the circuit 2001_1 has a function of controlling the timing of supplying the potentials of the wirings 2004_1 to 2004_*k* to the source lines 2008_1 to 2008_*k*. In this manner, the circuit 2002_1 functions as a selector. Note that the circuits 2002_2 to 2002_N have a function that is similar to the function of the circuit 2002_1.

The transistors 2003_1 to 2003_N each have a function of controlling the timing of bringing the wirings 2004_1 to 2004_*k* and the source lines 2008_1 to 2008_*k* into conduction. For example, the transistor 2003_1 has a function of controlling the timing of bringing the wiring 2004_1 and the source line 2008_1 into conduction. Alternatively, the transistors 2003_1 to 2003_N each have a function of controlling the timing of supplying the potentials of the wirings 2004_1 to 2004_*k* to the source lines 2008_1 to 2008_*k*. For example, the transistor 2003_1 has a function of controlling the timing of supplying the potential of the wiring 2004_1 to the source line 2008_1. In this manner, the transistors 2003_1 to 2003_N each function as a switch.

Note that in the case where signals corresponding to video signals, such as analog signals corresponding to video signals, are input to the wirings 2004_1 to 2004_*k*, the wirings 2004_1 to 2004_*k* function as signal lines. Alternatively, digital signals, analog voltage, or analog current may be input to the wirings 2004_1 to 2004_*k*.

Next, an operation example of the source driver circuit illustrated in FIG. 50A is described with reference to a timing chart in FIG. 50B.

Figure 50B:
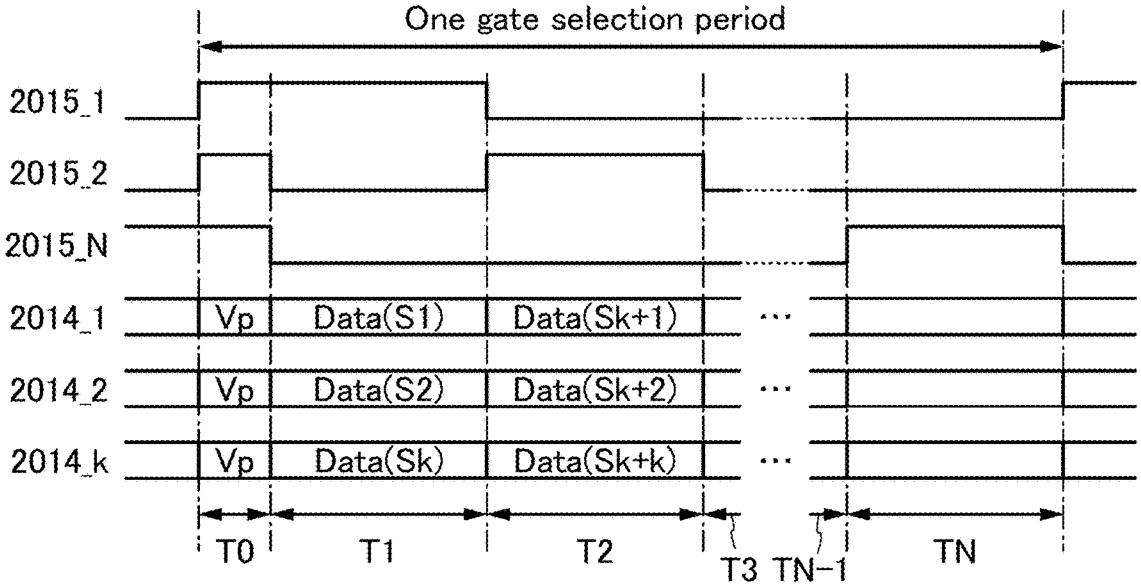
FIG. 50B is a timing chart illustrating an operation example of a source driver circuit.

FIG. 50B illustrates signals 2015_1 to 2015_N and signals 2014_1 to 2014_*k*. The signals 2015_1 to 2015_N are output signals of the circuit 2001. The signals 2014_1 to 2014_*k* are input to the wirings 2004_1 to 2004_*k*, respectively.

Note that one operation period of the source driver circuit corresponds to one gate selection period in a display device. One gate selection period is, for example, divided into a period T0 to TN. The period TO is a period during which precharge voltage is applied to pixels in a selected row concurrently and is also referred to as a precharge period. Each of the periods T1 to TN is a period during which video signals are written to pixels in the selected row and is also referred to as a writing period.

First, in the period TO, the circuit 2001 outputs H signals to the wirings 2005_1 to 2005_N. Then, the transistors 2003_1 to 2003_*k* are turned on in the circuit 2002_1, so that the wirings 2004_1 to 2004_*k* and the source lines 2008_1 to 2008_*k* are brought into conduction. At this time, precharge voltage Vp is applied to the wirings 2004_1 to 2004_*k*. Thus, the precharge voltage Vp is output to the source lines 2008_1 to 2008_*k* through the transistors 2003_1 to 2003_*k*. The precharge voltage Vp is written to pixels in a selected row, so that the pixels in the selected row are precharged.

In the periods T1 to TN, the circuit 2001 sequentially outputs H signals to the wirings 2005_1 to 2005_N. For example, in the period T1, the circuit 2001 outputs an H signal to the wiring 2005_1. Then, the transistors 2003_1 to 2003_*k* are turned on, so that the wirings 2004_1 to 2004_*k* and the source lines 2008_1 to 2008_*k* are brought into conduction. At this time, Data (S1) to Data (Sk) are input to the wirings 2004_1 to 2004_*k*, respectively. The Data (S1) to Data (Sk) are input to pixels in a selected row in a first to k-th columns through the transistors 2003_1 to 2003_*k*, respectively. In this manner, in the periods T1 to TN, video signals are sequentially written to the pixels in the selected row by k columns.

When video signals are written to pixels by a plurality of columns as described above, the number of video signals or the number of wirings needed for writing video signals to pixels can be reduced. Thus, the number of connections between a substrate over which a pixel portion is formed and an external circuit can be reduced, so that improvement in yield, improvement in reliability, reduction in the number of components, or reduction in cost can be achieved.

Alternatively, when video signals are written to pixels by a plurality of columns, the writing time can be extended. Thus, shortage of write of video signals can be prevented, so that display quality can be improved.

Note that when k is made larger, the number of connections to the external circuit can be reduced. However, if k is too large, the time to write signals to pixels would be shortened. Thus, k is preferably 6 or more, more preferably 3 or more, still more preferably 2.

In particular, in the case where the number of color elements of a pixel is n (n is a natural number), k=n or k=n×d (d is a natural number) is preferable. For example, in the case where the pixel is divided into three color elements: red (R), green (G), and blue (B), k=3 or k=3×d is preferable.

For example, in the case where the pixel is divided into m (m is a natural number) subpixels, k=m or k=m×d is preferable. For example, in the case where the pixel is divided into two subpixels, k=2 is preferable. Alternatively, in the case where the number of color elements of the pixel is n, k=m×n or k=m×n×d is preferable.

Figure 50C:
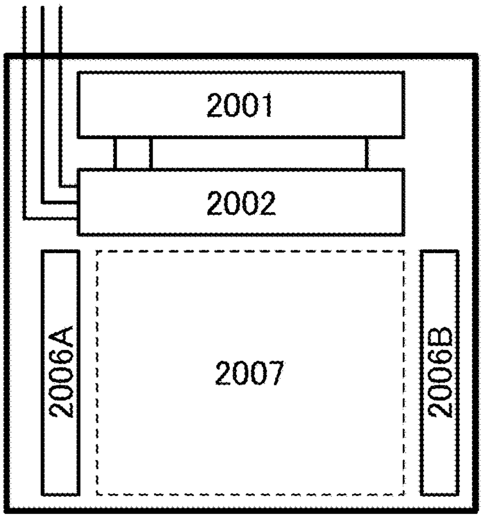

A different structure example of the source driver circuit is described with reference to FIG. 50C. Note that in the case where the drive frequencies of the circuit 2001 and the circuit 2002 are low, the circuit 2001 and the circuit 2002 may be formed using a single crystal semiconductor. Thus, the circuit 2001 and the circuit 2002 can be formed using the same substrate as a pixel portion 2007 as illustrated in FIG. 50C. With this structure, the number of connections between the substrate over which the pixel portion is formed and an external circuit can be reduced, so that improvement in yield, improvement in reliability, reduction in the number of components, or reduction in cost can be achieved.

When a gate driver circuit 2006A and a gate driver circuit 2006B are also formed using the same substrate as the pixel portion 2007, the number of connections to the external circuit can be further reduced. Note that the gate driver circuit 2006A corresponds to the circuit 10A, the circuit 100A, or the circuit 200A described in the above embodiments, and the gate driver circuit 2006B corresponds to the circuit 10B, the circuit 100B, or the circuit 200B described in the above embodiments.

Figure 50D:
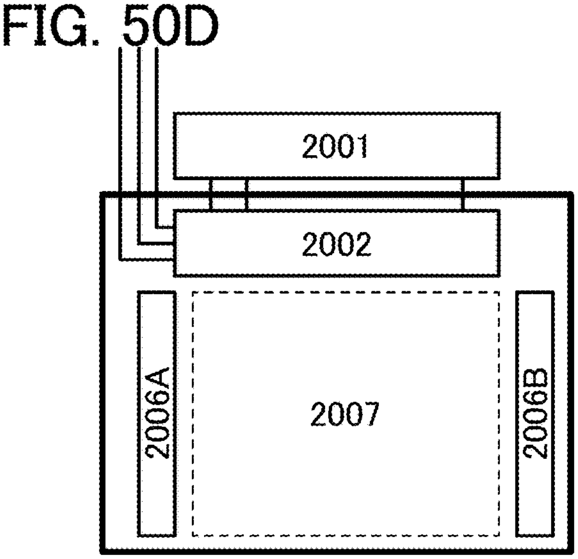

A different structure example of the source driver circuit is described with reference to FIG. 50D. As illustrated in FIG. 50D, the circuit 2001 may be formed using a substrate which is different from the substrate over which the pixel portion 2007 is formed, and the circuit 2002 may be formed using the same substrate as the pixel portion 2007. With this structure, the number of connections between the substrate over which the pixel portion is formed and an external circuit can be reduced, so that improvement in yield, improvement in reliability, reduction in the number of components, or reduction in cost can be achieved. Further, since the number of circuits which are formed using the same substrate as the pixel portion 2007 is reduced, the frame can be reduced.

Embodiment 8

In a display device, a protection circuit is provided for a gate line or a source line in some cases in order to prevent an element (e.g., a transistor, a display element, or a capacitor) provided in a pixel from being damaged by electrostatic discharge (ESD), noise, or the like.

In this embodiment, the structure of a protection circuit and the structure of a semiconductor device including the protection circuit are described.

Examples of circuit diagrams of a protection circuit are described with reference to FIGS. 51A to 51G.

Figure 51A:
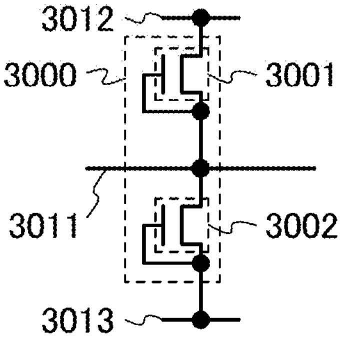
FIGS. 51A to 51G each illustrate an example of a circuit diagram of a protection circuit.

A protection circuit 3000 illustrated in FIG. 51A may be used as a protection circuit. The protection circuit 3000 illustrated in FIG. 51A is provided in order to prevent an element provided in a pixel connected to a wiring 3011 from being damaged by electrostatic discharge, noise, or the like. The protection circuit 3000 includes a transistor 3001 and a transistor 3002. The transistors 3001 and 3002 can be n-channel transistors or p-channel transistors.

A first terminal of the transistor 3001 is connected to a wiring 3012. A second terminal of the transistor 3001 is connected to the wiring 3011. A gate of the transistor 3001 is connected to the wiring 3011. A first terminal of the transistor 3002 is connected to a wiring 3013. A second terminal of the transistor 3002 is connected to the wiring 3011. A gate of the transistor 3002 is connected to the wiring 3013.

A signal (e.g., a scan signal, a video signal, a clock signal, a start signal, a reset signal, or a selection signal) and voltage (e.g., a negative power supply potential, ground voltage, or a positive power supply potential) are supplied to the wiring 3011. A high power supply potential VDD is supplied to the wiring 3012. A low power supply potential VSS (or ground voltage) is supplied to the wiring 3013.

When the potential of the wiring 3011 is between the low power supply potential VSS and the high power supply potential VDD, the transistor 3001 and the transistor 3002 are turned off. Thus, a signal or voltage supplied to the wiring 3011 is supplied to the pixel which is connected to the wiring 3011.

Due to the adverse effect of static electricity or the like, a potential which is higher than the high power supply potential VDD or a potential which is lower than the low power supply potential VSS is supplied to the wiring 3011 in some cases. In that case, the element provided in the pixel which is connected to the wiring 3011 might be damaged by the potential which is higher than the high power supply potential VDD or the potential which is lower than the low power supply potential VSS.

In order to prevent such electrostatic discharge, the transistor 3001 is turned on in the case where the potential which is higher than the high power supply potential VDD is supplied to the wiring 3011 due to the adverse effect of static electricity or the like. Then, since electrical charge in the wiring 3011 is transferred to the wiring 3012 through the transistor 3001, the potential of the wiring 3011 is lowered.

The transistor 3002 is turned on in the case where the potential which is higher than the low power supply potential VSS is supplied to the wiring 3011 due to the adverse effect of static electricity or the like. Then, since the electrical charge in the wiring 3011 is transferred to the wiring 3013 through the transistor 3002, the potential of the wiring 3011 is raised.

When the protection circuit 3000 is provided as described above, the element provided in the pixel which is connected to the wiring 3011 can be prevented from being damaged by static electricity or the like.

Figure 51B:
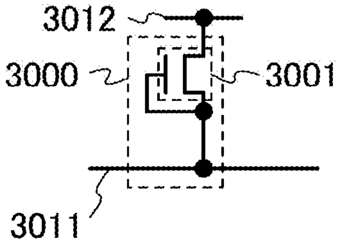
Figure 51C:
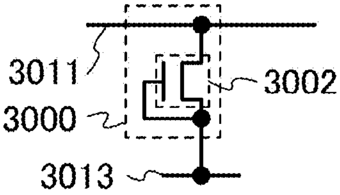

Note that the protection circuit 3000 illustrated in FIG. 51B or FIG. 51C may be used as a protection circuit. The structure illustrated in FIG. 51B corresponds to a structure in which the transistor 3002 and the wiring 3013 are eliminated from the structure illustrated in FIG. 51A. The structure illustrated in FIG. 51C corresponds to a structure in which the transistor 3001 and the wiring 3012 are eliminated from the structure in FIG. 51A.

Figure 51D:
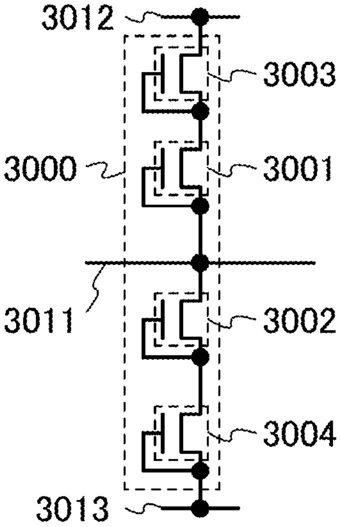

The protection circuit 3000 illustrated in FIG. 51D may be used as a protection circuit. The structure illustrated in FIG. 51D corresponds to a structure in which a transistor 3003 is connected in series between the wiring 3011 and the wiring 3012 and a transistor 3004 is connected in series between the wiring 3011 and the wiring 3013 in the structure illustrated in FIG. 51A.

In FIG. 51D, a first terminal of the transistor 3003 is connected to the wiring 3012; a second terminal of the transistor 3003 is connected to the first terminal of the transistor 3001; a gate of the transistor 3003 is connected to the first terminal of the transistor 3001. A first terminal of the transistor 3004 is connected to the wiring 3013; a second terminal of the transistor 3004 is connected to the first terminal of the transistor 3002; a gate of the transistor 3004 is connected to the wiring 3013.

Figure 51E:
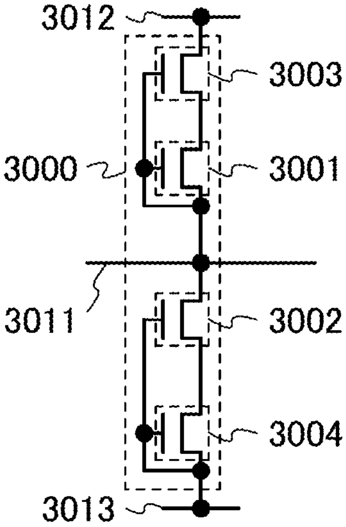

The protection circuit 3000 illustrated in FIG. 51E may be used as a protection circuit. The structure illustrated in FIG. 51E corresponds to a structure in which the gate of the transistor 3001 is connected to the gate of the transistor 3003 and the gate of the transistor 3002 is connected to the gate of the transistor 3004 in the structure illustrated in FIG. 51D.

Figure 51F:
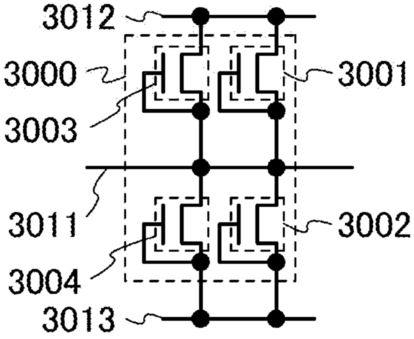

The protection circuit 3000 illustrated in FIG. 51F may be used as a protection circuit. The structure illustrated in FIG. 51F corresponds to a structure in which the transistor 3001 and the transistor 3003 are connected in parallel between the wiring 3011 and the wiring 3012 and the transistor 3002 and the transistor 3004 are connected in parallel between the wiring 3011 and the wiring 3013 in the structure illustrated in FIG. 51A.

In FIG. 51F, the first terminal of the transistor 3003 is connected to the wiring 3012; the second terminal of the transistor 3003 is connected to the wiring 3011; the gate of the transistor 3003 is connected to the wiring 3011. The first terminal of the transistor 3004 is connected to the wiring 3013; the second terminal of the transistor 3004 is connected to the wiring 3011; the gate of the transistor 3004 is connected to the wiring 3013.

Figure 51G:
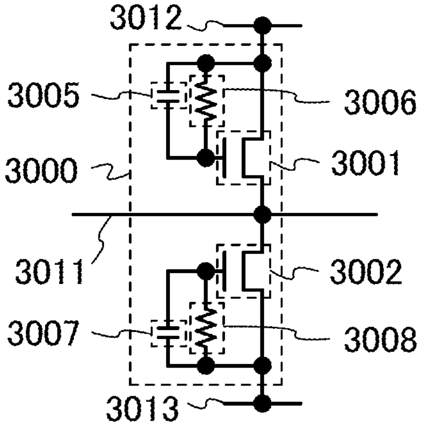

The protection circuit 3000 illustrated in FIG. 51G may be used as a protection circuit. The structure illustrated in FIG. 51G corresponds to a structure in which a capacitor 3005 and a resistor 3006 are connected in parallel between the gate of the transistor 3001 and the first terminal of the transistor 3001 and a capacitor 3007 and a resistor 3008 are connected in parallel between the gate of the transistor 3002 and the first terminal of the transistor 3002 in the structure illustrated in FIG. 51A.

With the structure illustrated in FIG. 51G, damage or deterioration of the protection circuit 3000 itself can be prevented.

For example, in the case where voltage which is higher than a power supply potential is supplied to the wiring 3011, a potential difference Vgs between the gate of the transistor 3001 and a source of the transistor 3001 is raised. Thus, the transistor 3001 is turned on, so that the potential of the wiring 3011 is lowered. However, since high voltage is applied between the gate of the transistor 3001 and the second terminal of the transistor 3001, the transistor 3001 might be damaged or deteriorate. In order to prevent damage or deterioration of the transistor 3001, the gate voltage of the transistor 3001 is raised using the capacitor 3005 and the potential difference Vgs between the gate of the transistor 3001 and the source of the transistor 3001 is lowered.

Specifically, when the transistor 3001 is turned on, the voltage of the first terminal of the transistor 3001 is raised instantaneously. Then, with capacitive coupling of the capacitor 3005, the gate voltage of the transistor 3001 is raised. In this manner, the potential difference Vgs between the gate of the transistor 3001 and the source of the transistor 3001 can be lowered, so that damage or deterioration of the transistor 3001 can be suppressed.

Similarly, in the case where voltage which is lower than the power supply potential is supplied to the wiring 3011, the voltage of the first terminal of the transistor 3002 is lowered instantaneously. Then, with capacitive coupling of the capacitor 3007, the gate voltage of the transistor 3002 is lowered. In this manner, a potential difference Vgs between the gate of the transistor 3002 and a source of the transistor 3002 can be lowered, so that damage or deterioration of the transistor 3002 can be suppressed.

Next, the structure of a semiconductor device provided with a protection circuit is described with reference to FIGS. 52A and 52B.

Figure 52A:
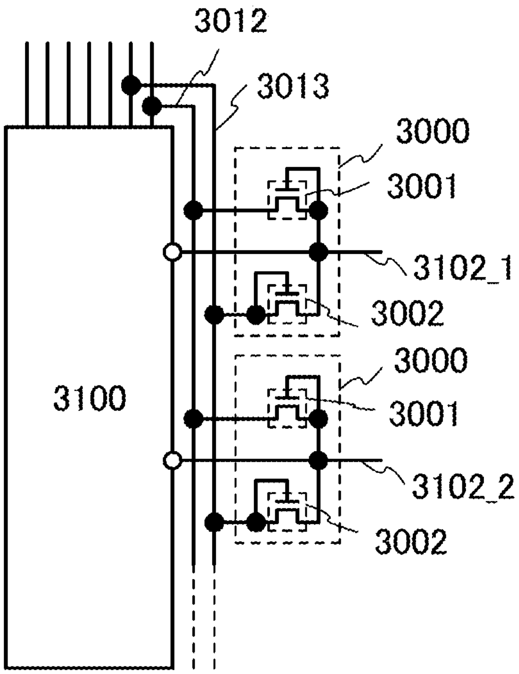
FIGS. 52A and 52B each illustrate a structure example of a semiconductor device including a protection circuit.

FIG. 52A illustrates a structure example of a semiconductor device in which a protection circuit is provided in a gate line. In FIG. 52A, each of a gate line 3102_1 and a gate line 3102_2 corresponds to the wiring 3011 in FIGS. 51A to 51G.

The wiring 3012 and the wiring 3013 are connected to any of wirings connected to a gate driver circuit 3100. With such a structure, the power supply voltage of the gate driver circuit can be used as power supply voltage for operating the protection circuit 3000, so that the kind of power supply voltages and the number of wirings for supplying power supply voltage to the protection circuit 3000 can be reduced.

Figure 52B:
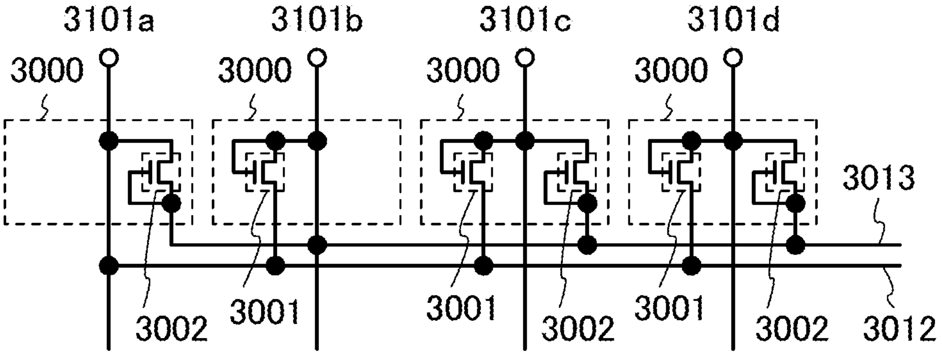

FIG. 52B illustrates a structure example of a semiconductor device in which a protection circuit is provided in a terminal to which a signal or voltage is supplied from the outside such as an FPC. In FIG. 52B, the wiring 3012 and the wiring 3013 can be connected to any of external terminals. For example, in the case where the wiring 3012 is connected to a terminal 3101*a*, in a protection circuit provided in the terminal 3101*a*, the transistor 3001 can be eliminated. Similarly, in the case where the wiring 3013 is connected to a terminal 3101*b*, in a protection circuit provided in the terminal 3101*b*, the transistor 3002 can be eliminated. The same can be said for protection circuits provided in a terminal 3101*c* and a terminal 3101*d*.

With such a structure, the number of transistors can be reduced, so that the layout area can be reduced.

Embodiment 9

In this embodiment, the structure of a display device including a transistor and a display element and the structure of the transistor are described with reference to FIGS. 53A to 53C.

For example, a field-effect transistor or a bipolar transistor can be used as a transistor. A thin film transistor (also referred to as a TFT) can be used as the field-effect transistor. In addition, the field-effect transistor may be a top-gate transistor or a bottom-gate transistor. A channel-etched transistor or a bottom-contact transistor (also referred to as an inverted coplanar transistor) can be used as the bottom-gate transistor. Further, the field-effect transistor may have n-type or p-type conductivity.

Note that the field-effect transistor includes, for example, a gate electrode; a semiconductor layer including a source region, a channel region, and a drain region; and a gate insulating layer provided between the gate electrode and the semiconductor layer in the cross-sectional view. The semiconductor layer is formed using a semiconductor film or a semiconductor substrate.

Examples of semiconductor materials which are used for the semiconductor film or the semiconductor substrate include an amorphous semiconductor, a microcrystalline semiconductor, a single crystal semiconductor, and a polycrystalline semiconductor. In addition, an oxide semiconductor may be used as the semiconductor material.

As the oxide semiconductor, a four-component metal oxide (e.g., an In—Sn—Ga—Zn—O-based metal oxide), a three-component metal oxide (e.g., an In—Ga—Zn—O-based metal oxide, an In—Sn—Zn—O-based metal oxide, an In—Al—Zn—O-based metal oxide, a Sn—Ga—Zn—O-based metal oxide, an Al—Ga—Zn—O-based metal oxide, or a Sn—Al—Zn—O-based metal oxide), or a two-component metal oxide (e.g., an In—Zn—O-based metal oxide, a Sn—Zn—O-based metal oxide, an Al—Zn—O-based metal oxide, a Zn—Mg—O-based metal oxide, a Sn—Mg—O-based metal oxide, an In—Mg—O-based metal oxide, an In—Ga—O-based metal oxide, or an In—Sn—O-based metal oxide) can be used. An In—O-based metal oxide, a Sn—O-based metal oxide, a Zn—O-based metal oxide, or the like can be used as the oxide semiconductor. Further, as the oxide semiconductor, an oxide semiconductor including $SiO_2$ in a metal oxide that can be used as the oxide semiconductor can be used.

As the oxide semiconductor, a material represented by $InMO_3(ZnO)_m$ (m>0) can be used. Here, M represents one or more metal elements selected from Ga, Al, Mn, or Co. For example, M can be Ga, Ga and Al, Ga and Mn, Ga and Co, or the like.

Figure 53A:
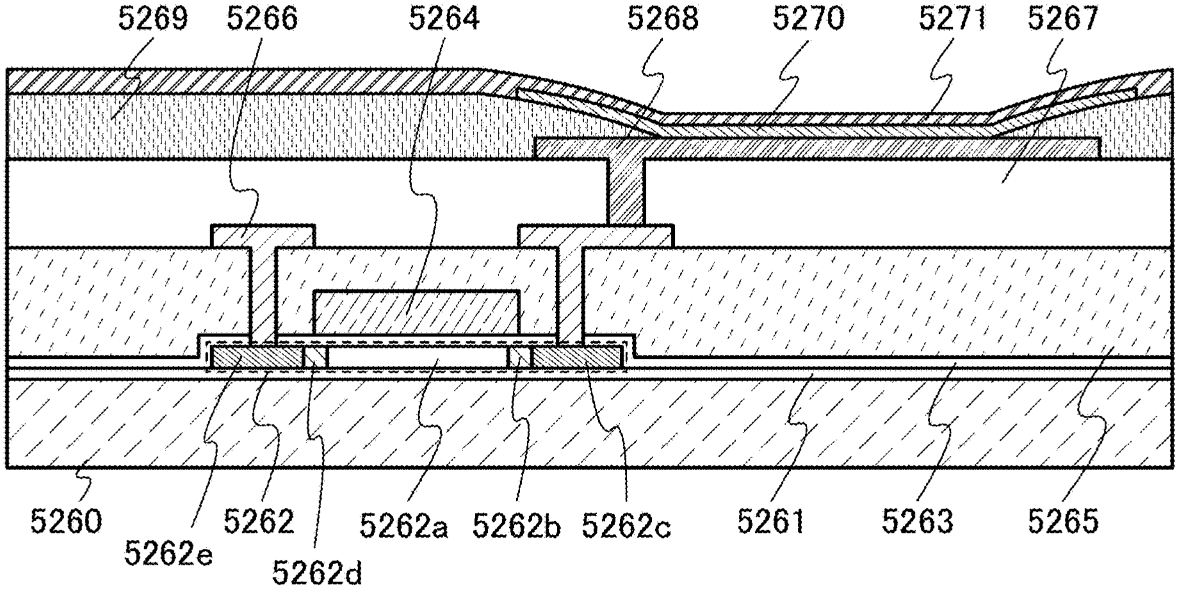
FIGS. 53A and 53B each illustrate a structure example of a display device.
Figure 53B:
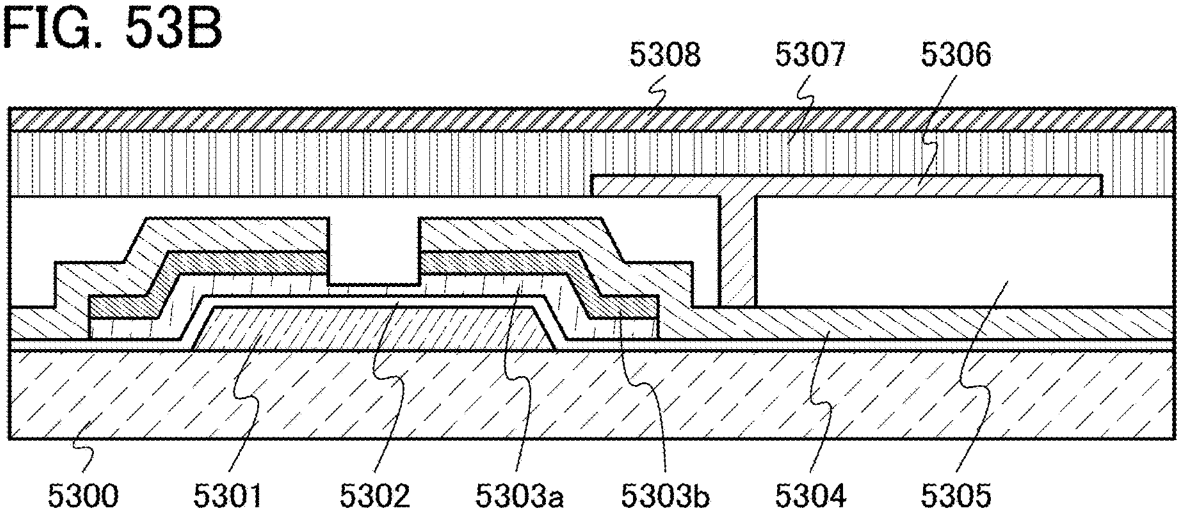

FIGS. 53A and 53B illustrate structure examples of a display device including a transistor and a display element. A top-gate transistor is used as the transistor in FIG. 53A, and a bottom-gate transistor is used as the transistor in FIG. 53B.

FIG. 53A illustrates a substrate 5260; an insulating layer 5261 provided over the substrate 5260; a semiconductor layer 5262 which is provided over the insulating layer 5261 and is provided with regions 5262*a* to 5262*e*; an insulating layer 5263 provided so as to cover the semiconductor layer 5262; a conductive layer 5264 provided over the semiconductor layer 5262 and the insulating layer 5263; an insulating layer 5265 which is provided over the insulating layer 5263 and the conductive layer 5264 and is provided with openings; and a conductive layer 5266 which is provided over the insulating layer 5265 and in the openings provided in the insulating layer 5265.

FIG. 53B illustrates a substrate 5300; a conductive layer 5301 provided over the substrate 5300; an insulating layer 5302 provided so as to cover the conductive layer 5301; a semiconductor layer 5303*a* provided over the conductive layer 5301 and the insulating layer 5302; a semiconductor layer 5303*b* provided over the semiconductor layer 5303*a*; a conductive layer 5304 provided over the semiconductor layer 5303*b* and the insulating layer 5302; an insulating layer 5305 which is provided over the insulating layer 5302 and the conductive layer 5304 and is provided with an opening; and a conductive layer 5306 which is provided over the insulating layer 5305 and in the opening provided in the insulating layer 5305.

Figure 53C:
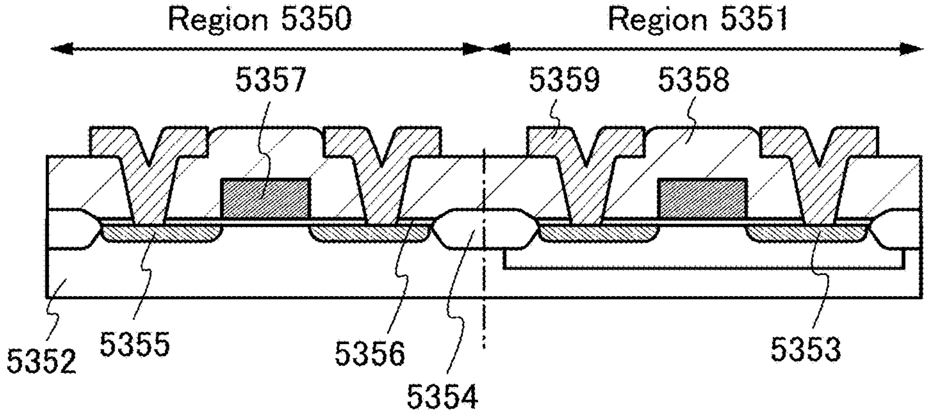
FIG. 53C illustrates a structure example of a transistor.

FIG. 53C illustrates a different structure example of the transistor. FIG. 53C illustrates a semiconductor substrate 5352 including a region 5353 and a region 5355; an insulating layer 5356 provided over the semiconductor substrate 5352; an insulating layer 5354 provided over the semiconductor substrate 5352; a conductive layer 5357 provided over the insulating layer 5356; an insulating layer 5358 which is provided over the insulating layer 5354, the insulating layer 5356, and the conductive layer 5357 and is provided with openings; and a conductive layer 5359 which is provided over the insulating layer 5358 and in the openings provided in the insulating layer 5358. In FIG. 53C, a transistor is formed in each of a region 5350 and a region 5351. The structure of the transistor illustrated in FIG. 53C may be applied to the transistors illustrated in FIGS. 53A and 53B.

Note that as illustrated in FIG. 53A, the display device may include an insulating layer 5267 which is provided over the conductive layer 5266 and the insulating layer 5265 and is provided with an opening; a conductive layer 5268 which is provided over the insulating layer 5267 and in the opening provided in the insulating layer 5267; an insulating layer 5269 which is provided over the insulating layer 5267 and the conductive layer 5268 and is provided with an opening; an EL layer 5270 which is provided over the insulating layer 5269 and in the opening provided in the insulating layer 5269; and a conductive layer 5271 provided over the insulating layer 5269 and the EL layer 5270. The same can be said for the display device in FIG. 53B.

Note that as illustrated in FIG. 53B, the display device may include a liquid crystal layer 5307 which is provided over the insulating layer 5305 and the conductive layer 5306 and a conductive layer 5308 which is provided over the liquid crystal layer 5307. The same can be said for the display device in FIG. 53A.

The insulating layer 5261 functions as a base film. The insulating layer 5354 functions as an element isolation layer (e.g., a field oxide film). Each of the insulating layer 5263, the insulating layer 5302, and the insulating layer 5356 functions as a gate insulating film. Each of the conductive layer 5264, the conductive layer 5301, and the conductive layer 5357 functions as a gate electrode. Each of the insulating layer 5265, the insulating layer 5267, the insulating layer 5305, and the insulating layer 5358 functions as an interlayer film or a planarization film. Each of the conductive layer 5266, the conductive layer 5304, and the conductive layer 5359 functions as a wiring, an electrode of a transistor, an electrode of a capacitor, or the like. Each of the conductive layer 5268 and the conductive layer 5306 functions as a pixel electrode, a reflective electrode, or the like. The insulating layer 5269 functions as a partition wall. Each of the conductive layer 5271 and the conductive layer 5308 functions as a counter electrode, a common electrode, or the like.

As each of the substrate 5260 and the substrate 5300, a glass substrate, a quartz substrate, a semiconductor substrate (e.g., a silicon substrate or a single crystal substrate), an SOI substrate, a plastic substrate, a metal substrate, a stainless steel substrate, a substrate including stainless steel foil, a tungsten substrate, a substrate including tungsten foil, a flexible substrate, or the like may be used.

As a glass substrate, a barium borosilicate glass substrate, an aluminoborosilicate glass substrate, or the like may be used. For a flexible substrate, a flexible synthetic resin such as plastics typified by polyethylene terephthalate (PET), polyethylene naphthalate (PEN), or polyether sulfone (PES), or acrylic may be used. Alternatively, an attachment film (formed using polypropylene, polyester, vinyl, polyvinyl fluoride, polyvinyl chloride, or the like), paper including a fibrous material, a base material film (formed using polyester, polyamide, polyimide, an inorganic vapor deposition film, paper, or the like), or the like may be used.

As the semiconductor substrate 5352, a single crystal silicon substrate having n-type or p-type conductivity may be used. Alternatively, part of or the whole of the single crystal silicon substrate may be used as the semiconductor substrate 5352. The region 5353 is a region where an impurity element is added to the semiconductor substrate 5352 and serves as a well. For example, in the case where the semiconductor substrate 5352 has p-type conductivity, the region 5353 has n-type conductivity and serves as an n-well. In the case where the semiconductor substrate 5352 has n-type conductivity, the region 5353 has p-type conductivity and serves as a p-well. The region 5355 is a region where an impurity element is added to the semiconductor substrate 5352 and serves as a source region or a drain region. Note that an LDD (lightly doped drain) region may be formed in the semiconductor substrate 5352.

For the insulating layer 5261, a single-layer structure, a layered structure, or the like of an insulating film containing oxygen or nitrogen, such as a silicon oxide film, a silicon nitride film, a silicon oxynitride ($SiO_xN_y$) (x>y>0) film, or a silicon nitride oxide ($SiN_xO_y$) (x>y>0) film, can be used. In the case where the insulating layer 5261 has a two-layer structure, for example, an insulating layer can be used in which a silicon nitride film is formed as a first insulating layer and a silicon oxide film is formed as a second insulating layer. In the case where the insulating layer 5261 has a three-layer structure, for example, an insulating layer can be used in which a silicon oxide film is formed as a first insulating layer, a silicon nitride film is formed as a second insulating layer, and a silicon oxide film is formed as a third insulating layer.

For each of the semiconductor layer 5262, the semiconductor layer 5303*a*, and the semiconductor layer 5303*b*, a non-single-crystal semiconductor (e.g., amorphous silicon, polycrystalline silicon, or microcrystalline silicon), a single crystal semiconductor, a compound semiconductor or an oxide semiconductor (e.g., ZnO, InGaZnO, SiGe, GaAs, IZO (indium zinc oxide), ITO (indium tin oxide), SnO, TiO, or AlZnSnO (AZTO)), an organic semiconductor, a carbon nanotube, or the like can be used.

The region 5262*a* is an intrinsic region where an impurity element is not added to the semiconductor layer 5262 and serves as a channel region. Note that an impurity element may be added to the region 5262*a*. The concentration of the impurity element added to the region 5262*a* is preferably lower than the concentration of an impurity element added to the region 5262*b*, the region 5262*c*, the region 5262*d*, or the region 5262*e*. Each of the region 5262*b* and the region 5262*d* is a region where an impurity element is added to the semiconductor layer 5262 at lower concentration than the region 5262*c* and the region 5262*e* and serves as an LDD (lightly doped drain) region. Note that the region 5262*b* and the region 5262*d* may be eliminated. Each of the region 5262*c* and the region 5262*e* is a region where an impurity element is added to the semiconductor layer 5262 at high concentration and serves as a source region or a drain region.

The semiconductor layer 5303*b* is a semiconductor layer to which phosphorus or the like is added as an impurity element and has n-type conductivity. Note that in the case where an oxide semiconductor or a compound semiconductor is used for the semiconductor layer 5303*a*, the semiconductor layer 5303*b* may be eliminated.

For each of the insulating layer 5263 and the insulating layer 5356, a single-layer structure or a layered structure of an insulating film containing oxygen or nitrogen, such as a silicon oxide film, a silicon nitride film, a silicon oxynitride ($SiO_xN_y$) (x>y>0) film, or a silicon nitride oxide ($SiN_xO_y$) (x>y>0) film, is preferably used.

As each of the conductive layer 5264, the conductive layer 5266, the conductive layer 5268, the conductive layer 5271, the conductive layer 5301, the conductive layer 5304, the conductive layer 5306, the conductive layer 5308, the conductive layer 5357, and the conductive layer 5359, a conductive film having a single-layer structure or a layered structure, or the like is preferably used. For the conductive film, the group consisting of aluminum (Al), tantalum (Ta), titanium (Ti), molybdenum (Mo), tungsten (W), neodymium (Nd), chromium (Cr), nickel (Ni), platinum (Pt), gold (Au), silver (Ag), copper (Cu), manganese (Mn), cobalt (Co), niobium (Nb), silicon (Si), iron (Fe), palladium (Pd), carbon (C), scandium (Sc), zinc (Zn), gallium (Ga), indium (In), tin (Sn), zirconium (Zr), and cerium (Ce); a single-layer film containing one element selected from the group; a film formed using a compound containing one or more elements selected from the group; or the like is preferably used. Note that the single-layer film or the compound may contain phosphorus (P), boron (B), arsenic (As), oxygen (O), or the like.

A compound containing one or more elements selected from the plurality of elements (e.g., an alloy), a compound containing nitrogen and one or more elements selected from the plurality of elements (e.g., a nitride film), a compound containing silicon and one or more elements selected from the plurality of elements (e.g., a silicide film), a nanotube material, or the like can be used as the compound. Indium tin oxide (ITO), indium zinc oxide (IZO), indium tin oxide containing silicon oxide (ITSO), zinc oxide (ZnO), tin oxide (SnO), cadmium tin oxide (CTO), aluminum-neodymium (Al—Nd), aluminum-tungsten (Al—W), aluminum-zirconium (Al—Zr), aluminum titanium (Al—Ti), aluminum-cerium (Al—Ce), magnesium-silver (Mg—Ag), molybdenum-niobium (Mo—Nb), molybdenum-tungsten (Mo—W), molybdenum-tantalum (Mo—Ta), or the like can be used as an alloy. Titanium nitride, tantalum nitride, molybdenum nitride, or the like can be used for a nitride film. Tungsten silicide, titanium silicide, nickel silicide, aluminum silicon, molybdenum silicon, or the like can be used for a silicide film. A carbon nanotube, an organic nanotube, an inorganic nanotube, a metal nanotube, or the like can be used as a nanotube material.

For each of the insulating layer 5265, the insulating layer 5267, the insulating layer 5269, the insulating layer 5305, and the insulating layer 5358, an insulating layer having a single-layer structure or a layered structure, or the like is preferably used. As the insulating layer, a film containing oxygen or nitrogen, such as a silicon oxide film, a silicon nitride film, a silicon oxynitride ($SiO_xN_y$) (x>y>0) film, or a silicon nitride oxide ($SiN_xO_y$) (x>y>0) film; a film containing carbon such as diamond-like carbon (DLC); a film formed using an organic material such as a siloxane resin, epoxy, polyimide, polyamide, polyvinyl phenol, benzocyclobutene, or acrylic; or the like can be used.

The EL layer 5270 includes a light-emitting layer formed using a light-emitting material. The EL layer 5270 may include a hole injection layer formed using a hole injection material, a hole transport layer formed using a hole transport material, an electron transport layer formed using an electron transport material, an electron injection layer formed using an electron injection material, a layer in which a plurality of these materials are mixed, or the like, in addition to the light-emitting layer. The conductive layer 5268, the EL layer 5270, and the conductive layer 5271 form an organic EL element.

The liquid crystal layer 5307 includes a liquid crystal containing a plurality of liquid crystal molecules. The state of liquid crystal molecules is mainly determined by voltage applied between a pixel electrode and a counter electrode, and the transmittance of a liquid crystal is changed. For example, an electrically controlled birefringence liquid crystal (also referred to as an ECB liquid crystal), a liquid crystal to which a dichroic pigment is added (also referred to as a GH liquid crystal), a polymer dispersed liquid crystal, a discotic liquid crystal, or the like can be used as the liquid crystal. A liquid crystal exhibiting a blue phase may be used as the liquid crystal. The liquid crystal exhibiting a blue phase contains, for example, a liquid crystal composition including a liquid crystal exhibiting a blue phase and a chiral agent. The liquid crystal exhibiting a blue phase has a short response time of 1 ms or less, and is optically isotropic; thus, alignment treatment is not needed and viewing angle dependence is small. Thus, with the liquid crystal exhibiting a blue phase, operation speed can be improved.

Note that an insulating layer which functions as an alignment film, an insulating layer which functions as a protrusion, or the like may be provided over the insulating layer 5305 and the conductive layer 5306.

Note that an insulating layer or the like which functions as a color filter, a black matrix, or a protrusion may be formed over the conductive layer 5308. An insulating layer which functions as an alignment film may be formed below the conductive layer 5308.

The gate driver circuit and the semiconductor device described in any of the above embodiments can be applied to the display device in this embodiment. In addition, the transistor described in this embodiment can be used in the gate driver circuit and the semiconductor device described in any of the above embodiments. In particular, even in the case where a non-single-crystal semiconductor such as an amorphous semiconductor or a microcrystalline semiconductor, an organic semiconductor, an oxide semiconductor, or the like is used for a semiconductor layer of the transistor, an advantage of suppression of deterioration of the transistor or the like can be obtained with the structures of the gate driver circuit and the semiconductor device described in any of the above embodiments.

Embodiment 10

In this embodiment, the structure of a display device is described with reference to FIGS. 54A to 54C. As structure examples of the display device, FIG. 54A illustrates a top view of the display device and FIGS. 54B and 54C illustrate cross-sectional views taken along line A-B in FIG. 54A.

Figure 54A:
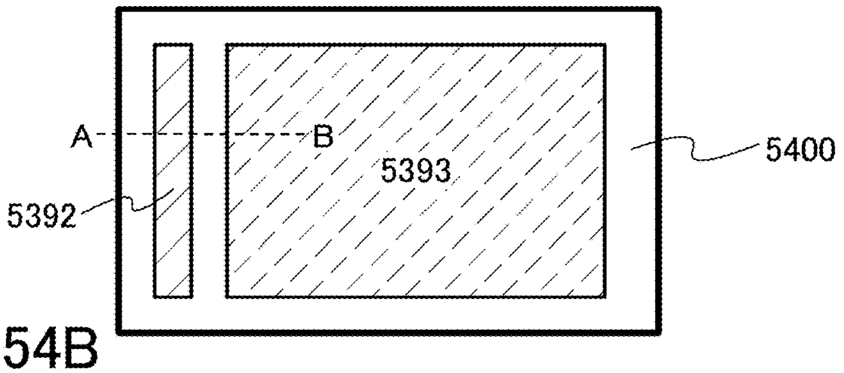
FIGS. 54A to 54C each illustrate a structure example of a display device.

In FIG. 54A, a driver circuit 5392 and a pixel portion 5393 are formed over a substrate 5400. The driver circuit 5392 includes a gate driver circuit, a source driver circuit, or the like.

Figure 54B:
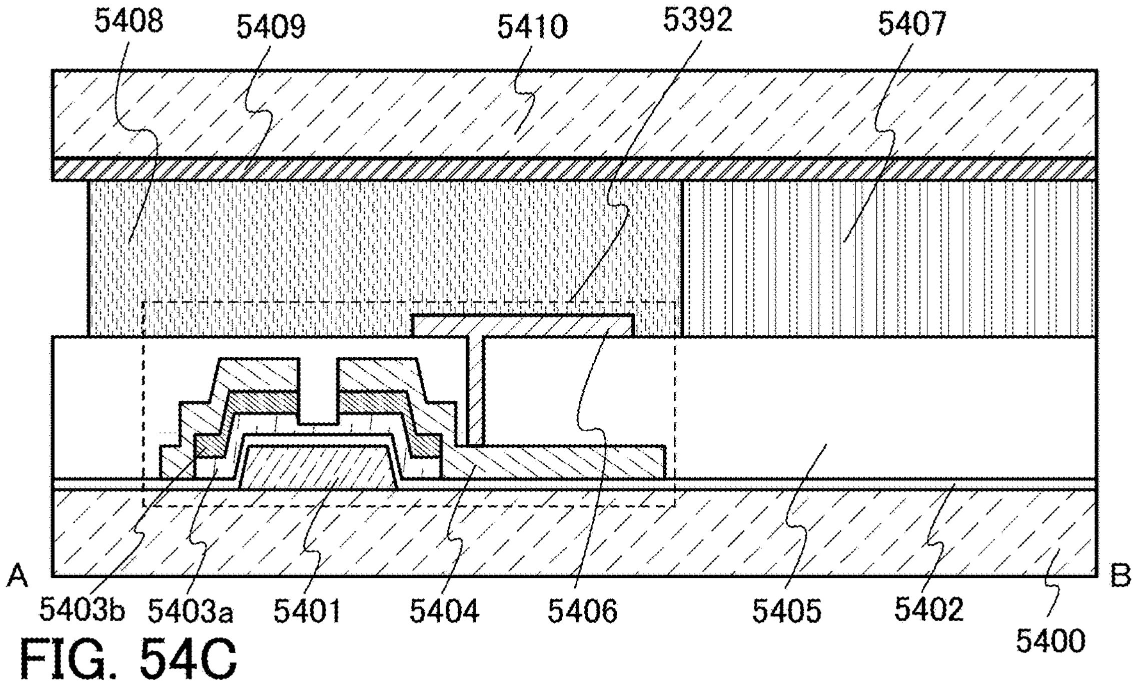
Figure 54C:
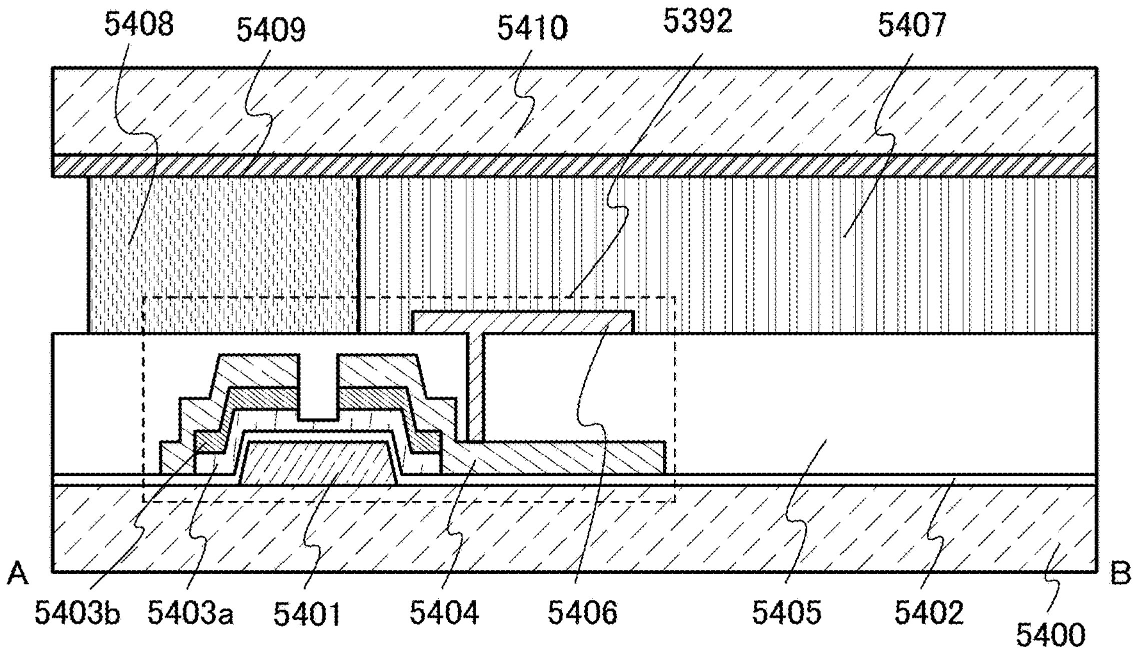

FIG. 54B illustrates a substrate 5400; a conductive layer 5401 provided over the substrate 5400; an insulating layer 5402 provided so as to cover the conductive layer 5401; a semiconductor layer **5403*a* provided over the conductive layer 5401 and the insulating layer 5402; a semiconductor layer 5403*b* provided over the semiconductor layer 5403*a*; a conductive layer 5404 provided over the semiconductor layer 5403*b* and the insulating layer 5402; an insulating layer 5405 which is provided over the insulating layer 5402 and the conductive layer 5404 and is provided with an opening; a conductive layer 5406 provided over the insulating layer 5405 and in the opening in the insulating layer 5405; an insulating layer 5408 provided over the insulating layer 5405 and the conductive layer 5406; a liquid crystal layer 5407 provided over the insulating layer 5405; a conductive layer 5409 provided over the liquid crystal layer 5407 and the insulating layer 5408; and a substrate 5410 provided over the conductive layer 5409**.

The conductive layer 5401 functions as a gate electrode. The insulating layer 5402 functions as a gate insulating film. The conductive layer 5404 functions as a wiring, an electrode of a transistor, or an electrode of a capacitor. The insulating layer 5405 functions as an interlayer film or a planarization film. The conductive layer 5406 functions as a wiring, a pixel electrode, or a reflective electrode. The insulating layer 5408 functions as a sealant. The conductive layer 5409 functions as a counter electrode or a common electrode.

Here, parasitic capacitance is generated between the driver circuit 5392 and the conductive layer 5409 in some cases. Accordingly, a signal output from the driver circuit 5392 or the potential of each node is distorted or delayed, and the power consumption of the driver circuit 5392 is increased.

In contrast, when the insulating layer 5408 which functions as a sealant and has lower dielectric constant than the liquid crystal layer is formed over the driver circuit 5392 as illustrated in FIG. 54B, parasitic capacitance generated between the driver circuit 5392 and the conductive layer 5409 can be reduced. Thus, distortion, delay, or the like of the signal output from the driver circuit 5392 or the potential of each node can be reduced. Alternatively, the power consumption of the driver circuit 5392 can be reduced.

As illustrated in FIG. 54C, when the insulating layer 5408 which functions as a sealant is formed over part of the driver circuit 5392, a similar effect can be obtained. Note that in the case where the adverse effect of parasitic capacitance does not matter, the insulating layer 5408 is not necessarily provided.

Note that although a display device provided with a liquid crystal element including a liquid crystal layer is described in this embodiment, other than the liquid crystal element, an EL element, an electrophoretic element, or the like can be used as the display element in the display device.

Since the parasitic capacitance of the driver circuit can be reduced in the display device in this embodiment, distortion or delay of the output signal or the potential of each node can be reduced. Thus, it is not necessary to increase the current supply capability of the transistor, so that the channel width of the transistor can be decreased. Consequently, the layout area of the driver circuit can be decreased, so that the frame of the display device can be decreased or the display device can have higher definition.

Embodiment 11

In this embodiment, a layout diagram (also referred to as a top view) of a semiconductor device is described. For example, FIG. 55 is a layout diagram of the semiconductor device illustrated in FIG. 31B.

Figure 55:
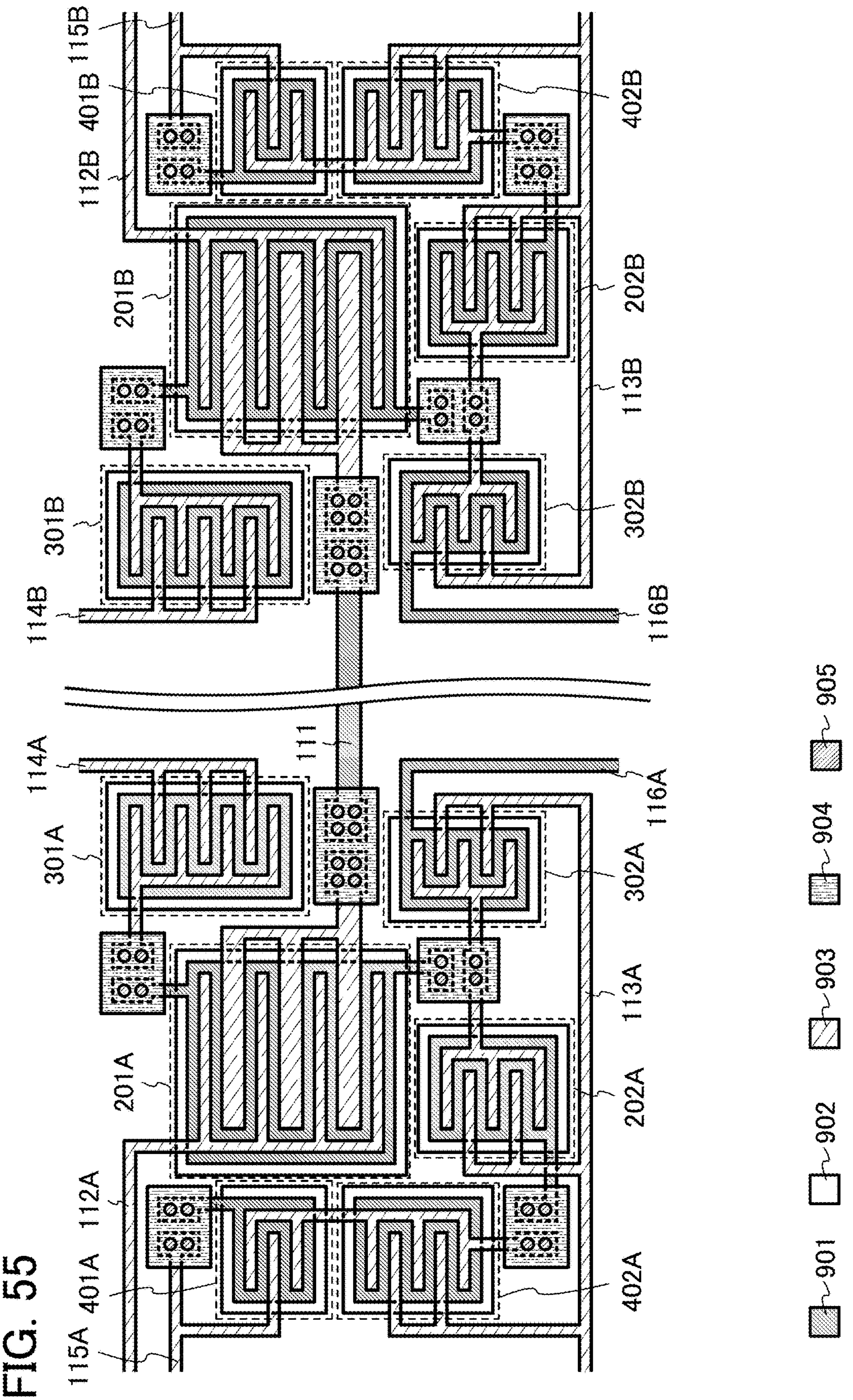
FIG. 55 is a layout diagram of a semiconductor device.

The semiconductor device illustrated in FIG. 55 includes a conductive layer 901, a semiconductor layer 902, a conductive layer 903, a conductive layer 904, and a contact hole 905. Note that a different conductive layer, a different contact hole, an insulating film, or the like may be formed. For example, a contact hole for connecting the conductive layer 901 and the conductive layer 903 to each other may be formed.

The conductive layer 901 includes a portion which functions as a gate electrode or a wiring. The semiconductor layer 902 includes a portion which functions as a semiconductor layer of the transistor. The conductive layer 903 includes a portion which functions as a wiring, a source, or a drain. The conductive layer 904 includes a portion which functions as a transparent electrode, a pixel electrode, or a wiring. The conductive layer 901 and the conductive layer 904 can be connected to each other through the contact hole 905 or the conductive layer 903 and the conductive layer 904 can be connected to each other through the contact hole 905.

Note that when the semiconductor layer 902 is provided in a portion where the conductive layer 901 and the conductive layer 903 overlap with each other, parasitic capacitance between the conductive layer 901 and the conductive layer 903 can be reduced, so that noise can be reduced. For a similar reason, the semiconductor layer 902 may be provided in a portion where the conductive layer 901 and the conductive layer 904 overlap with each other or a portion where the conductive layer 903 and the conductive layer 904 overlap with each other.

Note that when the conductive layer 904 is formed over part of the conductive layer 901 and is connected to the conductive layer 901 through the contact hole 905, wiring resistance can be lowered.

When the conductive layers 903 and 904 are formed over part of the conductive layer 901, the conductive layer 901 is connected to the conductive layer 904 through the contact hole 905, and the conductive layer 903 can be connected to the conductive layer 904 through the different contact hole 905, the wiring resistance can be further lowered.

When the conductive layer 904 is formed over part of the conductive layer 903 and the conductive layer 903 is connected to the conductive layer 904 through the contact hole 905, wiring resistance can be lowered.

When the conductive layer 901 or the conductive layer 903 is formed below part of the conductive layer 904 and the conductive layer 904 is connected to the conductive layer 901 or the conductive layer 903 through the contact hole 905, wiring resistance can be lowered.

Embodiment 12

In this embodiment, examples of an electronic device including the gate driver circuit, the semiconductor device, or the display device described in any of the above embodiments and applications of the semiconductor device are described with reference to FIGS. 56A to 56H and FIGS. 57A to 57H.

FIGS. 56A to 56H and FIGS. 57A to 57D illustrate examples of electronic devices. These electronic devices includes a housing 5000, a display portion 5001, a speaker 5003, an LED lamp 5004, operation keys 5005, a connection terminal 5006, a sensor 5007, a microphone 5008, and the like. Note that the operation key 5005 includes a power switch or an operation switch. The sensor 5007 has a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, smell, or infrared ray.

Figure 56A:
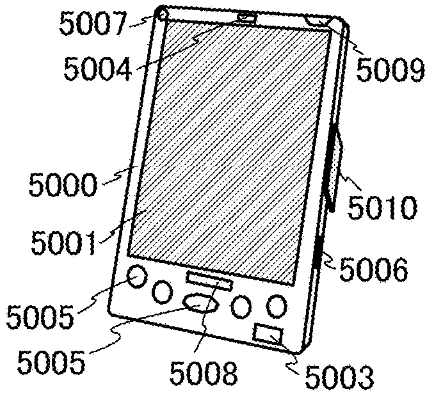
FIGS. 56A to 56H each illustrate an example of an electronic device.
Figure 56B:
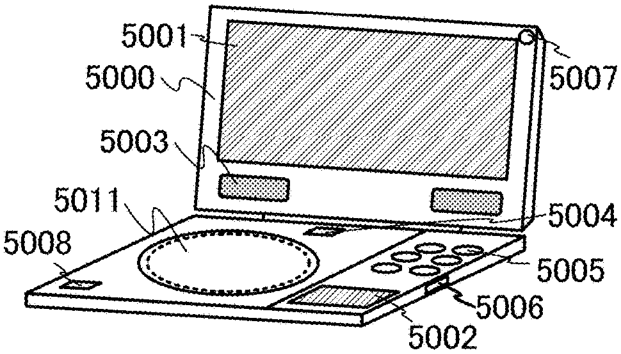
Figure 56C:
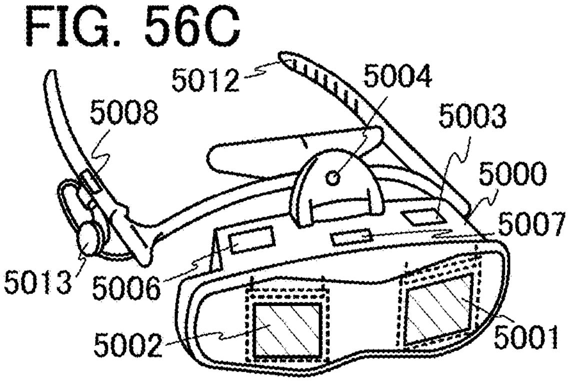
Figure 56D:
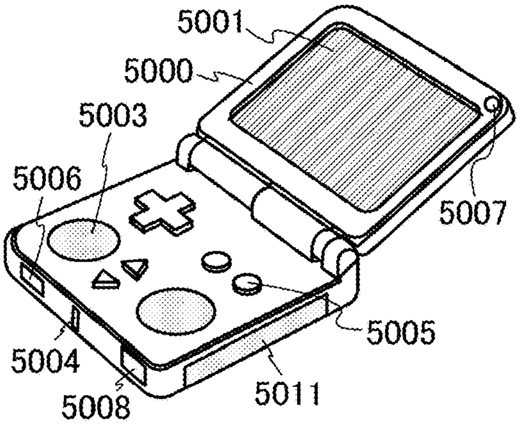

FIG. 56A illustrates a mobile computer, which includes a switch 5009, an infrared port 5010, and the like in addition to the above components. FIG. 56B illustrates a portable image regenerating device provided with a storage medium (e.g., a DVD reproducing device), which includes a display portion 5002, a storage medium reading portion 5011, and the like in addition to the above components. FIG. 56C illustrates a goggle-type display, which includes the display portion 5002, a support 5012, an earphone 5013, and the like in addition to the above components. FIG. 56D illustrates a portable game machine, which includes the storage medium reading portion 5011 and the like in addition to the above components.

Figure 56E:
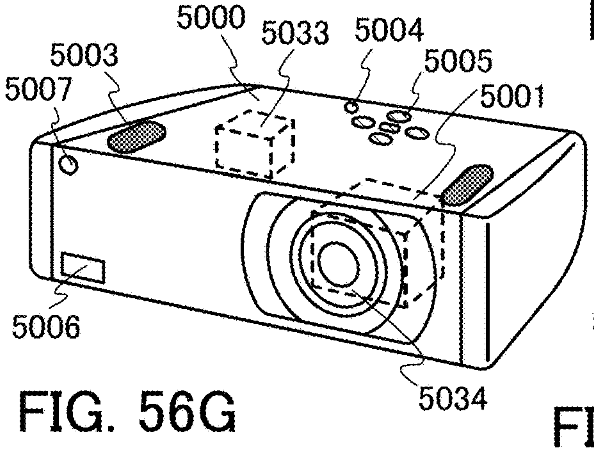
Figure 56F:
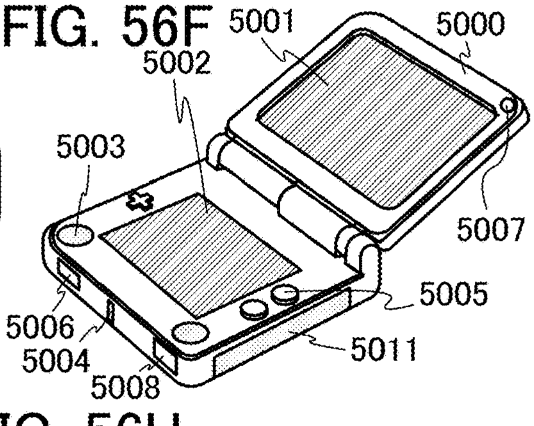
Figure 56G:
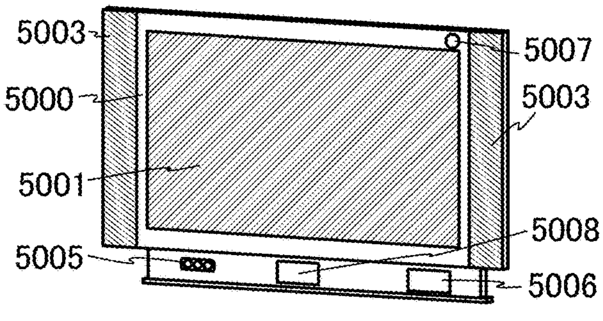
Figure 56H:
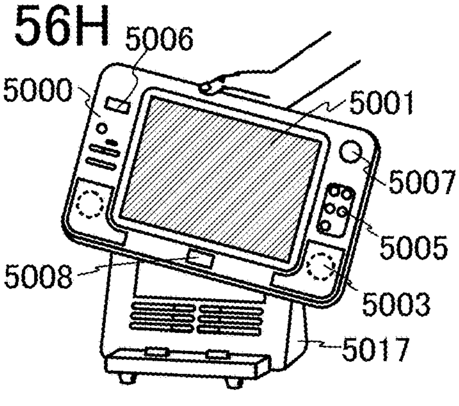

FIG. 56E illustrates a projector, which includes a light source 5033, a projector lens 5034, and the like in addition to the above components. FIG. 56F illustrates a portable game machine, which includes the display portion 5002, the storage medium reading portion 5011, and the like in addition to the above components. FIG. 56G illustrates a television receiver, which includes a tuner, an image processing portion, and the like in addition to the above components. FIG. 56H illustrates a portable television receiver, which can include a charger 5017 capable of transmitting and receiving signals and the like in addition to the above components.

Figure 57A:
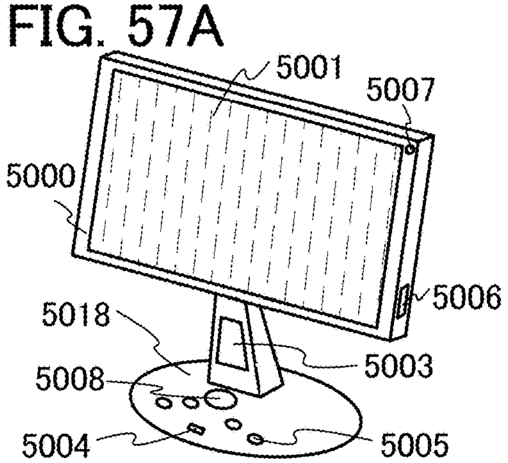
FIGS. 57A to 57D each illustrate an example of an electronic device, and FIGS. 57E to 57H each illustrate an application of a semiconductor device.

FIG. 57A illustrates a display, which includes a support base 5018 and the like in addition to the above components.

Figure 57B:
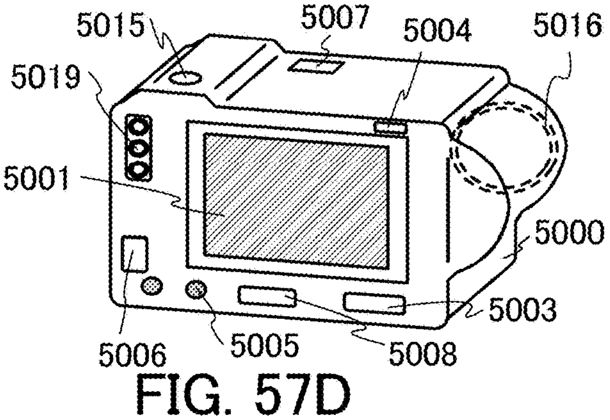
Figure 57C:
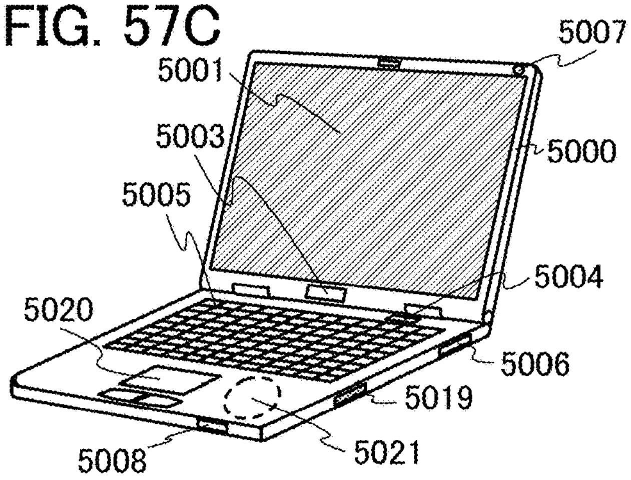
Figure 57D:
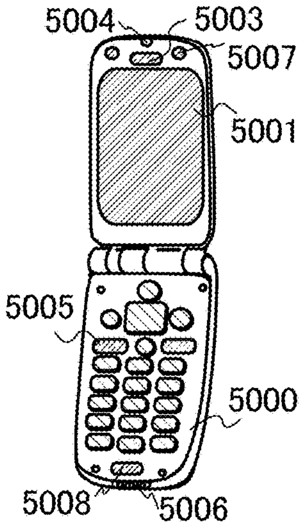

FIG. 57B illustrates a camera, which includes an external connection port 5019, a shutter button 5015, an image reception portion 5016, and the like in addition to the above components. FIG. 57C illustrates a computer, which includes a pointing device 5020, the external connection port 5019, a reader/writer 5021, and the like in addition to the above components. FIG. 57D illustrates a cellular phone, which includes an antenna, a tuner of one-segment (1seg digital TV broadcasts) partial reception service for cellular phones and mobile terminals, and the like in addition to the above components.

The electronic devices illustrated in FIGS. 56A to 56H and FIGS. 57A to 57D can have a variety of functions in addition to the above functions.

The electronic devices illustrated in FIGS. 56A to 56H and FIGS. 57A to 57D may have, for example, a function of displaying information (e.g., a still image, a moving image, or a text image) on a display portion; a touch panel function; a function of displaying a calendar, date, time, or the like; a function of controlling processing with software (e.g., a program); a wireless communication function; a function of being connected to a computer network with a wireless communication function; a function of transmitting and receiving data with a wireless communication function; a function of reading a program or data stored in a storage medium and displaying the program or data on a display portion.

Further, the electronic device including a plurality of display portions may have a function of displaying image information mainly on one display portion while displaying text information on another display portion, a function of displaying a three-dimensional image by displaying images where parallax is considered on a plurality of display portions, or the like.

Furthermore, the electronic device including an image reception portion may have a function of photographing a still image, a function of photographing a moving image, a function of automatically or manually correcting a photographed image, a function of storing a photographed image in a storage medium (an external storage medium or a storage medium incorporated in the electronic device), a function of displaying a photographed image on the display portion, or the like.

The electronic devices described in this embodiment each include a display portion for displaying some kind of information. By applying the electronic device in this embodiment to the gate driver circuit, the semiconductor device, or the display device described in the above embodiments to the display portion in the electronic devices in this embodiment, it is possible to achieve improvement in reliability, improvement in yield, reduction in cost, the increase in the size of the display portion, the increase in the definition of the display portion, or the like.

Next, applications of a semiconductor device are described with reference to FIGS. 57E to 57H.

An example in which the semiconductor device is incorporated in a building structure is described with reference to each of FIGS. 57E and 57F. An example in which the semiconductor device is incorporated in a moving vehicle is described with reference to each of FIGS. 57G and 57H.

Figure 57E:
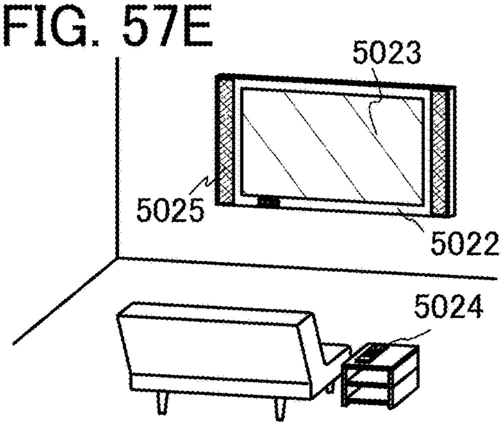

In FIG. 57E, the semiconductor device is incorporated in a wall that is a building structure. In FIG. 57E, the semiconductor device includes a housing 5022, a display portion 5023, a remote control 5024 that is an operation portion, a speaker 5025, and the like. The semiconductor device is incorporated in the wall of a building and can be provided without requiring a large space.

Figure 57F:
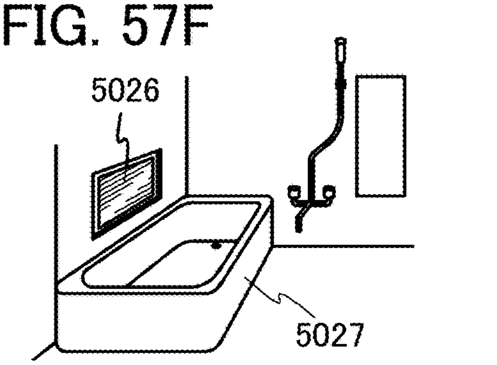

In FIG. 57F, the semiconductor device is incorporated in a prefabricated bath 5027 that is a building structure. A display panel 5026 included in the semiconductor device is incorporated in the prefabricated bath 5027, so that a person who takes a bath can watch the display panel 5026.

Note that although FIGS. 57E and 57F illustrate the wall and the prefabricated bath unit as examples of the building structures, the semiconductor device can be provided in a variety of building structures.

Figure 57G:
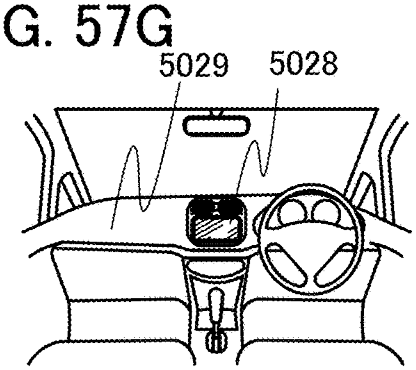

In FIG. 57G, the semiconductor device is incorporated in a display panel 5028 in a car body 5029 of a car and can display information related to the operation of the car or information input from the inside or outside of the car on demand. Note that the semiconductor device may have a navigation function.

Figure 57H:
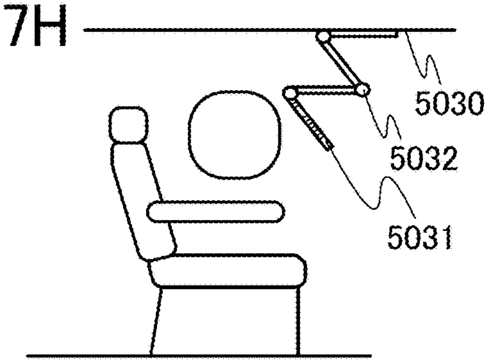
Figure 58:
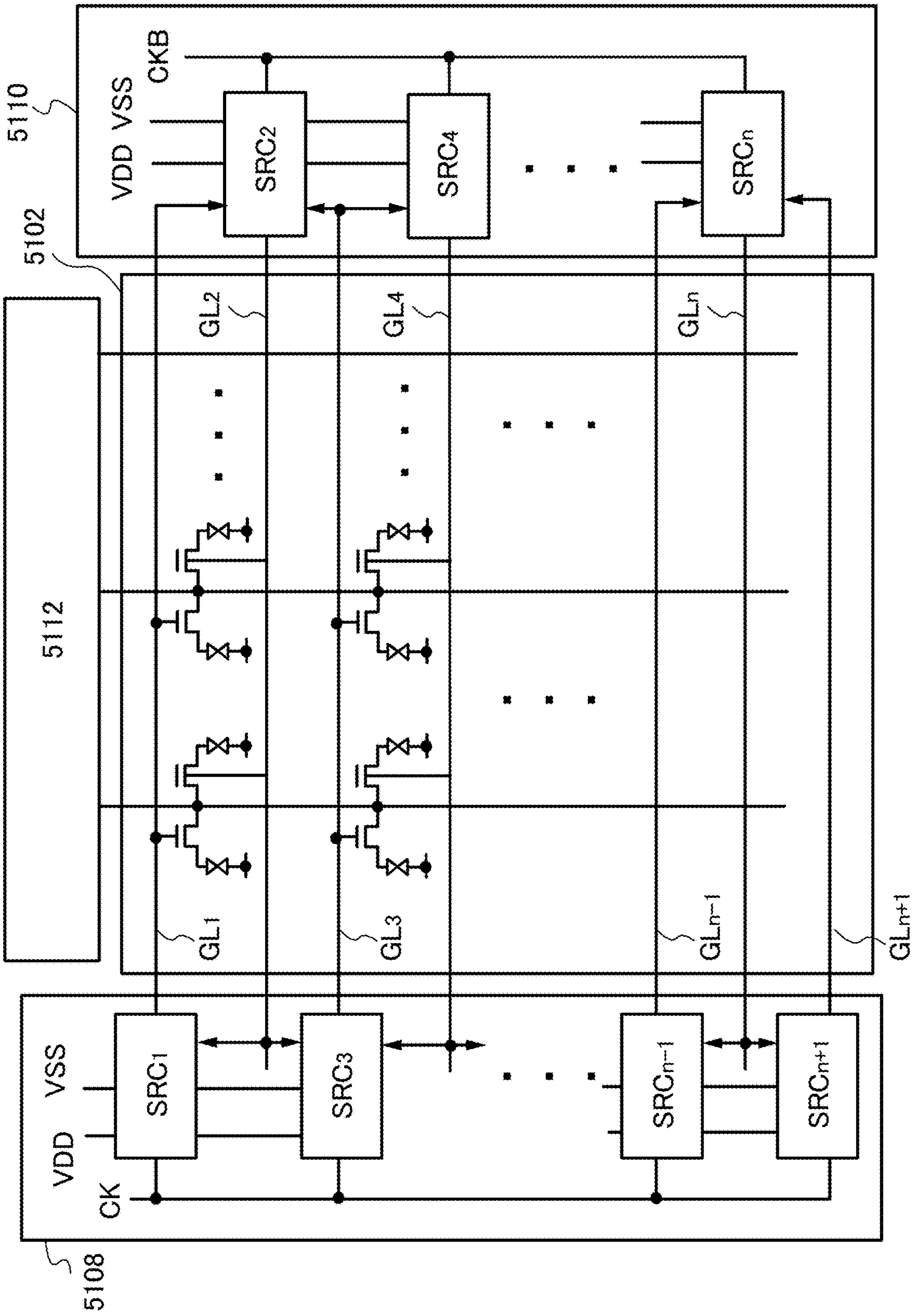
FIG. 58 illustrates a structure example of a display device.

In FIG. 57H, the semiconductor device is incorporated in a passenger airplane. FIG. 57H illustrates a usage pattern at the time when a display panel 5031 is provided for a ceiling 5030 above a seat of the passenger airplane. The display panel 5031 is incorporated in the ceiling 5030 through a hinge 5032, and a passenger can watch the display panel 5031 by stretching of the hinge 5032. The display panel 5031 has a function of displaying information by the operation of the passenger.

Note that although a car and an airplane are illustrated as moving vehicles in FIGS. 57G and 57H, the semiconductor device can be provided for a variety of vehicles such as two-wheeled vehicles, four-wheeled vehicles (including cars, buses, and the like), trains (including monorails, railroads, and the like), and vessels.

Example 1

In this example, circuit simulation was performed to verify that delay or distortion of a signal output to a gate signal line is decreased in a semiconductor device including two gate driver circuits.

In the circuit simulation, the semiconductor device described in Embodiment 5 with reference to FIG. 31B was used. In the semiconductor device illustrated in FIG. 31B, the wiring 111 corresponds to a gate signal line and the circuits 200A and 200B correspond to gate driver circuits.

Figure 59:
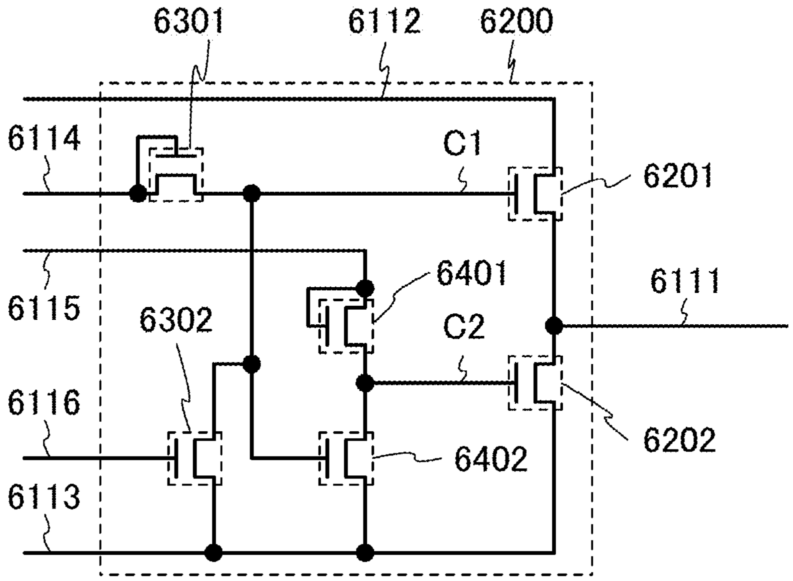
FIG. 59 is a circuit diagram of a semiconductor device which is a comparison example.

In addition, FIG. 59 is a circuit diagram of a semiconductor device used as a comparison example. In FIG. 59, a circuit 6200 includes a transistor 6201, a transistor 6202, a transistor 6301, a transistor 6302, a transistor 6401, and a transistor 6402.

A first terminal of the transistor 6201 is connected to a wiring 6112. A second terminal of the transistor 6201 is connected to a wiring 6111. A gate of the transistor 6201 is connected to the node C1. A first terminal of the transistor 6202 is connected to a wiring 6113. A second terminal of the transistor 6202 is connected to the wiring 6111. A gate of the transistor 6202 is connected to the node C2.

A first terminal of the transistor 6301 is connected to a wiring 6114. A second terminal of the transistor 6301 is connected to the node C1. A gate of the transistor 6301 is connected to the wiring 6114. A first terminal of the transistor 6302 is connected to the wiring 6113. A second terminal of the transistor 6302 is connected to the node C1. A gate of the transistor 6302 is connected to a wiring 6116. A first terminal of the transistor 6401 is connected to a wiring 6115. A second terminal of the transistor 6401 is connected to the node C2. A gate of the transistor 6401 is connected to the wiring 6115. A first terminal of the transistor 6402 is connected to the wiring 6113. A second terminal of the transistor 6402 is connected to the node C2. A gate of the transistor 6402 is connected to the gate of the transistor 6201.

Figure 60A:
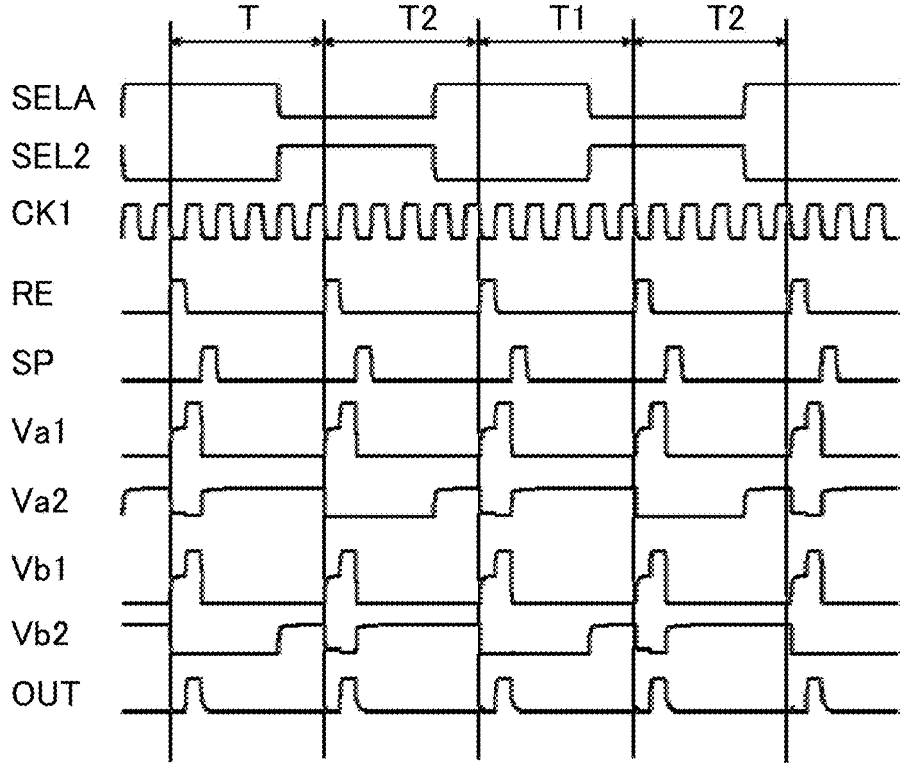
FIGS. 60A and 60B each illustrate a calculation result by circuit simulation.
Figure 60B:
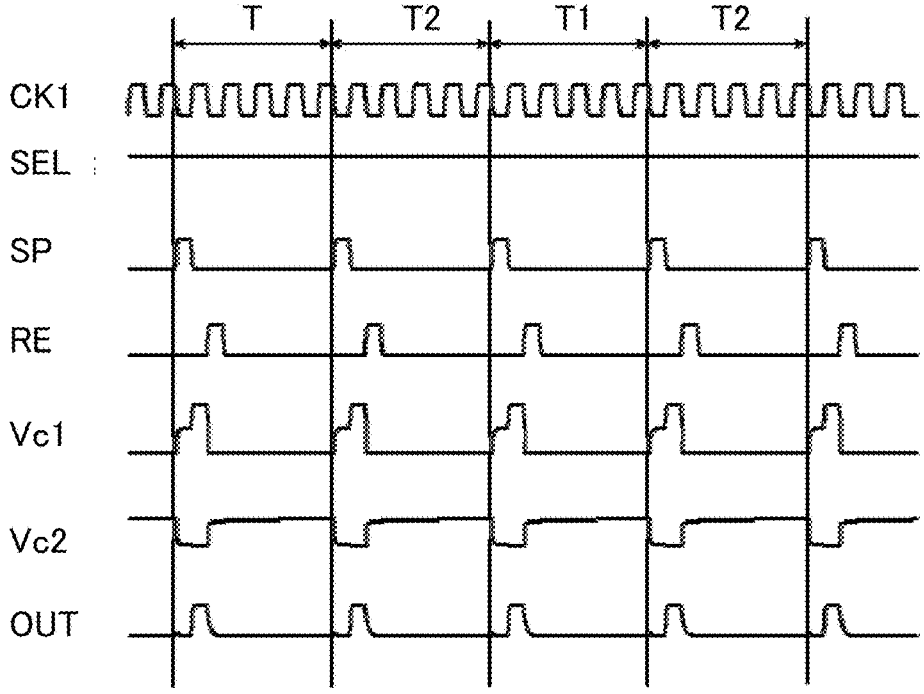
Figure 61:
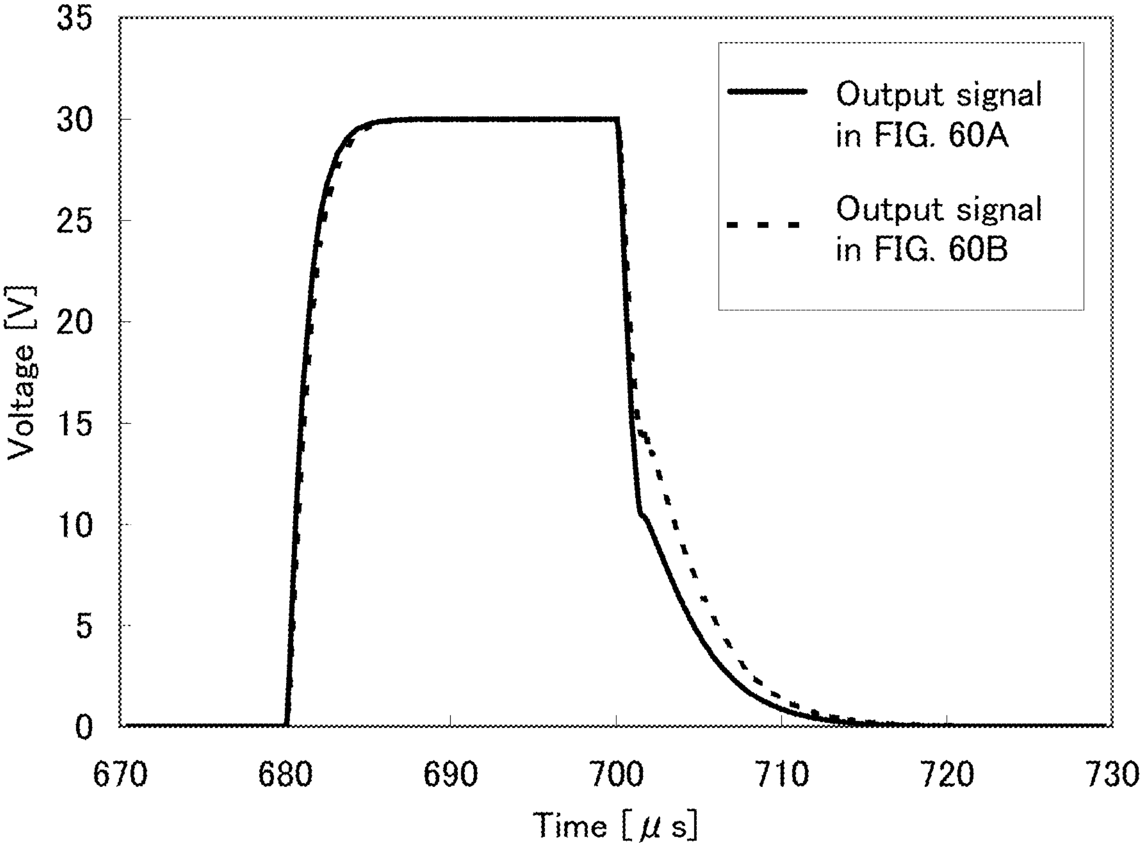
FIG. 61 illustrates a calculation result by circuit simulation.

FIGS. 60A and 60B and FIG. 61 show results of the circuit simulation. Note that PSpice was used as calculation software. It is assumed that the threshold voltage of the transistor was 5 V and the field-effect mobility of the transistor was 1 $cm^2/Vs$. Further, it is assumed that the voltage amplitude of the clock signal CK1 was 30 V (an H-level potential was 30 V and an L-level potential was 0 V), and ground voltage was 0 V.

Here, the transistor 201A and the transistor 201B in FIG. 31B and the transistor 6201 in FIG. 59 have the same characteristics. Similarly, the transistor 202A and the transistor 202B in FIG. 31B and the transistor 6202 in FIG. 59 have the same characteristics; the transistor 301A and the transistor 301B in FIG. 31B and the transistor 6301 in FIG. 59 have the same characteristics; the transistor 302A and the transistor 302B in FIG. 31B and the transistor 6302 in FIG. 59 have the same characteristics; the transistor 401A and the transistor 401B in FIG. 31B and the transistor 6401 in FIG. 59 have the same characteristics; the transistor 402A and the transistor 402B in FIG. 31B and the transistor 6402 in FIG. 59 have the same characteristics.

The same voltage was input to the wiring 113A and the wiring 113B in FIG. 31B and the wiring 6113 in FIG. 59. Similarly, the same start pulse SP was input to the wiring 114A and the wiring 114B in FIG. 31B and the wiring 6114 in FIG. 59; the same reset signal RE was input to the wiring 116A and the wiring 116B in FIG. 31B and the wiring 6116 in FIG. 59. In addition, the signal SELA was input to the wiring 115A, and the signal SELB was input to the wiring 115B. Fixed voltage was input to the wiring 6115.

FIG. 60A shows results of the circuit simulation using the circuit diagram illustrated in FIG. 31B. FIG. 60B shows results of the circuit simulation using the circuit diagram illustrated in FIG. 59. FIG. 60A illustrates the potential Va1 of the node A1, the potential Va2 of the node A2, the potential Vb1 of the node B1, the potential Vb2 of the node B2, and the potential of an output signal OUT of the wiring 111. In addition, FIG. 60B illustrates a potential Vc1 of the node C1, a potential Vc2 of the node C2, and the potential of an output signal OUT of the signal line 6111.

With the use of FIG. 61, the potential of the output signal OUT of the wiring 111 in FIG. 60A is compared with the potential of the output signal OUT of the signal line 6111 in FIG. 60B.

As illustrated in FIG. 61, it is confirmed that delay of the output signal OUT output to the wiring 111 in FIG. 60A was further decreased as compared to delay of the output signal OUT output to the signal line 6111 in FIG. 60B.

This application is based on Japanese Patent Application serial No. 2010-201621 filed with Japan Patent Office on Sep. 9, 2010, the entire contents of which are hereby incorporated by reference.

What is claimed is:

1. A display device comprising:

a first gate driver circuit; and a second gate driver circuit, wherein each of the first gate driver circuit and the second gate driver circuit comprises a plurality of circuits, wherein at least one of the plurality of circuits comprises first to tenth transistors, wherein one of a source and a drain of the first transistor is electrically connected to a first wiring, wherein the other of the source and the drain of the first transistor is electrically connected to a second wiring, wherein one of a source and a drain of the second transistor is electrically connected to a third wiring, wherein the other of the source and the drain of the second transistor is electrically connected to the first wiring, wherein one of a source and a drain of the third transistor is electrically connected to a gate of the first transistor, wherein the other of the source and the drain of the third transistor is electrically connected to a gate of the third transistor, wherein one of a source and a drain of the fourth transistor is electrically connected to the third wiring, wherein the other of the source and the drain of the fourth transistor is electrically connected to the gate of the first transistor, wherein one of a source and a drain of the fifth transistor is electrically connected to a gate of the second transistor, wherein the other of the source and the drain of the fifth transistor is electrically connected to a fourth wiring, wherein a gate of the fifth transistor is electrically connected to the fourth wiring, wherein one of a source and a drain of the sixth transistor is electrically connected to the gate of the second transistor, wherein the other of the source and the drain of the sixth transistor is electrically connected to the fourth wiring, wherein a gate of the sixth transistor is electrically connected to the gate of the second transistor, wherein one of a source and a drain of the seventh transistor is electrically connected to the third wiring, wherein the other of the source and the drain of the seventh transistor is electrically connected to the gate of the second transistor, wherein a gate of the seventh transistor is electrically connected to the gate of the first transistor, wherein one of a source and a drain of the eighth transistor is electrically connected to a gate of the fourth transistor, wherein the other of the source and the drain of the eighth transistor is electrically connected to a fifth wiring, wherein a gate of the eighth transistor is electrically connected to the fifth wiring, wherein one of a source and a drain of the ninth transistor is electrically connected to the third wiring, wherein the other of the source and the drain of the ninth transistor is electrically connected to the gate of the fourth transistor, wherein a gate of the ninth transistor is electrically connected to the gate of the first transistor, wherein one of a source and a drain of the tenth transistor is electrically connected to the third wiring, wherein the other of the source and the drain of the tenth transistor is electrically connected to the gate of the first transistor, wherein a gate of the tenth transistor is electrically connected to a sixth wiring, and wherein the fourth wiring is configured to be a clock signal line.

2. The display device according to claim 1, wherein a channel width of the seventh transistor is larger than a channel width of the fifth transistor.

3. The display device according to claim 1, wherein a channel width of the ninth transistor is larger than a channel width of the eighth transistor.

4. The display device according to claim 1, wherein the first wiring comprises a first conductive layer, wherein the one of the source and the drain of the first transistor comprises a second conductive layer, and wherein the first conductive layer and the second conductive layer are electrically connected through a plurality of contact holes in an insulating layer provided between the first conductive layer and the second conductive layer.

5. A display device comprising:

a first gate driver circuit; and a second gate driver circuit, wherein each of the first gate driver circuit and the second gate driver circuit comprises a plurality of circuits, wherein at least one of the plurality of circuits comprises first to tenth transistors, wherein one of a source and a drain of the first transistor is electrically connected to a first wiring, wherein the other of the source and the drain of the first transistor is electrically connected to a second wiring, wherein one of a source and a drain of the second transistor is electrically connected to a third wiring, wherein the other of the source and the drain of the second transistor is electrically connected to the first wiring, wherein one of a source and a drain of the third transistor is electrically connected to a gate of the first transistor, wherein the other of the source and the drain of the third transistor is electrically connected to a gate of the third transistor, wherein one of a source and a drain of the fourth transistor is electrically connected to the third wiring, wherein the other of the source and the drain of the fourth transistor is electrically connected to the gate of the first transistor, wherein one of a source and a drain of the fifth transistor is electrically connected to a gate of the second transistor, wherein the other of the source and the drain of the fifth transistor is electrically connected to a fourth wiring, wherein a gate of the fifth transistor is electrically connected to the fourth wiring, wherein one of a source and a drain of the sixth transistor is electrically connected to the gate of the second transistor, wherein the other of the source and the drain of the sixth transistor is electrically connected to the fourth wiring, wherein a gate of the sixth transistor is electrically connected to the gate of the second transistor, wherein one of a source and a drain of the seventh transistor is electrically connected to the third wiring, wherein the other of the source and the drain of the seventh transistor is electrically connected to the gate of the second transistor, wherein a gate of the seventh transistor is electrically connected to the gate of the first transistor, wherein one of a source and a drain of the eighth transistor is electrically connected to a gate of the fourth transistor, wherein the other of the source and the drain of the eighth transistor is electrically connected to a fifth wiring, wherein a gate of the eighth transistor is electrically connected to the fifth wiring, wherein one of a source and a drain of the ninth transistor is electrically connected to the third wiring, wherein the other of the source and the drain of the ninth transistor is electrically connected to the gate of the fourth transistor, wherein a gate of the ninth transistor is electrically connected to the gate of the first transistor, wherein one of a source and a drain of the tenth transistor is electrically connected to the third wiring, wherein the other of the source and the drain of the tenth transistor is electrically connected to the gate of the first transistor, wherein a gate of the tenth transistor is electrically connected to a sixth wiring, wherein the first wiring is configured to transmit a signal output from the one of the plurality of circuits, wherein the second wiring is configured to be a first clock signal line, wherein the third wiring is configured to be a power supply line, and wherein the fourth wiring is configured to be a second clock signal line.

6. The display device according to claim 5, wherein a channel width of the seventh transistor is larger than a channel width of the fifth transistor.

7. The display device according to claim 5, wherein a channel width of the ninth transistor is larger than a channel width of the eighth transistor.

8. The display device according to claim 5, wherein the first wiring comprises a first conductive layer, wherein the one of the source and the drain of the first transistor comprises a second conductive layer, and wherein the first conductive layer and the second conductive layer are electrically connected through a plurality of contact holes in an insulating layer provided between the first conductive layer and the second conductive layer.

9. A display device comprising:

a first gate driver circuit; and a second gate driver circuit, wherein each of the first gate driver circuit and the second gate driver circuit comprises a plurality of circuits, wherein at least one of the plurality of circuits comprises first to tenth transistors, wherein one of a source and a drain of the first transistor is electrically connected to a first wiring, wherein the other of the source and the drain of the first transistor is electrically connected to a second wiring, wherein one of a source and a drain of the second transistor is electrically connected to a third wiring, wherein the other of the source and the drain of the second transistor is electrically connected to the first wiring, wherein one of a source and a drain of the third transistor is electrically connected to a gate of the first transistor, wherein the other of the source and the drain of the third transistor is electrically connected to a gate of the third transistor, wherein one of a source and a drain of the fourth transistor is electrically connected to the third wiring, wherein the other of the source and the drain of the fourth transistor is electrically connected to the gate of the first transistor, wherein one of a source and a drain of the fifth transistor is electrically connected to a gate of the second transistor, wherein the other of the source and the drain of the fifth transistor is electrically connected to a fourth wiring, wherein a gate of the fifth transistor is electrically connected to the fourth wiring, wherein one of a source and a drain of the sixth transistor is electrically connected to the gate of the second transistor, wherein the other of the source and the drain of the sixth transistor is electrically connected to the fourth wiring, wherein a gate of the sixth transistor is electrically connected to the gate of the second transistor, wherein one of a source and a drain of the seventh transistor is electrically connected to the third wiring, wherein the other of the source and the drain of the seventh transistor is electrically connected to the gate of the second transistor, wherein a gate of the seventh transistor is electrically connected to the gate of the first transistor, wherein one of a source and a drain of the eighth transistor is electrically connected to a gate of the fourth transistor, wherein the other of the source and the drain of the eighth transistor is electrically connected to a fifth wiring, wherein a gate of the eighth transistor is electrically connected to the fifth wiring, wherein one of a source and a drain of the ninth transistor is electrically connected to the third wiring, wherein the other of the source and the drain of the ninth transistor is electrically connected to the gate of the fourth transistor, wherein a gate of the ninth transistor is electrically connected to the gate of the first transistor, wherein one of a source and a drain of the tenth transistor is electrically connected to the third wiring, wherein the other of the source and the drain of the tenth transistor is electrically connected to the gate of the first transistor, wherein a gate of the tenth transistor is electrically connected to a sixth wiring, wherein the fourth wiring is configured to be a clock signal line, wherein a channel width of the seventh transistor is larger than a channel width of the fifth transistor, and wherein a channel width of the ninth transistor is larger than a channel width of the eighth transistor.

10. The display device according to claim 9, wherein the first wiring comprises a first conductive layer, wherein the one of the source and the drain of the first transistor comprises a second conductive layer, and wherein the first conductive layer and the second conductive layer are electrically connected through a plurality of contact holes in an insulating layer provided between the first conductive layer and the second conductive layer.

* * * * *